(12) United States Patent
Ohata et al.

(10) Patent No.: US 8,289,632 B2
(45) Date of Patent: Oct. 16, 2012

(54) ZOOM LENS AND IMAGE PICKUP DEVICE

(75) Inventors: Atsushi Ohata, Tokyo (JP); Takuya Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 12/926,066

(22) Filed: Oct. 25, 2010

(65) Prior Publication Data

US 2011/0096407 A1    Apr. 28, 2011

(30) Foreign Application Priority Data

Oct. 27, 2009  (JP) ................. 2009-246700
Oct. 27, 2009  (JP) ................. 2009-246701
Oct. 27, 2009  (JP) ................. 2009-246702

(51) Int. Cl.
  *G02B 9/12*    (2006.01)
  *G02B 9/34*    (2006.01)
(52) U.S. Cl. ........................ 359/782; 359/783
(58) Field of Classification Search ........... 359/781–784
   See application file for complete search history.

(56) References Cited

U.S. PATENT DOCUMENTS

2007/0229972 A1 * 10/2007 Satori ...................... 359/686

FOREIGN PATENT DOCUMENTS

| JP | 2005-308953 | 11/2005 |
| JP | 2006-113404 | 4/2006 |
| JP | 2007-255864 | 9/2007 |
| JP | 2008-233161 | 10/2008 |

* cited by examiner

*Primary Examiner* — Joseph P Martinez

(74) *Attorney, Agent, or Firm* — Rader Fishman & Grauer, PLLC

(57) ABSTRACT

A zoom lens includes three groups that are a negative first group, a positive second group, and a positive third group in order from an object side. The first group includes a negative cemented lens formed by joining together, from the object side, a first lens formed by a negative single lens and a second lens formed by a positive single lens. The second group includes, from the object side, a third lens formed by a positive single lens and a cemented lens formed by joining together a fourth lens formed by a positive single lens and a fifth lens formed by a negative single lens. The third group includes a sixth lens formed by a positive single lens.

28 Claims, 51 Drawing Sheets

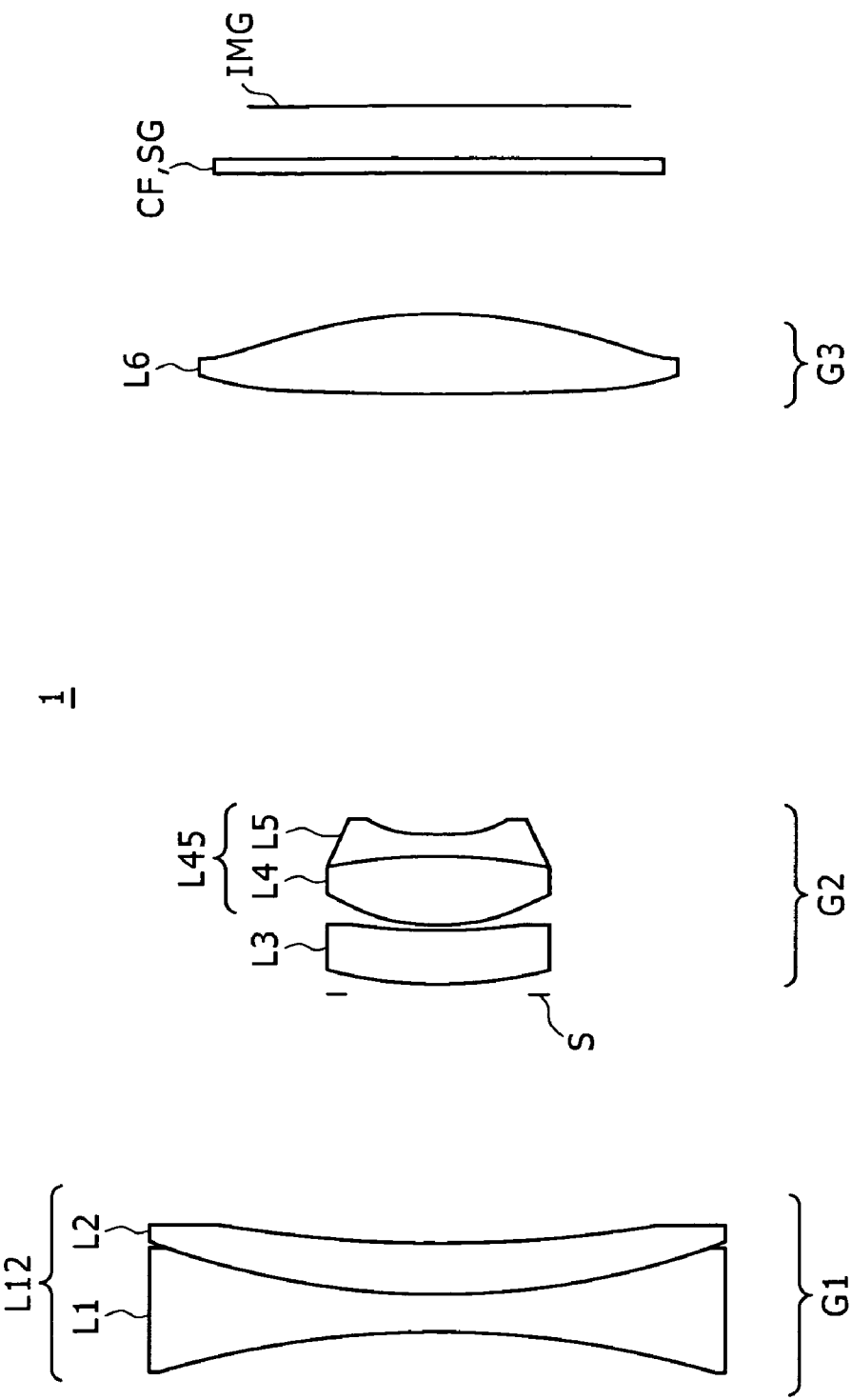

FIG. 4
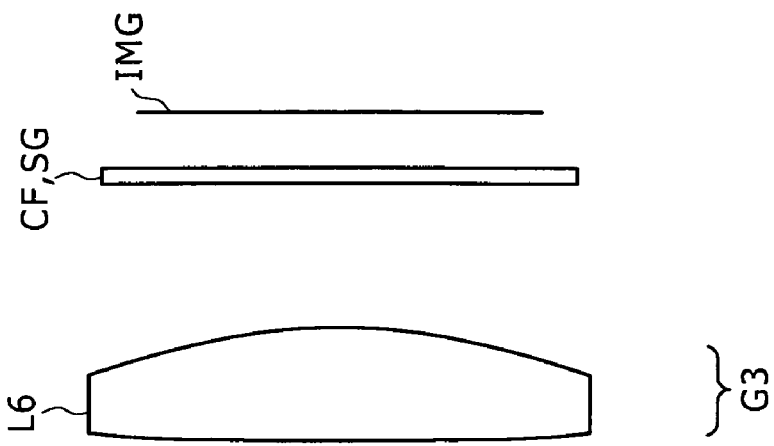
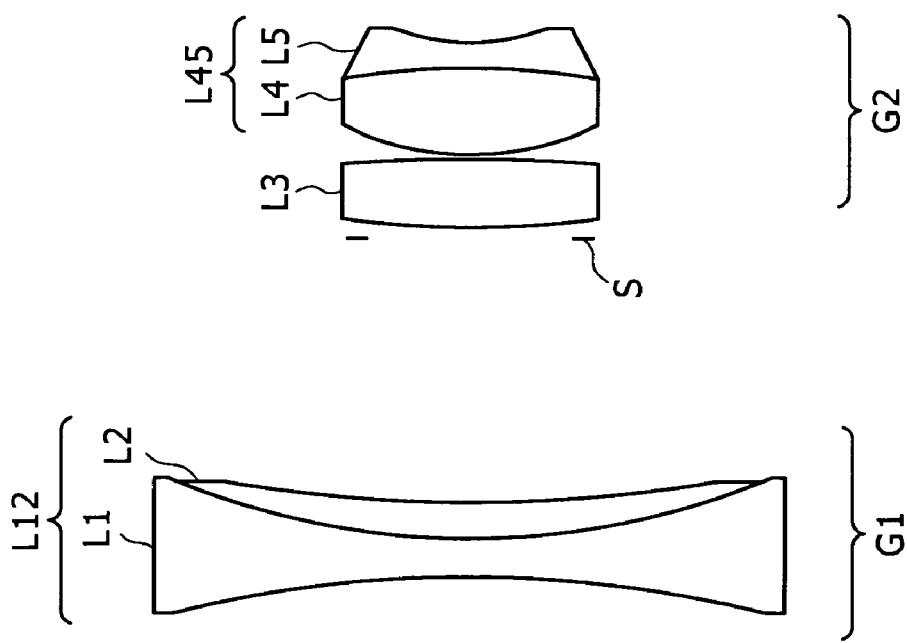

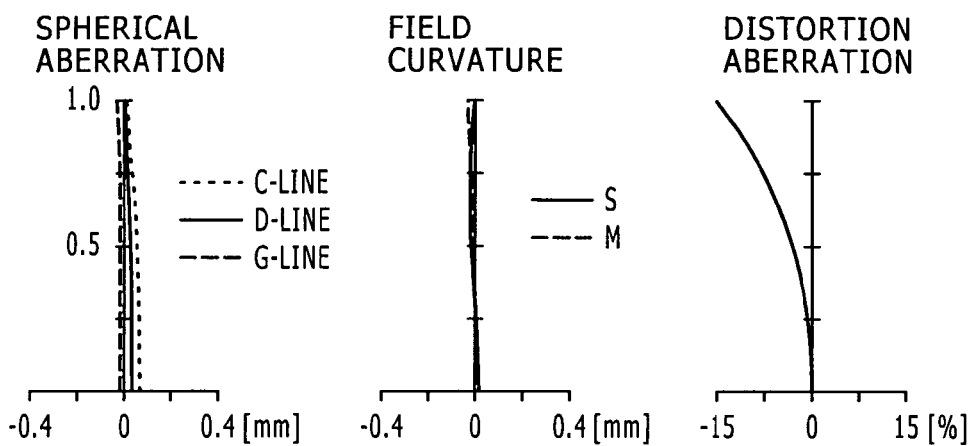
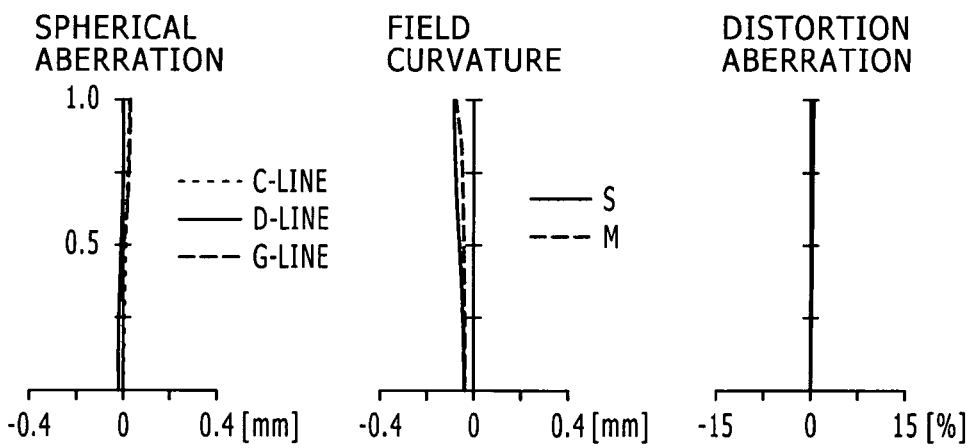
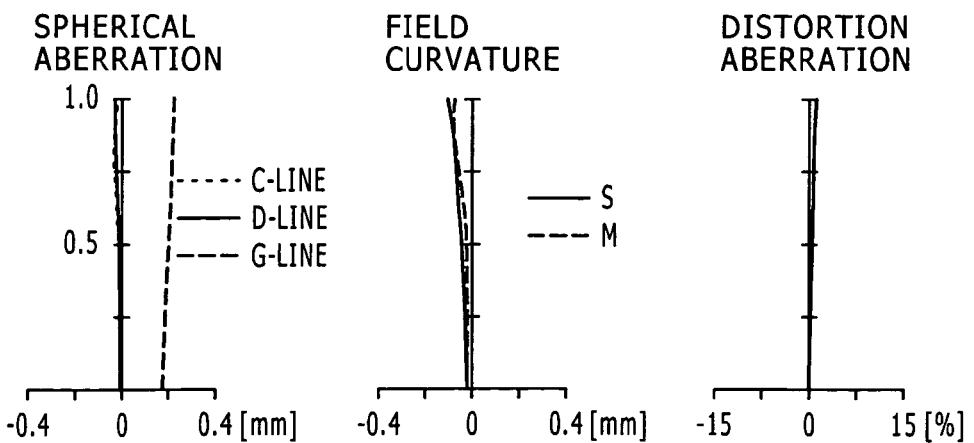

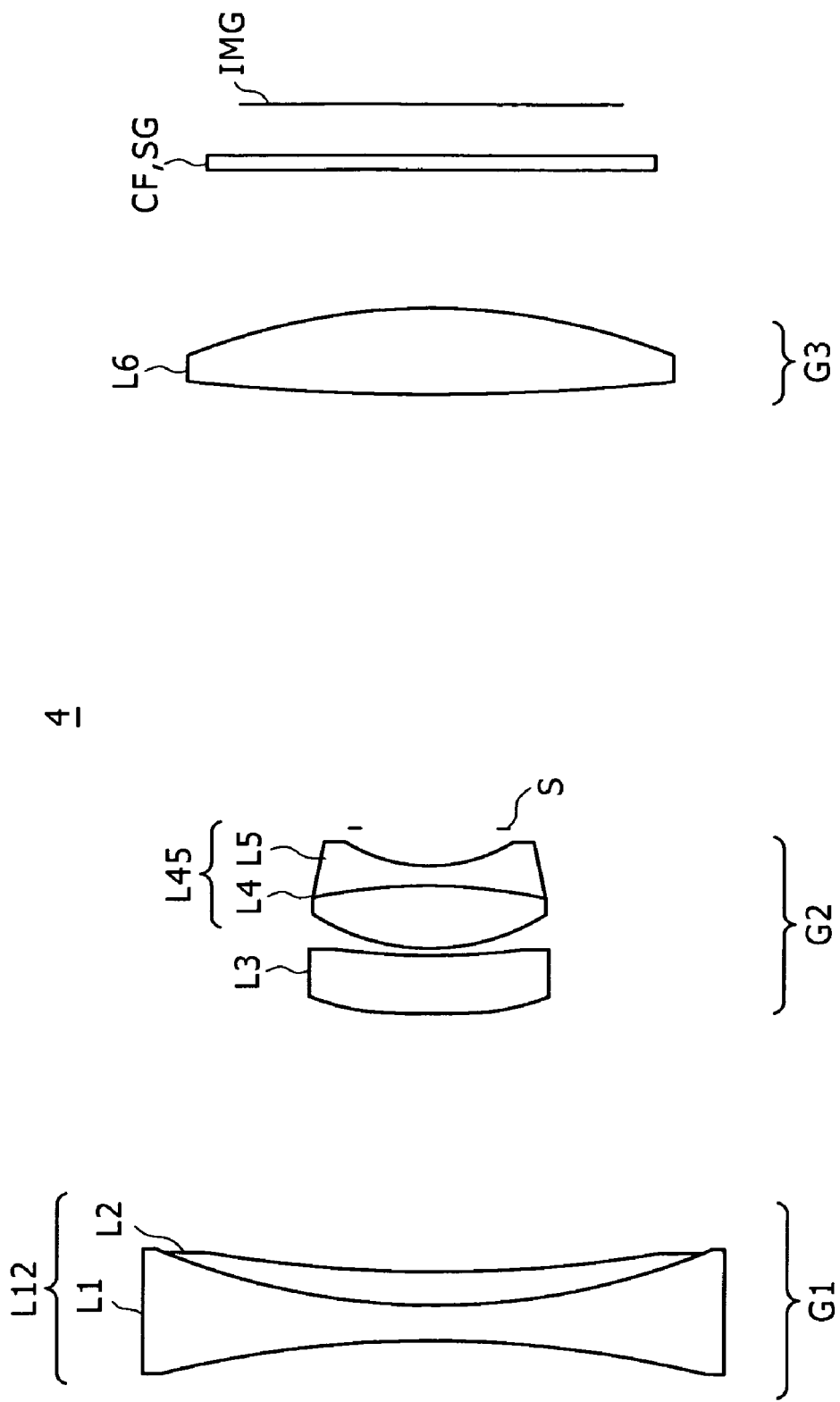

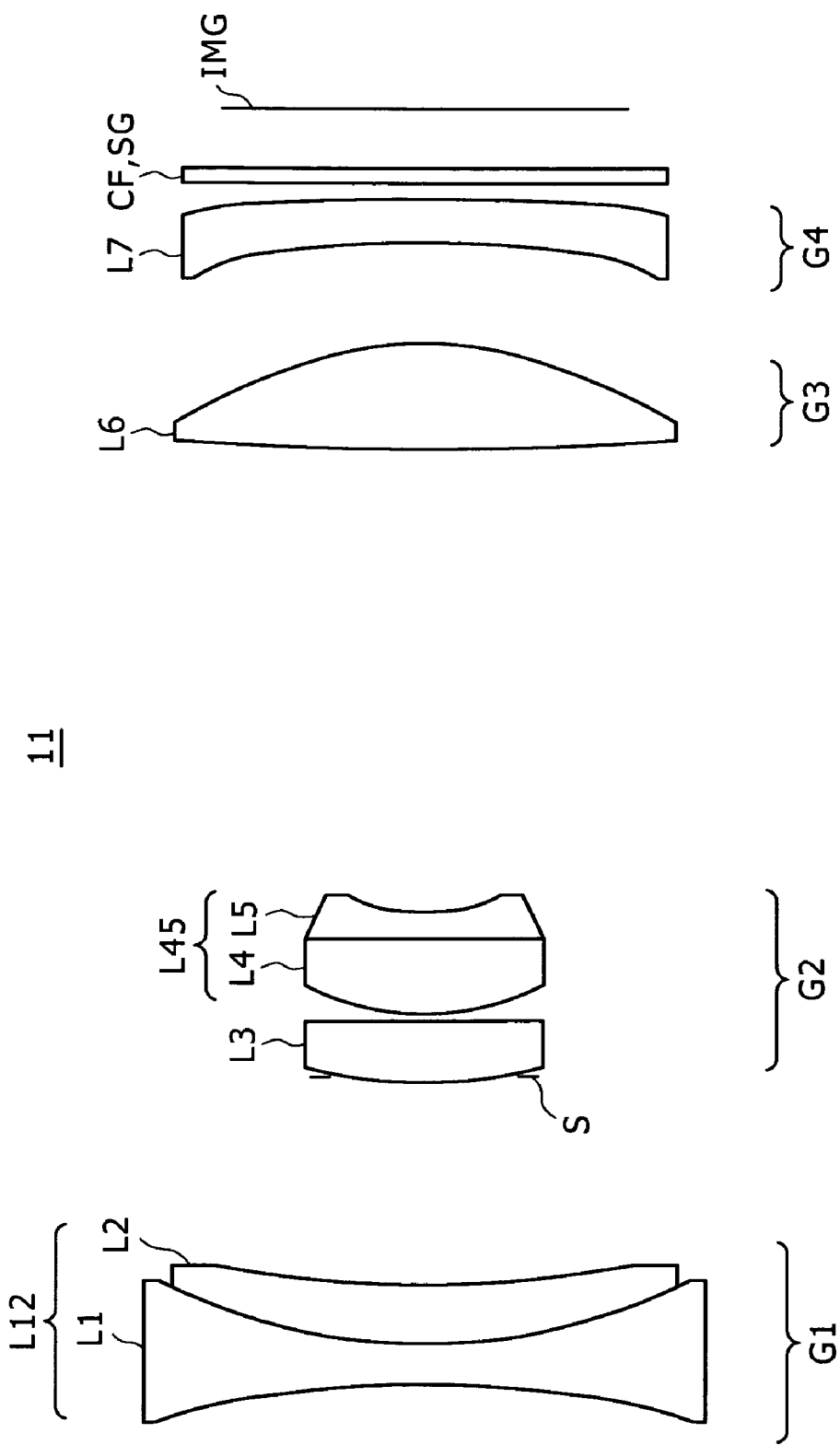

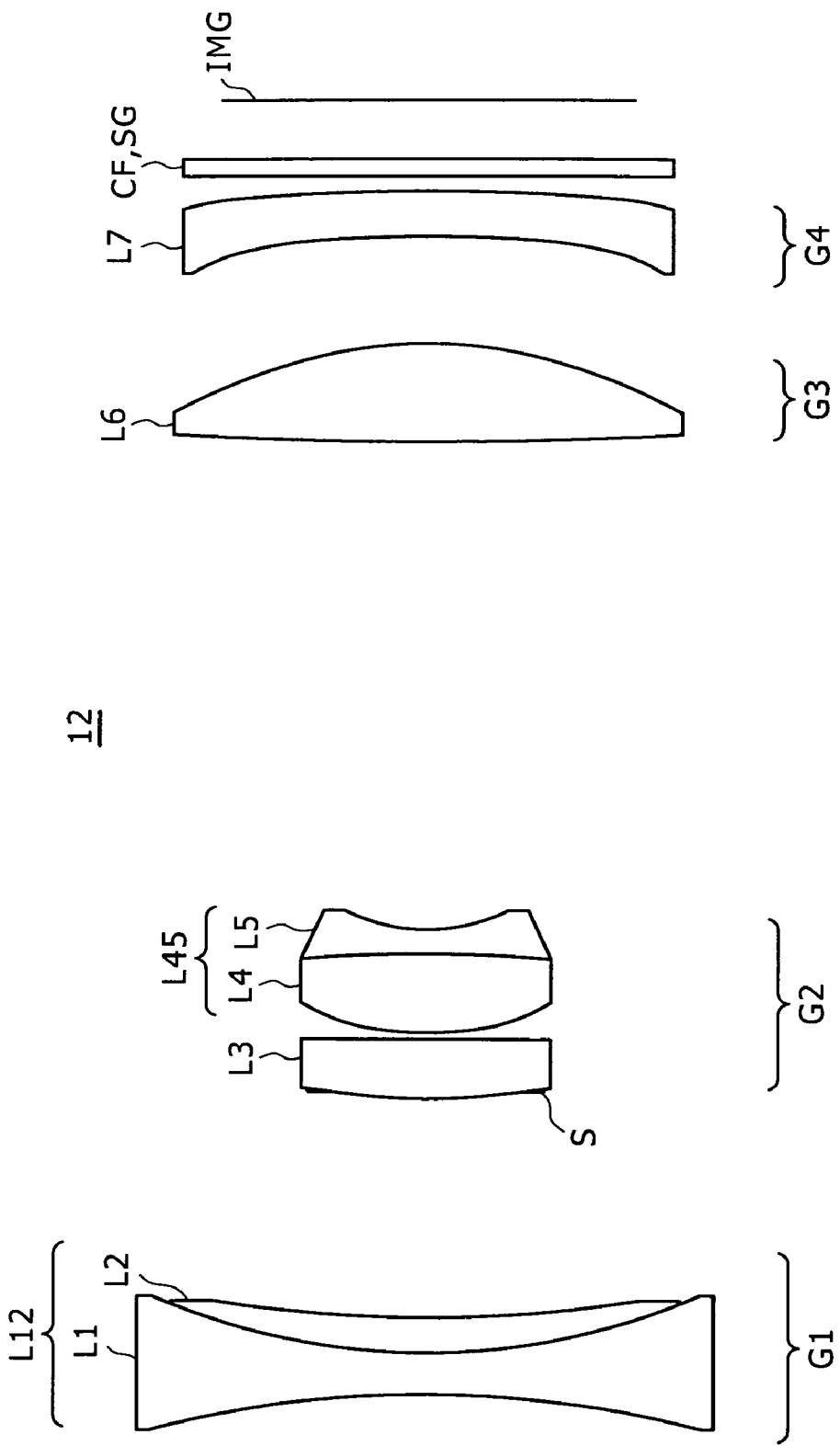

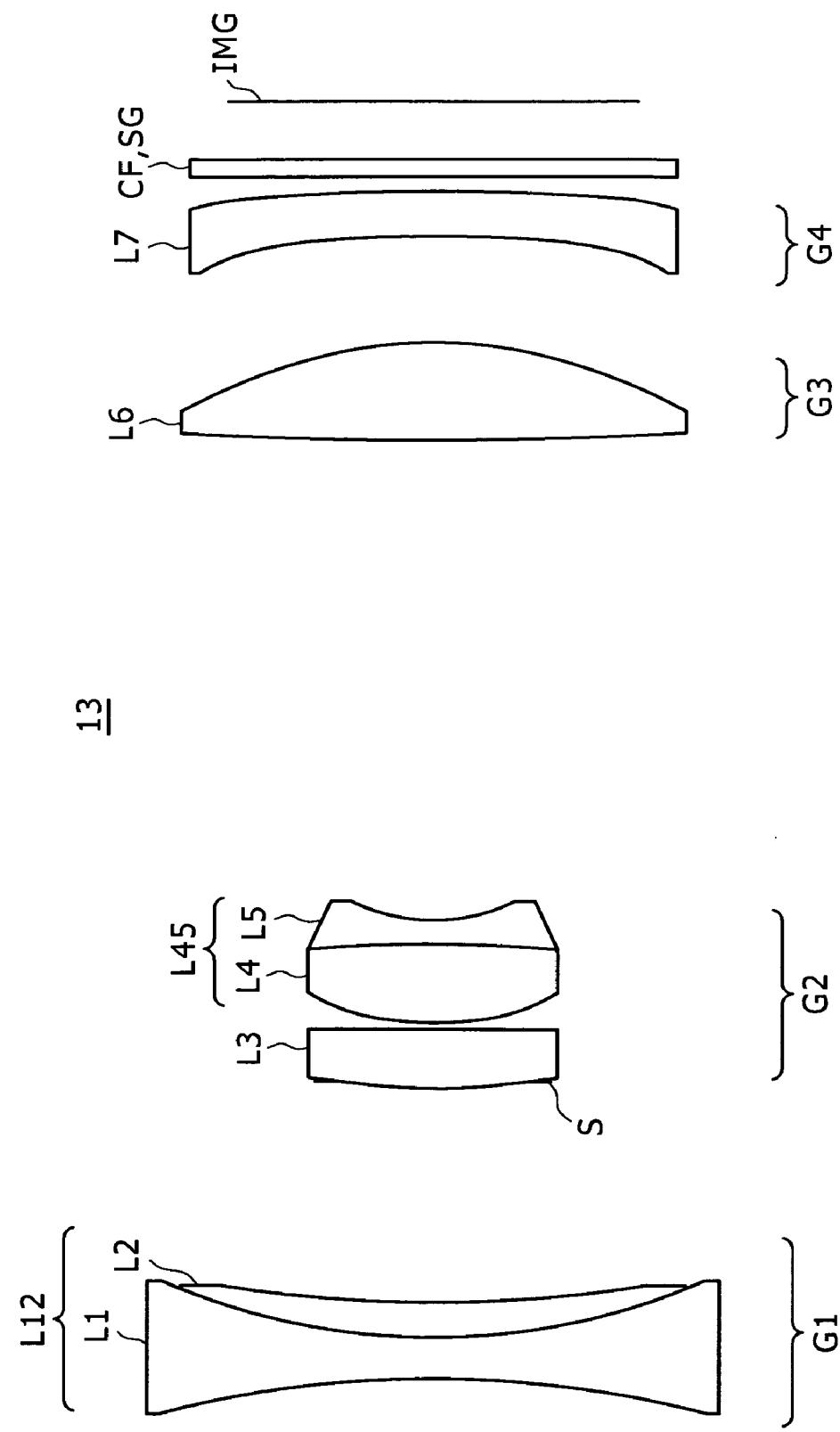

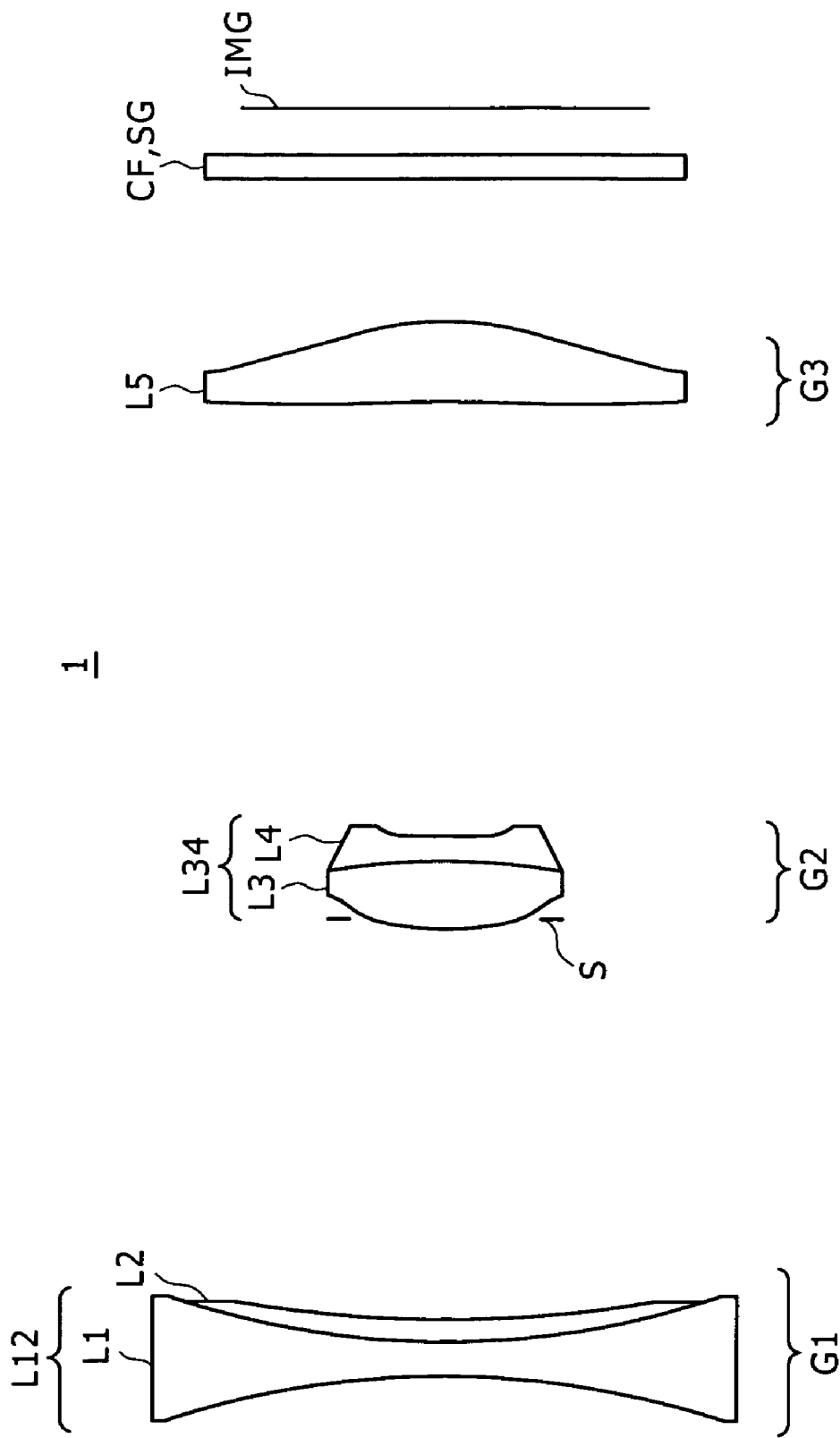

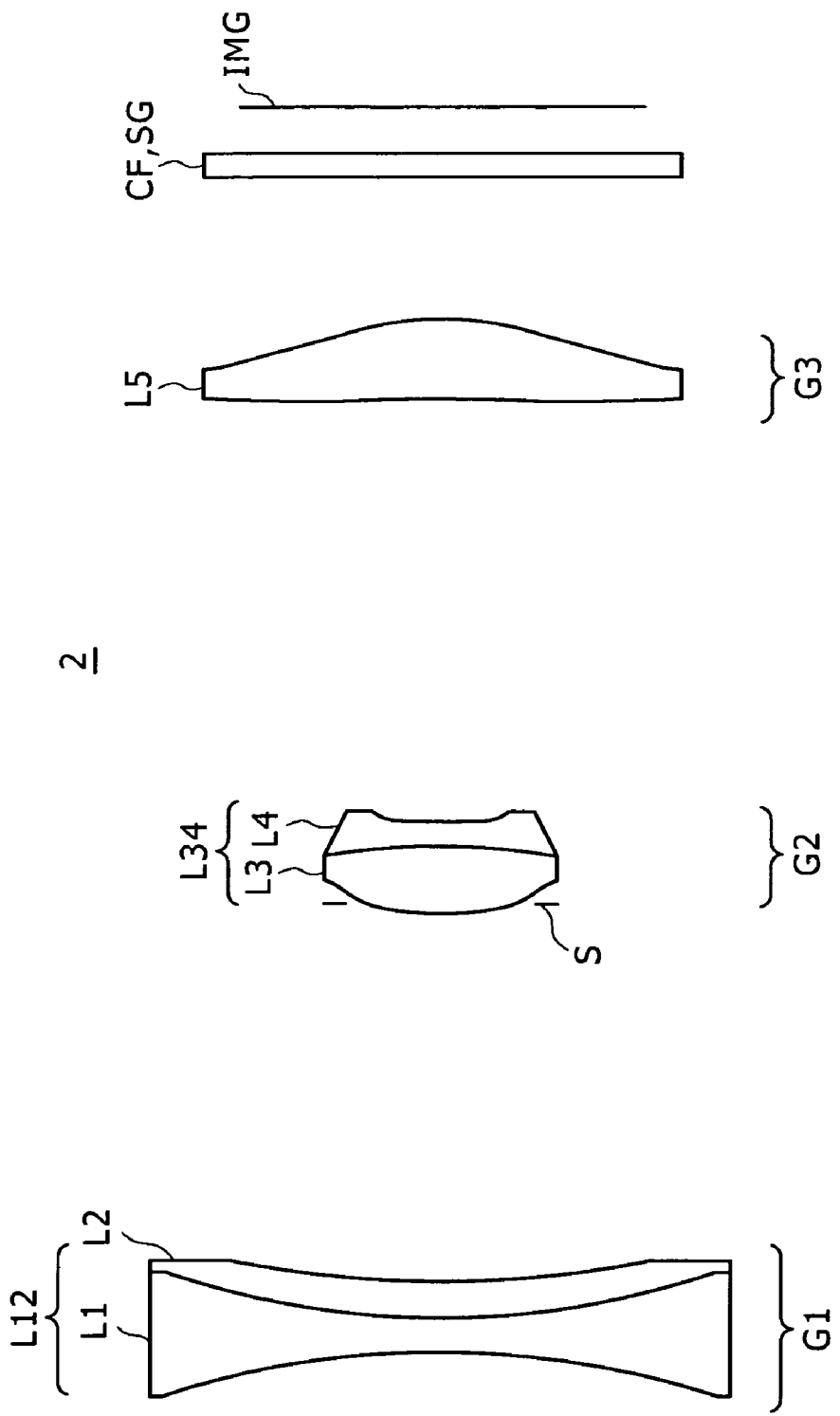

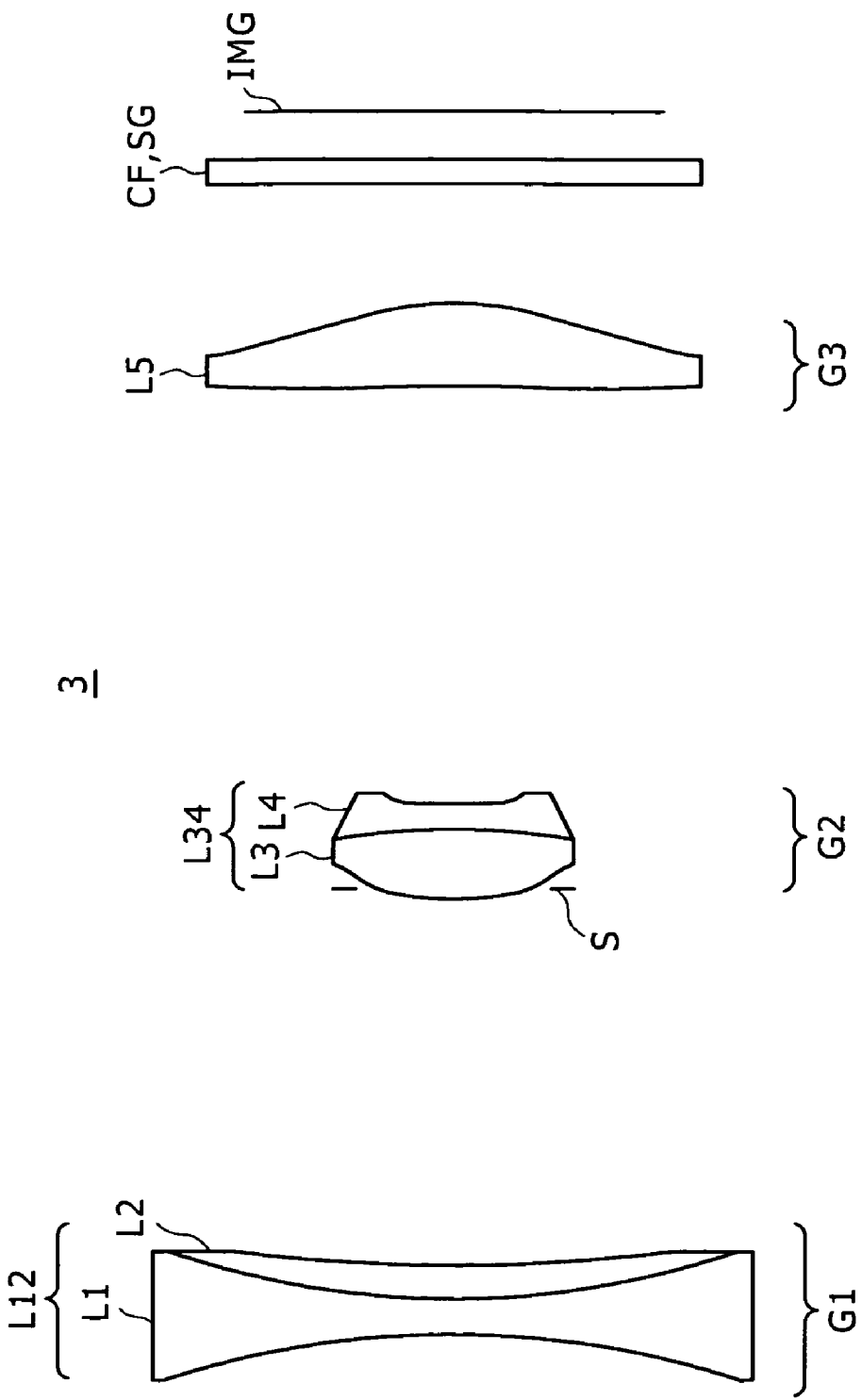

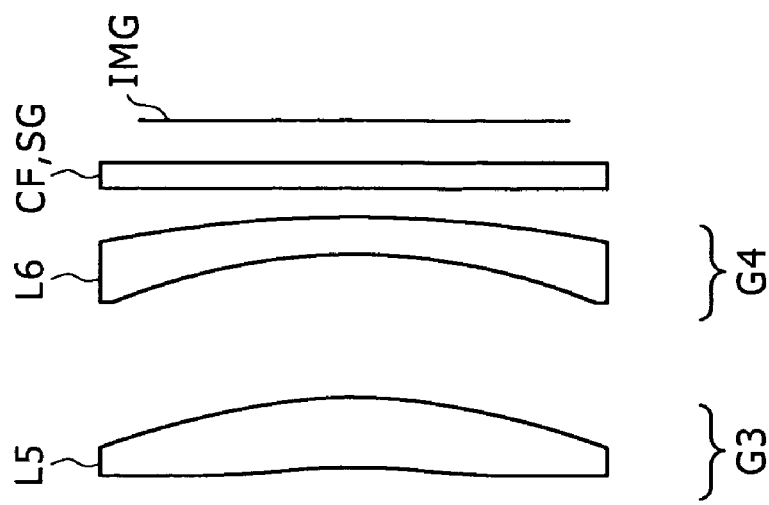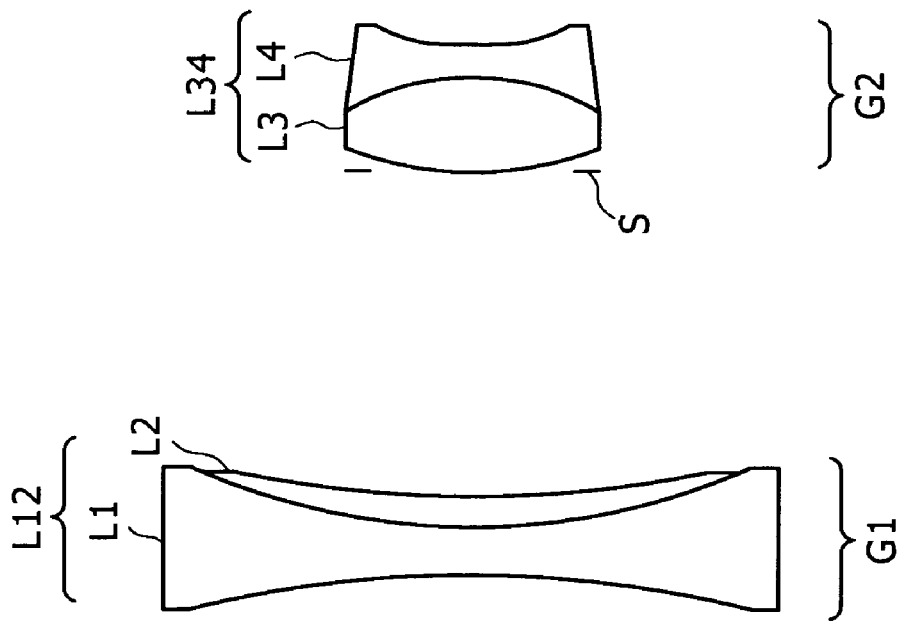

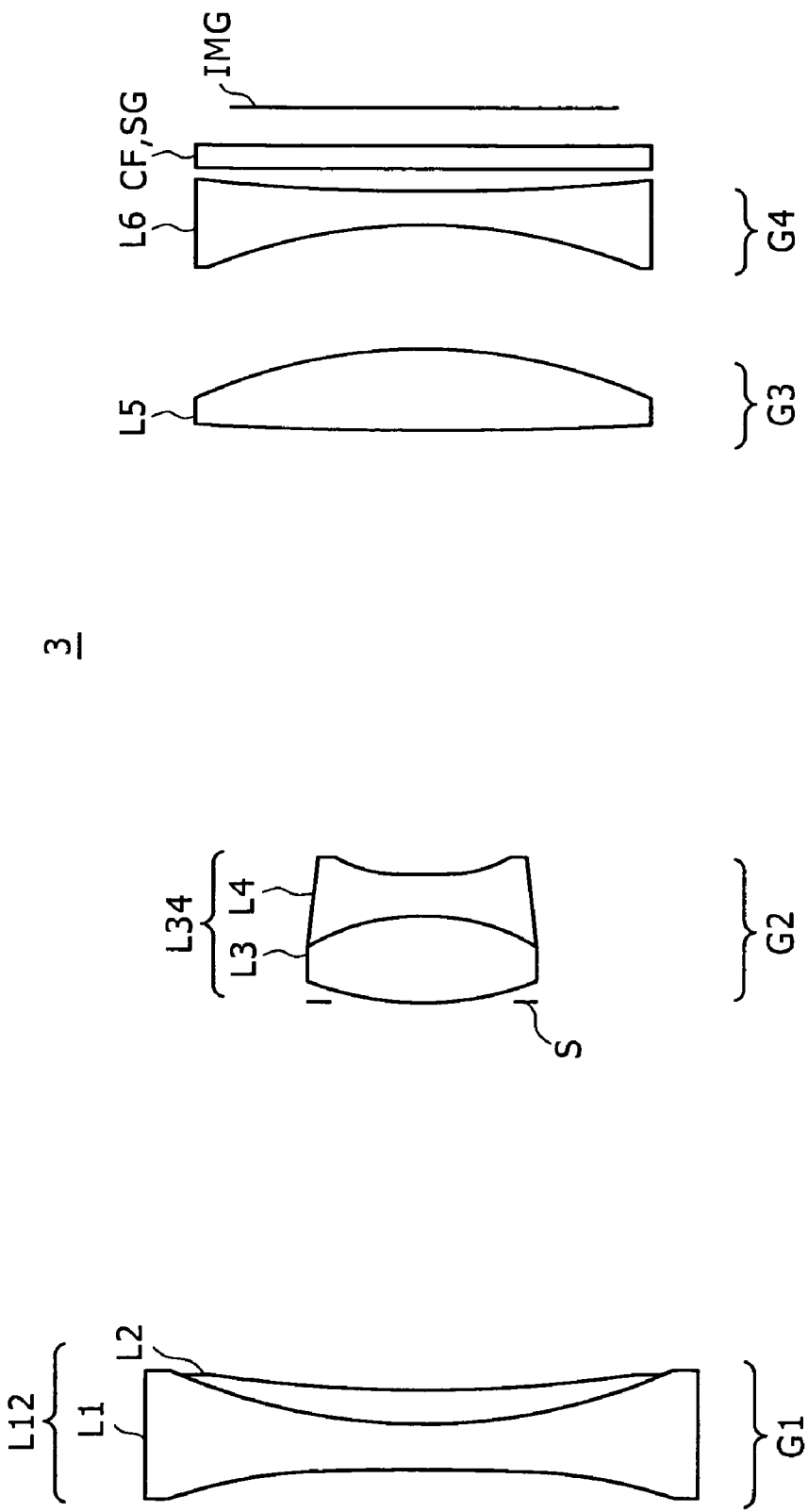

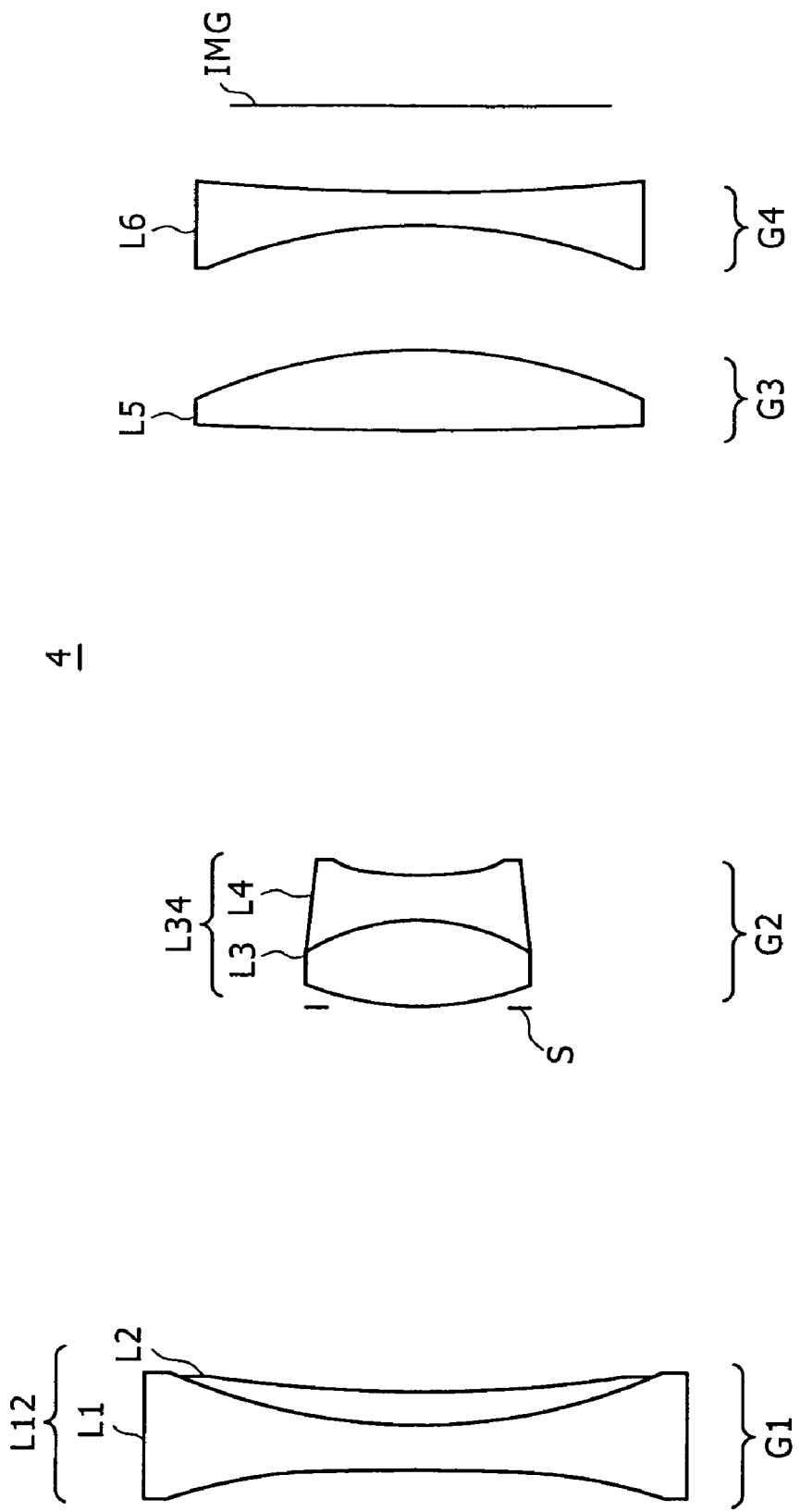

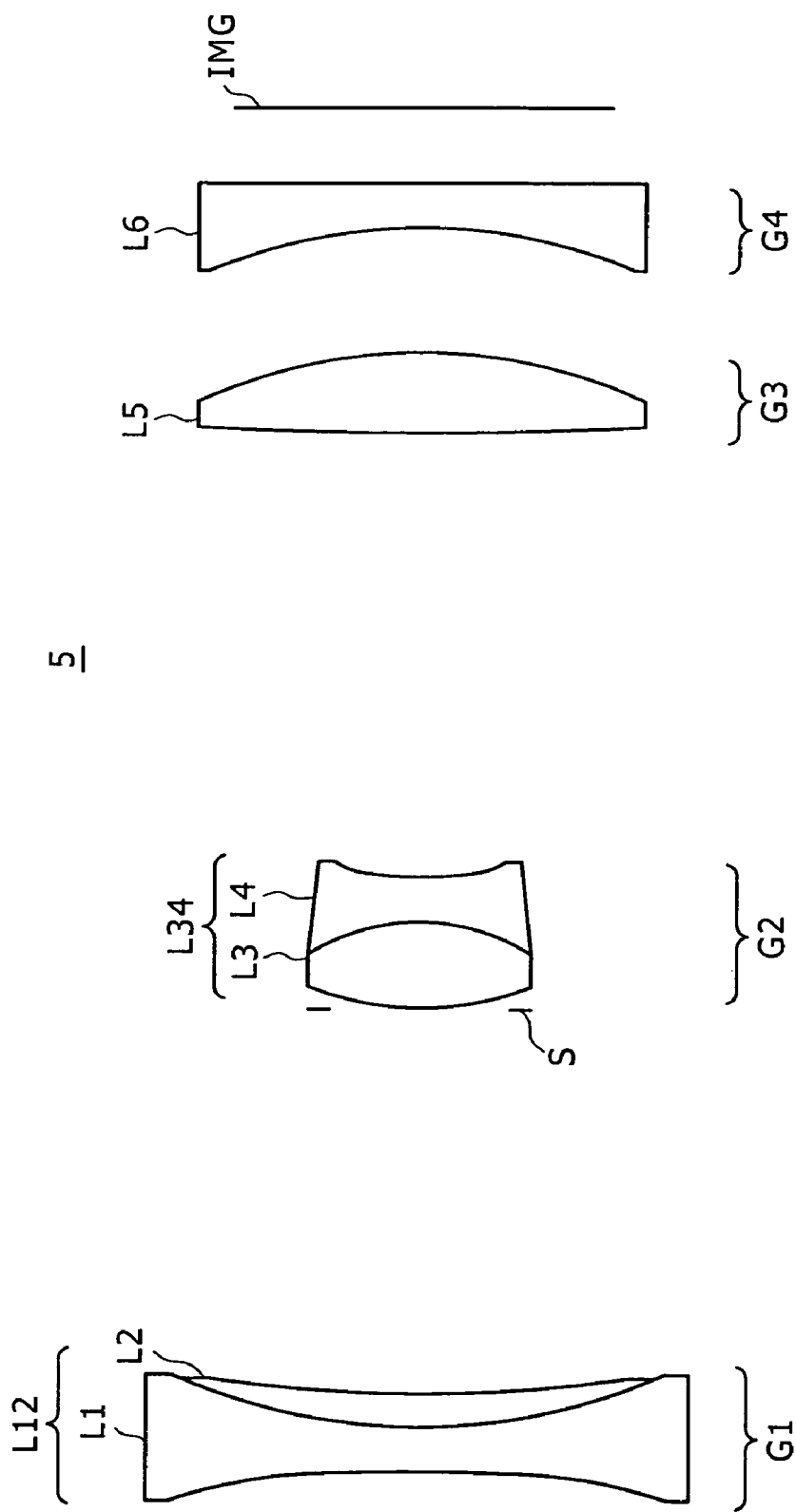

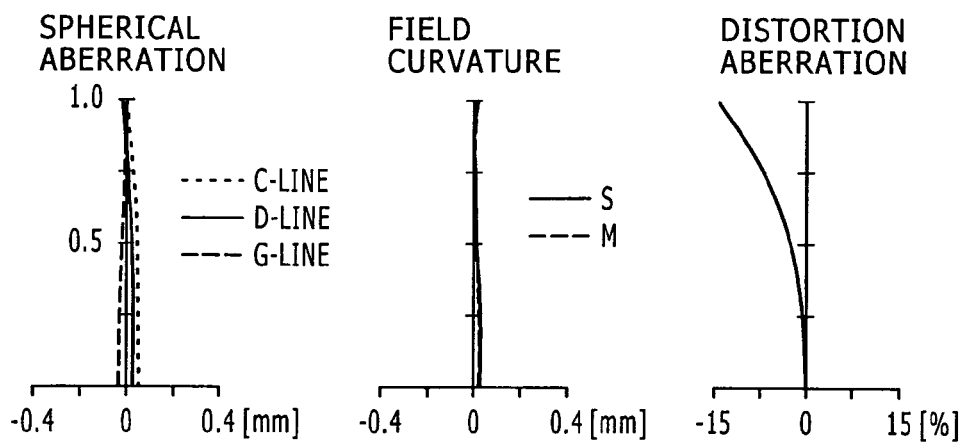
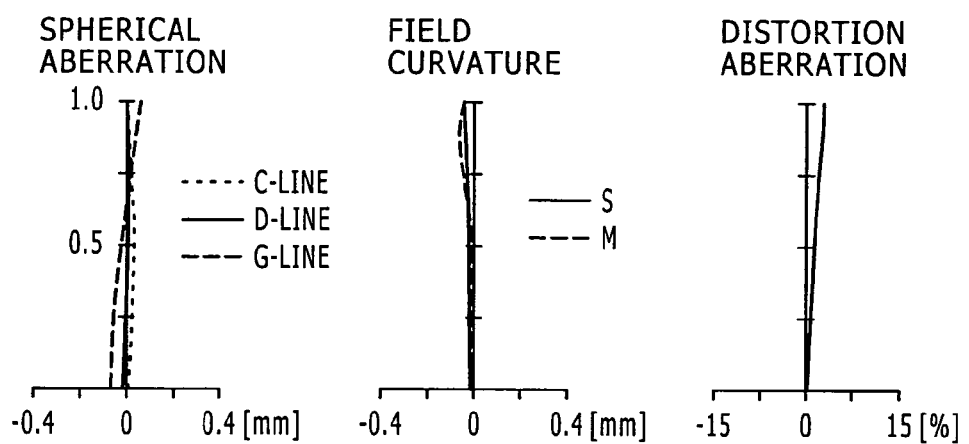
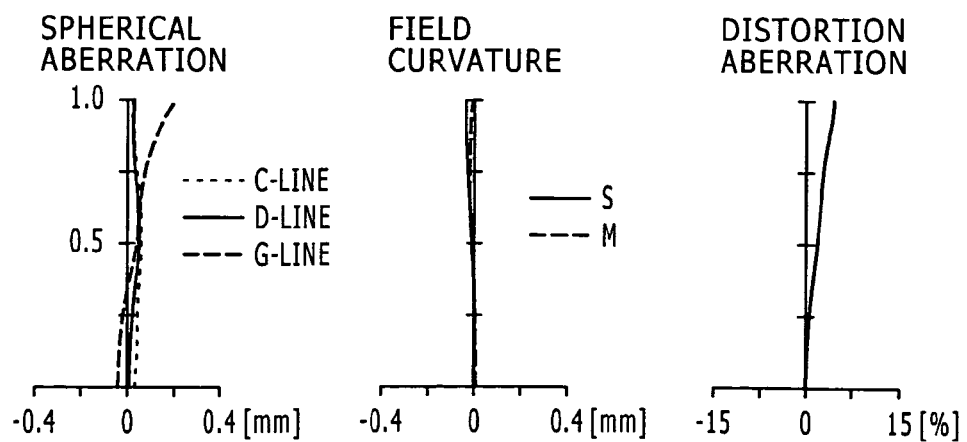

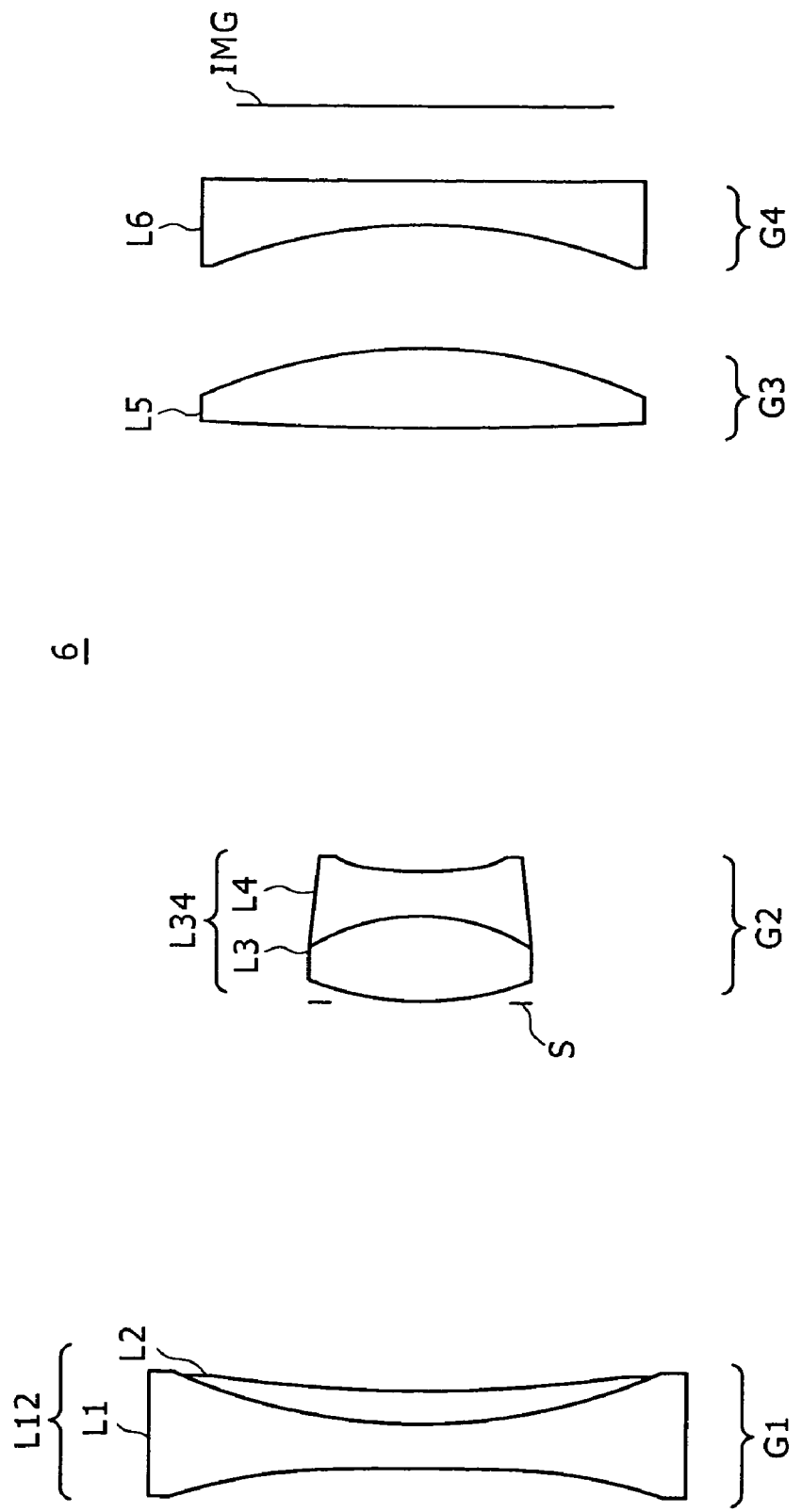

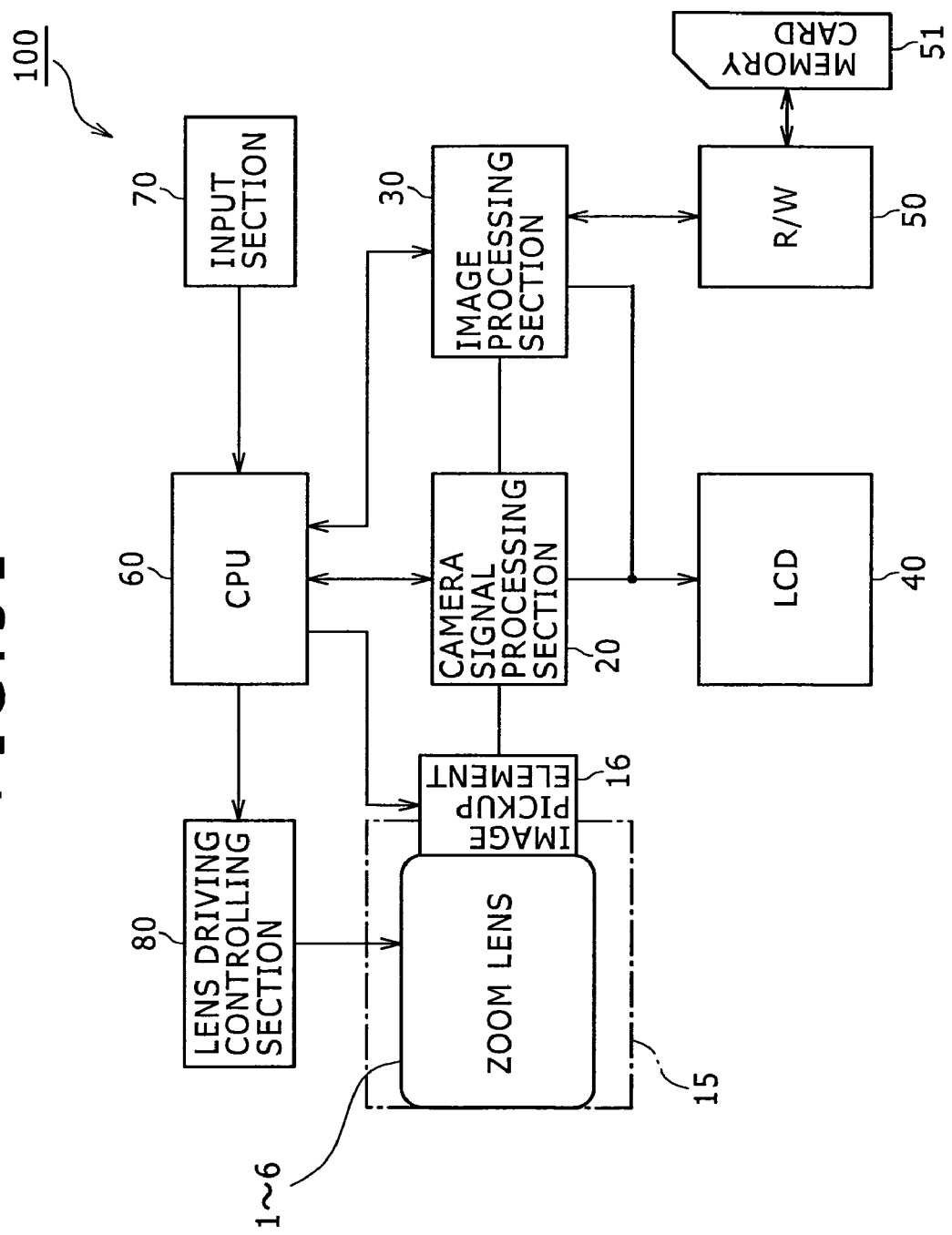

ZOOM LENS AND IMAGE PICKUP DEVICE

BACKGROUND OF THE INVENTION

1. Field of the Invention

The present invention relates to a zoom lens and an image pickup device, and particularly to a zoom lens and an image pickup device having a zoom mechanism for a digital video camera, a digital still camera and the like (these cameras will hereinafter be referred to as a digital camera).

2. Description of the Related Art

Digital cameras using an image pickup element such as a CCD (Charge Coupled Device) sensor, a CMOS (Complementary Metal Oxide Semiconductor) sensor or the like have recently spread rapidly and come into common use.

As digital cameras thus become common, there has particularly been an increasing user need for lower prices, smaller size, and higher functionality of digital still cameras integral with lenses. Optical systems in which reduction in thickness is achieved by a so-called collapsible lens formed by a configuration of three groups that are a negative group, a positive group, and a positive group against a background of such a user need are known (see Japanese Patent Laid-Open No. 2005-308953 (hereinafter, referred to as Patent Document 1) and Japanese Patent Laid-Open No. 2008-233161 (hereinafter, referred to as Patent Document 2), for example).

As digital cameras thus become common, there has particularly been an increasing user need for lower prices, smaller size, and higher functionality of digital still cameras integral with lenses. Against a background of such a user need, a zoom lens that is a so-called collapsible lens formed by a configuration of three groups that are a negative group, a positive group, and a positive group and in which a first group and a second group each include only a cemented lens is known (see Patent Document 1 and Japanese Patent Laid-open No. 2007-225864 (hereinafter, referred to as Patent Document 3), for example).

As digital cameras thus become common, there has particularly been increasing user need for lower prices, smaller size, and higher functionality of digital still cameras integral with lenses. Against a background of such a user need, a zoom lens that is a so-called collapsible lens formed by a configuration of three groups that are a negative group, a positive group, and a positive group or a configuration of four groups that are a negative group, a positive group, a positive group, and a negative group and in which a first group and a second group each include only a cemented lens is known (see Patent Document 1 and Japanese Patent Laid-open No. 2006-113404 (hereinafter, referred to as Patent Document 4), for example).

SUMMARY OF THE INVENTION

In the optical system described in the above Patent Document 1, a second group is formed by only a cemented lens composed of a negative single lens and a positive single lens. Therefore longitudinal chromatic aberration and spherical aberration in a telephoto end state when a variable power ratio is high and changes in field curvature due to object distance variation in the telephoto end state are increased.

In the optical system described in the above Patent Document 2, a second group is formed by a positive single lens and a cemented lens of a positive single lens and a negative single lens. Thereby spherical aberration in the telephoto end state and changes in field curvature due to object distance variation in the telephoto end state can be suppressed.

In this case, however, because of high power of the positive single lens nearest to an object side in the second group, the decentration sensitivity of the lenses within the second group is increased, and a manufacturing process is complicated by an increase in required assembly precision, addition of an aligning process, and the like. In addition, because each group is movable, mechanical hardware configuration is complicated.

In the optical system described in the above Patent Document 1, the setting of glass material and curvature for a negative lens and a positive lens forming the cemented lens of the first group cannot be said to be sufficiently effective in achieving miniaturization, reduction in thickness, and improvement in performance. Thus it cannot be said that miniaturization, a reduction in thickness, and an improvement in performance are achieved sufficiently.

In addition, in the zoom lens in which the first group includes a positive single lens and a negative single lens from an object side as described in the above Patent Document 3, because the first group is formed by a cemented lens of the positive single lens and the negative single lens in order from the object side, an angle of incidence of rim rays in a wide-angle end state is changed sharply by the positive single lens, and thereafter the rim rays are made incident on the negative single lens.

Thus, the cemented lens described in Patent Document 3 is disadvantageous for correcting aberrations such as distortion aberration, field curvature and the like on the periphery in the wide-angle end state in particular.

Further, when the first group as described in the above Patent Document 3 includes the negative single lens, performance degradation occurs in both the wide-angle end state and the telephoto end state due to a chromatic aberration of magnification in the wide-angle end state and a longitudinal chromatic aberration in the telephoto end state which aberrations are caused by the negative single lens in the first group. It is thus difficult to say that miniaturization and an improvement in performance are both achieved.

In the optical system described in the above Patent Document 1, the setting of glass material and curvature for a negative lens and a positive lens forming the cemented lens of the first group cannot be said to be sufficiently effective in achieving miniaturization, a reduction in thickness, and an improvement in performance. Thus it cannot be said that miniaturization, a reduction in thickness, and an improvement in performance are achieved sufficiently.

In addition, the third group and the fourth group in this optical system are formed by a glass lens, which is also disadvantageous in terms of cost.

In addition, in the optical system as described in the above Patent Document 4, a surface nearest to an image surface side in the first group has a small radius of curvature, thus increasing a degree of difficulty in manufacturing, and all surfaces in contact with air are formed in an aspheric shape, which is also disadvantageous in terms of cost.

The present invention has been made in view of the above. It is desirable to provide a zoom lens and an image pickup device that make it possible to achieve smaller thickness and higher performance by a simple configuration and which involve a low degree of difficulty in manufacturing.

A zoom lens according to a first mode of the present invention includes three groups that are a negative first group, a positive second group, and a positive third group in order from an object side. The first group includes a negative cemented lens formed by joining together, from the object side, a first lens formed by a negative single lens and a second lens formed by a positive single lens. The second group includes, from the object side, a third lens formed by a positive single lens and a cemented lens formed by joining together a fourth lens formed by a positive single lens and a fifth lens formed by a negative single lens. The third group includes a sixth lens formed by a positive single lens. The zoom lens is formed so as to satisfy the following conditional expressions (1) to (3):

$$N1d > 1.55 \quad (1)$$

$$v2d < 30 \quad (2)$$

$$f21/fw > 1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

The three-group type zoom lens has the following advantages because the first group includes only the single cemented lens composed of the first lens having negative power and the second lens having positive power.

First, in the three-group type zoom lens, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the three-group type zoom lens is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the three-group type zoom lens, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The three-group type zoom lens thereby makes it possible to reduce an amount of clearance of mechanical hardware configuration for focal position adjustment by the first to third groups. Therefore the whole of the three-group type zoom lens can be further miniaturized.

Third, in the three-group type zoom lens, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The three-group type zoom lens can thereby weaken an effect of bringing the principal point position of the first group closer to the image surface by the second group. That is, the three-group type zoom lens can achieve higher performance even when the power of the positive third lens is made lower than in the existing case when the second group includes the positive third lens and the cemented lens formed by joining together the positive fourth lens and the negative fifth lens. It is thus possible to suppress lens decentration sensitivity in the second group, and lower a degree of difficulty in manufacturing while achieving a reduction in thickness and an improvement in performance.

The conditional expressions (1) to (3) in the three-group type zoom lens are defined to lower the degree of difficulty in manufacturing while achieving a reduction in thickness and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the three-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded.

The conditional expression (3) defines a ratio between focal length in the wide-angle end state and the focal length of the positive third lens located nearest to the object side in the second group, and thereby weakens the power of the positive third lens in the second group.

When the ratio is less than the lower limit value of the conditional expression (3), the power of the positive third lens located nearest to the object side in the second group is too strong as compared with the focal length in the wide-angle end state, the decentration sensitivity of the positive third lens and the cemented lens composed of the positive fourth lens and the negative fifth lens in the second group is increased, and thus precision for assembly of the second group is heightened. This invites a degradation in performance or an increase in the degree of difficulty in manufacturing of the three-group type zoom lens.

An image pickup device according to a second mode of the present invention includes a zoom lens, and an image pickup element for converting an optical image formed by the zoom lens into an electric signal. The zoom lens includes three groups that are a negative first group, a positive second group, and a positive third group in order from an object side. The first group includes a negative cemented lens formed by joining together, from the object side, a first lens formed by a negative single lens and a second lens formed by a positive single lens. The second group includes, from the object side, a third lens formed by a positive single lens and a cemented lens formed by joining together a fourth lens formed by a positive single lens and a fifth lens formed by a negative single lens. The third group includes a sixth lens formed by a positive single lens. The zoom lens is formed so as to satisfy the following conditional expressions (1) to (3):

$$N1d > 1.55 \quad (1)$$

$$v2d < 30 \quad (2)$$

$$f21/fw > 1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

The three-group type zoom lens in the image pickup device has the following advantages because the first group includes only the single cemented lens composed of the first lens having negative power and the second lens having positive power.

First, in the three-group type zoom lens in the image pickup device, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the three-group type zoom lens in the image pickup device is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the three-group type zoom lens in the image pickup device, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The three-group type zoom lens in the image pickup device thereby makes it possible to reduce an amount of clearance of mechanical hardware configuration for focal position adjustment by the first to third groups. Therefore the whole of the three-group type zoom lens in the image pickup device can be further miniaturized.

Third, in the three-group type zoom lens in the image pickup device, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The three-group type zoom lens in the image pickup device can thereby weaken an effect of bringing the principal point position of the first group closer to the image surface by the second group. That is, the three-group type zoom lens can achieve higher performance even when the power of the positive third lens is made lower than in the existing case when the second group includes the positive third lens and the cemented lens formed by joining together the positive fourth lens and the negative fifth lens. It is thus possible to suppress lens decentration sensitivity in the second group, and lower a degree of difficulty in manufacturing while achieving a reduction in thickness and an improvement in performance.

Here, the conditional expressions (1) to (3) in the three-group type zoom lens in the image pickup device are defined to lower the degree of difficulty in manufacturing while achieving a reduction in thickness and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the three-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded.

The conditional expression (3) defines a ratio between focal length in the wide-angle end state and the focal length of the positive third lens located nearest to the object side in the second group, and thereby weakens the power of the positive third lens in the second group.

When the ratio is less than the lower limit value of the conditional expression (3), the power of the positive third lens located nearest to the object side in the second group is too strong as compared with the focal length in the wide-angle end state, the decentration sensitivity of the positive third lens and the cemented lens composed of the positive fourth lens and the negative fifth lens in the second group is increased, and thus precision for assembly of the second group is heightened. This invites a degradation in performance or an increase in the degree of difficulty in manufacturing of the three-group type zoom lens.

A zoom lens according to a third mode of the present invention includes three groups that are a negative first group, a positive second group, and a positive third group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, and the third group including a fifth lens formed by a positive single lens, and the zoom lens satisfying following conditional expressions (1) to (3):

$$N1d>1.55 \quad (1)$$

$$v2d<30 \quad (2)$$

$$|G1R1/G2R2|<3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

The three-group type zoom lens has the following advantages because the first group includes only the single cemented lens composed of the first lens having negative power and the second lens having positive power.

First, in the three-group type zoom lens, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the three-group type zoom lens is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the three-group type zoom lens, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The three-group type zoom lens thereby makes it possible to reduce an amount of clearance of mechanical hardware configuration for focal position adjustment by the first to third groups. Therefore the whole of the three-group type zoom lens can be further miniaturized.

Third, in the three-group type zoom lens, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The three-group type zoom lens can thereby weaken an effect of bringing the principal point position of the first group closer to the image surface by the second group. That is, in the three-group type zoom lens, the second group can be formed only by the cemented lens of the positive third lens and the negative fourth lens. It is thus possible to suppress lens decentration sensitivity in the second group, and lower a degree of difficulty in manufacturing while achieving a reduction in thickness and an improvement in performance.

Fourth, in the three-group type zoom lens, because not only the first group but also the second group can be formed by a cemented lens alone, performance degradation due to decentration between the lenses in the second group can be prevented.

At this time, in the three-group type zoom lens, assembly variation in the direction of an optical axis between the lenses in the second group is also eliminated, and thus an amount of focal position shift is reduced. The three-group type zoom lens thereby makes it possible to reduce an amount of clearance of mechanical hardware configuration for focal position adjustment by the first to third groups. Therefore the whole of the three-group type zoom lens can be further miniaturized.

Here, the conditional expressions (1) to (3) in the three-group type zoom lens are defined to lower the degree of difficulty in manufacturing while achieving a reduction in thickness, miniaturization and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the three-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resojution performance in a peripheral part of the image pickup element in the wide-angle end state and a central part of the image pickup element in the telephoto end state is degraded.

The conditional expression (3) defines so as to prevent the radius of curvature of the second surface of the positive second lens forming the cemented lens of the first group from becoming too small as compared with the radius of curvature of the first surface of the negative first lens.

When |G1R1/G2R2| exceeds the upper limit value of the conditional expression (3), the radius of curvature of the second surface of the second lens in the first group becomes too small as compared with the first surface of the first lens in the first group. Thus, a degree of difficulty in manufacturing of the second lens as a single part and the cemented lens is increased, and manufacturing cost is raised. In addition, the negative power of the first lens cannot be strengthened sufficiently, which is disadvantageous for miniaturization.

An image pickup device according to a fourth mode of the present invention includes: a zoom lens; and an image pickup element for converting an optical image formed by the zoom lens into an electric signal; the zoom lens including three groups that are a negative first group, a positive second group, and a positive third group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, and the third group including a fifth lens formed by a positive single lens, and the zoom lens satisfying following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

The three-group type zoom lens in the image pickup device has the following advantages because the first group includes only the single cemented lens composed of the first lens having negative power and the second lens having positive power.

First, in the three-group type zoom lens in the image pickup device, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the three-group type zoom lens in the image pickup device is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the three-group type zoom lens in the image pickup device, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The three-group type zoom lens in the image pickup device thereby makes it possible to reduce an amount of clearance of mechanical hardware configuration for focal position adjustment by the first to third groups. Therefore the whole of the three-group type zoom lens in the image pickup device can be further miniaturized.

Third, in the three-group type zoom lens in the image pickup device, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The three-group type zoom lens in the image pickup device can thereby weaken an effect of bringing the principal point position of the first group closer to the image surface by the second group. That is, in the three-group type zoom lens, the second group can be formed only by the cemented lens of the positive third lens and the negative fourth lens. It is thus possible to achieve a reduction in thickness, an improvement in performance, and facilitation of manufacturing while suppressing lens decentration sensitivity in the second group.

Fourth, in the three-group type zoom lens in the image pickup device, because not only the first group but also the second group can be formed by a cemented lens alone, performance degradation due to decentration between the lenses in the second group can be prevented.

At this time, in the three-group type zoom lens in the image pickup device, assembly variation in the direction of an optical axis between the lenses in the second group is also eliminated, and thus an amount of focal position shift is reduced. The three-group type zoom lens in the image pickup device thereby makes it possible to reduce an amount of clearance of mechanical hardware configuration for focal position adjustment by the first to third groups. Therefore the whole of the three-group type zoom lens can be further miniaturized.

The conditional expressions (1) to (3) in the three-group type zoom lens are defined to lower the degree of difficulty in manufacturing while achieving a reduction in thickness, miniaturization and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the three-group type zoom lens in the image pickup device, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded.

The conditional expression (3) defines so as to prevent the radius of curvature of the second surface of the positive second lens forming the cemented lens of the first group from becoming too small as compared with the radius of curvature of the first surface of the negative first lens.

When |G1R1/G2R2| exceeds the upper limit value of the conditional expression (3), the radius of curvature of the second surface of the second lens in the first group becomes too small as compared with the first surface of the first lens in the first group. Thus, a degree of difficulty in manufacturing of the second lens as a single part and the cemented lens is increased, and manufacturing cost is raised. In addition, the negative power of the first lens cannot be strengthened sufficiently, which is disadvantageous for miniaturization.

A zoom lens according to a fifth mode of the present invention includes four groups that are a negative first group, a positive second group, a positive third group, and a negative or positive fourth group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, the third group including a fifth lens formed by a positive single lens, the fourth group including a sixth lens formed by a single lens at a fixed distance from an image pickup surface, at least one of surfaces in contact with air being formed in a spherical shape, and the zoom lens satisfying following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

The four-group type zoom lens has the following advantages because the first group includes only the single cemented lens composed of the first lens having negative power and the second lens having positive power.

First, in the four-group type zoom lens, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the four-group type zoom lens is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the four-group type zoom lens, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The four-group type zoom lens thereby makes it possible to reduce an amount of clearance of mechanical hardware configuration for focal position adjustment by the first to third groups. Therefore the whole of the three-group type zoom lens can be further miniaturized.

Third, in the four-group type zoom lens, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The four-group type zoom lens can thereby weaken an effect of bringing the principal point position of the first group closer to the image surface by the second group. That is, in the four-group type zoom lens, the second group can be formed only by the cemented lens of the positive third lens and the negative fourth lens. It is thus possible to suppress lens decentration sensitivity in the second group, and lower a degree of difficulty in manufacturing while achieving a reduction in thickness and an improvement in performance.

Fourth, in the four-group type zoom lens, because not only the first group but also the second group can be formed by a cemented lens alone, performance degradation due to decentration between the lenses in the second group can be prevented.

At this time, in the four-group type zoom lens, assembly variation in the direction of an optical axis between the lenses in the second group is also eliminated, and thus an amount of focal position shift is reduced. The four-group type zoom lens thereby makes it possible to reduce an amount of clearance of mechanical hardware configuration for focal position adjustment by the first to third groups. Therefore the whole of the four-group type zoom lens can be further miniaturized.

The conditional expressions (1) to (3) in the four-group type zoom lens are defined to lower the degree of difficulty in manufacturing while achieving a reduction in thickness, miniaturization and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the four-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded.

The conditional expression (3) defines so as to prevent the radius of curvature of the second surface of the positive second lens forming the cemented lens of the first group from becoming too small as compared with the radius of curvature of the first surface of the negative first lens.

When |G1R1/G2R2| exceeds the upper limit value of the conditional expression (3), the radius of curvature of the second surface of the second lens in the first group becomes too small as compared with the first surface of the first lens in the first group. Thus, a degree of difficulty in manufacturing of the second lens as a single part and the cemented lens is increased, and manufacturing cost is raised. In addition, the negative power of the first lens cannot be strengthened sufficiently, which is disadvantageous for miniaturization.

An image pickup device according to a sixth mode of the present invention includes: a zoom lens; and an image pickup element for converting an optical image formed by the zoom lens into an electric signal; the zoom lens including four groups that are a negative first group, a positive second group, a positive third group, and a negative or positive fourth group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, and the third group including a fifth lens formed by a positive single lens, the fourth group including a sixth lens formed by a single lens at a fixed distance from an image pickup surface, at least one of surfaces in contact with air being formed in a spherical shape, and the zoom lens satisfying following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

The four-group type zoom lens in the image pickup device has the following advantages because the first group includes only the single cemented lens composed of the first lens having negative power and the second lens having positive power.

First, in the four-group type zoom lens in the image pickup device, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the four-group type zoom lens in the image pickup device is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the four-group type zoom lens in the image pickup device, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The four-group type zoom lens in the image pickup device thereby makes it possible to reduce an amount of clearance of mechanical hardware configuration for focal position adjustment by the first to third groups. Therefore the whole of the three-group type zoom lens in the image pickup device can be further miniaturized.

Third, in the four-group type zoom lens in the image pickup device, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The four-group type zoom lens in the image pickup device can thereby weaken an effect of bringing the principal point position of the first group closer to the image surface by the second group. That is, in the four-group type zoom lens in the image pickup device, the second group can be formed only by the cemented lens of the positive third lens and the negative fourth lens. It is thus possible to suppress lens decentration sensitivity in the second group, and lower a degree of difficulty in manufacturing while achieving a reduction in thickness and an improvement in performance.

Fourth, in the four-group type zoom lens in the image pickup device, because not only the first group but also the second group can be formed by a cemented lens alone, performance degradation due to decentration between the lenses in the second group can be prevented.

At this time, in the four-group type zoom lens in the image pickup device, assembly variation in the direction of an optical axis between the lenses' in the second group is also eliminated, and thus an amount of focal position shift is reduced. The four-group type zoom lens in the image pickup device thereby makes it possible to reduce an amount of clearance of mechanical hardware configuration for focal position adjustment by the first to third groups. Therefore the whole of the three-group type zoom lens can be further miniaturized.

The conditional expressions (1) to (3) in the four-group type zoom lens in the image pickup device are defined to lower the degree of difficulty in manufacturing while achieving a reduction in thickness, miniaturization and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the four-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded.

The conditional expression (3) defines so as to prevent the radius of curvature of the second surface of the positive second lens forming the cemented lens of the first group from becoming too small as compared with the radius of curvature of the first surface of the negative first lens.

When |G1R1/G2R2| exceeds the upper limit value of the conditional expression (3), the radius of curvature of the second surface of the second lens in the first group becomes too small as compared with the first surface of the first lens in the first group. Thus, a degree of difficulty in manufacturing of the second lens as a single part and the cemented lens is increased, and manufacturing cost is raised. In addition, the negative power of the first lens cannot be strengthened sufficiently, which is disadvantageous for miniaturization.

The zoom lens according to the first mode of the present invention includes three groups that are a negative first group, a positive second group, and a positive third group in order from an object side. The first group includes a negative cemented lens formed by joining together, from the object side, a first lens formed by a negative single lens and a second lens formed by a positive single lens. The second group includes, from the object side, a third lens formed by a positive single lens and a cemented lens formed by joining together a fourth lens formed by a positive single lens and a fifth lens formed by a negative single lens. The third group includes a sixth lens formed by a positive single lens. The zoom lens is formed so as to satisfy the following conditional expressions (1) to (3):

$$N1d > 1.55 \tag{1}$$

$$v2d < 30 \tag{2}$$

$$f21/fw > 1 \tag{3}$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

Thus, the zoom lens according to the above-described mode of the present invention has a simple configuration, needs a low degree of difficulty in manufacturing on the whole, and makes it possible to achieve smaller thickness and higher performance.

The image pickup device according to the second mode of the present invention includes a zoom lens, and an image pickup element for converting an optical image formed by the zoom lens into an electric signal. The zoom lens includes three groups that are a negative first group, a positive second group, and a positive third group in order from an object side. The first group includes a negative cemented lens formed by joining together, from the object side, a first lens formed by a negative single lens and a second lens formed by a positive single lens. The second group includes, from the object side, a third lens formed by a positive single lens and a cemented lens formed by joining together a fourth lens formed by a positive single lens and a fifth lens formed by a negative single lens. The third group includes a sixth lens formed by a positive single lens. The zoom lens is formed so as to satisfy the following conditional expressions (1) to (3):

$$N1d > 1.55 \tag{1}$$

$$v2d < 30 \tag{2}$$

$$f21/fw > 1 \tag{3}$$

where N1d is an index of refraction of the negative first, lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

Thus, the image pickup device according to the above-described mode of the present invention has a simple configuration in the zoom lens, needs a low degree of difficulty in manufacturing on the whole, and makes it possible to achieve smaller thickness and higher performance.

The zoom lens according to the third mode of the present invention includes three groups that are a negative first group, a positive second group, and a positive third group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, and the third group including a fifth lens formed by a positive single lens, and the zoom lens being formed so as to satisfy following conditional expressions (1) to (3):

$$N1d > 1.55 \tag{1}$$

$$v2d < 30 \tag{2}$$

$$|G1R1/G2R2| < 3 \tag{3}$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

Thereby, according to the zoom lens according to the above-described mode of the present invention, a simple constitution is obtained, and by optimally setting glass material and curvature for the negative first lens and the positive second lens forming the first group, a degree of difficulty in manufacturing is lowered and a reduction in thickness and an improvement in performance can be achieved.

In addition, the image pickup device according to the fourth mode of the present invention includes: a zoom lens; and an image pickup element for converting an optical image formed by the zoom lens into an electric signal; the zoom lens including three groups that are a negative first group, a positive second group, and a positive third group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, and the third group including a fifth lens formed by a positive single lens, and the zoom lens being formed so as to satisfy following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

Thereby, according to the image pickup device according to the above-described mode of the present invention, the zoom lens has a simple constitution, and by optimally setting glass material and curvature for the negative first lens and the positive second lens forming the first group, a degree of difficulty in manufacturing is lowered on the whole and a reduction in thickness and an improvement in performance can be achieved.

The zoom lens according to the fifth mode of the present invention includes four groups that are a negative first group, a positive second group, a positive third group, and a negative or positive fourth group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, the third group including a fifth lens formed by a positive single lens, the fourth group including a sixth lens formed by a single lens at a fixed distance from an image pickup surface, at least one of surfaces in contact with air being formed in a spherical shape, and the zoom lens satisfying following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

Thereby, according to the above-described mode of the present invention, the zoom lens has a simple constitution, and by optimally setting glass material and curvature for the negative first lens and the positive second lens forming the first group and optimally setting the power ratio of the first to fourth groups, it is possible to lower a degree of difficulty in manufacturing while achieving miniaturization and an improvement in performance.

In addition, according to the image pickup device according to the sixth mode of the present invention includes: a zoom lens; and an image pickup element for converting an optical image formed by the zoom lens into an electric signal; the zoom lens including four groups that are a negative first group, a positive second group, a positive third group, and a negative or positive fourth group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, and the third group including a fifth lens formed by a positive single lens, the fourth group including a sixth lens formed by a single lens at a fixed distance from an image pickup surface, at least one of surfaces in contact with air being formed in a spherical shape, and the zoom lens satisfying following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

Thereby, according to the image pickup device according to the above-described mode of the present invention, the zoom lens has a simple constitution, and by optimally setting glass material and curvature for the negative first lens and the positive second lens forming the first group and optimally setting the power ratio of the first to fourth groups, it is possible to lower a degree of difficulty in manufacturing while achieving miniaturization and an improvement in performance.

BRIEF DESCRIPTION OF THE DRAWINGS

FIG. 1 is a schematic sectional view of a configuration of a zoom lens according to a first numerical example corresponding to a first embodiment;

FIG. 4 is a schematic sectional view of a configuration of a zoom lens according to a second numerical example corresponding to the first embodiment;

FIGS. 9A, 9B, and 9C are characteristic curve diagrams of various aberrations according to the third numerical example corresponding to the first embodiment;

FIG. 10 is a schematic sectional view of a configuration of a zoom lens according to a fourth numerical example corresponding to the first embodiment;

FIG. 13 is a schematic sectional view of a configuration of a zoom lens according to a first numerical example corresponding to a second embodiment;

FIG. 16 is a schematic sectional view of a configuration of a zoom lens according to a second numerical example corresponding to the second embodiment;

FIG. 19 is a schematic sectional view of a configuration of a zoom lens according to a third numerical example corresponding to the second embodiment;

FIG. 23 is a schematic sectional view of a configuration of a zoom lens according to a first numerical example;

FIG. 26 is a schematic sectional view of a configuration of a zoom lens according to a second numerical example;

FIG. 29 is a schematic sectional view of a configuration of a zoom lens according to a third numerical example;

FIG. 33 is a schematic sectional view of a configuration of a zoom lens according to a first numerical example;

FIG. 39 is a schematic sectional view of a configuration of a zoom lens according to a third numerical example;

FIG. 42 is a schematic sectional view of a configuration of a zoom lens according to a fourth numerical example;

FIG. 45 is a schematic sectional view of a configuration of a zoom lens according to a fifth numerical example;

FIGS. 47A, 47B, and 47C are characteristic curve diagrams showing various aberrations in the fifth numerical example;

FIG. 48 is a schematic sectional view of a configuration of a zoom lens according to a sixth numerical example;

FIG. 51 is a schematic block diagram showing a configuration of a digital still camera including an image pickup device according to an embodiment of the present invention.

DETAILED DESCRIPTION OF THE PREFERRED EMBODIMENTS

Figure 2A:
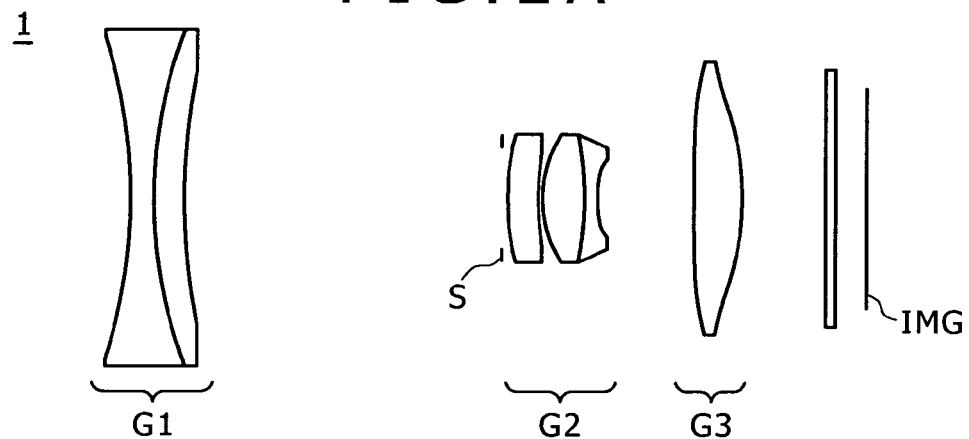
FIGS. 2A, 2B, and 2C are schematic sectional views of lens group arrangements according to the first numerical example corresponding to the first embodiment.

The best mode for carrying out the invention (which best mode will hereinafter be referred to as embodiments) will hereinafter be described. Incidentally, description will be made in the following order.

1. First Embodiment (Zoom Lens of Three-Group Type)
2. Numerical Examples Corresponding to First Embodiment (First Numerical Example to Fourth Numerical Example)
3. Second Embodiment (Zoom Lens of Four-Group Type)
4. Numerical Examples Corresponding to Second Embodiment (First Numerical Example to Third Numerical Example)
5. Image Pickup Device and Digital Still Camera
6. Other Embodiments
7. Third Embodiment
8. Numerical Examples Corresponding to Third Embodiment (First Numerical Example to Third Numerical Example)
9. Image Pickup Device and Digital Still Camera
10. Other Embodiments
11. Fourth Embodiment
12. Numerical Examples Corresponding to Fourth Embodiment (First Numerical Example to Sixth Numerical Example)
13. Image Pickup Device and Digital Still Camera
14. Other Embodiments <1. First Embodiment>

A three-group type zoom lens according to a first embodiment of the present invention includes three groups that are a negative first group, a positive second group, and a positive third group in order from an object side, the first group including a negative cemented lens formed by joining together, from the object side, a first lens formed by a negative single lens and a second lens formed by a positive single lens, the second group including, from the object side, a third lens formed by a positive single lens and a cemented lens formed by joining together a fourth lens formed by a positive single lens and a fifth lens formed by a negative single lens, and the third group including a sixth lens formed by a positive single lens, and the zoom lens being formed so as to satisfy the following conditional expressions (1) to (3):

$$N1d > 1.55 \quad (1)$$

$$v2d < 30 \quad (2)$$

$$f21/fw > 1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

The three-group type zoom lens has the following advantages because the first group includes only the single cemented lens composed of the first lens having negative power and the second lens having positive power.

First, in the three-group type zoom lens, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the three-group type zoom lens is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the three-group type zoom lens, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The three-group type zoom lens thereby makes it possible to reduce an amount of clearance of mechanical hardware configuration for focal position adjustment by the first to third groups. Therefore the whole of the three-group type zoom lens can be further miniaturized.

Third, in the three-group type zoom lens, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The three-group type zoom lens can thereby weaken an effect of bringing the principal point position of the first group closer to the image surface by the second group. That is, the three-group type zoom lens can achieve higher performance even when the power of the positive third lens is made lower than in the existing case when the second group includes the positive third lens and the cemented lens formed by joining together the positive fourth lens and the negative fifth lens. It is thus possible to suppress lens decentration sensitivity in the second group, and lower a degree of difficulty in manufacturing while achieving a reduction in thickness and an improvement in performance.

Here, the conditional expressions (1) to (3) in the three-group type zoom lens are defined to lower the degree of difficulty in manufacturing while achieving a reduction in thickness and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the three-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded.

Incidentally, when the three-group type zoom lens satisfies the following conditional expression (2)' in place of the conditional expression (2), a correcting effect (achromatizing effect) on chromatic aberration of magnification and longitudinal chromatic aberration can be further increased.

$$v2d<26.5 \tag{2}'$$

The conditional expression (3) defines a ratio between focal length in the wide-angle end state and the focal length of the positive third lens located nearest to the object side in the second group, and thereby weakens the power of the positive third lens in the second group.

When the ratio is less than the lower limit value of the conditional expression (3), the power of the positive third lens located nearest to the object side in the second group is too strong as compared with the focal length in the wide-angle end state, the decentration sensitivity of the positive third lens and the cemented lens composed of the positive fourth lens and the negative fifth lens in the second group is increased, and thus precision for assembly of the second group is heightened. This invites a degradation in performance or an increase in the degree of difficulty in manufacturing of the three-group type zoom lens.

Incidentally, when the three-group type zoom lens satisfies the following conditional expression (3)' in place of the conditional expression (3), decentration sensitivity within the second group is further lowered, and thus the degree of difficulty in manufacturing can be further decreased.

$$f21/fw>1.5 \tag{3}'$$

Next, in the three-group type zoom lens according to the first embodiment of the present invention, at least one surface nearest to the object side or nearest to the image surface side in the cemented lens in the first group and at least one surface of the positive third lens located nearest to the object side in the second group have an aspheric shape, and are formed so as to satisfy the following conditional expression (4):

$$f21/f2>1 \tag{4}$$

where f2 is the focal length of the second group.

In the three-group type zoom lens, by making at least one surface nearest to the object side or nearest to the image surface side in the cemented lens in the first group have an aspheric shape, coma aberration, astigmatism, and distortion aberration of the peripheral part in the wide-angle end state in particular can be suppressed.

In addition, in the three-group type zoom lens, by making at least one surface nearest to the object side or nearest to the image surface side in the cemented lens in the first group have an aspheric shape, various kinds of aberration occurring when the negative power of the first group is strengthened can be corrected. Therefore degradation in optical performance can be suppressed.

At this time, in the three-group type zoom lens, because the negative power of the first group is strengthened, a same variable power ratio can be obtained even when a traveling distance between the first group and the second group is shortened. It is therefore possible to correspondingly shorten a total optical length and thereby achieve further miniaturization.

Further, in the three-group type zoom lens, by making at least one surface of the positive third lens located nearest to the object side in the second group have an aspheric shape, spherical aberration, astigmatism, and variation in field curvature on the telephoto end side which variation is attendant on object distance variation can be suppressed. Thus, resolution performance can be further improved.

The conditional expression (4) defines a ratio between the focal length of the second group as a whole and the focal length of the positive third lens nearest to the object side in the second group. The conditional expression (4) is to weaken the power of the third lens with respect to the power of the second group as a whole.

When the ratio is less than the lower limit value of the conditional expression (4), the focal length of the positive third lens nearest to the object side in the second group is shortened with respect to the focal length of the second group. That is, the power of the third lens is too strong with respect to the power of the second group as a whole.

At this time, in the three-group type zoom lens, the decentration sensitivity of the positive third lens nearest to the object side in the second group and the cemented lens composed of the positive fourth lens and the negative fifth lens in the second group is increased, and precision for assembly of the second group is heightened, thus inviting a degradation in performance or an increase in the degree of difficulty in manufacturing.

Incidentally, when the three-group type zoom lens satisfies the following conditional expression (4)' in place of the conditional expression (4), decentration sensitivity within the second group is further lowered, and thus the degree of difficulty in manufacturing can be further decreased.

$$f21/f2>1.3 \tag{4}'$$

Next, in the three-group type zoom lens according to the first embodiment of the present invention, at least one surface nearest to the object side or nearest to the image surface side in the cemented lens in the first group has an aspheric shape, both surfaces of the positive third lens nearest to the object side in the second group have a spherical shape, and at least one surface nearest to the object side or nearest to the image surface side in the cemented lens in the second group has an aspheric shape.

By making at least one surface nearest to the object side or nearest to the image surface side in the cemented lens in the first group have an aspheric shape, both surfaces of the positive third lens nearest to the object side in the second group have a spherical shape, and at least one surface nearest to the object side or nearest to the image surface side in the cemented lens in the second group have an aspheric shape, the three-group type zoom lens can lower the degree of difficulty in manufacturing while suppressing coma aberration, astigmatism, and distortion aberration of the peripheral part in the wide-angle end state and spherical aberration and coma aberration in the telephoto end state.

In addition, in the three-group type zoom lens according to the first embodiment of the present invention, the curvature of a surface nearest to the object side in the cemented lens in the first group satisfies the following conditional expression (5):

$$-1>G1R1/fw>-3.3 \tag{5}$$

where G1R1 is the radius of curvature of the surface nearest to the object side in the cemented lens in the first group.

The conditional expression (5) defines the radius of curvature of the surface nearest to the object side in the cemented lens in the first group.

When G1R1/fw is less than the lower limit value of the conditional expression (5), the radius of curvature of a joint surface in the cemented lens in the first group needs to be reduced in order to strengthen the negative power of the first group. Accordingly, it is necessary to reduce also the radius of curvature of the joint surface of the positive second lens forming the cemented lens, and the degree of difficulty in manufacturing the negative first lens and the positive second lens forming the cemented lens is raised.

When G1R1/fw exceeds the upper limit value of the conditional expression (5), on the other hand, the radius of curvature of the surface on the object side in the cemented lens in the first group is too small, and it is difficult to correct distortion aberration and field curvature in particular.

Further, the three-group type zoom lens according to the first embodiment of the present invention is characterized in that the cemented lens in the first group is formed by a compound aspheric lens including the first lens formed by a negative glass lens and the second lens formed by a positive resin lens.

Thus, because the three-group type zoom lens has the cemented lens in the first group formed using a resin, the peripheral part of the second lens formed by the resin can be made significantly thinner than a glass lens as compared with a case where glass lenses are joined to each other.

<2. Numerical Examples Corresponding to First Embodiment>

Numerical examples in which concrete numerical values are applied to the three-group type zoom lens according to the first embodiment of the present invention will next be described with reference to drawings and tables. In each numerical example, an aspheric surface is expressed by the following Equation 1:

$$x = cy^2/(1+(1-(1+k)c^2y^2)^{1/2}) + Ay^4 + By^6 + \quad (1)$$

where y is height from an optical axis, x is an amount of sag, c is curvature, k is a conic constant, and A, B, ... are aspheric coefficients.

[2-1. First Numerical Example]

In FIG. 1, reference numeral 1 denotes a zoom lens as a whole in a first numerical example corresponding to the first embodiment, which zoom lens is formed by a three-group configuration of a negative first group G1, a positive second group G2, and a positive third group G3 in order from an object side.

Figure 2B:
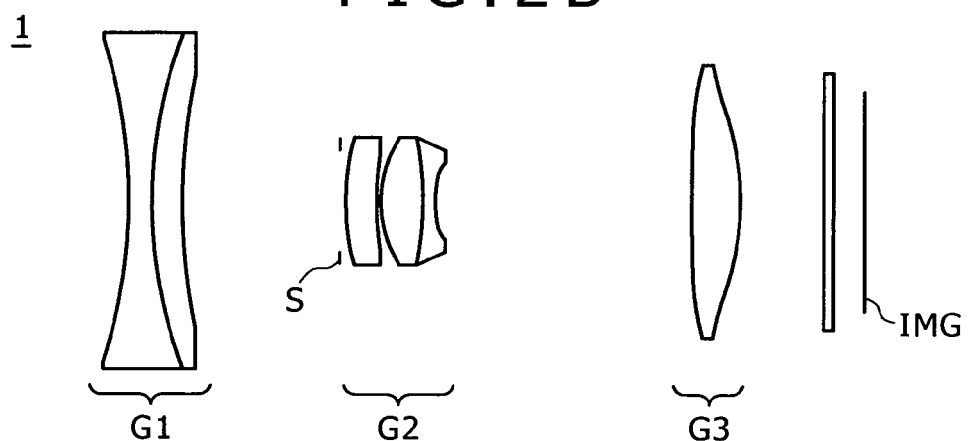
Figure 2C:
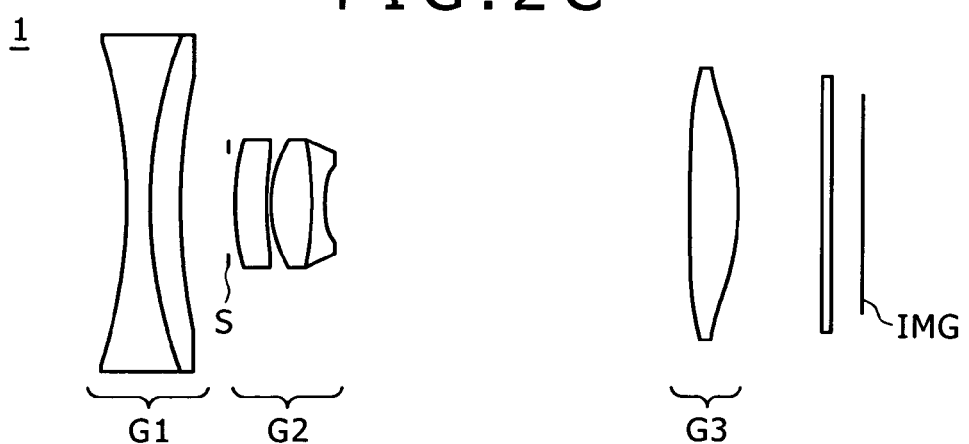

FIGS. 2A, 2B, and 2C show lens group arrangements when the zoom lens 1 in the first numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive aspheric glass lens. The first group G1 as a whole has negative power.

The second group G2 includes a third lens L3 formed by a positive lens both surfaces of which are an aspheric surface and a cemented lens L45 formed by joining together a fourth lens L4 formed of a positive single lens and a fifth lens L5 formed of a negative single lens. An aperture stop S is disposed on the object side of the second group G2. This aperture stop S may be disposed on the image surface side of the second group G2.

The third group G3 is formed by a sixth lens L6 made of a positive single lens. Incidentally, an IR cutoff filter CF and a seal glass SG for protecting an image surface IMG are disposed between the third group G3 and the image surface IMG in the zoom lens 1.

The following Tables 1 to 5 show specification values of the first numerical example corresponding to the first embodiment. In the specification tables in the first numerical example, f denotes focal length, FNO denotes an F-number, and $\omega$ denotes a half angle of view, and an index of refraction is a value corresponding to the d-line (wavelength of 587.6 nm). Incidentally, a radius of curvature of $\infty$ in Table 2 means a plane.

TABLE 1

|     | WIDE  | MID   | TELE  |
|-----|-------|-------|-------|
| f   | 6.39  | 11.80 | 18.00 |
| FNO | 3.09  | 4.19  | 5.48  |
| ω   | 28.58 | 18.16 | 12.16 |

TABLE 2

|  | Radius of curvature | Surface interval | Index of refraction (d) | Abbe number (d) |
|---|---|---|---|---|
| 1 | −19.0278 | 0.800 | 1.61881 | 63.39 |
| 2 | 16.4267 | 1.051 | 1.82115 | 24.06 |
| 3 (ASP) | 26.6461 | Variable | | |
| Aperture stop | ∞ | 0.200 | | |
| 5 (ASP) | 10.8000 | 1.113 | 1.80139 | 45.45 |
| 6 (ASP) | 34.5132 | 0.100 | | |
| 7 | 4.1319 | 1.450 | 1.83500 | 42.98 |
| 8 | −10.1864 | 0.450 | 1.71736 | 29.50 |
| 9 | 3.1447 | Variable | | |
| 10 (ASP) | 140.8469 | 1.600 | 1.52500 | 56.45 |
| 11 (ASP) | −8.4709 | Variable | | |
| 12 | ∞ | 0.300 | 1.56883 | 56.04 |
| 13 | ∞ | 1.100 | | |
| IMG | ∞ | 0.000 | | |

Incidentally, a third surface, a fifth surface, a sixth surface, a tenth surface, and an eleventh surface have an aspheric shape, and the aspheric coefficients of the surfaces are as shown in Table 3. Incidentally, for example, "0.26029E-05" denotes "$0.26029 \times 10^{-5}$."

TABLE 3

| Surface number | κ | A | B | C | D |
|---|---|---|---|---|---|
| 3  | 0.00000E+00 | −9.29688E−05 | 4.52706E−06 | −1.79391E−07 | 2.69767E−09 |
| 5  | 0.00000E+00 | 1.38499E−03 | 2.61470E−04 | −3.48218E−05 | 4.30012E−06 |
| 6  | 0.00000E+00 | 2.20895E−03 | 3.23018E−04 | −3.85093E−05 | 6.15283E−06 |
| 10 | 0.00000E+00 | 5.96048E−04 | −2.82987E−05 | −8.42612E−08 | 4.86002E−08 |
| 11 | 0.00000E+00 | 1.55465E−03 | −6.10988E−05 | 7.78885E−07 | 3.82473E−08 |

Next, variable intervals when a lens position state changes in the zoom lens 1 according to the first numerical example are shown in the following Table 4. In the zoom lens 1, the first group G1, the second group G2, and the third group G3 are all movable, variable power is achieved mainly by changing an interval between the first group G1 and the second group G2, and focal position variation at each angle of view is absorbed by moving the third group G3, whereby high performance can be ensured while maintaining miniaturization.

TABLE 4

|  | WIDE | MID | TELE |
|---|---|---|---|
| D3 | 14.901 | 5.683 | 0.700 |
| D9 | 4.038 | 9.197 | 14.456 |
| D11 | 3.585 | 2.933 | 2.020 |

The following Table 5 shows conditional expression correspondence values in the zoom lens 1 according to the first numerical example.

TABLE 5

|  |  | First example |
|---|---|---|
| Conditional expression (1) | N1d | 1.61881 |
| Conditional expression (2) | ν2d | 24.06 |
| Conditional expression (3) | f21/fw | 2.989 |
| Conditional expression (4) | f21/f2 | 1.821 |
| Conditional expression (5) | G1R1/fw | −2.976 |

Figure 3A:
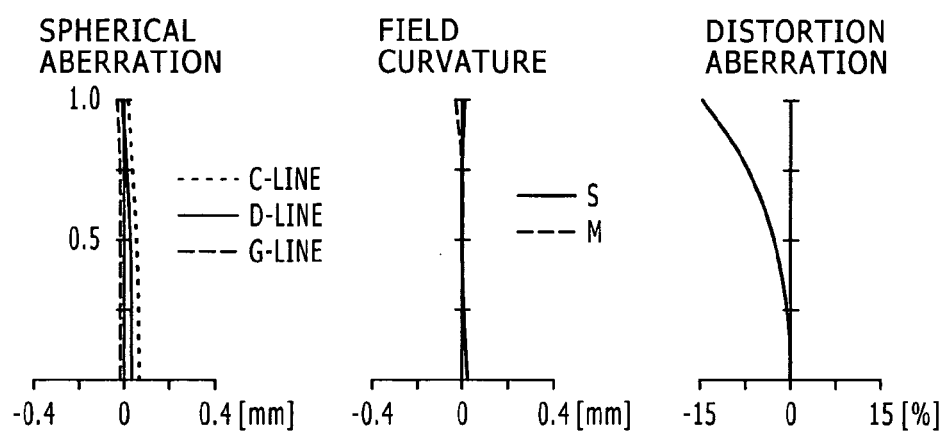
FIGS. 3A, 3B, and 3C are characteristic curve diagrams of various aberrations according to the first numerical example corresponding to the first embodiment.
Figure 3B:
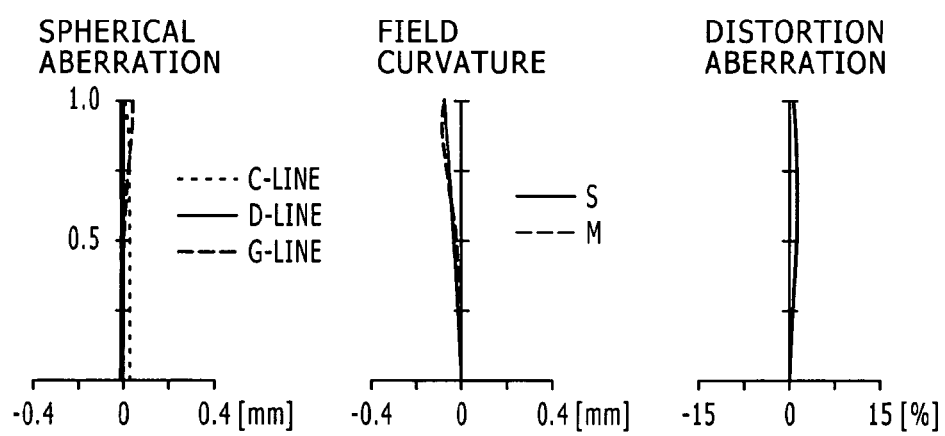
Figure 3C:
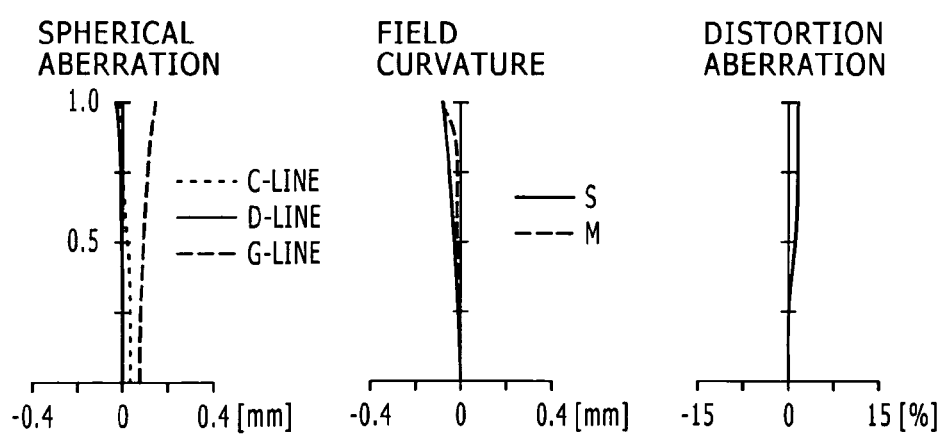

Next, FIGS. 3A, 3B, and 3C are diagrams of various aberrations in an infinity focused state of the first numerical example. FIG. 3A shows various aberrations in a wide-angle end state (ω=28.58 degrees). FIG. 3B shows various aberrations in an intermediate focal length state (ω=18.16 degrees). FIG. 3C shows various aberrations in a telephoto end state (ω=12.16 degrees).

In FIGS. 3A to 3C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 3A to 3C show that the zoom lens 1 according to the first numerical example excellently corrects various aberrations even though reduced in thickness, and has excellent image forming performance.

[2-2. Second Numerical Example]

In FIG. 4, reference numeral 2 denotes a zoom lens as a whole in a second numerical example corresponding to the first embodiment, which zoom lens is formed by a three-group configuration of a negative first group G1, a positive second group G2, and a positive third group G3 in order from an object side.

Figure 5A:
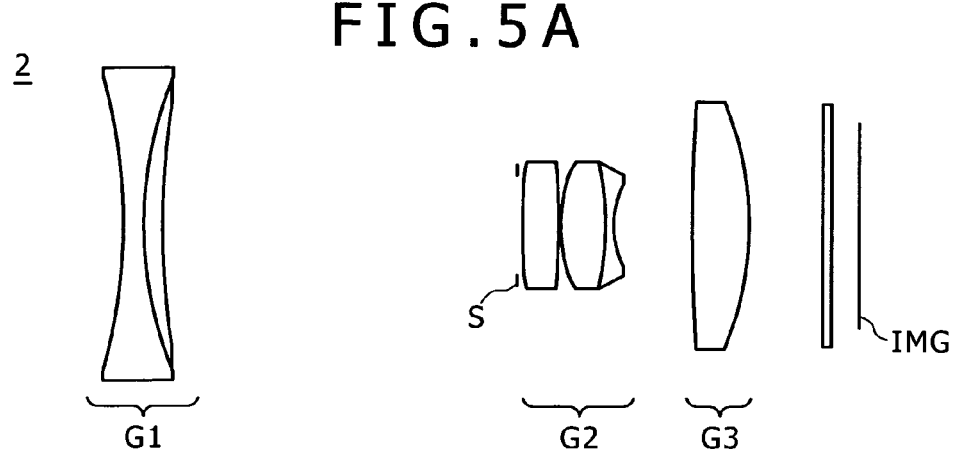
FIGS. 5A, 5B, and 5C are schematic sectional views of lens group arrangements according to the second numerical example corresponding to the first embodiment.
Figure 5B:
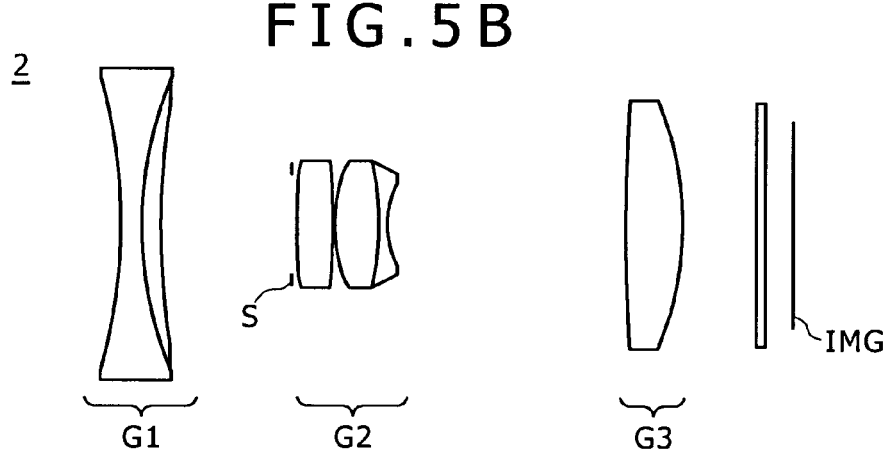
Figure 5C:
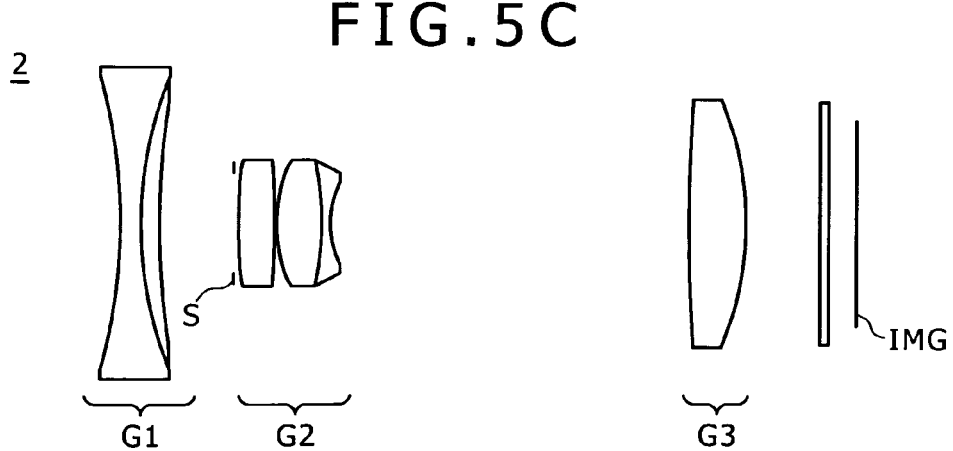

FIGS. 5A, 5B, and 5C show lens group arrangements when the zoom lens 2 in the second numerical example is in a wide-angle end state (WIDE), an intermediate focal length state (MID), and a telephoto end state (TELE).

The first group G1 is a cemented lens L12 including a first lens L1 formed of a negative aspheric glass lens and a second lens L2 formed of a positive spherical glass lens. The first group G1 as a whole has negative power.

The second group G2 includes a third lens L3 formed by a positive lens both surfaces of which are a spherical surface and a cemented lens L45 formed by joining together a fourth lens L4 formed of a positive aspheric lens and a fifth lens L5 formed of a negative spherical lens. An aperture stop S is disposed on the object side of the second group. This aperture stop S may be disposed on the image surface side of the second group.

The third group G3 is formed by a sixth lens L6 made of a positive single lens. Incidentally, an IR cutoff filter CF and a seal glass SG for protecting an image surface IMG are disposed between the third group G3 and the image surface IMG in the zoom lens 2.

The following Tables 6 to 10 show specification values of the second numerical example corresponding to the first embodiment. In the specification tables in the second numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 1 means a plane.

TABLE 6

|  | WIDE | MID | TELE |
|---|---|---|---|
| f | 6.50 | 11.94 | 18.36 |
| FNO | 3.10 | 4.13 | 5.41 |
| ω | 28.19 | 18.01 | 11.93 |

TABLE 7

|  | Radius of curvature | Surface interval | Index of refraction (d) | Abbe number (d) |
|---|---|---|---|---|
| 1 | −20.3594 | 0.800 | 1.61881 | 63.39 |
| 2 | 14.4608 | 0.700 | 1.60700 | 26.30 |
| 3 (ASP) | 28.2146 | Variable |  |  |
| Aperture stop | ∞ | 0.200 |  |  |
| 5 | 19.0402 | 1.300 | 1.81600 | 46.57 |
| 6 | −32.9098 | 0.100 |  |  |
| 7 (ASP) | 4.9149 | 1.650 | 1.83500 | 42.98 |
| 8 | −14.4449 | 0.500 | 1.72825 | 28.32 |
| 9 | 3.6092 | Variable |  |  |
| 10 (ASP) | 146.9594 | 2.080 | 1.52500 | 56.45 |
| 11 (ASP) | −9.4709 | Variable |  |  |
| 12 | ∞ | 0.300 | 1.56883 | 56.04 |
| 13 | ∞ | 1.100 |  |  |
| IMG | ∞ | 0.000 |  |  |

Incidentally, a third surface, a seventh surface, a tenth surface, and an eleventh surface have an aspheric shape, and the aspheric coefficients of the surfaces are as shown in Table 8. Incidentally, for example, "0.26029E−05" denotes "$0.26029 \times 10^{-5}$."

TABLE 8

| Surface number | κ | A | B | C | D |
|---|---|---|---|---|---|
| 3 | 0.00000E+00 | −6.09827E−05 | 3.01228E−06 | −6.22171E−08 | 5.09658E−11 |
| 7 | 0.00000E+00 | −2.96013E−04 | 1.01977E−05 | −3.94599E−06 | 8.04193E−08 |

TABLE 8-continued

| Surface number | κ | A | B | C | D |
|---|---|---|---|---|---|
| 10 | 0.00000E+00 | 1.21217E−04 | −4.66434E−06 | −5.86555E−07 | 3.21289E−08 |
| 11 | 0.00000E+00 | 1.13011E−03 | −4.45084E−05 | 1.01661E−06 | −6.40039E−10 |

Next, variable intervals when a lens position state changes in the zoom lens 2 according to the second numerical example are shown in the following Table 9. In the zoom lens 2, the first group G1, the second group G2, and the third group G3 are all movable, variable power is achieved mainly by changing an interval between the first group G1 and the second group G2, and focal position variation at each angle of view is absorbed by moving the third group G3, whereby high performance can be ensured while maintaining miniaturization.

TABLE 9

|  | WIDE | MID | TELE |
|---|---|---|---|
| D3 | 14.475 | 5.182 | 1.600 |
| D9 | 4.230 | 8.897 | 14.273 |
| D11 | 3.265 | 2.778 | 1.700 |

The following Table 10 shows conditional expression correspondence values in the zoom lens 2 according to the second numerical example.

TABLE 10

|  |  | Second example |
|---|---|---|
| Conditional expression (1) | N1d | 1.61881 |
| Conditional expression (2) | ν2d | 26.3 |
| Conditional expression (3) | f21/fw | 2.288 |
| Conditional expression (4) | f21/f2 | 1.450 |
| Conditional expression (5) | G1R1/fw | −3.132 |

Figure 6A:
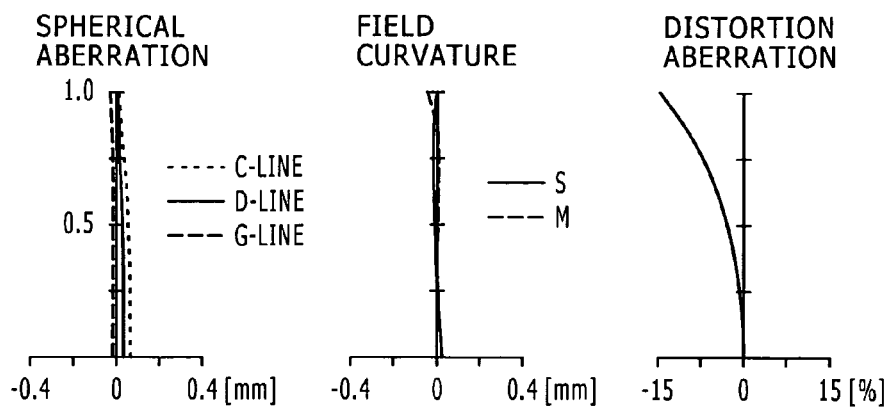
FIGS. 6A, 6B, and 6C are characteristic curve diagrams of various aberrations according to the second numerical example corresponding to the first embodiment.
Figure 6B:
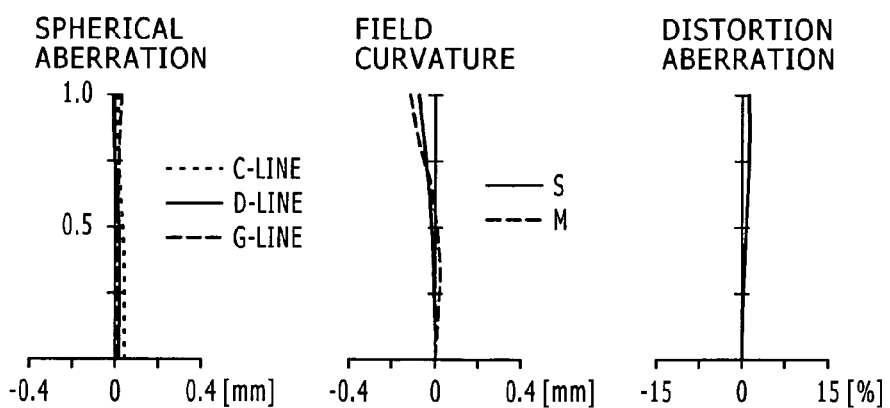
Figure 6C:
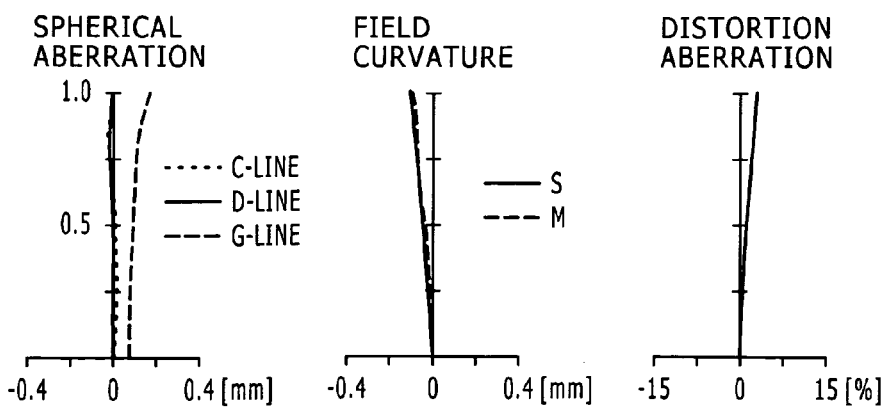

Next, FIGS. 6A, 6B, and 6C are diagrams of various aberrations in an infinity focused state of the second numerical example. FIG. 6A shows various aberrations in a wide-angle end state (ω=28.19 degrees). FIG. 6B shows various aberrations in an intermediate focal length state (ω=18.01 degrees). FIG. 6C shows various aberrations in a telephoto end state (ω=11.93 degrees).

In FIGS. 6A to 6C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 6A to 6C show that the zoom lens 2 according to the second numerical example excellently corrects various aberrations even though reduced in thickness, and has excellent image forming performance.

[2-3. Third Numerical Example]

Figure 7:
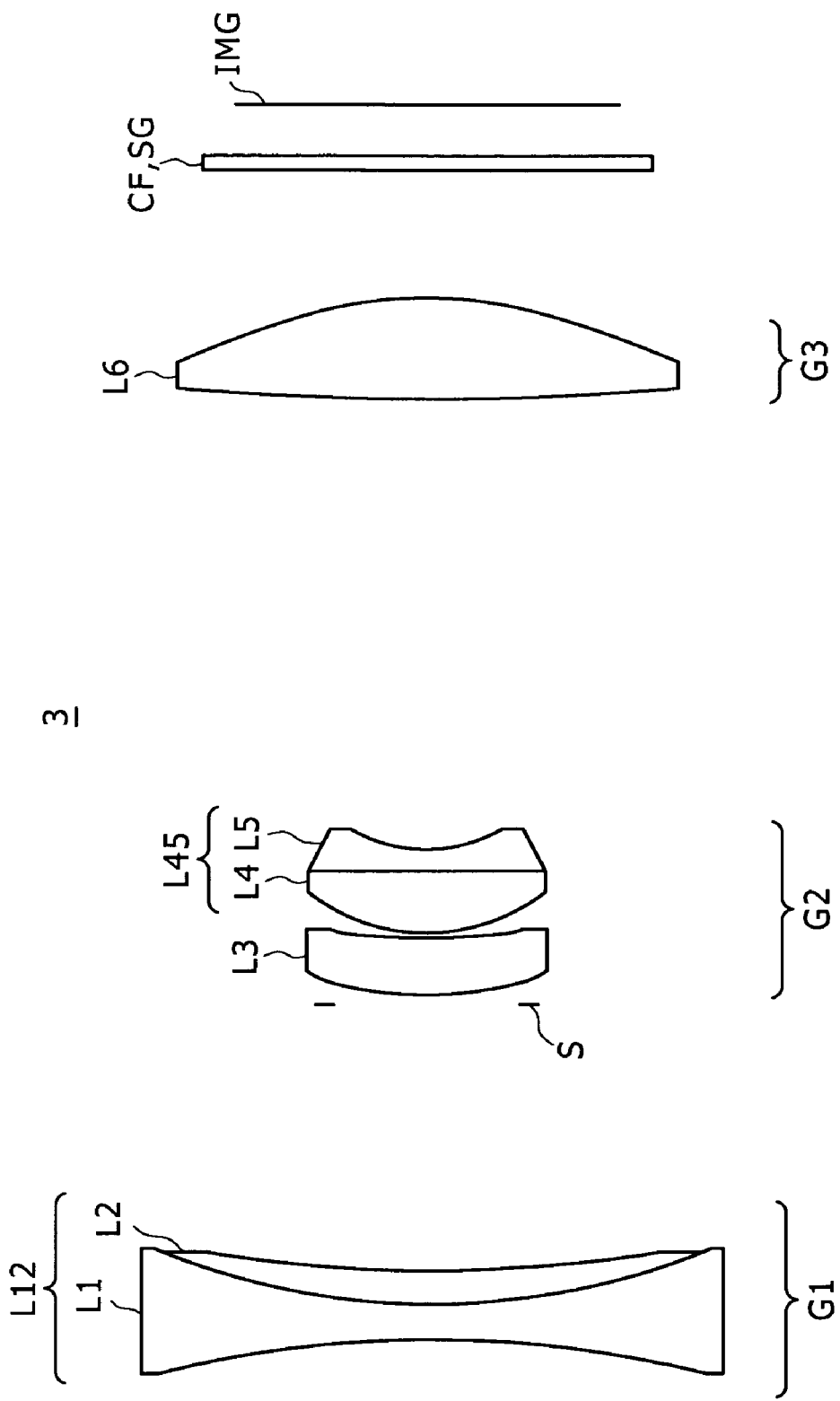
FIG. 7 is a schematic sectional view of a configuration of a zoom lens according to a third numerical example corresponding to the first embodiment.

In FIG. 7, reference numeral 3 denotes a zoom lens as a whole in a third numerical example corresponding to the first embodiment, which zoom lens is formed by a three-group configuration of a negative first group G1, a positive second group G2, and a positive third group G3 in order from an object side.

Figure 8A:
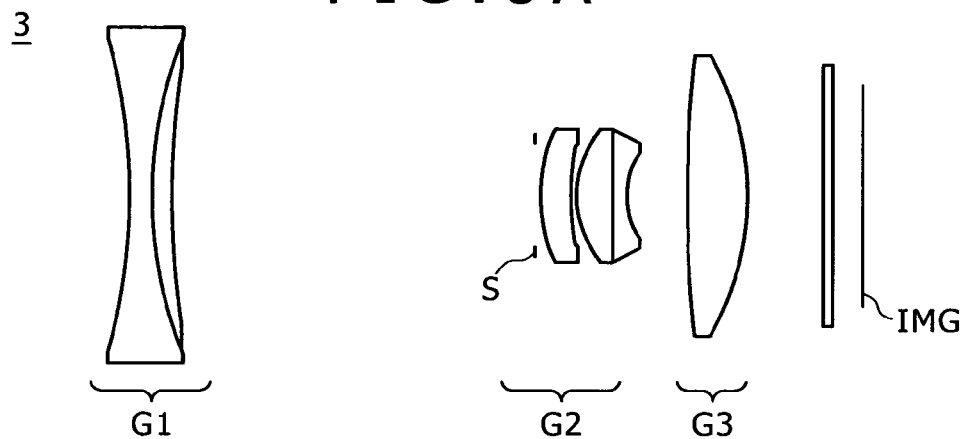
FIGS. 8A, 8B, and 8C are schematic sectional views of lens group arrangements according to the third numerical example corresponding to the first embodiment.
Figure 8B:
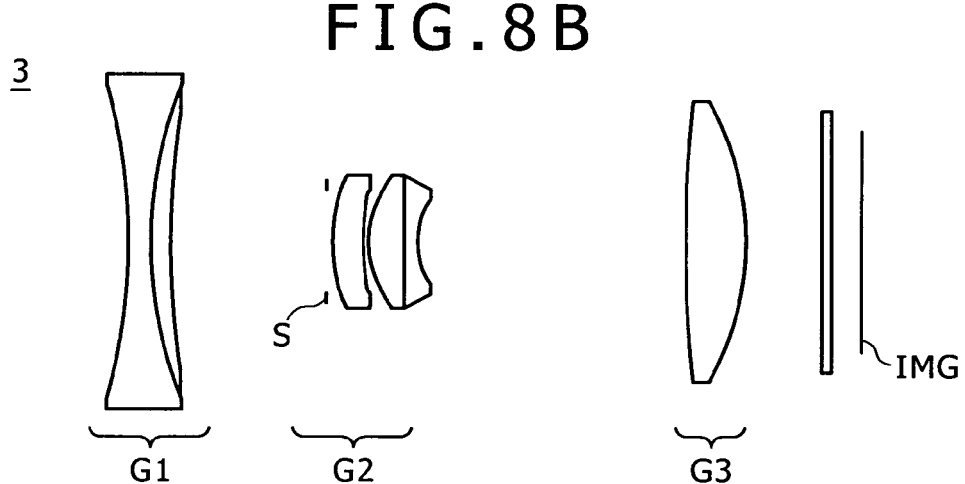
Figure 8C:
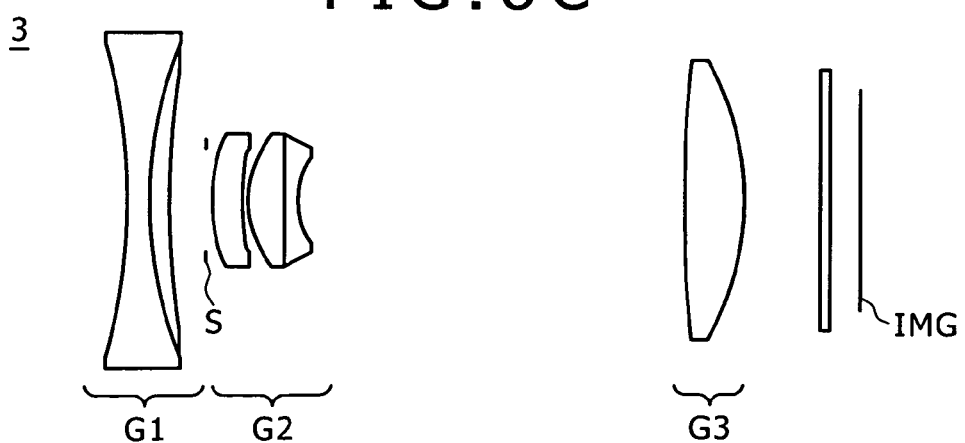

FIGS. 8A, 8B, and 8C show lens group arrangements when the zoom lens 3 in the third numerical example is in a wide-angle end state (WIDE), an intermediate focal length state (MID), and a telephoto end state (TELE).

The first group G1 is a cemented lens L12 made of a compound aspheric lens formed by joining together a first lens L1 formed of a negative aspheric glass lens and a second lens L2 formed of a positive resin. The first group G1 as a whole has negative power.

The second group G2 includes a third lens L3 formed of a positive aspheric lens and a cemented lens L45 formed by joining together a fourth lens L4 formed of a positive spherical lens and a fifth lens L5 formed of a negative spherical lens. An aperture stop S is disposed on the object side of the second group G2. This aperture stop S may be disposed on the image surface side of the second group G2.

The third group G3 is formed by a sixth lens L6 made of a positive single lens. Incidentally, an IR cutoff filter CF and a seal glass SG for protecting an image surface IMG are disposed between the third group G3 and the image surface IMG in the zoom lens 3.

The following Tables 11 to 15 show specification values of the third numerical example corresponding to the first embodiment. In the specification tables in the third numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 12 means a plane.

TABLE 11

|  | WIDE | MID | TELE |
|---|---|---|---|
| f | 6.30 | 12.15 | 23.65 |
| FNO | 3.10 | 4.39 | 6.73 |
| ω | 28.91 | 17.67 | 9.32 |

TABLE 12

|  | Radius of curvature | Surface interval | Index of refraction (d) | Abbe number (d) |
|---|---|---|---|---|
| 1 (ASP) | −16.1944 | 0.806 | 1.61881 | 63.39 |
| 2 | 16.5790 | 0.650 | 1.63200 | 23.41 |
| 3 (ASP) | 40.0000 | Variable |  |  |
| Aperture stop | ∞ | 0.200 |  |  |
| 5 (ASP) | 7.8233 | 1.200 | 1.83441 | 37.28 |
| 6 (ASP) | 16.0868 | 0.100 |  |  |
| 7 | 3.5992 | 1.300 | 1.83500 | 42.98 |
| 8 | 260.4143 | 0.500 | 1.80518 | 25.46 |
| 9 | 2.9602 | Variable |  |  |
| 10 (ASP) | 79.0849 | 2.120 | 1.52500 | 56.45 |
| 11 (ASP) | −7.7729 | Variable |  |  |

TABLE 12-continued

| | Radius of curvature | Surface interval | Index of refraction (d) | Abbe number (d) |
|---|---|---|---|---|
| 12 | ∞ | 0.300 | 1.56883 | 56.04 |
| 13 | ∞ | 1.100 | | |
| IMG | ∞ | 0.000 | | |

Incidentally, a first surface, a third surface, a fifth surface, a sixth surface, a tenth surface, and an eleventh surface have an aspheric shape, and the aspheric coefficients of the surfaces are as shown in Table 13. Incidentally, for example, "0.26029E−05" denotes "$0.26029 \times 10^{-5}$."

TABLE 13

| Surface number | κ | A | B | C | D |
|---|---|---|---|---|---|
| 1 | 0.00000E+00 | −4.57909E−06 | 4.87147E−06 | 1.12918E−08 | −1.62572E−09 |
| 3 | 0.00000E+00 | −1.09416E−04 | 6.67839E−06 | 1.34673E−07 | −5.74755E−09 |
| 5 | 0.00000E+00 | 2.84727E−03 | 1.77170E−04 | 7.40094E−06 | 7.23270E−07 |
| 6 | 0.00000E+00 | 4.19318E−03 | 2.93985E−04 | 1.29073E−05 | 4.34199E−06 |
| 10 | 0.00000E+00 | 9.38340E−05 | −8.17773E−06 | 9.87708E−07 | −2.65688E−08 |
| 11 | 0.00000E+00 | 9.20626E−04 | −2.36901E−05 | 1.33678E−06 | −2.80667E−08 |

Next, variable intervals when a lens position state changes in the zoom lens 3 according to the third numerical example are shown in the following Table 14. In the zoom lens 3, the first group G1, the second group G2, and the third group G3 are all movable, variable power is achieved mainly by changing an interval between the first group G1 and the second group G2, and focal position variation at each angle of view is absorbed by moving the third group G3, whereby high performance can be ensured while maintaining miniaturization.

TABLE 14

| | WIDE | MID | TELE |
|---|---|---|---|
| D3 | 14.640 | 5.736 | 0.439 |
| D9 | 3.760 | 9.647 | 19.050 |
| D11 | 3.366 | 2.740 | 2.436 |

The following Table 15 shows conditional expression correspondence values in the zoom lens 3 according to the third numerical example.

TABLE 15

| | | Third example |
|---|---|---|
| Conditional expression (1) | N1d | 1.61881 |
| Conditional expression (2) | v2d | 23.3 |
| Conditional expression (3) | f21/fw | 2.701 |
| Conditional expression (4) | f21/f2 | 1.609 |
| Conditional expression (5) | G1R1/fw | −2.572 |

Next, FIGS. 9A, 9B, and 9C are diagrams of various aberrations in an infinity focused state of the third numerical example. FIG. 9A shows various aberrations in a wide-angle end state (ω=28.91 degrees). FIG. 9B shows various aberrations in an intermediate focal length state (ω=17.67 degrees). FIG. 9C shows various aberrations in a telephoto end state (ω=9.32 degrees).

In FIGS. 9A to 9C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 9A to 9C show that the zoom lens 3 according to the third numerical example excellently corrects various aberrations even though reduced in thickness, and has excellent image forming performance.

[2-4. Fourth Numerical Example]

In FIG. 10, reference numeral 4 denotes a zoom lens as a whole in a fourth numerical example corresponding to the first embodiment, which zoom lens is formed by a three-group configuration of a negative first group G1, positive second group G2, and a positive third group G3 in order from an object side.

Figure 11A:
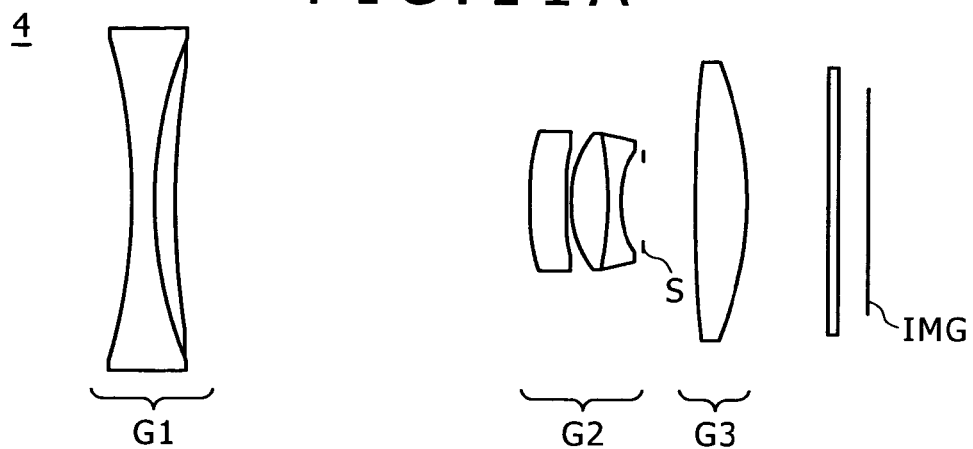
FIGS. 11A, 11B, and 11C are schematic sectional views of lens group arrangements according to the fourth numerical example corresponding to the first embodiment.
Figure 11B:
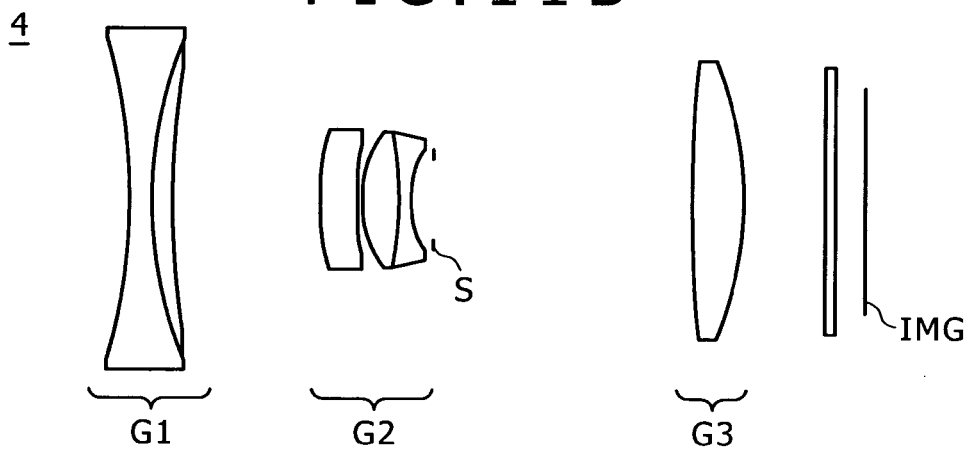
Figure 11C:
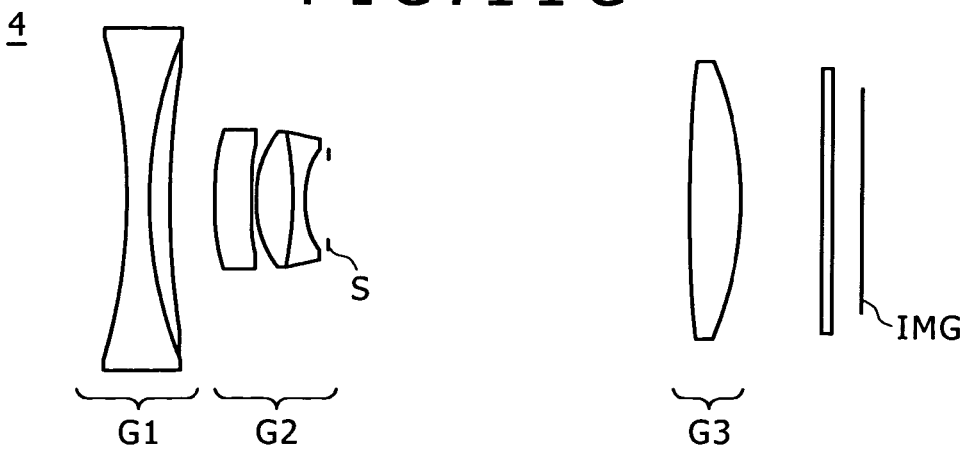

FIGS. 11A, 11B, and 11C show lens group arrangements when the zoom lens 4 in the fourth numerical example is in a wide-angle end state (WIDE), an intermediate focal length state (MID), and a telephoto end state (TELE).

The first group G1 is a cemented lens L12 made of a compound aspheric lens formed by joining together a first lens L1 formed of a negative spherical glass lens and a second lens L2 formed of a positive resin aspheric lens. The first group G1 as a whole has negative power.

The second group G2 includes a third lens L3 formed of a positive lens both surfaces of which are an aspheric surface and a cemented lens L45 formed by joining together a positive fourth lens L4 and a negative fifth lens L5. An aperture stop S is disposed on the image surface side of the second group G2. This aperture stop S may be disposed on the object side of the second group G2.

The third group G3 is formed by a sixth lens L6 made of a positive single lens. Incidentally, an IR cutoff filter CF and a seal glass SG for protecting an image surface IMG are disposed between the third group G3 and the image surface IMG in the zoom lens 4.

The following Tables 16 to 20 show specification values of the fourth numerical example corresponding to the first embodiment. In the specification tables in the fourth numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 17 means a plane.

TABLE 16

|  | WIDE | MID | TELE |
|---|---|---|---|
| f | 6.50 | 12.27 | 18.36 |
| FNO | 3.08 | 4.43 | 5.89 |
| ω | 28.18 | 17.46 | 11.87 |

TABLE 17

|  | Radius of curvature | Surface interval | Index of refraction (d) | Abbe number (d) |
|---|---|---|---|---|
| 1 | −17.0260 | 0.800 | 1.61881 | 63.39 |
| 2 | 15.9026 | 0.750 | 1.63200 | 23.30 |
| 3 (ASP) | 34.0416 | Variable |  |  |
| 4 (ASP) | 10.0433 | 1.300 | 1.08139 | 45.45 |
| 5 (ASP) | 26.2725 | 0.100 |  |  |
| 6 | 3.8846 | 1.300 | 1.83500 | 42.98 |
| 7 | −11.3164 | 0.432 | 1.1736 | 29.50 |
| 8 | 3.0504 | 0.800 |  |  |
| Aperture stop |  | −0.800 |  |  |
| 10 |  | Variable |  |  |
| 11 (ASP) | 257.0684 | 1.800 | 1.52500 | 56.45 |
| 12 (ASP) | −8.4857 | Variable |  |  |
| 13 | ∞ | 0.300 | 1.56883 | 56.04 |
| 14 | ∞ | 1.100 |  |  |
| IMG | ∞ | 0.000 |  |  |

Incidentally, a third surface, a fourth surface, a fifth surface, an eleventh surface, and a twelfth surface have an aspheric shape, and the aspheric coefficients of the surfaces are as shown in Table 18. Incidentally, for example, "0.26029E-05" denotes "$0.26029 \times 10^{-5}$."

TABLE 18

| Surface number | κ | A | B | C | D |
|---|---|---|---|---|---|
| 3 | 0.00000E+00 | −1.39673E−04 | 5.29898E−06 | −1.84872E−07 | 2.65829E−09 |
| 4 | 0.00000E+00 | 1.78748E−03 | 1.23127E−04 | 1.67225E−06 | 3.49770E−07 |
| 5 | 0.00000E+00 | 2.79150E−03 | 2.18054E−04 | −2.38222E−06 | 2.26169E−06 |
| 11 | 0.00000E+00 | 7.99687E−04 | −5.94465E−05 | 1.89133E−06 | −9.15761E−09 |
| 12 | 0.00000E+00 | 1.87884E−03 | −9.88649E−05 | 3.00984E−06 | −2.25535E−08 |

Next, variable intervals when a lens position state changes in the zoom lens 4 according to the fourth numerical example are shown in the following Table 19. In the zoom lens 4, the first group G1, the second group G2, and the third group G3 are all movable, variable power is achieved mainly by changing an interval between the first group G1 and the second group G2, and focal position variation at each angle of view is absorbed by moving the third group G3, whereby high performance can be ensured while maintaining miniaturization.

TABLE 19

|  | WIDE | MID | TELE |
|---|---|---|---|
| D3 | 13.581 | 4.888 | 1.866 |
| D10 | 4.454 | 9.839 | 15.116 |
| D12 | 3.384 | 2.791 | 1.715 |

The following Table 20 shows conditional expression correspondence values in the zoom lens 4 according to the fourth numerical example.

TABLE 20

|  |  | Fourth example |
|---|---|---|
| Conditional expression (1) | N1d | 1.61881 |
| Conditional expression (2) | ν2d | 23.3 |
| Conditional expression (3) | f21/fw | 2.998 |
| Conditional expression (4) | f21/f2 | 1.902 |
| Conditional expression (5) | G1R1/fw | −2.619 |

Figure 12A:
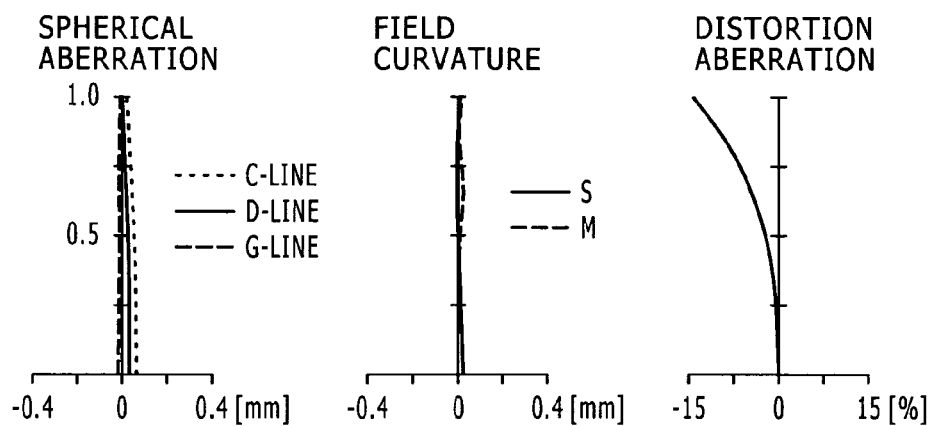
FIGS. 12A, 12B, and 12C are characteristic curve diagrams of various aberrations according to the fourth numerical example corresponding to the first embodiment.
Figure 12B:
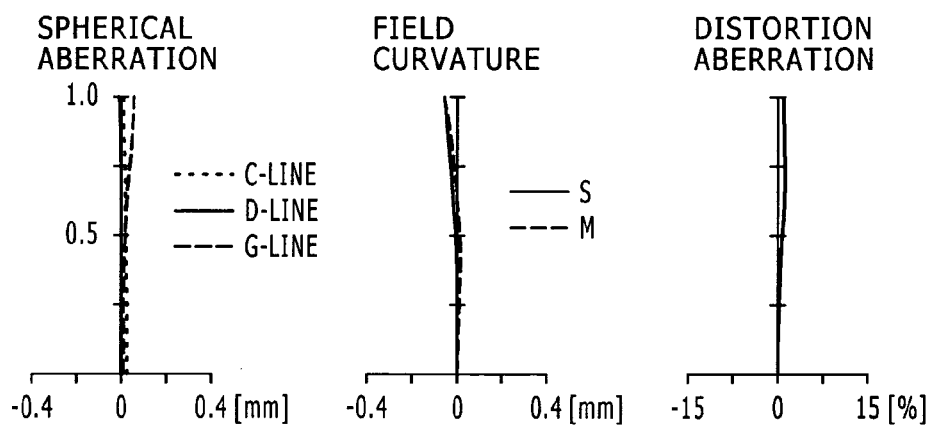
Figure 12C:
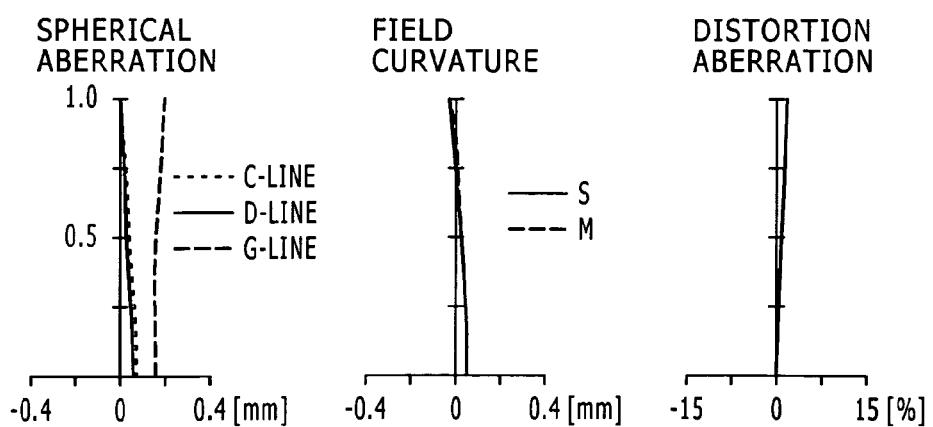

Next, FIGS. 12A, 12B, and 12C are diagrams of various aberrations in an infinity focused state of the fourth numerical example. FIG. 12A shows various aberrations in a wide-angle end state (ω=28.18 degrees). FIG. 12B shows various aberrations in an intermediate focal length state (ω=17.46 degrees). FIG. 12C shows various aberrations in a telephoto end state (ω=11.87 degrees).

In FIGS. 12A to 12C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 12A to 12C show that the zoom lens 4 according to the fourth numerical example excellently corrects various aberrations even though reduced in thickness, and has excellent image forming performance.

Thus, according to the first to fourth numerical examples corresponding to the first embodiment, an image pickup system miniaturized and improved in performance at low cost with a focal length Wf of 28 mm to 38 mm (equivalent to a 35-mm film), a variable power ratio of two to four times, an FNO of about 2.5 to 3.5 in the wide-angle end state, and an FNO of about 5 to 6.5 in the telephoto end state can be realized in the zoom lenses 1 to 4.

<3. Second Embodiment>

A four-group type zoom lens according to a second embodiment of the present invention includes four groups that are a negative first group, a positive second group, a positive third group, and a negative fourth group in order from an object side, the first group including a negative cemented lens formed by joining together, from the object side, a first lens formed by a negative single lens and a second lens formed by a positive single lens, the second group including, from the object side, a third lens formed by a positive single lens and a cemented lens formed by joining together a fourth lens formed by a positive single lens and a fifth lens formed by a negative single lens, the third group including a sixth lens formed by a positive single lens, and the fourth group including a seventh lens at a fixed distance from an image pickup surface, and the zoom lens being formed so as to satisfy the following conditional expressions (1) to (3):

$$N1d > 1.55 \quad (1)$$

$$v2d < 30 \quad (2)$$

$$f21/fw > 1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

The four-group type zoom lens has the following advantages because the first group includes only the single cemented lens composed of the first lens having negative power and the second lens having positive power.

First, in the four-group type zoom lens, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the four-group type zoom lens is of a single configuration of only the cemented lens rather than a configuration of a plurality of lenses, the four-group type zoom lens makes it possible to achieve an improvement in performance, cost reduction, and reduction in thickness as compared with the case where the first group is formed by a plurality of lenses.

Second, in the four-group type zoom lens, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The four-group type zoom lens thereby makes it possible to reduce an amount of clearance of mechanical hardware configuration for focal position adjustment by the first to third groups. Therefore the whole of the four-group type zoom lens can be further miniaturized.

Third, in the four-group type zoom lens, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The four-group type zoom lens can thereby weaken an effect of bringing the principal point position of the first group closer to the image surface by the second group. That is, the four-group type zoom lens can achieve higher performance even when the power of the positive third lens is made lower than in the existing case when the second group includes the positive third lens and the cemented lens formed by joining together the positive fourth lens and the negative fifth lens. It is thus possible to suppress lens decentration sensitivity in the second group, and lower a degree of difficulty in manufacturing while achieving a reduction in thickness and an improvement in performance.

The conditional expressions (1) to (3) in the four-group type zoom lens are defined to lower the degree of difficulty in manufacturing while achieving a reduction in thickness and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the four-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded.

Incidentally, when the four-group type zoom lens satisfies the following conditional expression (2)' in place of the conditional expression (2), a correcting effect (achromatizing effect) on chromatic aberration of magnification and longitudinal chromatic aberration can be further increased.

$$v2d < 26.5 \quad (2)'$$

The conditional expression (3) defines a ratio between focal length in the wide-angle end state and the focal length of the positive third lens located nearest to the object side in the second group, and thereby weakens the power of the positive third lens in the second group.

When the ratio is less than the lower limit value of the conditional expression (3), the power of the positive third lens located nearest to the object side in the second group is too strong as compared with the focal length in the wide-angle end state, the decentration sensitivity of the positive third lens and the cemented lens composed of the positive fourth lens and the negative fifth lens in the second group is increased, and thus precision for assembly of the second group is heightened. This invites a degradation in performance or an increase in the degree of difficulty in manufacturing of the four-group type zoom lens.

Incidentally, when the four-group type zoom lens satisfies the following conditional expression (3)' in place of the conditional expression (3), decentration sensitivity within the second group is further lowered, and thus the degree of difficulty in manufacturing can be further decreased.

$$f21/fw>1.5 \quad (3)'$$

Next, in the four-group type zoom lens according to the second embodiment of the present invention, at least one surface nearest to the object side or nearest to the image surface side in the cemented lens in the first group and at least one surface of the positive third lens located nearest to the object side in the second group have an aspheric shape, and are formed so as to satisfy the following conditional expression (4):

$$f21/f2>1 \quad (4)$$

where f2 is the focal length of the second group.

In the four-group type zoom lens, by making at least one surface nearest to the object side or nearest to the image surface side in the cemented lens in the first group have an aspheric shape, coma aberration, astigmatism, and distortion aberration of the peripheral part in the wide-angle end state in particular can be suppressed.

In addition, in the four-group type zoom lens, by making at least one surface nearest to the object side or nearest to the image surface side in the cemented lens in the first group have an aspheric shape, various kinds of aberration occurring when the negative power of the first group is strengthened can be corrected. Therefore degradation in optical performance can be suppressed.

At this time, in the four-group type zoom lens, because the negative power of the first group is strengthened, a same variable power ratio can be obtained even when a traveling distance between the first group and the second group is shortened. It is therefore possible to correspondingly shorten a total optical length and thereby achieve further miniaturization.

Further, in the four-group type zoom lens, by making at least one surface of the positive third lens located nearest to the object side in the second group have an aspheric shape, spherical aberration, astigmatism, and variation in field curvature on the telephoto end side which variation is attendant on object distance variation can be suppressed. Thus, resolution performance can be further improved.

The conditional expression (4) defines a ratio between the focal length of the second group as a whole and the focal length of the positive third lens nearest to the object side in the second group. The conditional expression (4) is to weaken the power of the third lens with respect to the power of the second group as a whole.

When the ratio is less than the lower limit value of the conditional expression (4), the focal length of the positive third lens nearest to the object side in the second group is shortened with respect to the focal length of the second group. That is, the power of the third lens is too strong with respect to the power of the second group as a whole.

At this time, in the four-group type zoom lens, the decentration sensitivity of the positive third lens nearest to the object side in the second group and the cemented lens composed of the positive fourth lens and the negative fifth lens in the second group is increased, and precision for assembly of the second group is heightened, thus inviting a degradation in performance or an increase in the degree of difficulty in manufacturing.

Incidentally, when the four-group type zoom lens satisfies the following conditional expression (4)' in place of the conditional expression (4), decentration sensitivity within the second group is further lowered, and thus the degree of difficulty in manufacturing can be further decreased.

$$f21/f2>1.3 \quad (4)'$$

Incidentally, in the four-group type zoom lens, by making the fourth group have negative power, optical performance can be improved even for a close-range object in the telephoto end state.

Next, in the four-group type zoom lens according to the second embodiment of the present invention, at least one surface nearest to the object side or nearest to the image surface side in the cemented lens in the first group has an aspheric shape, both surfaces of the positive third lens nearest to the object side in the second group have a spherical shape, and at least one surface nearest to the object side or nearest to the image surface side in the cemented lens in the second group has an aspheric shape.

By making at least one surface nearest to the object side or nearest to the image surface side in the cemented lens in the first group have an aspheric shape, both surfaces of the positive third lens nearest to the object side in the second group have a spherical shape, and at least one surface nearest to the object side or nearest to the image surface side in the cemented lens in the second group have an aspheric shape, the four-group type zoom lens can lower the degree of difficulty in manufacturing while suppressing coma aberration, astigmatism, and distortion aberration of the peripheral part in the wide-angle end state and spherical aberration and coma aberration in the telephoto end state.

In addition, in the four-group type zoom lens according to the second embodiment of the present invention, the curvature of a surface nearest to the object side in the cemented lens in the first group satisfies the following conditional expression (5):

$$-1>G1R1/fw>-3.3 \quad (5)$$

where G1R1 is the radius of curvature of the surface nearest to the object side in the cemented lens in the first group.

The conditional expression (5) defines the radius of curvature of the surface nearest to the object side in the cemented lens in the first group.

When G1R1/fw is less than the lower limit value of the conditional expression (5), the radius of curvature of a joint surface in the cemented lens in the first group needs to be reduced in order to strengthen the negative power of the first group. Accordingly, it is necessary to reduce also the radius of curvature of the joint surface of the positive second lens forming the cemented lens, and the degree of difficulty in manufacturing the negative first lens and the positive second lens forming the cemented lens is raised.

When G1R1/fw exceeds the upper limit value of the conditional expression (5), on the other hand, the radius of curvature of the surface on the object side in the cemented lens in the first group is too small, and it is difficult to correct distortion aberration and field curvature in particular.

Further, in the four-group type zoom lens according to the second embodiment of the present invention, the seventh lens in the fourth group has negative power, and satisfies the following conditional expression (6):

$$f1/f4<0.9 \quad (6)$$

where f1 is focal length of the first group, and f4 is focal length of the fourth group.

The conditional expression (6) defines the power of the fourth group with respect to the power of the first group. In view of the disposition of the seventh lens in the fourth group at a position closest to an image pickup element as a heat source, when the seventh lens in the fourth group is formed by a resin lens, the radius of curvature of the seventh lens in the fourth group is made gentle to prevent performance degradation due to thermal deformation.

When f1/f4 is less than the lower limit value of the conditional expression (6), the negative power of the fourth group is too strong. Thus, there arises a need to strengthen the positive power of the second group and the third group, and the central thickness of the positive sixth lens in the third group, in particular, needs to be further increased to secure an edge thickness in the positive sixth lens in the third group, which is disadvantageous for reduction in thickness at a time of collapsing.

Incidentally, when the four-group type zoom lens satisfies the following conditional expression (6)' in place of the conditional expression (6), performance degradation at times of changes in temperature and humidity is suppressed, and a further advantage is provided for thickness reduction.

$$f1/f4 < 0.6 \quad (6)'$$

Further, in the four-group type zoom lens according to the second embodiment of the present invention, the third group and the fourth group are formed by a resin lens. Thereby a low-cost image pickup device can be provided as compared with a case where the third group and the fourth group are formed by a glass lens.

In this case, in the four-group type zoom lens, the third group and the fourth group are formed by resin lenses having positive power and negative power, respectively. Thereby focal position variation at times of changes in temperature and humidity can be cancelled out by the third group and the fourth group. A high-performance image pickup device can therefore be provided at low cost.

Further, the four-group type zoom lens according to the second embodiment of the present invention is characterized in that the cemented lens in the first group is formed by a compound aspheric lens including the first lens formed by a negative glass lens and the second lens formed by a positive resin lens.

Thus, because the four-group type zoom lens has the cemented lens in the first group formed using a resin, the peripheral part of the second lens formed by the resin can be made significantly thinner than a glass lens as compared with a case where glass lenses are joined to each other.

Incidentally, in the four-group type zoom lens, the fourth group increases an effect of correcting field curvature, and a mechanical structure can be simplified because the fourth group is fixed. Further, in the four-group type zoom lens, because of the addition of the fourth group, the power of the first to third groups can be strengthened, and optical length can be correspondingly shortened as compared with the three-group type.

<4. Numerical Examples Corresponding to Second Embodiment>

Numerical examples in which concrete numerical values are applied to the four-group type zoom lens according to the second embodiment of the present invention will next be described with reference to drawings and tables. In each numerical example, an aspheric surface is expressed by the above-described Equation 1.

[4-1. First Numerical Example]

In FIG. 13, reference numeral 11 denotes a zoom lens as a whole in a first numerical example corresponding to the second embodiment, which zoom lens is formed by a four-group configuration of a negative first group G1, a positive second group G2, a positive third group G3, and a negative fourth group G4 in order from an object side.

Figure 14A:
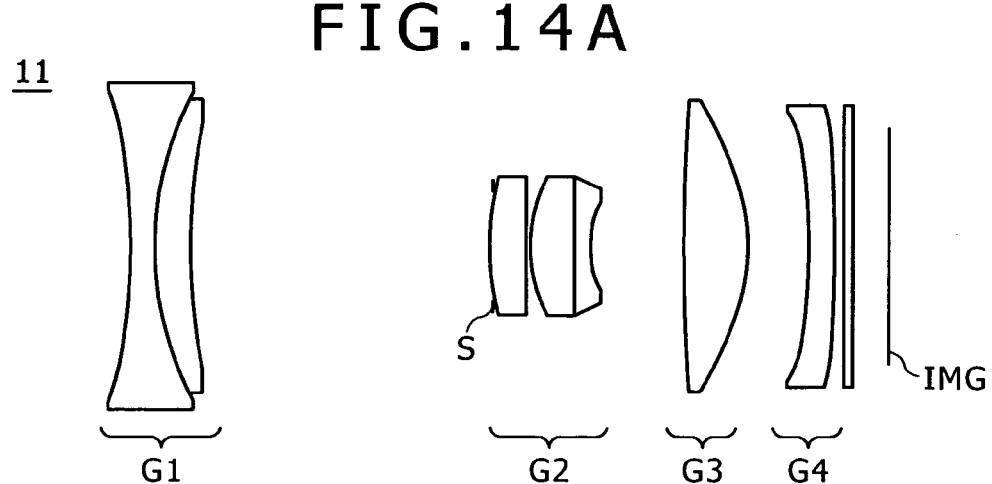
FIGS. 14A, 14B, and 14C are schematic sectional views of lens group arrangements according to the first numerical example corresponding to the second embodiment.
Figure 14B:
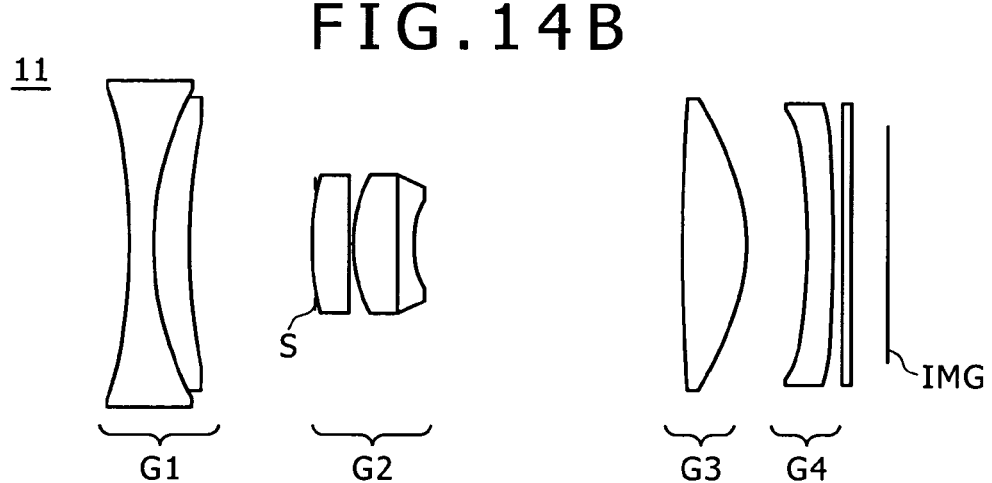
Figure 14C:
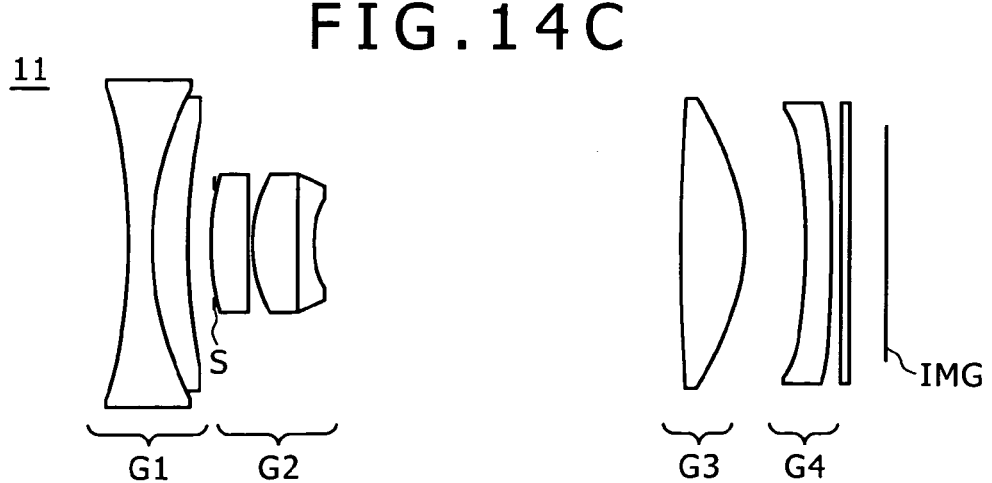

FIGS. 14A, 14B, and 14C show lens group arrangements when the zoom lens 11 in the first numerical example is in a wide-angle end state (WIDE), an intermediate focal length state (MID), and a telephoto end state (TELE).

The first group G1 is a cemented lens L12 including a first lens L1 formed of a negative aspheric glass lens and a second lens L2 formed of a positive spherical glass lens. The first group G1 as a whole has negative power.

The second group G2 includes a third lens L3 formed by a positive lens both surfaces of which are an aspheric surface and a cemented lens L45 formed by joining together a fourth lens L4 formed of a positive single lens and a fifth lens L5 formed of a negative single lens. An aperture stop S is disposed on the object side of the second group G2. This aperture stop S may be disposed on the image surface side of the second group G2.

The third group G3 is formed by a sixth lens L6 made of a positive single lens. The fourth group G4 is formed by a seventh lens L7 made of a negative single lens at a fixed distance from an image surface IMG.

Incidentally, an IR cutoff filter CF and a seal glass SG for protecting the image surface IMG are disposed between the fourth group G4 and the image surface IMG in the zoom lens 11.

The following Tables 21 to 25 show specification values of the second numerical example corresponding to the second embodiment. In the specification tables in the second numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 22 means a plane.

TABLE 21

|  | WIDE | MID | TELE |
|---|---|---|---|
| f | 6.25 | 11.48 | 17.66 |
| FNO | 2.99 | 4.13 | 5.48 |
| ω | 29.36 | 18.68 | 12.40 |

TABLE 22

|  | Radius of curvature | Surface interval | Index of refraction (d) | Abbe number (d) |
|---|---|---|---|---|
| 1 (ASP) | −17.1942 | 0.80 | 1.59201 | 67.02 |
| 2 | 11.4507 | 1.100 | 1.82155 | 27.53 |
| 3 | 20.3458 | Variable |  |  |
| Aperture stop | ∞ |  |  |  |
| 5 (ASP) | 13.4744 | 1.100 | 1.80139 | 45.45 |
| 6 (ASP) | −104.5622 | 0.100 |  |  |
| 7 | 4.3484 | 1.461 | 1.88300 | 40.80 |
| 8 | −48.0420 | 0.500 | 1.78472 | 25.72 |
| 9 | 3.3420 | Variable |  |  |
| 10 (ASP) | 91.3776 | 1.950 | 1.52500 | 56.45 |
| 11 (ASP) | −5.9033 | Variable |  |  |
| 12 (ASP) | −11.5510 | 0.800 | 1.52500 | 56.45 |
| 13 (ASP) | −25.0000 | 0.300 |  |  |
| 14 | ∞ | 0.300 | 1.56883 | 56.04 |
| 15 | ∞ | 1.100 |  |  |
| IMG | ∞ | 0.000 |  |  |

Incidentally, a first surface, a fifth surface, a sixth surface, a tenth surface, an eleventh surface, a twelfth surface, and a thirteenth surface have an aspheric shape, and the aspheric coefficients of the surfaces are as shown in Table 23. Incidentally, for example, "0.26029E-05" denotes "0.26029×10$^{-5}$."

TABLE 23

| Surface number | κ | A | B | C | D |
|---|---|---|---|---|---|
| 1 | 0.00000E+00 | 1.83956E−04 | −1.00000E−05 | 3.87100E−07 | −5.81281E−09 |
| 5 | 0.00000E+00 | 1.17891E−03 | 9.40000E−05 | 2.00000E−05 | −2.00000E−06 |
| 6 | 0.00000E+00 | 1.69701E−03 | 8.00000E−05 | 3.00000E−05 | −3.00000E−06 |
| 10 | 0.00000E+00 | 3.02200E−04 | −2.20000E−05 | 1.00000E−06 | −3.97522E−09 |
| 11 | 0.00000E+00 | 2.66200E−03 | −1.07385E−04 | 4.00000E−06 | −5.47626E−08 |
| 12 | 0.00000E+00 | 4.21969E−03 | −3.75818E−04 | 1.20000E−05 | −1.59496E−07 |
| 13 | 0.00000E+00 | 3.90537E−03 | −3.49903E−04 | 8.00000E−06 | −1.59119E−08 |

Next, variable intervals when a lens position state changes in the zoom lens 11 according to the first numerical example are shown in the following Table 24. In the zoom lens 11, the first group G1, the second group G2, and the third group G3 are all movable, and the fourth group is at a fixed distance from the image surface IMG.

In the zoom lens 11, variable power is achieved mainly by changing an interval between the first group G1 and the second group G2, and focal position variation at each angle of view is absorbed by moving the third group G3, whereby high performance can be ensured while maintaining miniaturization.

TABLE 24

Variable interval table

| | WIDE | MID | TELE |
|---|---|---|---|
| D3 | 11.054 | 3.939 | 0.948 |
| D9 | 4.038 | 9.197 | 14.456 |
| D11 | 3.585 | 2.933 | 2.020 |

The following Table 25 shows conditional expression correspondence values in the zoom lens 11 according to the first numerical example.

TABLE 25

| | | First example |
|---|---|---|
| Conditional expression (1) | N1d | 1.59201 |
| Conditional expression (2) | ν2d | 26.39 |
| Conditional expression (3) | f21/fw | 2.310 |
| Conditional expression (4) | f21/f2 | 1.491 |
| Conditional expression (5) | f1/f4 | 0.323 |

Figure 15A:
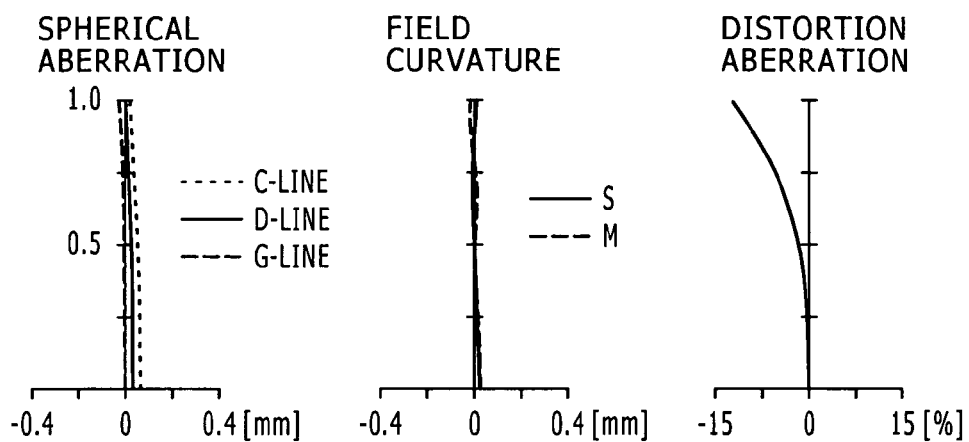
FIGS. 15A, 15B, and 15C are characteristic curve diagrams of various aberrations according to the first numerical example corresponding to the second embodiment.
Figure 15B:
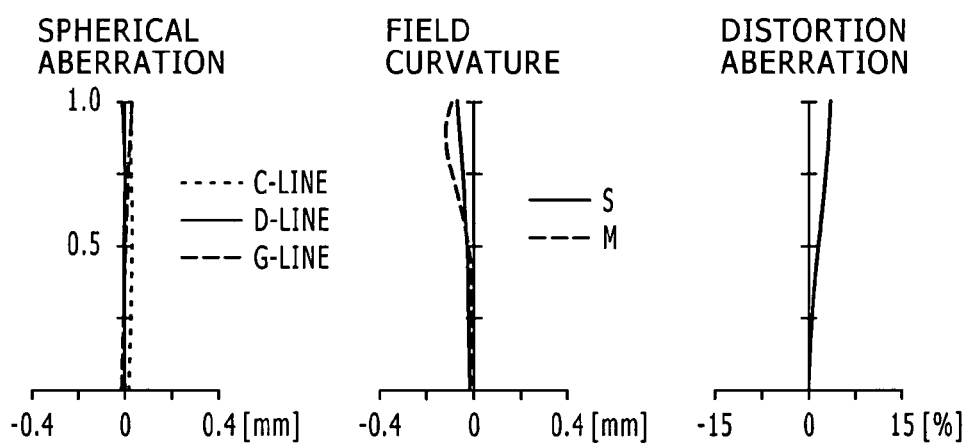
Figure 15C:
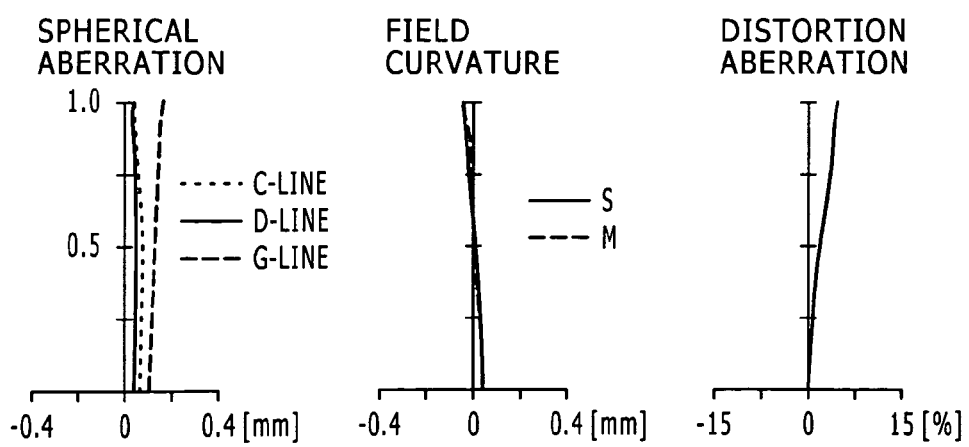

Next, FIGS. 15A, 15B, and 15C are diagrams of various aberrations in an infinity focused state of the first numerical example. FIG. 15A shows various aberrations in a wide-angle end state (ω=29.36 degrees). FIG. 15B shows various aberrations in an intermediate focal length state (ω=18.68 degrees). FIG. 15C shows various aberrations in a telephoto end state (ω=12.40 degrees).

In FIGS. 15A to 15C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 15A to 15C show that the zoom lens 11 according to the first numerical example excellently corrects various aberrations even though reduced in thickness, and has excellent image forming performance.

[4-2. Second Numerical Example]

In FIG. 16, reference numeral 12 denotes a zoom lens as a whole in a second numerical example corresponding to the second embodiment, which zoom lens is formed by a four-group configuration of a negative first group G1, a positive second group G2, a positive third group G3, and a negative fourth group G4 in order from an object side.

Figure 17A:
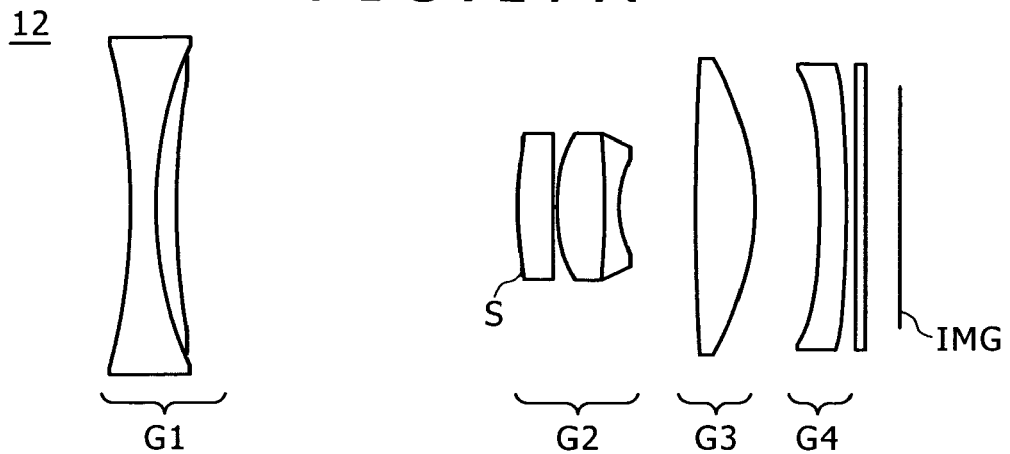
FIGS. 17A, 17B, and 17C are schematic sectional views of lens group arrangements according to the second numerical example corresponding to the second embodiment.
Figure 17B:
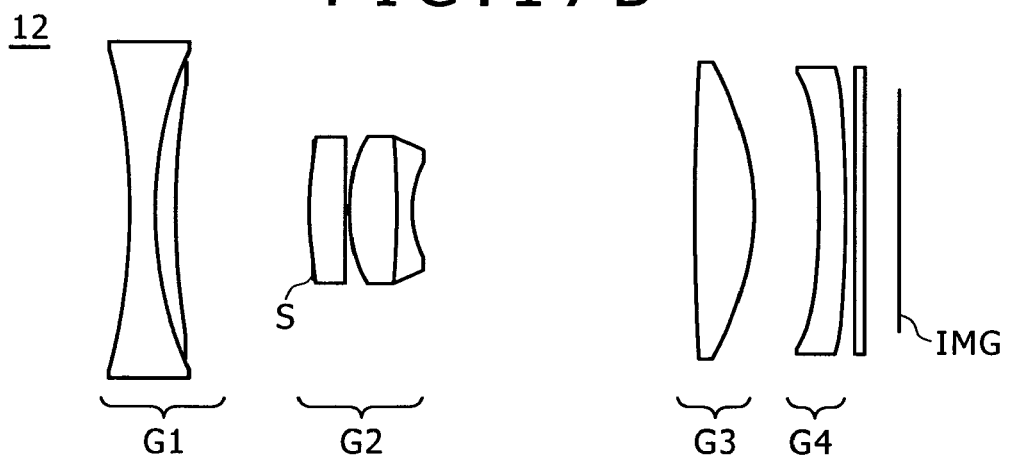
Figure 17C:
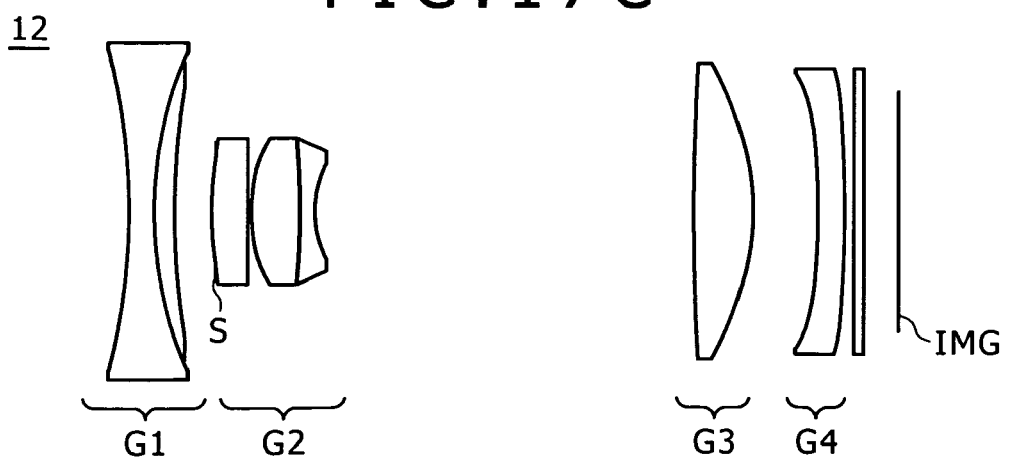

FIGS. 17A, 17B, and 17C show lens group arrangements when the zoom lens 12 in the second numerical example is in a wide-angle end state (WIDE), an intermediate focal length state (MID), and a telephoto end state (TELE).

The first group G1 is a cemented lens L12 formed by a compound aspheric lens including a first lens L1 formed of a negative spherical glass lens and a second lens L2 formed of a positive aspheric resin lens. The first group G1 as a whole has negative power.

The second group G2 includes a third lens L3 formed by a positive lens both surfaces of which are an aspheric surface and a cemented lens L45 formed by joining together a fourth lens L4 formed of a positive single lens and a fifth lens L5 formed of a negative single lens. An aperture stop S is disposed on the object side of the second group G2. This aperture stop S may be disposed on the image surface side of the second group G2.

The third group G3 is formed by a sixth lens L6 made of a positive resin lens. The fourth group G4 is formed by a seventh lens L7 made of a negative resin lens at a fixed distance from an image surface IMG.

Incidentally, an IR cutoff filter CF and a seal glass SG for protecting the image surface IMG are disposed between the fourth group G4 and the image surface IMG in the zoom lens 12.

The following Tables 26 to 30 show specification values of the second numerical example corresponding to the second embodiment. In the specification tables in the second numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 27 means a plane.

TABLE 26

| | WIDE | MID | TELE |
|---|---|---|---|
| f | 6.25 | 11.48 | 17.56 |
| FNO | 3.06 | 4.22 | 5.58 |
| ω | 29.36 | 18.68 | 12.47 |

TABLE 27

| | Radius of curvature | Surface interval | Index of refraction (d) | Abbe number (d) |
|---|---|---|---|---|
| 1 | −18.2846 | 0.800 | 1.59201 | 67.02 |
| 2 | 10.9297 | 0.722 | 1.82155 | 26.39 |
| 3 (ASP) | 21.2849 | Variable | | |
| Aperture stop | ∞ | | | |
| 5 (ASP) | 15.1990 | 1.100 | 1.80139 | 45.45 |
| 6 (ASP) | −47.8692 | 0.100 | | |
| 7 | 4.4469 | 1.456 | 1.88300 | 40.80 |
| 8 | −48.1168 | 0.500 | 1.78472 | 25.75 |
| 9 | 3.4081 | Variable | | |
| 10 (ASP) | 91.3776 | 1.831 | 1.52500 | 56.45 |
| 11 (ASP) | −6.2456 | Variable | | |
| 12 (ASP) | −12.8510 | 0.80000 | 1.52500 | 56.45 |
| 13 (ASP) | −25.0000 | 0.3000 | | |
| 14 | ∞ | 0.300 | 1.56883 | 56.04 |
| 15 | ∞ | 1.100 | | |
| IMG | ∞ | 0.000 | | |

Incidentally, a third surface, a fifth surface, a sixth surface, a tenth surface, an eleventh surface, a twelfth surface, and a thirteenth surface have an aspheric shape, and the aspheric coefficients of the surfaces are as shown in Table 28. Incidentally, for example, "0.26029E-05" denotes "$0.26029 \times 10^{-5}$."

TABLE 28

| Surface number | κ | A | B | C | D |
|---|---|---|---|---|---|
| 3 | 0.00000E+00 | −2.00019E−04 | 1.60000E−05 | −1.00000E−06 | 1.83401E−08 |
| 5 | 0.00000E+00 | 8.92527E−04 | 5.40000E−05 | 2.70000E−05 | −3.00000E−06 |
| 6 | 0.00000E+00 | 1.36142E−03 | 1.60000E−05 | 4.00000E−05 | −4.00000E−06 |
| 10 | 0.00000E+00 | 3.02200E−04 | −2.20000E−05 | 1.00000E−06 | −3.97522E−09 |
| 11 | 0.00000E+00 | 2.24355E−03 | −8.00000E−05 | 3.00000E−06 | −3.58674E−08 |
| 12 | 0.00000E+00 | 3.27160E−03 | −2.84762E−04 | 8.00000E−06 | −8.68886E−08 |
| 13 | 0.00000E+00 | 3.90537E−03 | −3.49903E−04 | 8.00000E−06 | −1.59119E−08 |

Next, variable intervals when a lens position state changes in the zoom lens 12 according to the second numerical example are shown in the following Table 29. In the zoom lens 12, the first group G1, the second group G2, and the third group G3 are all movable, and the fourth group G4 is at a fixed distance from the image surface IMG.

In the zoom lens 12, variable power is achieved mainly by changing an interval between the first group G1 and the second group G2, and focal position variation at each angle of view is absorbed by moving the third group G3, whereby high performance can be ensured while maintaining miniaturization.

TABLE 29

| | WIDE | MID | TELE |
|---|---|---|---|
| D3 | 11.193 | 4.176 | 1.286 |
| D9 | 4.038 | 9.197 | 14.456 |
| D11 | 3.585 | 2.933 | 2.020 |

The following Table 30 shows conditional expression correspondence values in the zoom lens 12 according to the second numerical example.

TABLE 30

| | | Second example |
|---|---|---|
| Conditional expression (1) | N1d | 1.59201 |
| Conditional expression (2) | ν2d | 26.39 |
| Conditional expression (3) | f21/fw | 2.310 |
| Conditional expression (4) | f21/f2 | 1.491 |
| Conditional expression (5) | f1/f4 | 0.323 |

Figure 18A:
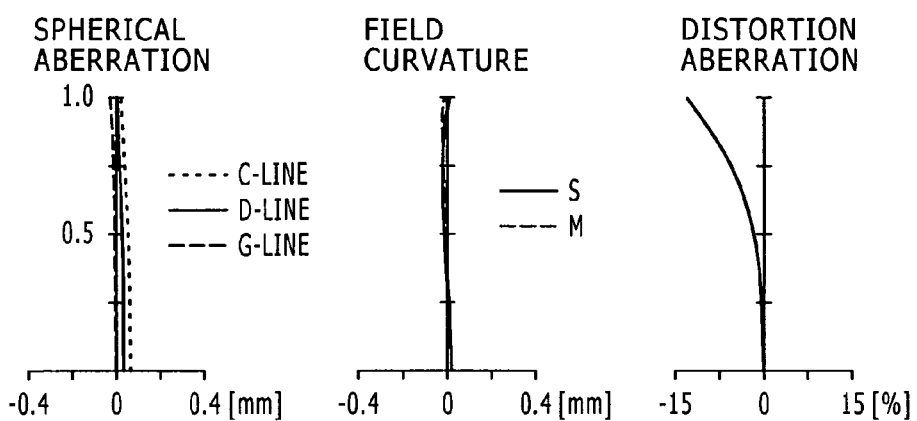
FIGS. 18A, 18B, and 18C are characteristic curve diagrams of various aberrations according to the second numerical example corresponding to the second embodiment.
Figure 18B:
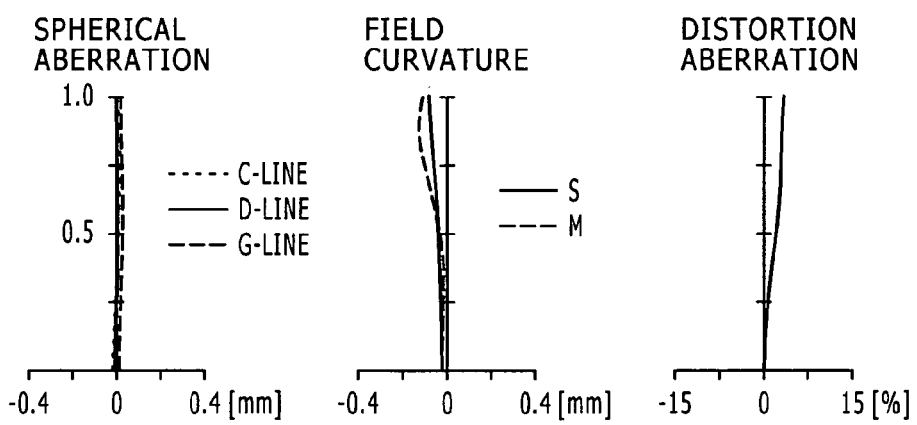
Figure 18C:
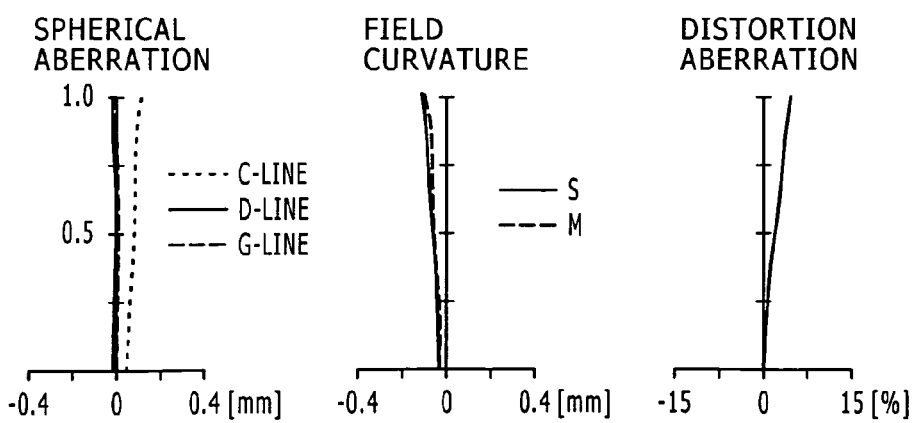

Next, FIGS. 18A, 18B, and 18C are diagrams of various aberrations in an infinity focused state of the second numerical example. FIG. 18A shows various aberrations in a wide-angle end state (ω=29.36 degrees). FIG. 18B shows various aberrations in an intermediate focal length state (ω=18.68 degrees). FIG. 18C shows various aberrations in a telephoto end state (ω=12.47 degrees).

In FIGS. 18A to 18C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 18A to 18C show that the zoom lens 12 according to the second numerical example excellently corrects various aberrations even though reduced in thickness, and has excellent image forming performance.

[4-3. Third Numerical Example]

In FIG. 19, reference numeral 13 denotes a zoom lens as a whole in a third numerical example corresponding to the second embodiment, which zoom lens is formed by a four-group configuration of a negative first group G1, a positive second group G2, a positive third group G3, and a negative fourth group G4 in order from an object side.

Figure 20A:
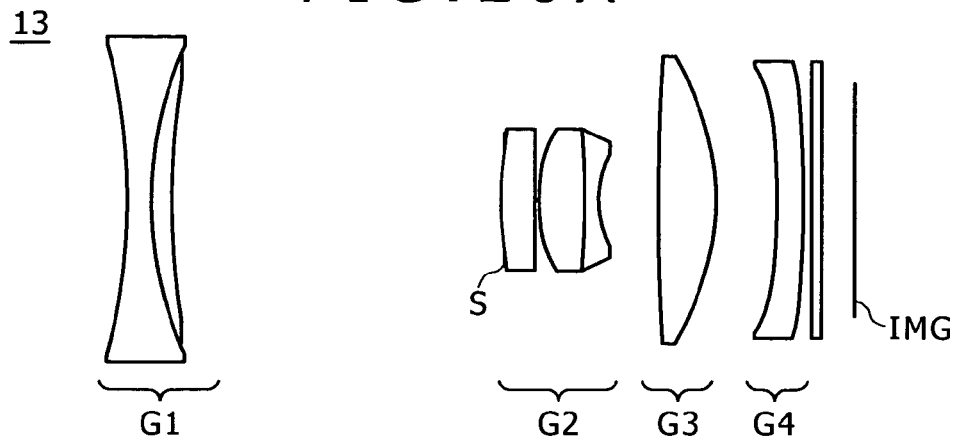
FIGS. 20A, 20B, and 20C are schematic sectional views of lens group arrangements according to the third numerical example corresponding to the second embodiment.
Figure 20B:
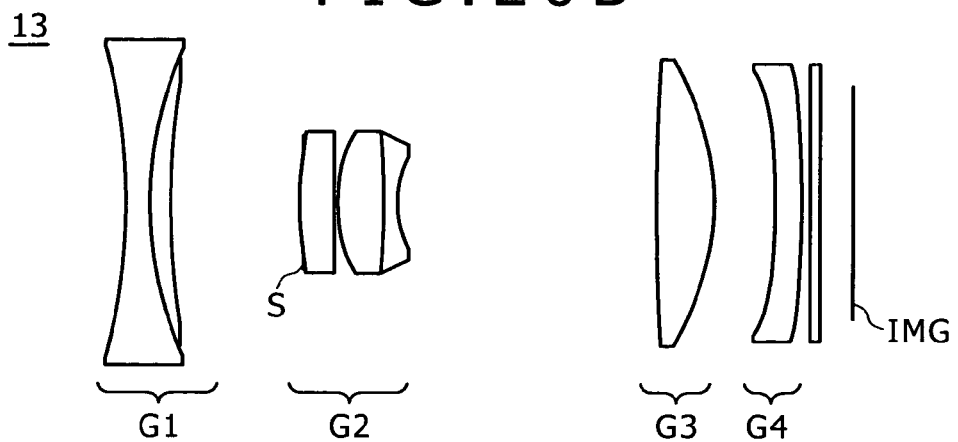
Figure 20C:
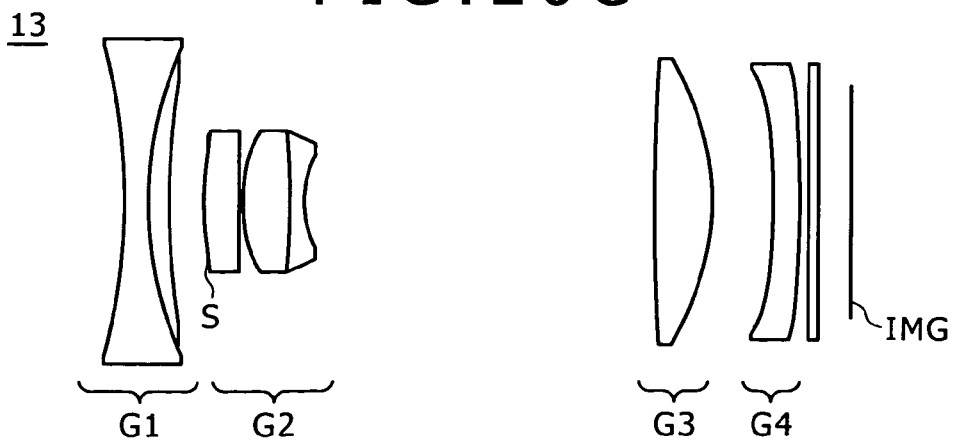

FIGS. 20A, 20B, and 20C show lens group arrangements when the zoom lens 13 in the third numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive resin lens. The first group G1 as a whole has negative power.

The second group G2 includes a third lens L3 formed by a positive aspheric lens and a cemented lens L45 formed by joining together a fourth lens L4 formed of a positive single lens and a fifth lens L5 formed of a negative single lens. An aperture stop S is disposed on the object side of the second group G2. This aperture stop S may be disposed on the image surface side of the second group G2.

The third group G3 is formed by a sixth lens L6 made of a positive resin lens. The fourth group G4 is formed by a seventh lens L7 made of a negative resin lens at a fixed distance from an image surface IMG.

Incidentally, an IR cutoff filter CF and a seal glass SG for protecting the image surface IMG are disposed between the fourth group G4 and the image surface IMG in the zoom lens 13.

The following Tables 31 to 35 show specification values of the third numerical example corresponding to the second embodiment. In the specification tables in the third numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 32 means a plane.

TABLE 31

|  | WIDE | MID | TELE |
|---|---|---|---|
| f | 6.50 | 11.94 | 18.37 |
| FNO | 3.40 | 4.64 | 6.14 |
| ω | 28.40 | 18.01 | 11.93 |

TABLE 32

|  | Radius of curvature | Surface interval | Index of refraction (d) | Abbe number (d) |
|---|---|---|---|---|
| 1 | −20.5006 | 0.800 | 1.59201 | 67.02 |
| 2 | 10.4445 | 0.700 | 1.82155 | 26.39 |
| 3 | 20.0311 | Variable |  |  |
| Aperture stop | ∞ |  |  |  |
| 5 (ASP) | 11.5623 | 1.100 | 1.80139 | 45.45 |
| 6 (ASP) | −165.1481 | 0.100 |  |  |
| 7 | 4.5191 | 1.424 | 1.88300 | 40.80 |
| 8 | −40.5661 | 0.500 | 1.78472 | 25.75 |
| 9 | 3.4062 | Variable |  |  |
| 10 (ASP) | 91.3776 | 1.800 | 1.52500 | 56.45 |
| 11 (ASP) | −6.7024 | Variable |  |  |
| 12 (ASP) | −10.9283 | 0.8000 | 1.52500 | 56.45 |
| 13 (ASP) | −25.0000 | 0.3000 |  |  |
| 14 | ∞ | 0.300 | 1.56883 | 56.04 |
| 15 | ∞ | 1.100 |  |  |
| IMG | ∞ | 0.000 |  |  |

Incidentally, a fifth surface, a sixth surface, a tenth surface, an eleventh surface, a twelfth surface, and a thirteenth surface have an aspheric shape, and the aspheric coefficients of the surfaces are as shown in Table 33. Incidentally, for example, "0.26029E−05" denotes "0.26029×10⁻⁵."

TABLE 33

| Surface number | κ | A | B | C | D |
|---|---|---|---|---|---|
| 5 | 0.00000E+00 | 1.13425E−03 | −1.08096E−04 | 1.10942E−04 | −1.70000E−05 |
| 6 | 0.00000E+00 | 1.83133E−03 | −1.74248E−04 | 1.43876E−04 | −2.10000E−05 |
| 10 | 0.00000E+00 | 3.02200E−04 | −2.20000E−05 | 1.00000E−06 | −8.17231E−08 |
| 11 | 0.00000E+00 | 2.63801E−03 | −1.36400E−04 | 5.00000E−06 | −8.17231E−08 |
| 12 | 0.00000E+00 | 5.71169E−03 | −4.82325E−04 | 1.70000E−05 | −2.29666E−07 |
| 13 | 0.00000E+00 | 3.90537E−03 | −3.49903E−04 | 8.00000E−06 | −1.59119E−08 |

Next, variable intervals when a lens position state changes in the zoom lens 13 according to the third numerical example are shown in the following Table 34. In the zoom lens 13, the first group G1, the second group G2, and the third group G3 are all movable, and the fourth group is at a fixed distance from the image surface IMG.

In the zoom lens 13, variable power is achieved mainly by changing an interval between the first group G1 and the second group G2, and focal position variation at each angle of view is absorbed by moving the third group G3, whereby high performance can be ensured while maintaining miniaturization.

TABLE 34

|  | WIDE | MID | TELE |
|---|---|---|---|
| D3 | 11.361 | 3.978 | 0.976 |
| D9 | 3.962 | 8.809 | 14.091 |
| D11 | 2.247 | 1.953 | 1.500 |

The following Table 35 shows conditional expression correspondence values in the zoom lens 13 according to the third numerical example.

TABLE 35

|  |  | Third example |
|---|---|---|
| Conditional expression (1) | N1d | 1.59201 |
| Conditional expression (2) | ν2d | 26.39 |
| Conditional expression (3) | f21/fw | 2.069 |
| Conditional expression (4) | f21/f2 | 1.410 |
| Conditional expression (5) | f1/f4 | 0.455 |

Figure 21A:
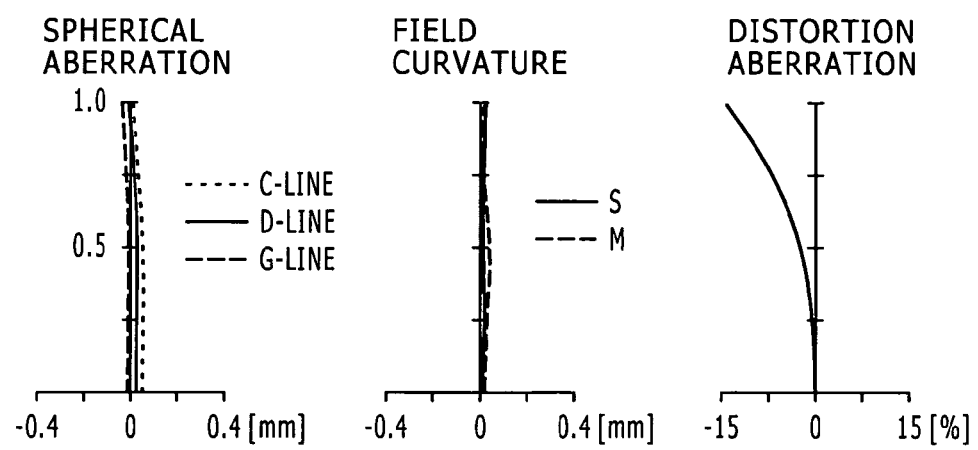
FIGS. 21A, 21B, and 21C are characteristic curve diagrams of various aberrations according to the third numerical example corresponding to the second embodiment.
Figure 21B:
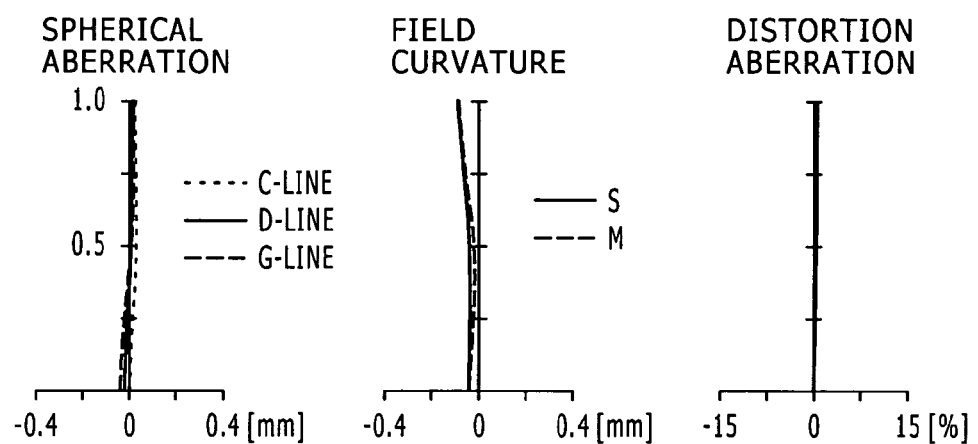
Figure 21C:
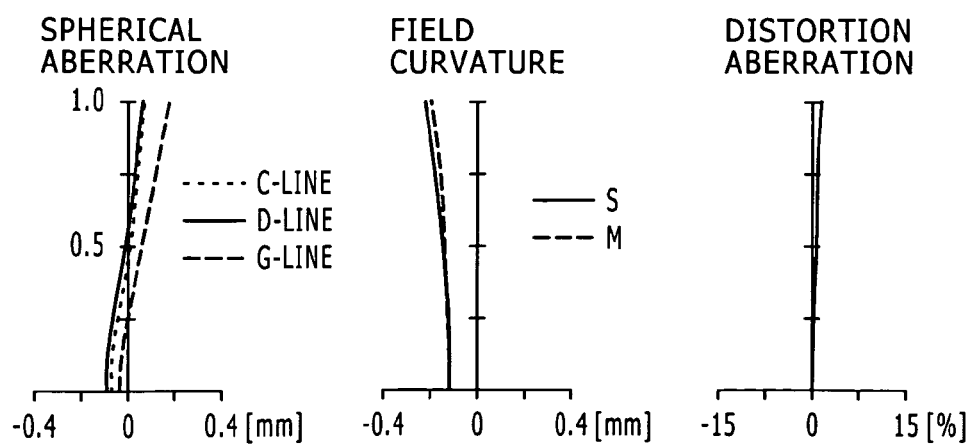

Next, FIGS. 21A, 21B, and 21C are diagrams of various aberrations in an infinity focused state of the third numerical example. FIG. 21A shows various aberrations in a wide-angle end state (ω=28.4 degrees). FIG. 21B shows various aberrations in an intermediate focal length state (ω=18.01 degrees). FIG. 21C shows various aberrations in a telephoto end state (ω=11.93 degrees).

In FIGS. 21A to 21C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 21A to 21C show that the zoom lens 13 according to the third numerical example excellently corrects various aberrations even though reduced in thickness, and has excellent image forming performance.

<5. Image Pickup Device and Digital Still Camera>
[5-1. Configuration of Image Pickup Device]

An image pickup device according to an embodiment of the present invention will next be described. This image pickup device has an image pickup element formed by a CCD (Charge Coupled Device) sensor or a CMOS (Complementary Metal Oxide Semiconductor) sensor, for example, for converting an optical image formed by the zoom lens 1 (or 2, 3, or 4) illustrated in the numerical example in the first embodiment or the zoom lens 11 (or 12 or 13) illustrated in the numerical example in the second embodiment into an electric signal.

This zoom lens 1 (or 2, 3, or 4) includes three groups that are a negative first group G1, a positive second group G2, and a positive third group in order from an object side, the first group G1 including a negative cemented lens L12 formed by joining together, from the object side, a first lens L1 formed by a negative single lens and a second lens L2 formed by a positive single lens, the second group G2 including, from the object side, a third lens L3 formed by a positive single lens and a cemented lens L45 formed by joining together a fourth lens L4 formed by a positive single lens and a fifth lens L5 formed by a negative single lens, and the third group including a sixth lens L6 formed by a positive single lens, and the zoom lens being formed so as to satisfy the following conditional expressions (1) to (3):

$$N1d > 1.55 \quad (1)$$

$$v2d < 30 \quad (2)$$

$$f21/fw > 1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

The three-group type zoom lens 1 (or 2, 3, or 4) has the following advantages because the first group G1 includes only the single cemented lens L12 composed of the first lens L1 having negative power and the second lens L2 having positive power.

First, in the three-group type zoom lens 1 (or 2, 3, or 4), because the first group G1 is of a single configuration of only the cemented lens L12 rather than a configuration of a plurality of lenses, performance degradation due to decentration between the lenses in the first group G1 does not occur. It is thus possible to eliminate a need for alignment between the lenses at a time of assembly, omit the manufacturing process of the alignment, and thereby shorten manufacturing time.

That is, because the first group G1 in the three-group type zoom lens 1 (or 2, 3, or 4) is of a single configuration of only the cemented lens L12 rather than a configuration of a plurality of lenses, the three-group type zoom lens makes it possible to achieve an improvement in performance, cost reduction, and reduction in thickness as compared with the case where the first group G1 is formed by a plurality of lenses.

Second, in the three-group type zoom lens 1 (or 2, 3, or 4), because the first group G1 is of a single configuration of only the cemented lens L12 rather than a configuration of a plurality of lenses, a lens interval error in the first group G1 is zero. Therefore an amount of shift in focal position is reduced as compared with the case where the first group G1 is formed by a plurality of lenses as in the existing case.

The three-group type zoom lens 1 (or 2, 3, or 4) thereby makes it possible to reduce an amount of clearance of mechanical hardware configuration for focal position adjustment by the first to third groups G1 to G3. Therefore the whole of the three-group type zoom lens 1 (or 2, 3, or 4) can be further miniaturized.

Third, in the three-group type zoom lens 1 (or 2, 3, or 4), because the first group G1 is of a single configuration of only the cemented lens L12 rather than a configuration of a plurality of lenses, the second lens L2 located on an image surface side in the case where the first group G1 is formed by a plurality of lenses as in the existing case is prevented from interfering with the second group G2. Therefore the position of the second group G2 can be brought correspondingly closer to the principal point position of the first group G1.

The three-group type zoom lens 1 (or 2, 3, or 4) can thereby weaken an effect of bringing the principal point position of the first group G1 closer to the image surface IMG by the second group G2. That is, the three-group type zoom lens 1 (or 2, 3, or 4) can achieve higher performance even when the power of the positive third lens L3 is made lower than in the existing case when the second group G2 includes the positive third lens L3 and the cemented lens L45 formed by joining together the positive fourth lens L4 and the negative fifth lens L5. It is thus possible to suppress lens decentration sensitivity in the second group G2, and lower a degree of difficulty in manufacturing while achieving a reduction in thickness and an improvement in performance.

The conditional expressions (1) to (3) in the three-group type zoom lens 1 (or 2, 3, or 4) are defined to lower the degree of difficulty in manufacturing while achieving a reduction in thickness and an improvement in performance.

The conditional expression (1) defines the index of refraction of the negative first lens L1 forming the cemented lens L12 in the first group G1 with respect to the d-line. When the index of refraction of the negative first lens L1 is less than the lower limit value of the conditional expression (1), and when miniaturization is to be achieved by strengthening the negative power of the first group G1, the curvature of the negative first lens L1 is reduced, and thickness in the direction of an optical axis is increased, which is disadvantageous for thickness reduction, and it becomes difficult to correct spherical aberration, field curvature, and distortion aberration.

In addition, when the index of refraction of the negative first lens L1 is less than the lower limit value of the conditional expression (1), because the curvature of the negative first lens L1 is reduced, it becomes difficult to join the positive second lens L2 when forming the cemented lens L12, and therefore the degree of difficulty in manufacturing is raised. That is, in the three-group type zoom lens 1 (or 2, 3, or 4), the conditional expression (1) lowers the degree of difficulty in manufacturing while achieving a reduction in thickness.

The conditional expression (2) defines the Abbe number of the positive second lens L2 forming the cemented lens L12 in the first group G1. The conditional expression (2) is to correct chromatic aberration of magnification in a wide-angle end state and longitudinal chromatic aberration in a telephoto end state while maintaining miniaturization.

When the Abbe number of the positive second lens L2 exceeds the upper limit value of the conditional expression (2), chromatic aberration of magnification in the wide-angle end state and longitudinal chromatic aberration in the telephoto end state when the negative power of the first lens L1 in the first group G1 is strengthened cannot be corrected, so that resolution performance in a peripheral part of the image pickup element in the wide-angle end state and a central part of the image pickup element in the telephoto end state is degraded.

Incidentally, when the three-group type zoom lens satisfies the following conditional expression (2)' in place of the conditional expression (2), a correcting effect (achromatizing effect) on chromatic aberration of magnification and longitudinal chromatic aberration can be further increased.

$$v2d<26.5 \quad (2)'$$

The conditional expression (3) defines a ratio between focal length in the wide-angle end state and the focal length of the positive third lens L3 located nearest to the object side in the second group G2, and thereby weakens the power of the positive third lens L3 in the second group G2.

When the ratio is less than the lower limit value of the conditional expression (3), the power of the positive third lens L3 located nearest to the object side in the second group G2 is too strong as compared with the focal length fw in the wide-angle end state, the decentration sensitivity of the positive third lens L3 and the cemented lens L45 composed of the positive fourth lens L4 and the negative fifth lens L5 in the second group G2 is increased, and thus precision for assembly of the second group G2 is heightened. This invites a degradation in performance or an increase in the degree of difficulty in manufacturing of the three-group type zoom lens 1 (or 2, 3, or 4).

Incidentally, when the three-group type zoom lens satisfies the following conditional expression (3)' in place of the conditional expression (3), decentration sensitivity within the second group G2 is further lowered, and thus the degree of difficulty in manufacturing can be further decreased.

$$f21/fw>1.5 \quad (3)'$$

Next, in the three-group type zoom lens 1 (or 2, 3, or 4), at least one surface nearest to the object side or nearest to the image surface side in the cemented lens L12 in the first group G1 and at least one surface of the positive third lens L3 located nearest to the object side in the second group G2 have an aspheric shape, and are formed so as to satisfy the following conditional expression (4):

$$f21/f2>1 \quad (4)$$

where f2 is the focal length of the second group.

In the three-group type zoom lens, by making at least one surface nearest to the object side or nearest to the image surface side in the cemented lens L12 in the first group G1 have an aspheric shape, coma aberration, astigmatism, and distortion aberration of the peripheral part in the wide-angle end state in particular can be suppressed.

In addition, in the three-group type zoom lens 1 (or 2, 3, or 4), by making at least one surface nearest to the object side or nearest to the image surface side in the cemented lens L12 in the first group G1 have an aspheric shape, various kinds of aberration occurring when the negative power of the first group G1 is strengthened can be corrected. Therefore degradation in optical performance can be suppressed.

At this time, in the three-group type zoom lens, because the negative power of the first group G1 is strengthened, a same variable power ratio can be obtained even when a traveling distance between the first group G1 and the second group G2 is shortened. It is therefore possible to correspondingly shorten a total optical length and thereby achieve further miniaturization.

Further, in the three-group type zoom lens 1 (or 2, 3, or 4), by making at least one surface of the positive third lens L3 located nearest to the object side in the second group G2 have an aspheric shape, spherical aberration, astigmatism, and variation in field curvature on the telephoto end side which variation is attendant on object distance variation can be suppressed. Thus, resolution performance can be further improved.

The conditional expression (4) defines a ratio between the focal length f2 of the second group G2 as a whole and the focal length f21 of the positive third lens L3 nearest to the object side in the second group G2. The conditional expression (4) is to weaken the power of the third lens L3 with respect to the power of the second group G2 as a whole.

When the ratio is less than the lower limit value of the conditional expression (4), the focal length f21 of the positive third lens L3 nearest to the object side in the second group G2 is shortened with respect to the focal length f2 of the second group G2. That is, the power of the third lens L3 is too strong with respect to the power of the second group G2 as a whole.

Incidentally, when the three-group type zoom lens satisfies the following conditional expression (4)' in place of the conditional expression (4), decentration sensitivity within the second group G2 is further lowered, and thus the degree of difficulty in manufacturing can be further decreased.

$$f21/f2>1.3 \quad (4)'$$

At this time, in the three-group type zoom lens 1 (or 2, 3, or 4), the decentration sensitivity of the positive third lens L3 nearest to the object side in the second group G2 and the cemented lens L45 composed of the positive fourth lens L4 and the negative fifth lens L5 in the second group G2 is increased, and precision for assembly of the second group G2 is heightened, thus inviting a degradation in performance or an increase in the degree of difficulty in manufacturing.

Next, in the three-group type zoom lens 1 (or 2, 3, or 4), at least one surface nearest to the object side or nearest to the image surface side in the cemented lens in the first group G1 has an aspheric shape, both surfaces of the positive third lens L3 nearest to the object side in the second group G2 have a spherical shape, and at least one surface nearest to the object side or nearest to the image surface side in the cemented lens L45 in the second group G2 has an aspheric shape.

By making at least one surface nearest to the object side or nearest to the image surface side in the cemented lens L12 in the first group G1 have an aspheric shape, both surfaces of the positive third lens L3 nearest to the object side in the second group G2 have a spherical shape, and at least one surface nearest to the object side or nearest to the image surface side in the cemented lens L45 in the second group G2 have an aspheric shape, the three-group type zoom lens 1 (or 2, 3, or 4) can lower the degree of difficulty in manufacturing while suppressing coma aberration, astigmatism, and distortion aberration of the peripheral part in the wide-angle end state and spherical aberration and coma aberration in the telephoto end state.

In addition, in the three-group type zoom lens 1 (or 2, 3, or 4) according to the first embodiment of the present invention, the curvature of a surface nearest to the object side in the cemented lens L12 in the first group G1 satisfies the following conditional expression (5):

$$-1>G1R1/fw>-3.3 \quad (5)$$

where G1R1 is the radius of curvature of the surface nearest to the object side in the cemented lens L12 in the first group G1.

The conditional expression (5) defines the radius of curvature of the surface nearest to the object side in the cemented lens L12 in the first group G1.

When G1R1/fw is less than the lower limit value of the conditional expression (5), the radius of curvature of a joint surface in the cemented lens L12 in the first group G1 needs to be reduced in order to strengthen the negative power of the first group G1. Accordingly, it is necessary to reduce also the radius of curvature of the joint surface of the positive second lens L2 forming the cemented lens L12, and the degree of difficulty in manufacturing the negative first lens L1 and the positive second lens L2 forming the cemented lens L12 is raised.

When G1R1/fw exceeds the upper limit value of the conditional expression (5), on the other hand, the radius of curvature of the surface on the object side in the cemented lens L12 in the first group G1 is too small, and it is difficult to correct distortion aberration and field curvature in particular.

Further, the three-group type zoom lens 1 (or 2, 3, or 4) is characterized in that the cemented lens L12 in the first group G1 is formed by a compound aspheric lens including the first lens L1 formed by a negative glass lens and the second lens L2 formed by a positive resin lens.

Thus, because the three-group type zoom lens 1 (or 2, 3, or 4) uses a resin lens rather than a glass lens for the second lens L2 forming the cemented lens L12 in the first group G1, the peripheral part of the second lens L2 formed by the resin lens can be made significantly thinner than a glass lens.

The zoom lens 11 (or 12 or 13) includes four groups that are a negative first group G1, a positive second group G2, a positive third group G3, and a negative fourth group G4 from an object side, the first group G1 including a negative cemented lens L12 formed by joining together, from the object side, a first lens L1 formed by a negative single lens and a second lens L2 formed by a positive single lens, the second group G2 including, from the object side, a third lens L3 formed by a positive single lens and a cemented lens L45 formed by joining together a fourth lens L4 formed by a positive single lens and a fifth lens L5 formed by a negative single lens, the third group G3 including a sixth lens L6 formed by a positive single lens, and the fourth group G4 including a seventh lens L7 at a fixed distance from an image pickup surface, and the zoom lens being formed so as to satisfy the following conditional expressions (1) to (3):

$$N1d > 1.55 \quad (1)$$

$$v2d < 30 \quad (2)$$

$$f21/fw > 1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

The four-group type zoom lens 11 (or 12 or 13) has the following advantages because the first group G1 includes only the single cemented lens L12 composed of the first lens L1 having negative power and the second lens L2 having positive power.

First, in the four-group type zoom lens 11 (or 12 or 13), because the first group G1 is of a single configuration of only the cemented lens L12 rather than a configuration of a plurality of lenses, performance degradation due to decentration between the lenses in the first group G1 does not occur. It is thus possible to eliminate a need for alignment between the lenses at a time of assembly, omit the manufacturing process of the alignment, and thereby shorten manufacturing time.

That is, because the first group G1 in the four-group type zoom lens 11 (or 12 or 13) is of a single configuration of only the cemented lens L12 rather than a configuration of a plurality of lenses, the four-group type zoom lens 11 (or 12 or 13) makes it possible to achieve an improvement in performance, cost reduction, and reduction in thickness as compared with the case where the first group G1 is formed by a plurality of lenses.

Second, in the four-group type zoom lens 11 (or 12 or 13), because the first group G1 is of a single configuration of only the cemented lens L12 rather than a configuration of a plurality of lenses, a lens interval error in the first group G1 is zero. Therefore an amount of shift in focal position is reduced as compared with the case where the first group G1 is formed by a plurality of lenses as in the existing case.

The four-group type zoom lens 11 (or 12 or 13) thereby makes it possible to reduce an amount of clearance of mechanical hardware configuration for focal position adjustment by the first to third groups G1 to G3. Therefore the whole of the four-group type zoom lens 11 (or 12 or 13) can be further miniaturized.

Third, in the four-group type zoom lens 11 (or 12 or 13), because the first group G1 is of a single configuration of only the cemented lens L12 rather than a configuration of a plurality of lenses, the second lens L2 located on an image surface side in the case where the first group G1 is formed by a plurality of lenses as in the existing case is prevented from interfering with the second group G2. Therefore the position of the second group G2 can be brought correspondingly closer to the principal point position of the first group G1.

The four-group type zoom lens 11 (or 12 or 13) can thereby weaken an effect of bringing the principal point position of the first group G1 closer to the image surface by the second group G2. That is, the four-group type zoom lens 11 (or 12 or 13) can achieve higher performance even when the power of the positive third lens L3 is made lower than in the existing case when the second group G2 includes the positive third lens L3 and the cemented lens L45 formed by joining together the positive fourth lens L4 and the negative fifth lens L5. It is thus possible to suppress lens decentration sensitivity in the second group G2, and lower a degree of difficulty in manufacturing while achieving a reduction in thickness and an improvement in performance.

The conditional expressions (1) to (3) in the four-group type zoom lens 11 (or 12 or 13) are defined to lower the degree of difficulty in manufacturing while achieving a reduction in thickness and an improvement in performance.

The conditional expression (1) defines the index of refraction of the negative first lens L1 forming the cemented lens L12 in the first group G1 with respect to the d-line. When the index of refraction of the negative first lens L1 is less than the lower limit value of the conditional expression (1), and when miniaturization is to be achieved by strengthening the negative power of the first group G1, the curvature of the negative first lens L1 is reduced, and thickness in the direction of an optical axis is increased, which is disadvantageous for thickness reduction, and it becomes difficult to correct spherical aberration, field curvature, and distortion aberration.

In addition, when the index of refraction of the negative first lens L1 is less than the lower limit value of the conditional expression (1), because the curvature of the negative first lens L1 is reduced, it becomes difficult to join the positive second lens L2 when forming the cemented lens L12, and therefore the degree of difficulty in manufacturing is raised. That is, in the four-group type zoom lens 11 (or 12 or 13), the conditional expression (1) lowers the degree of difficulty in manufacturing while achieving a reduction in thickness.

The conditional expression (2) defines the Abbe number of the positive second lens L2 forming the cemented lens L12 in the first group G1. The conditional expression (2) is to correct chromatic aberration of magnification in a wide-angle end state and longitudinal chromatic aberration in a telephoto end state while maintaining miniaturization.

When the Abbe number of the positive second lens L2 exceeds the upper limit value of the conditional expression (2), chromatic aberration of magnification in the wide-angle end state and longitudinal chromatic aberration in the telephoto end state when the negative power of the first lens L1 in the first group G1 is strengthened cannot be corrected, so that resolution performance in a peripheral part of the image pickup element in the wide-angle end state and a central part of the image pickup element in the telephoto end state is degraded.

Incidentally, when the four-group type zoom lens 11 (or 12 or 13) satisfies the following conditional expression (2)' in place of the conditional expression (2), a correcting effect (achromatizing effect) on chromatic aberration of magnification and longitudinal chromatic aberration can be further increased.

$$v2d<26.5 \quad (2)'$$

The conditional expression (3) defines a ratio between focal length fw in the wide-angle end state and the focal length f21 of the positive third lens L3 located nearest to the object side in the second group G2, and thereby weakens the power of the positive third lens L3 in the second group G2.

When the ratio is less than the lower limit value of the conditional expression (3), the power of the positive third lens L3 located nearest to the object side in the second group G2 is too strong as compared with the focal length fw in the wide-angle end state, the decentration sensitivity of the positive third lens L3 and the cemented lens L45 composed of the positive fourth lens L4 and the negative fifth lens L5 in the second group G2 is increased, and thus precision for assembly of the second group G2 is heightened. This invites degradation in performance or an increase in the degree of difficulty in manufacturing of the four-group type zoom lens 11 (or 12 or 13).

Incidentally, when the four-group type zoom lens 11 (or 12 or 13) satisfies the following conditional expression (3)' in place of the conditional expression (3), decentration sensitivity within the second group G2 is further lowered, and thus the degree of difficulty in manufacturing can be further decreased.

$$f21/fw>1.5 \quad (3)'$$

Next, in the four-group type zoom lens 11 (or 12 or 13), at least one surface nearest to the object side or nearest to the image surface side in the cemented lens L12 in the first group G1 and at least one surface of the positive third lens L3 located nearest to the object side in the second group G2 have an aspheric shape, and are formed so as to satisfy the following conditional expression (4):

$$f21/f2>1 \quad (4)$$

where f2 is the focal length of the second group G2.

In the four-group type zoom lens 11 (or 12 or 13), by making at least one surface nearest to the object side or nearest to the image surface side in the cemented lens L12 in the first group G1 have an aspheric shape, coma aberration, astigmatism, and distortion aberration of the peripheral part in the wide-angle end state in particular can be suppressed.

In addition, in the four-group type zoom lens 11 (or 12 or 13), by making at least one surface nearest to the object side or nearest to the image surface side in the cemented lens L12 in the first group G1 have an aspheric shape, various kinds of aberration occurring when the negative power of the first group G1 is strengthened can be corrected. Therefore degradation in optical performance can be suppressed.

At this time, in the four-group type zoom lens 11 (or 12 or 13), because the negative power of the first group G1 is strengthened, a same variable power ratio can be obtained even when a traveling distance between the first group G1 and the second group G2 is shortened. It is therefore possible to correspondingly shorten a total optical length and thereby achieve further miniaturization.

Further, in the four-group type zoom lens 11 (or 12 or 13), by making at least one surface of the positive third lens L3 located nearest to the object side in the second group G2 have an aspheric shape, spherical aberration, astigmatism, and variation in field curvature on the telephoto end side which variation is attendant on object distance variation can be suppressed. Thus, resolution performance can be further improved.

The conditional expression (4) defines a ratio between the focal length f2 of the second group G2 as a whole and the focal length f21 of the positive third lens L3 nearest to the object side in the second group G2. The conditional expression (4) is to weaken the power of the third lens L3 with respect to the power of the second group G2 as a whole.

When the ratio is less than the lower limit value of the conditional expression (4), the focal length f21 of the positive third lens L3 nearest to the object side in the second group G2 is shortened with respect to the focal length f2 of the second group G2. That is, the power of the third lens L3 is too strong with respect to the power of the second group G2 as a whole.

At this time, in the four-group type zoom lens 11 (or 12 or 13), the decentration sensitivity of the positive third lens L3 nearest to the object side in the second group G2 and the cemented lens L45 composed of the positive fourth lens L4 and the negative fifth lens L5 in the second group G2 is increased, and precision for assembly of the second group G2 is heightened, thus inviting a degradation in performance or an increase in the degree of difficulty in manufacturing.

Incidentally, when the four-group type zoom lens 11 (or 12 or 13) satisfies the following conditional expression (4)' in place of the conditional expression (4), decentration sensitivity within the second group G2 is further lowered, and thus the degree of difficulty in manufacturing can be further decreased.

$$f21/f2>1.3 \quad (4)'$$

Incidentally, in the four-group type zoom lens 11 (or 12 or 13), by making the fourth group G4 have negative power, optical performance can be improved even for a close-range object in the telephoto end state.

Next, in the four-group type zoom lens 11 (or 12 or 13) according to the second embodiment of the present invention, at least one surface nearest to the object side or nearest to the image surface side in the cemented lens L12 in the first group G1 has an aspheric shape, both surfaces of the positive third lens L3 nearest to the object side in the second group G2 have a spherical shape, and at least one surface nearest to the object side or nearest to the image surface side in the cemented lens L45 in the second group G2 has an aspheric shape.

By making at least one surface nearest to the object side or nearest to the image surface side in the cemented lens L12 in the first group G1 have an aspheric shape, both surfaces of the positive third lens L3 nearest to the object side in the second group G2 have a spherical shape, and at least one surface nearest to the object side or nearest to the image surface side in the cemented lens L45 in the second group G2 have an aspheric shape, the four-group type zoom lens 11 (or 12 or 13) can lower the degree of difficulty in manufacturing while suppressing coma aberration, astigmatism, and distortion aberration of the peripheral part in the wide-angle end state and spherical aberration and coma aberration in the telephoto end state.

In addition, in the four-group type zoom lens 11 (or 12 or 13) according to the second embodiment of the present invention, the curvature of a surface nearest to the object side in the cemented lens L12 in the first group G1 satisfies the following conditional expression (5):

$$-1 > G1R1/fw > -3.3 \quad (5)$$

where G1R1 is the radius of curvature of the surface nearest to the object side in the cemented lens L12 in the first group The conditional expression (5) defines the radius of curvature of the surface nearest to the object side in the cemented lens L12 in the first group When G1R1/fw is less than the lower limit value of the conditional expression (5), the radius of curvature of a joint surface in the cemented lens L12 in the first group G1 needs to be reduced in order to strengthen the negative power of the first group G1. Accordingly, it is necessary to reduce also the radius of curvature of the joint surface of the positive second lens L2 forming the cemented lens L12, and the degree of difficulty in manufacturing the negative first lens L1 and the positive second lens L2 forming the cemented lens L12 is raised.

When G1R1/fw exceeds the upper limit value of the conditional expression (5), on the other hand, the radius of curvature of the surface on the object side in the cemented lens L12 in the first group G1 is too small, and it is difficult to correct distortion aberration and field curvature in particular.

Further, in the four-group type zoom lens 11 (or 12 or 13), the seventh lens L7 in the fourth group G4 has negative power, and satisfies the following conditional expression (6):

$$f1/f4 < 0.9 \quad (6)$$

where f1 is focal length of the first group G1, and f4 is focal length of the fourth group G4.

The conditional expression (6) defines the power of the fourth group G4 with respect to the power of the first group G1. In view of the disposition of the seventh lens L7 in the fourth group G4 at a position closest to an image pickup element as a heat source, when the seventh lens L7 in the fourth group G4 is formed by a resin lens, the radius of curvature of the seventh lens L7 in the fourth group G4 is made gentle to prevent performance degradation due to thermal deformation.

When f1/f4 is less than the lower limit value of the conditional expression (6), the negative power of the fourth group G4 is too strong. Thus, there arises a need to strengthen the positive power of the second group G2 and the third group G3, and the central thickness of the positive sixth lens L6 in the third group G3, in particular, needs to be further increased to secure an edge thickness in the positive sixth lens L6 in the third group G3, which is disadvantageous for reduction in thickness at a time of collapsing.

Incidentally, when the four-group type zoom lens 11 (or 12 or 13) satisfies the following conditional expression (6)' in place of the conditional expression (6), performance degradation at times of changes in temperature and humidity is suppressed, and a further advantage is provided for thickness reduction.

$$f1/f4 < 0.6 \quad (6)'$$

Further, in the four-group type zoom lens 11 (or 12 or 13), the third group G3 and the fourth group G4 are formed by a resin lens. Thereby a low-cost image pickup device can be provided as compared with a case where the third group G3 and the fourth group G4 are formed by a glass lens.

In this case, in the four-group type zoom lens 11 (or 12 or 13), the third group G3 and the fourth group G4 are formed by resin lenses having positive power and negative power, respectively. Thereby focal position variation at times of changes in temperature and humidity can be cancelled out by the third group G3 and the fourth group G4. A high-performance image pickup device can therefore be provided at low cost.

Further, the four-group type zoom lens 11 (or 12 or 13) is characterized in that the cemented lens L12 in the first group G1 is formed by a compound aspheric lens including the first lens L1 formed by a negative glass lens and the second lens L2 formed by a positive resin lens.

Thus, because the four-group type zoom lens 11 (or 12 or 13) uses a resin lens rather than a glass lens for the second lens L2 forming the cemented lens L12 in the first group G1, the peripheral part of the second lens L2 formed by the resin lens can be made significantly thinner than a glass lens.

Incidentally, in the four-group type zoom lens 11 (or 12 or 13), the fourth group G4 increases an effect of correcting field curvature, and a mechanical structure can be simplified because the fourth group G4 is fixed. Further, in the four-group type zoom lens 11 (or 12 or 13), because of the addition of the fourth group G4, the power of the first to third groups G1 to G3 can be strengthened, and optical length can be correspondingly shortened as compared with the three-group type.

[5-2. Configuration of Digital Still Camera]

Figure 22:
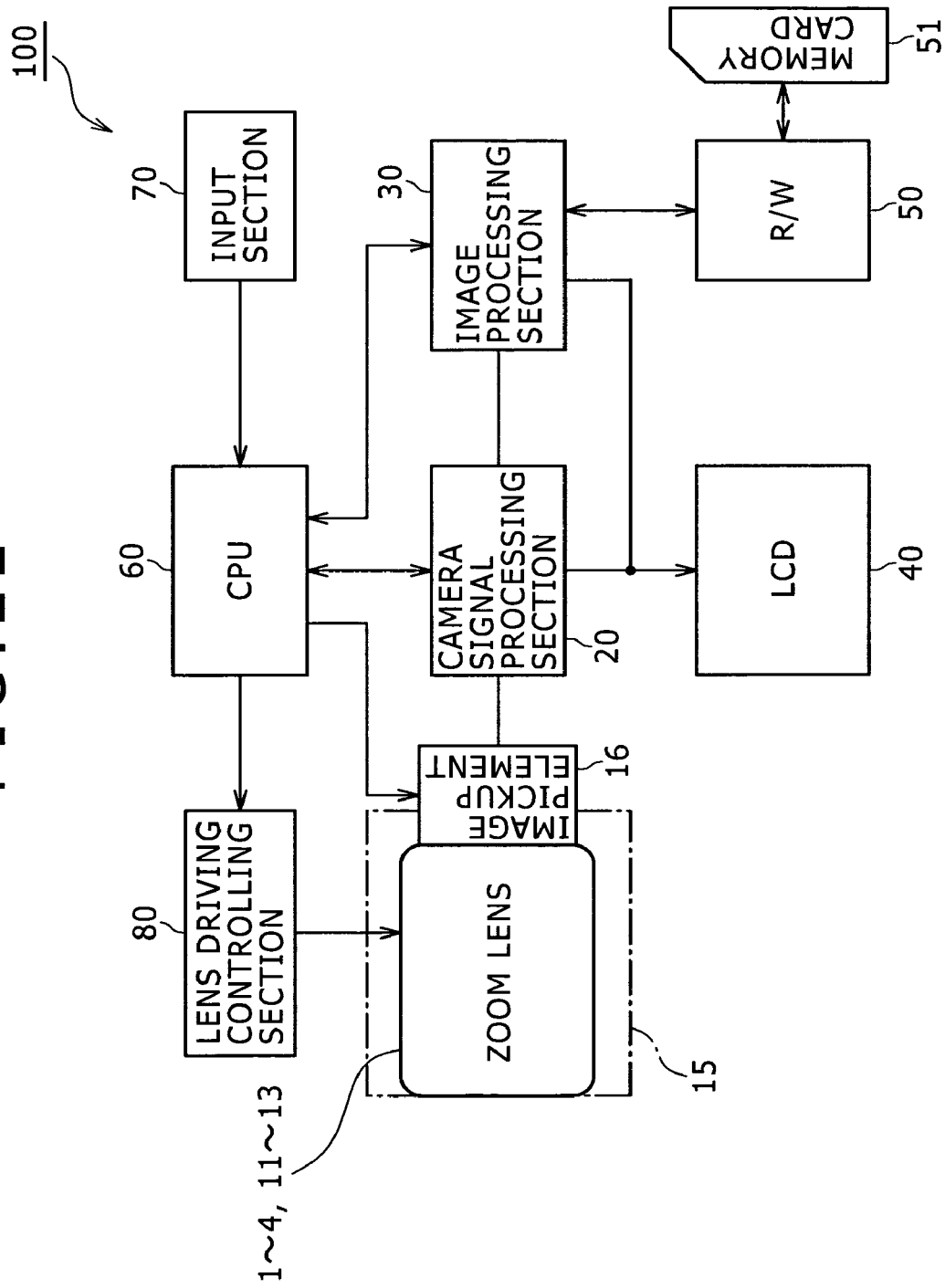
FIG. 22 is a schematic block diagram showing a configuration of a digital still camera including an image pickup device according to an embodiment of the present invention.

As shown in FIG. 22, a digital still camera 100 including an image pickup device as described above has a camera block 15 for performing an image pickup function as the image pickup device and a camera signal processing section 20 for subjecting an image signal obtained by image pickup by the camera block 15 to signal processing such as analog-to-digital conversion processing and the like.

The digital still camera 100 also has an image processing section 30 for performing image signal recording and reproducing processing and the like, an LCD (Liquid Crystal Display) 40 for displaying a taken image and the like, and a reader-writer 50 for performing writing/reading of a memory card 51.

In addition, the digital still camera 100 has a CPU (Central Processing Unit) 60 for controlling the whole of the camera, an input section 70 for operating input by a user, and a lens driving controlling section 80 for controlling the driving of a lens within the camera block 15.

The camera block 15 has a configuration combining an optical system including the zoom lens 1 (or 2, 3, or 4) or the zoom lens 11 (or 12 or 13) and an image pickup element 16 formed by for example a CCD (Charge Coupled Device) sensor or a CMOS (Complementary Metal Oxide Semiconductor) sensor.

The camera signal processing section 20 performs signal processing including the processing of conversion of an output signal from the image pickup element 16 into a digital signal, noise removal, image quality correction, the processing of conversion into a luminance signal and a color-difference signal, and the like.

The image processing section 30 performs the processing of compression coding and decompression decoding of an image signal on the basis of a predetermined image data format, the processing of conversion of data specifications including resolution, and the like.

The memory card 51 is composed of a detachable semiconductor memory. The reader-writer 50 writes image data coded by the image processing section 30 to the memory card 51, and reads image data recorded in the memory card 51.

The CPU 60 performs centralized control of each circuit block within the digital still camera 100. The CPU 60 controls each circuit block on the basis of an instruction input signal from the input section 70 and the like.

The input section 70 includes for example a shutter release button for performing shutter operation and a selecting switch for selecting an operation mode. The input section 70 outputs an instruction input signal corresponding to an operation by a user to the CPU 60.

The lens driving controlling section 80 controls a motor and the like not shown in FIG. 22 for driving lens groups within the zoom lens 1 (or 2, 3, or 4) or the zoom lens 11 (or 12 or 13) on the basis of a control signal from the CPU 60.

Operation of the digital still camera 100 will next be described in brief. In a standby state for picture taking, under control of the CPU 60, the digital still camera 100 outputs an image signal of an image picked up by the camera block 15 to the LCD 40 via the camera signal processing section 20, and displays the image signal as a camera-through image on the LCD 40.

When an instruction input signal for zooming is input from the input section 70, the CPU 60 outputs a control signal to the lens driving controlling section 80, and the digital still camera 100 moves a predetermined lens group within the zoom lens 1 (or 2, 3, or 4) or the zoom lens 11 (or 12 or 13) on the basis of control of the lens driving controlling section 80.

Then, when a shutter not shown in FIG. 22 within the camera block 15 is released by an instruction input signal from the input section 70, the digital still camera 100 outputs a picked-up image signal from the camera signal processing section 20 to the image processing section 30.

The image processing section 30 subjects the image signal supplied from the camera signal processing section 20 to predetermined compression coding, thereafter converts the image signal into digital data in a predetermined data format, and writes the digital data to the memory card 51 via the reader-writer 50.

Incidentally, focusing is for example performed by driving control of the zoom lens 1 (or 2, 3, or 4) or the zoom lens 11 (or 12 or 13) by the lens driving controlling section 80 on the basis of a control signal from the CPU 60 when the shutter release button is pressed halfway down or pressed all the way down for recording.

When image data recorded in the memory card 51 is reproduced, the CPU 60 reads the image data from the memory card 51 via the reader-writer 50 according to an operation of the input section 70, and the image data is subjected to decompression decoding processing by the image processing section 30 and then output to the LCD 40.

The LCD 40 displays a reproduced image on the basis of the image data resulting from the decompression decoding processing by the image processing section 30.

Incidentally, while in the present embodiment, description has been made of a case where the image pickup device according to the present invention is applied to a digital still camera, the image pickup device according to the present invention is also applicable to other image pickup devices such as digital video cameras, for example.

<6. Other Embodiments>

In addition, the concrete shapes, structures, and numerical values of respective parts shown in the first and second embodiments and the first to seventh numerical examples described above are each a mere example of embodiment in carrying out the present invention, and the technical scope of the present invention is not to be construed in a restricted manner by these shapes, structures, and numerical values.

Incidentally, in the foregoing second embodiment, description has been made of a case where a fourth group G4 having negative power is used. However, the present invention is not limited to this. A fourth group G4 having positive power may be used.

In addition, in the foregoing second embodiment, description has been made of a case where an IR cutoff filter CF and a seal glass SG for protecting an image surface IMG are disposed between the fourth group G4 and the image surface IMG. However, the present invention is not limited to this. Only the IR cutoff filter CF may be disposed between the fourth group G4 and the image surface IMG by making the fourth group G4 also play the role of the seal glass.

Further, in the foregoing first and second embodiments, a case where an image pickup device is incorporated into for example the digital still camera 100 has been illustrated as an example. However, objects into which to incorporate the image pickup device are not limited to this. The image pickup device is widely applicable to various other electronic devices such as digital video cameras, portable telephones, personal computers having a camera incorporated therein, PDAs having a camera incorporated therein, and the like.

<7. Third Embodiment>

A three-group type zoom lens according to a third embodiment of the present invention includes three groups that are a negative first group, a positive second group, and a positive third group in order from an object side, the first group including a negative cemented lens formed by joining together, from the object side, a first lens formed by a negative single lens and a second lens formed by a positive single lens, the second group including, from the object side, a cemented lens formed by joining together a third lens formed by a positive single lens and a fourth lens formed by a positive single lens, and the third group including a fifth lens formed by a positive single lens, and the zoom lens being formed so as to satisfy the following conditional expressions (1) to (3):

$$N1d > 1.55 \quad (1)$$

$$\nu 2d < 30 \quad (2)$$

$$|G1R1/G2R2| < 3 \quad (3)$$

where N1d is an index of refraction of the negative first lens forming the cemented lens in the first group with respect to a d-line, ν2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

The three-group type zoom lens has the following advantages because the first group includes only the single cemented lens composed of the first lens having negative power and the second lens having positive power.

First, in the three-group type zoom lens, because the first group is of a single configuration of only the cemented lens rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the three-group type zoom lens is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the three-group type zoom lens, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The three-group type zoom lens thereby makes it possible to reduce an amount of clearance of mechanical hardware configuration for focal position adjustment by the first to third groups. Therefore the whole of the three-group type zoom lens can be further miniaturized.

Third, in the three-group type zoom lens, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

Third, in the three-group type zoom lens, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The three-group type zoom lens can thereby weaken an effect of bringing the principal point position of the first group closer to the image surface by the second group. That is, in the three-group type zoom lens, the second group can be formed only by the cemented lens of the positive third lens and the negative fourth lens. It is thus possible to suppress lens decentration sensitivity in the second group, and lower a degree of difficulty in manufacturing while achieving a reduction in thickness and an improvement in performance.

Fourth, in the three-group type zoom lens, because not only the first group but also the second group can be formed by a cemented lens alone, performance degradation due to decentratioh between the lenses in the second group can be prevented.

At this time, in the three-group type zoom lens, assembly variation in the direction of an optical axis between the lenses in the second group is also eliminated, and thus an amount of focal position shift is reduced. The three-group type zoom lens thereby makes it possible to reduce an amount of clearance of mechanical hardware configuration for focal position adjustment by the first to third groups. Therefore the whole of the three-group type zoom lens can be further miniaturized.

Here, the conditional expressions (1) to (3) in the three-group type zoom lens are defined to lower the degree of difficulty in manufacturing while achieving a reduction in thickness, miniaturization and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when the index of refraction of the negative first lens is less than the lower limit value of the conditional expression (1), because the curvature of the negative first lens is reduced, it becomes difficult to join the positive second lens when forming the cemented lens, and therefore the degree of difficulty in manufacturing is raised. That is, in the three-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded. Incidentally, the effects are further enhanced when the upper limit value of the conditional expression (2) is set at 27.

The conditional expression (3) defines so as to prevent the radius of curvature of the second surface of the positive second lens forming the cemented lens of the first group from becoming too small as compared with the radius of curvature of the first surface of the negative first lens.

When $|G1R1/G2R2|$ exceeds the upper limit value of the conditional expression (3), the radius of curvature of the second surface of the second lens in the first group becomes too small as compared with the first surface of the first lens in the first group. Thus, a degree of difficulty in manufacturing of the second lens as a single part and the cemented lens is increased, and manufacturing cost is raised. In addition, the negative power of the first lens cannot be strengthened sufficiently, which is disadvantageous for miniaturization. Incidentally, the effects are further enhanced when the upper limit value of the conditional expression (3) is set at 1.7.

Next, the three-group type zoom lens according to the third embodiment of the present invention is formed such that the curvature of the surface nearest to the object side and the curvature of the surface nearest to the image surface side in the cemented lens of the first group satisfy the following conditional expressions (4) and (5):

$$G1R1/fw < -2.2 \tag{4}$$

$$G2R2/fw > 3 \tag{5}$$

where fw is focal length in the wide-angle end state.

The conditional expression (4) defines the radius of curvature of the surface nearest to the object side of the first lens in the cemented lens of the first group. The conditional expression (5) defines the radius of curvature of the surface nearest to the image surface side of the second lens in the cemented lens of the first group.

When G1R1/fw exceeds the upper limit value of the conditional expression (4), the radius of curvature of the surface nearest to the object side of the first lens in the cemented lens of the first group becomes too small, and the projection of a lens edge part of the first lens in the direction of the optical axis with respect to a surface vertex nearest to the object side of the first lens becomes larger, which is disadvantageous for thickness reduction.

When G2R2/fw is less than the lower limit value of the conditional expression (5), the radius of curvature of the surface nearest to the image surface side of the second lens in the cemented lens of the first group with respect to the focal length in the wide-angle end state becomes too small. Thus, a degree of difficulty in manufacturing of the second lens as a single part and the cemented lens is increased, and manufacturing cost is raised.

In addition, when the radius of curvature of the surface on the image surface side of the second lens in the cemented lens of the first group becomes too small, the projection of a lens edge part of the second lens in the direction of the optical axis with respect to a surface vertex on the image surface side of the second lens becomes larger and interferes. It is thus difficult to make an interval between the first group and the second group sufficiently short.

As a result, in the three-group type zoom lens, the principal point position of the first group cannot be brought closer to the image surface by the second group. It is thus difficult to correct spherical aberration and field curvature, in particular.

Next, in the three-group type zoom lens according to the third embodiment of the present invention, at least one surface nearest to the object side or nearest to the image surface side in the first group is a spherical shape, and the zoom lens is formed so as to satisfy the following conditional expression (6):

$$|G1R1/G2R2|<1.4 \quad (6)$$

As with the above-described conditional expression (3), the conditional expression (6) defines so as to prevent the radius of curvature of the second surface of the positive second lens from being too small as compared with the radius of curvature of the first surface of the negative first lens forming the cemented lens of the first group.

When |G1R1/G2R2| exceeds the upper limit value of the conditional expression (6), and sufficient negative power is to be provided by the first group, the radius of curvature of the first surface of the negative first lens or the second surface of the positive second lens forming the cemented lens of the first group becomes too small.

At this time, in the three-group type zoom lens, it is difficult to correct distortion aberration, field curvature, coma aberration and the like in the wide-angle end state by only an aspheric shape formed as at least one surface nearest to the object side or nearest to the image surface side in the first group, and degradation in optical performance of a peripheral part in the wide-angle end state, in particular, becomes noticeable.

Incidentally, in the three-group type zoom lens, when one of the negative first lens and the positive second lens forming the cemented lens of the first group is made into a spherical lens for cost reduction, the positive second lens preferably has a spherical shape from a viewpoint of aberration correction.

This is because the passing position of rim rays in the wide-angle end state is closer to the optical axis in the positive second lens situated on the image surface side than in the negative first lens situated on the object side, and because the positive second lens has weaker power and thus has a larger radius of curvature than the negative first lens.

As in Patent Document 1, when the first lens has a low index of refraction, and the negative power of the first group is to be strengthened, it is difficult to correct distortion aberration, field curvature, spherical aberration, coma aberration and the like in the wide-angle end state unless the first surface of the negative first lens forming the cemented lens of the first group and the second surface of the positive second lens are both in an aspheric shape.

Thus, in the three-group type zoom lens, by making one of the first lens and the second lens forming the cemented lens of the first group have a spherical shape, it is possible not only to achieve the cost reduction, but also to reduce the cost of the cemented lens because required cementing accuracy is lowered.

Further, the three-group type zoom lens according to the third embodiment of the present invention is characterized in that the cemented lens of the first group is formed by a compound aspheric lens including the first lens made of a negative glass lens and the second lens made of a positive resin lens.

The three-group type zoom lens thus has the cemented lens of the first group formed by molding using resin. Therefore the thickness of a peripheral part of the second lens formed by the resin can be greatly reduced as compared with a case where glass lenses are joined to each other.

Further, the three-group type zoom lens according to the third embodiment of the present invention is formed such that a distance from the aperture stop of the second group to the lens surface vertex of the fourth lens disposed nearest to the image surface side in the second group satisfies the following conditional expression (7):

$$L/(fw*ft)^{1/2}<0.25 \quad (7)$$

where ft is focal length in the telephoto end state, and L is the distance from the aperture stop disposed in the second group to the lens surface vertex of the fourth lens disposed nearest to the image surface side in the second group.

This conditional expression (7) defines the distance from the aperture stop to the lens surface vertex of the fourth lens disposed nearest to the image surface side in the second group, and defines so as to prevent this distance from becoming too long.

When $L/(fw*ft)^{1/2}$ exceeds the upper limit value of the conditional expression (7), an angle of incidence of rim rays in the wide-angle end state in particular on the fourth lens disposed nearest to the image surface side in the second group is increased, and the occurrence of coma aberration degrades resolution performance.

<8. Numerical Examples Corresponding to Third Embodiment>

Numerical examples in which concrete numerical values are applied to the three-group type zoom lens according to the first embodiment of the present invention will next be described with reference to drawings and tables. In each numerical example, an aspheric surface is expressed by the following Equation 1:

$$x=cy^2/(1+(1-(1+k)c^2y^2)^{1/2})+Ay^4+By^6+ \quad (1)$$

where y is height from an optical axis, x is an amount of sag, c is curvature, k is a conic constant, and A, B, . . . are aspheric coefficients.

[8-1. First Numerical Example]

In FIG. 23, reference numeral 1 denotes a zoom lens as a whole in a first numerical example corresponding to the third embodiment, which zoom lens is formed by a three-group configuration of a negative first group G1, a positive second group G2, and a positive third group G3 in order from an object side.

Figure 24A:
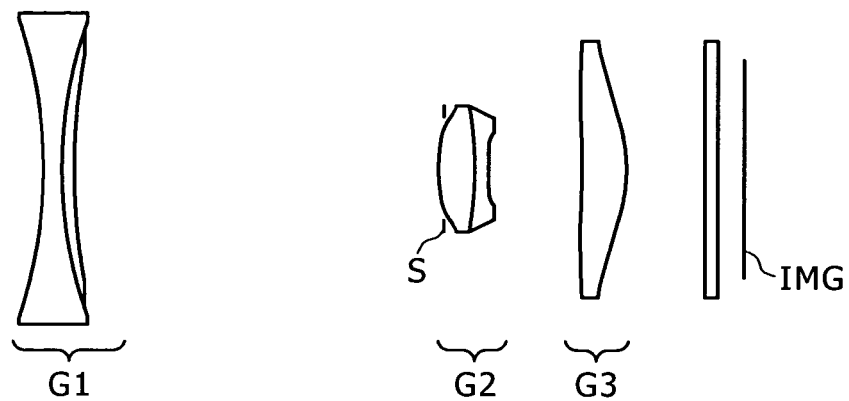
FIGS. 24A, 24B, and 24C are schematic sectional views of lens group arrangements in the first numerical example.
Figure 24B:
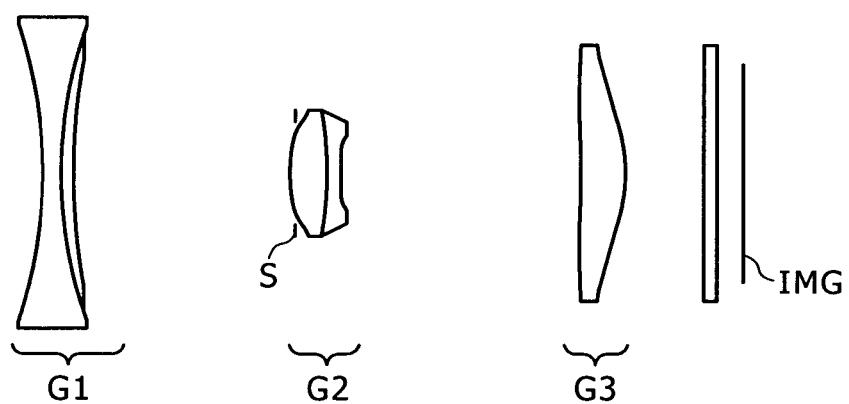
Figure 24C:
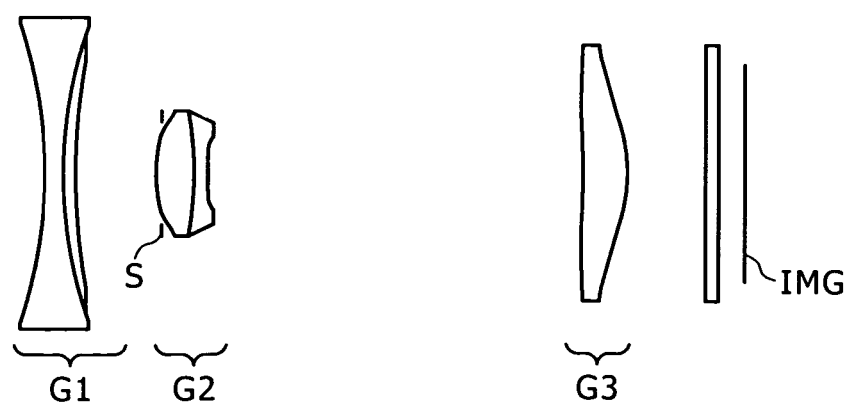

FIGS. 24A, 24B, and 24C show lens group arrangements when the zoom lens 1 in the first numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive aspheric glass lens. The first group G1 as a whole has negative power.

The second group G2 includes a cemented lens L34 formed by joining together a third lens L3 formed of an aspheric positive lens and a fourth lens L4 formed of a negative aspheric lens. An aperture stop S is disposed on the object side of the second group G2. This aperture stop S may be disposed on the image surface side of the second group G2.

The third group G3 is formed by a fifth lens L5 made of a positive single lens. Incidentally, an IR cutoff filter CF and a seal glass SG for protecting an image surface IMG are disposed between the third group G3 and the image surface IMG in the zoom lens 1.

The following Tables 36 to 40 show specification values of the first numerical example corresponding to the third embodiment. In the specification tables in the first numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 37 means a plane.

TABLE 36

|  | WIDE | MID | TELE |
| --- | --- | --- | --- |
| f | 6.07 | 11.16 | 17.16 |
| FNO | 3.26 | 4.47 | 5.81 |
| ω | 30.06 | 19.15 | 12.74 |

TABLE 37

|  | Radius of curvature | Surface interval | Index of refraction (d) | Abbe number (d) |
| --- | --- | --- | --- | --- |
| 1 (ASP) | −15.6223 | 0.800 | 1.61881 | 63.85 |
| 2 | 15.2335 | 0.750 | 1.75211 | 25.05 |
| 3 (ASP) | 35.1545 | Variable |  |  |

TABLE 37-continued

|  | Radius of curvature | Surface interval | Index of refraction (d) | Abbe number (d) |
| --- | --- | --- | --- | --- |
| Aperture stop | ∞ |  |  |  |
| 5 (ASP) | 4.0884 | 1.700 | 1.85135 | 40.10 |
| 6 | −4.0499 | 0.538 | 1.71736 | 29.50 |
| 7 (ASP) | 3.9194 | Variable |  |  |
| 8 (ASP) | −24.9313 | 1.450 | 1.52500 | 56.45 |
| 9 (ASP) | −6.7709 | Variable |  |  |
| 10 | ∞ | 0.300 | 1.56883 | 56.04 |
| 11 | ∞ | 1.100 |  |  |
| IMG | ∞ | 0.000 |  |  |

Incidentally, a first surface, a third surface, a fifth surface, a seventh surface, an eight surface, and a ninth surface have an aspheric shape, and the aspheric coefficients of the surfaces are as shown in Table 3. Incidentally, for example, "0.26029E−05" denotes "0.26029×10$^{-5}$."

TABLE 38

| Surface number | κ | A | B | C | D |
| --- | --- | --- | --- | --- | --- |
| 1 | 0.00000E+00 | 1.60266E−04 | −3.62656E−06 | 9.93293E−08 | −1.10201E−09 |
| 3 | 0.00000E+00 | −1.29474E−05 | 1.57942E−07 | 8.38887E−10 | −8.81855E−13 |
| 7 | 0.00000E+00 | −2.64544E−04 | −3.17733E−06 | −3.28956E−05 | 2.01049E−06 |
| 9 | 0.00000E+00 | 4.75567E−03 | 4.72268E−04 | −9.03983E−05 | 1.40138E−05 |
| 10 | 0.00000E+00 | 7.21181E−04 | −4.94524E−05 | 5.09479E−06 | −7.79166E−08 |
| 11 | 0.00000E+00 | 1.83985E−03 | −8.74017E−05 | 5.91179E−06 | −5.93472E−08 |

Next, variable intervals when a lens position state changes in the zoom lens 1 according to the first numerical example are shown in the following Table 39. In the zoom lens 1, the first group G1, the second group G2, and the third group G3 are all movable, variable power is achieved mainly by changing an interval between the first group G1 and the second group G2, and focal position variation at each angle of view is absorbed by moving the third group G3, whereby high performance can be ensured while maintaining miniaturization.

TABLE 39

|  | WIDE | MID | TELE |
| --- | --- | --- | --- |
| D3 | 14.512 | 5.601 | 1.694 |
| D7 | 3.518 | 8.629 | 13.467 |
| D9 | 4.012 | 2.921 | 1.800 |

The following Table 40 shows conditional expression correspondence values in the zoom lens 1 according to the first numerical example.

TABLE 40

|  |  | First example |
| --- | --- | --- |
| Conditional expression (1) | nd(G1) | 1.6188 |
| Conditional expression (2) | vd(G2) | 25.0500 |
| Conditional expression (3) | |G1R1/G2R2| | 0.4415 |
| Conditional expression (4) | G1R1/fw | −2.5683 |
| Conditional expression (5) | G2R2/fw | 5.8176 |

TABLE 40-continued

|  |  | First example |
|---|---|---|
| Conditional expression (6) | \|G1R1/G2R2\| | 0.4415 |
| Conditional expression (7) | $L/(fw * ft)^{1/2}$ | 0.2192 |

Figure 25A:
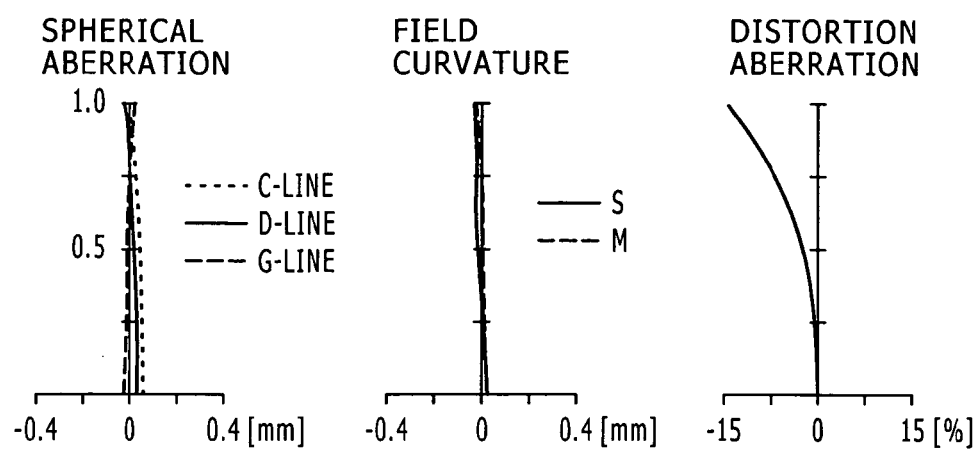
FIGS. 25A, 25B, and 25C are characteristic curve diagrams showing various aberrations in the first numerical example.
Figure 25B:
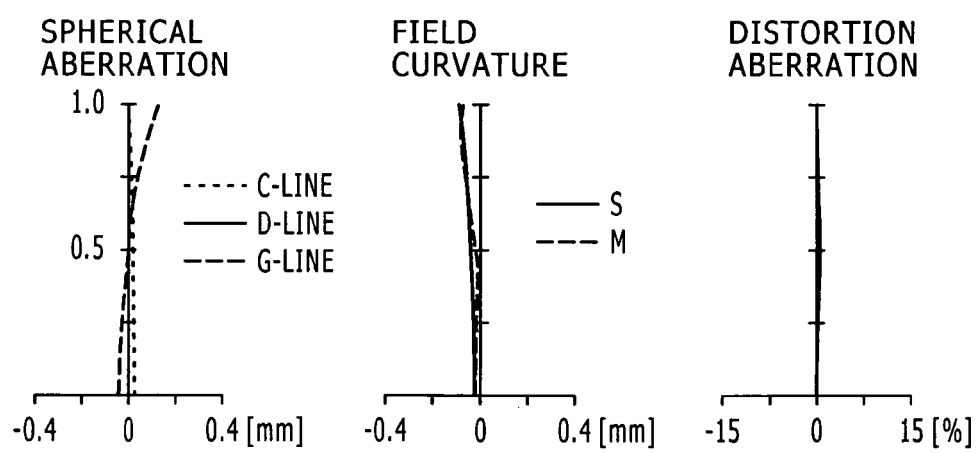
Figure 25C:
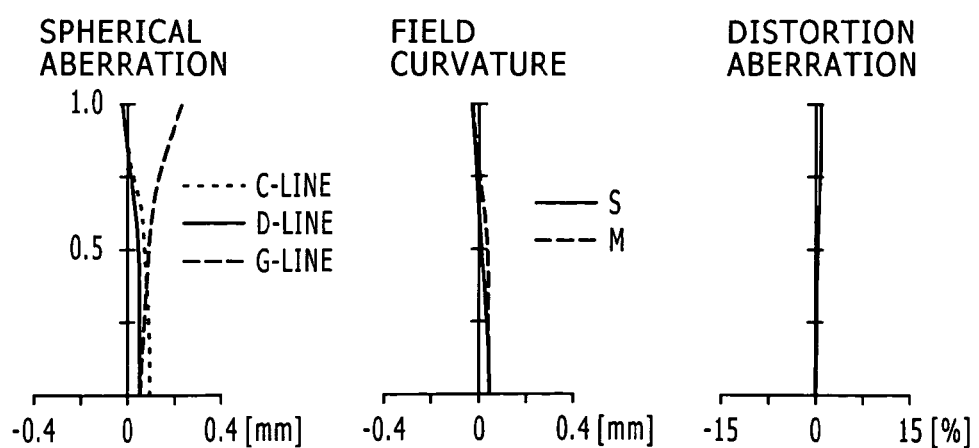

Next, FIGS. 25A, 25B, and 25C are diagrams of various aberrations in an infinity focused state of the first numerical example. FIG. 25A shows various aberrations in a wide-angle end state ($\omega$=30.06 degrees). FIG. 25B shows various aberrations in an intermediate focal length state ($\omega$=19.15 degrees). FIG. 25C shows various aberrations in a telephoto end state ($\omega$=12.74 degrees).

In FIGS. 25A to 25C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 25A to 25C show that the zoom lens 1 according to the first numerical example excellently corrects various aberrations even though reduced in thickness and miniaturized, and has excellent image forming performance.

[8-2. Second Numerical Example]

In FIG. 26, reference numeral 2 denotes a zoom lens as a whole in a second numerical example corresponding to the third embodiment, which zoom lens is formed by a three-group configuration of a negative first group G1, a positive second group G2, and a positive third group G3 in order from an object side.

Figure 27A:
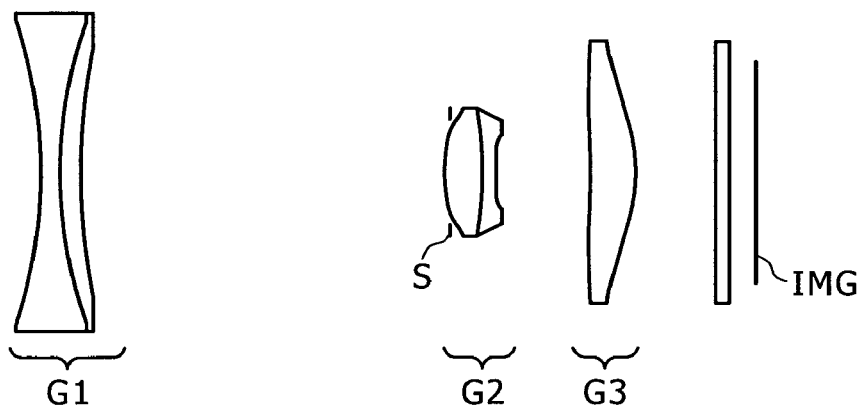
FIGS. 27A, 27B, and 27C are schematic sectional views of lens group arrangements in the second numerical example.
Figure 27B:
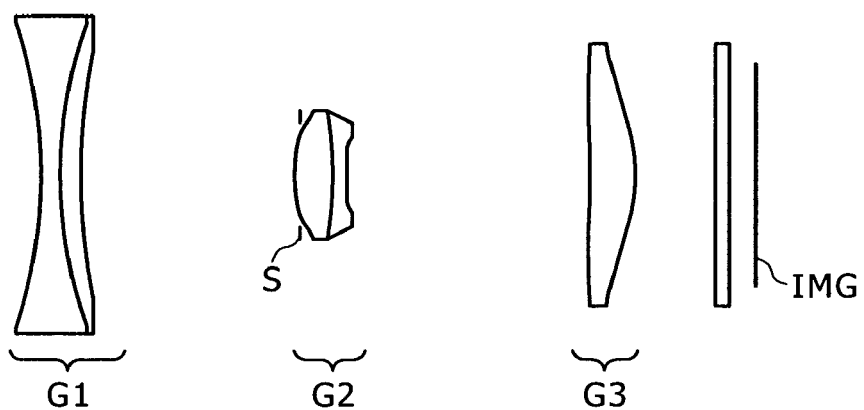
Figure 27C:
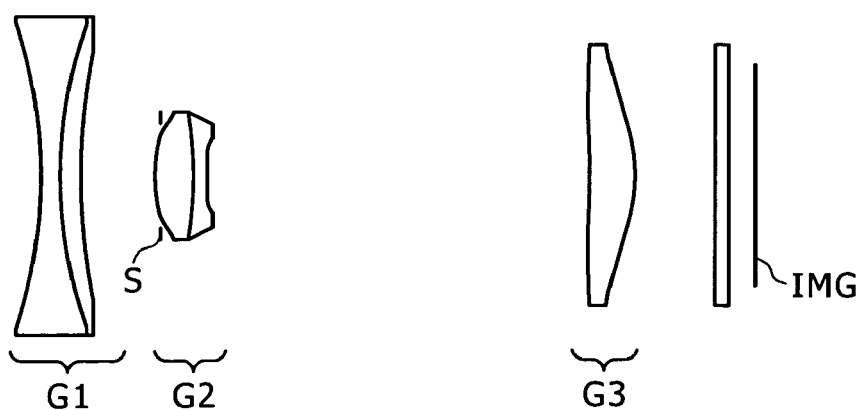

FIGS. 27A, 27B, and 27C show lens group arrangements when the zoom lens 2 in the second numerical example is in a wide-angle end state (WIDE), an intermediate focal length state (MID), and a telephoto end state (TELE).

The first group G1 is a cemented lens L12 including a first lens L1 formed of a negative aspheric glass lens and a second lens L2 formed of a positive spherical glass lens. The first group G1 as a whole has negative power.

The second group G2 includes a cemented lens L34 formed by joining together a third lens L3 formed of a positive spherical lens and a fourth lens L4 formed of a negative aspheric lens. An aperture stop S is disposed on the object side of the second group. This aperture stop S may be disposed on the image surface side of the second group.

The third group G3 is formed by a fifth lens L5 made of a positive single lens. Incidentally, an IR cutoff filter CF and a seal glass SG for protecting an image surface IMG are disposed between the third group G3 and the image surface IMG in the zoom lens 2.

The following Tables 41 to 45 show specification values of the second numerical example corresponding to the third embodiment. In the specification tables in the second numerical example, f denotes focal length, FNO denotes an F-number, and $\omega$ denotes a half angle of view, and an index of refraction is a value corresponding to the d-line (wavelength of 587.6 nm). Incidentally, a radius of curvature of $\infty$ in Table 42 means a plane.

TABLE 41

|  | WIDE | MID | TELE |
|---|---|---|---|
| f | 6.00 | 11.02 | 16.86 |
| FNO | 3.08 | 4.20 | 5.43 |
| $\omega$ | 30.26 | 19.36 | 12.96 |

TABLE 42

|  | Radius of curvature | Surface interval | Index of refraction (d) | Abbe number (d) |
|---|---|---|---|---|
| 1(ASP) | −16.0100 | 0.800 | 1.61881 | 63.85 |
| 2 | 15.1938 | 1.150 | 1.80518 | 25.46 |
| 3 | 32.3168 | Variable |  |  |
| Aperture stop | $\infty$ |  |  |  |
| 5(ASP) | 4.0112 | 1.700 | 1.85135 | 40.10 |
| 6 | −4.1477 | 0.476 | 1.71736 | 29.50 |
| 7(ASP) | 3.8150 | Variable |  |  |
| 8(ASP) | −24.5026 | 1.450 | 1.52500 | 56.45 |
| 9(ASP) | −6.4928 | Variable |  |  |
| 10 | $\infty$ | 0.300 | 1.56883 | 56.04 |
| 11 | $\infty$ | 1.100 |  |  |
| IMG | $\infty$ | 0.000 |  |  |

Incidentally, a first surface, a fifth surface, a seventh surface, an eighth surface, and a ninth surface have an aspheric shape, and the aspheric coefficients of the surfaces are as shown in Table 8. Incidentally, for example, "0.26029E−05" denotes "$0.26029 \times 10^{-5}$."

TABLE 43

| Surface number | κ | A | B | C | D |
|---|---|---|---|---|---|
| 1 | 0.00000E+00 | 1.78011E−04 | −3.71038E−06 | 8.44979E−08 | −8.18115E−10 |
| 5 | 0.00000E+00 | −1.34311E−04 | −6.17587E−05 | −1.46708E−05 | −1.15789E−07 |
| 7 | 0.00000E+00 | 4.96091E−03 | 4.20078E−04 | −5.26318E−05 | 8.27422E−06 |
| 8 | 0.00000E+00 | 7.55754E−04 | −8.03861E−05 | 6.78817E−06 | −8.48733E−08 |
| 9 | 0.00000E+00 | 1.99117E−03 | −1.15867E−04 | 6.82985E−06 | −3.21413E−08 |

Next, variable intervals when a lens position state changes in the zoom lens 2 according to the second numerical example are shown in the following Table 44. In the zoom lens 2, the first group G1, the second group G2, and the third group G3 are all movable, variable power is achieved mainly by changing an interval between the first group G1 and the second group G2, and focal position variation at each angle of view is absorbed by moving the third group G3, whereby high performance can be ensured while maintaining miniaturization.

TABLE 44

|  | WIDE | MID | TELE |
|---|---|---|---|
| D3 | 14.512 | 5.601 | 1.694 |
| D7 | 3.396 | 8.630 | 13.333 |
| D9 | 4.068 | 2.936 | 1.964 |

The following Table 45 shows conditional expression correspondence values in the zoom lens 2 according to the second numerical example.

TABLE 45

|  |  | Second example |
|---|---|---|
| Conditional expression (1) | nd(G1) | 1.6188 |
| Conditional expression (2) | vd(G2) | 25.4600 |
| Conditional expression (3) | |G1R1/G2R2| | 0.4954 |
| Conditional expression (4) | G1R1/fw | −2.6688 |
| Conditional expression (5) | G2R2/fw | 5.3870 |
| Conditional expression (6) | |G1R1/G2R2| | 0.4954 |
| Conditional expression (7) | $L/(fw * ft)^{1/2}$ | 0.2163 |

Figure 28A:
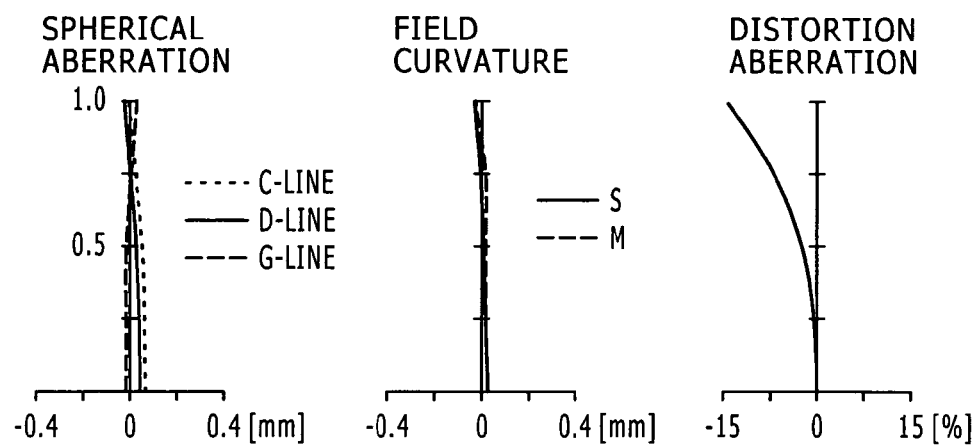
FIGS. 28A, 28B, and 28C are characteristic curve diagrams showing various aberrations in the second numerical example.
Figure 28B:
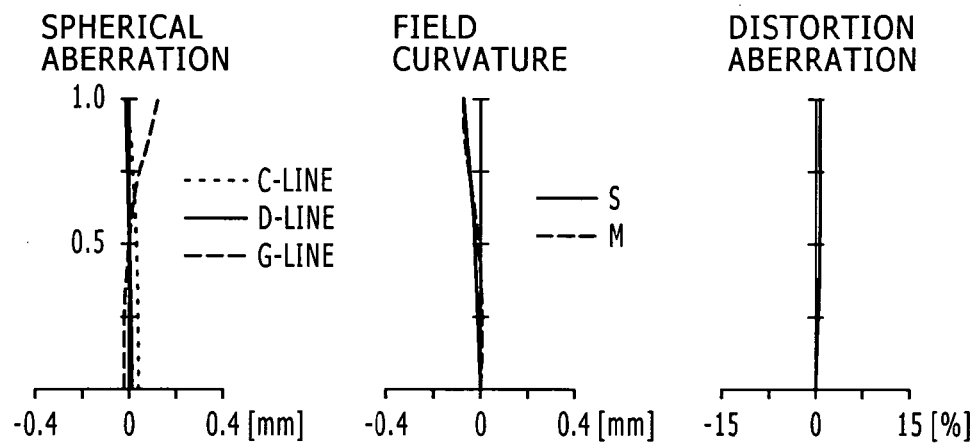
Figure 28C:
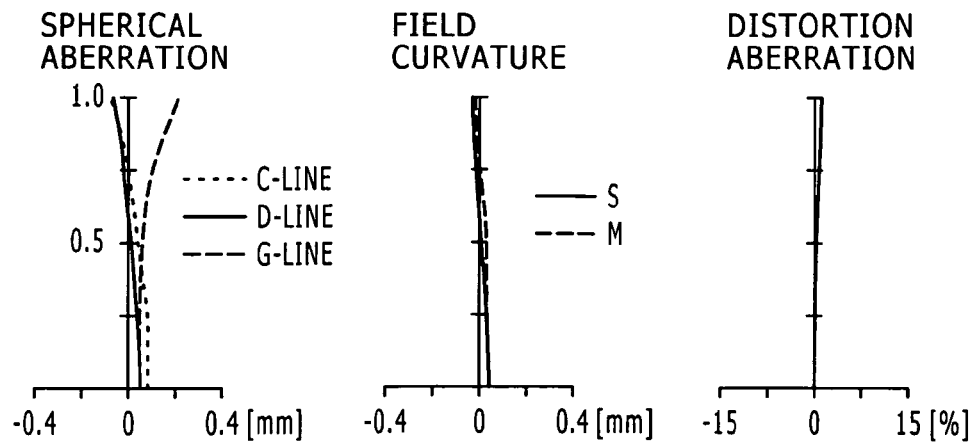

Next, FIGS. 28A, 28B, and 28C are diagrams of various aberrations in an infinity focused state of the second numerical example. FIG. 28A shows various aberrations in a wide-angle end state (ω=30.26 degrees). FIG. 28B shows various aberrations in an intermediate focal length state (ω=19.36 degrees). FIG. 28C shows various aberrations in a telephoto end state (ω=12.96 degrees).

In FIGS. 28A to 28C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 28A to 28C show that the zoom lens 2 according to the second numerical example excellently corrects various aberrations even though reduced in thickness and miniaturized, and has excellent image forming performance.

[8-3. Third Numerical Example]

In FIG. 29, reference numeral 3 denotes a zoom lens as a whole in a third numerical example corresponding to the third embodiment, which zoom lens is formed by a three-group configuration of a negative first group G1, a positive second group G2, and a positive third group G3 in order from an object side.

Figure 30A:
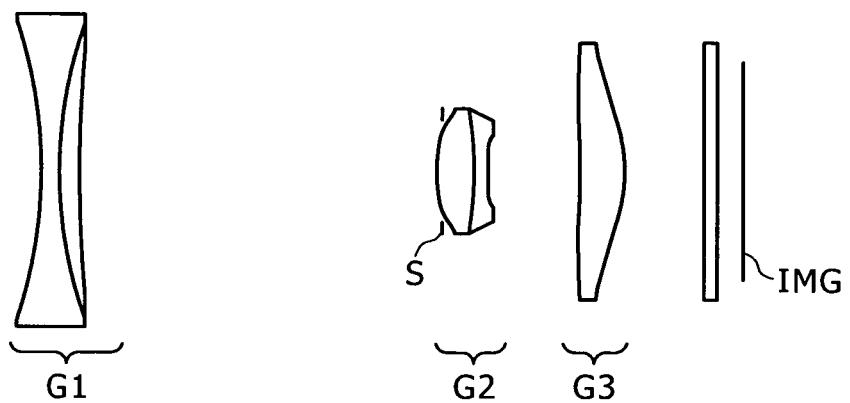
FIGS. 30A, 30B, and 30C are schematic sectional views of lens group arrangements in the third numerical example.
Figure 30B:
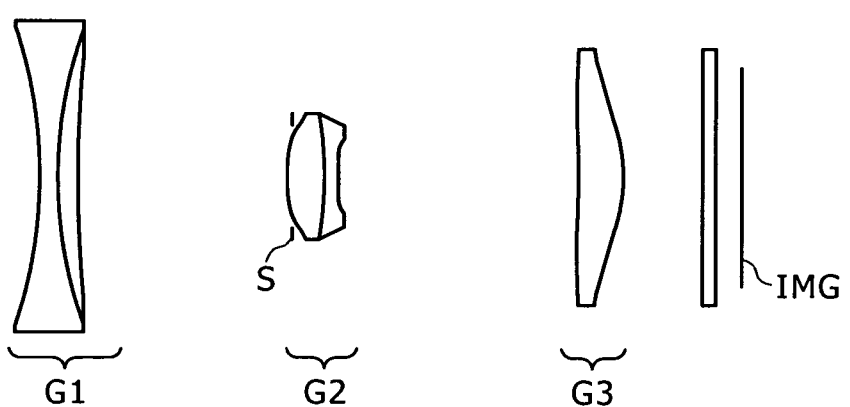
Figure 30C:
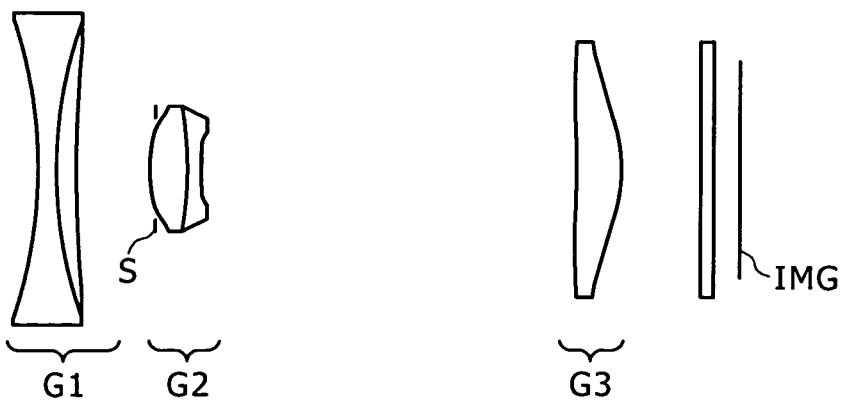

FIGS. 30A, 30B, and 30C show lens group arrangements when the zoom lens 3 in the third numerical example is in a wide-angle end state (WIDE), an intermediate focal length state (MID), and a telephoto end state (TELE).

The first group G1 is a cemented lens L12 made of a compound aspheric lens formed by joining together a first lens L1 formed of a negative aspheric glass lens and a second lens L2 formed of a positive resin. The first group G1 as a whole has negative power.

The second group G2 includes a cemented lens L34 formed by joining together a third lens L3 formed of a positive aspheric lens and a fourth lens L4 formed of a negative aspheric lens. An aperture stop S is disposed on the object side of the second group G2. This aperture stop S may be disposed on the image surface side of the second group G2.

The third group G3 is formed by a fifth lens L5 made of a positive single lens. Incidentally, an IR cutoff filter CF and a seal glass SG for protecting an image surface IMG are disposed between the third group G3 and the image surface IMG in the zoom lens 3.

The following Tables 46 to 50 show specification values of the third numerical example corresponding to the third embodiment. In the specification tables in the third numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 47 means a plane.

TABLE 46

|  | WIDE | MID | TELE |
|---|---|---|---|
| f | 6.12 | 11.24 | 17.21 |
| FNO | 3.13 | 4.21 | 5.40 |
| ω | 29.89 | 19.02 | 12.71 |

TABLE 47

| | Radius of curvature | Surface interval | Index of refraction (d) | Abbe number (d) |
|---|---|---|---|---|
| 1(ASP) | −27.8835 | 0.800 | 1.61881 | 63.85 |
| 2 | 13.4276 | 0.800 | 1.60700 | 26.30 |
| 3(ASP) | 20.3123 | Variable | | |
| Aperture stop | ∞ | | | |
| 5(ASP) | 3.9873 | 1.700 | 1.85135 | 40.10 |
| 6 | −4.1550 | 0.551 | 1.71736 | 29.50 |
| 7(ASP) | 3.9006 | Variable | | |
| 8(ASP) | −18.1375 | 1.450 | 1.52500 | 56.45 |
| 9(ASP) | −6.4927 | Variable | | |
| 10 | ∞ | 0.300 | 1.56883 | 56.04 |
| 11 | ∞ | 1.100 | | |
| IMG | ∞ | 0.000 | | |

Incidentally, a first surface, a third surface, a fifth surface, a seventh surface, an eighth surface, and a ninth surface have an aspheric shape, and the aspheric coefficients of the surfaces are as shown in Table 13. Incidentally, for example, "0.26029E−05" denotes "0.26029×$10^{−5}$."

TABLE 48

| Surface number | κ | A | B | C | D |
|---|---|---|---|---|---|
| 1 | 0.00000E+00 | −3.48717E−04 | 4.56773E−06 | 5.08490E−08 | −1.13123E−09 |
| 3 | 0.00000E+00 | −5.01911E−04 | 6.12268E−06 | 3.25197E−08 | −3.41854E−11 |
| 5 | 0.00000E+00 | −1.88586E−04 | 1.40043E−05 | −3.24467E−05 | 1.52733E−06 |
| 7 | 0.00000E+00 | 5.46448E−03 | 5.69250E−04 | −7.00743E−05 | 1.17096E−05 |

TABLE 48-continued

| Surface number | κ | A | B | C | D |
|---|---|---|---|---|---|
| 8 | 0.00000E+00 | 7.18643E−04 | 1.22147E−05 | 1.00284E−06 | 4.16413E−08 |
| 9 | 0.00000E+00 | 1.77684E−03 | −1.19552E−05 | 8.06160E−07 | 9.20405E−08 |

Next, variable intervals when a lens position state changes in the zoom lens 3 according to the third numerical example are shown in the following Table 49. In the zoom lens 3, the first group G1, the second group G2, and the third group G3 are all movable, variable power is achieved mainly by changing an interval between the first group G1 and the second group G2, and focal position variation at each angle of view is absorbed by moving the third group G3, whereby high performance can be ensured while maintaining miniaturization.

TABLE 49

|  | WIDE | MID | TELE |
|---|---|---|---|
| D3 | 14.512 | 5.601 | 1.694 |
| D7 | 3.383 | 8.133 | 12.533 |
| D9 | 3.851 | 2.776 | 1.902 |

The following Table 50 shows conditional expression correspondence values in the zoom lens 2 according to the second numerical example.

TABLE 50

|  |  | Third example |
|---|---|---|
| Conditional expression (1) | nd(G1) | 1.6188 |
| Conditional expression (2) | vd(G2) | 26.3000 |
| Conditional expression (3) | |G1R1/G2R2| | 1.3727 |
| Conditional expression (4) | G1R1/fw | −4.5588 |
| Conditional expression (5) | G2R2/fw | 3.3210 |
| Conditional expression (6) | |G1R1/G2R2| | 1.3727 |
| Conditional expression (7) | $L/(fw * ft)^{1/2}$ | 0.2194 |

Figure 31A:
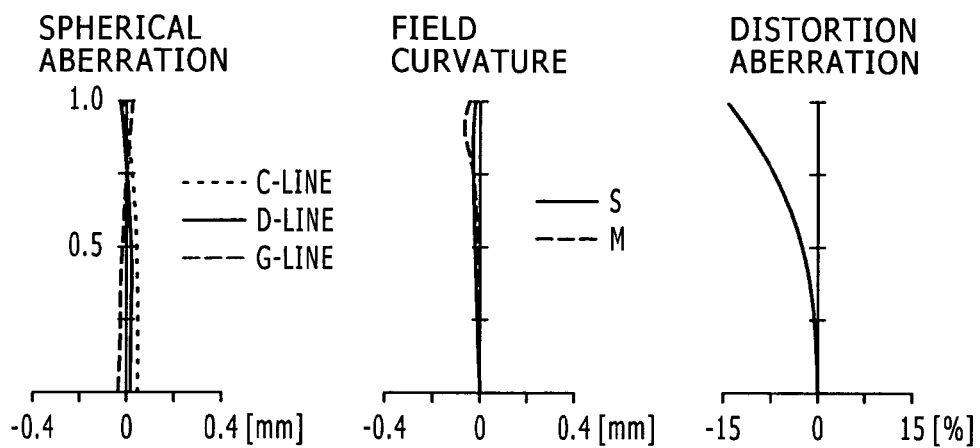
FIGS. 31A, 31B, and 31C are characteristic curve diagrams showing various aberrations in the third numerical example.
Figure 31B:
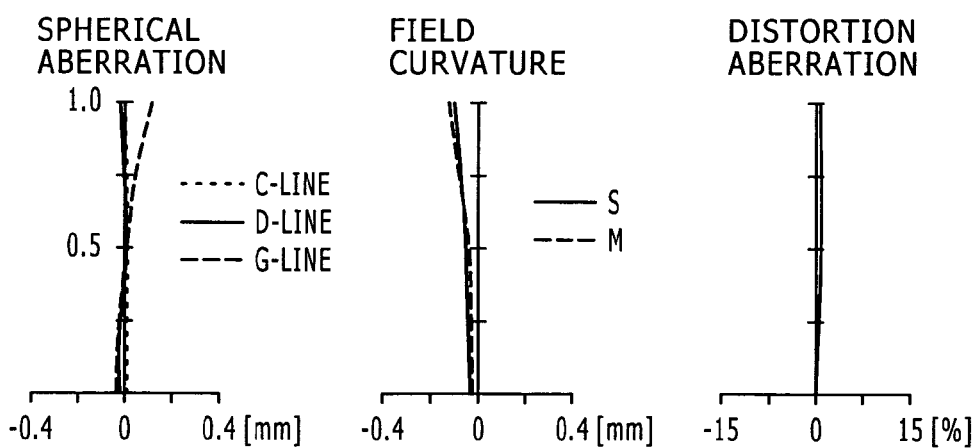
Figure 31C:
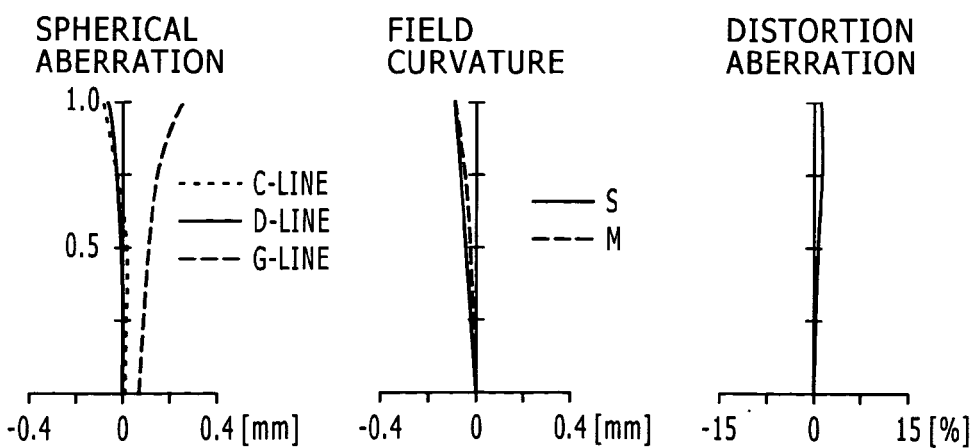

Next, FIGS. 31A, 31B, and 31C are diagrams of various aberrations in an infinity focused state of the third numerical example. FIG. 31A shows various aberrations in a wide-angle end state (ω=29.89 degrees). FIG. 31B shows various aberrations in an intermediate focal length state (ω=19.02 degrees). FIG. 31C shows various aberrations in a telephoto end state (ω=12.71 degrees).

In FIGS. 31A to 31C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 31A to 31C show that the zoom lens 3 according to the third numerical example excellently corrects various aberrations even though reduced in thickness and miniaturized, and has excellent image forming performance.

Thus, according to the first to third numerical examples corresponding to the first embodiment, an image pickup system miniaturized and improved in performance at low cost with a focal length Wf of 28 mm to 38 mm (equivalent to a 35-mm film), a variable power ratio of two to four times, an FNO of about 2.5 to 3.5 in the wide-angle end state, and an FNO of about 5 to 6.5 in the telephoto end state can be realized in the zoom lenses 1 to 3.

<9. Image Pickup Device and Digital Still Camera>
[9-1. Configuration of Image Pickup Device]

An image pickup device according to an embodiment of the present invention will next be described. This image pickup device has an image pickup element formed by a CCD (Charge Coupled Device) sensor or a CMOS (Complementary Metal Oxide Semiconductor) sensor, for example, for converting an optical image formed by the zoom lens 1 (or 2 or 3) illustrated in the third embodiment in the present invention into an electric signal.

This zoom lens 1 (or 2 or 3) includes three groups that are a negative first group G1, a positive second group G2, and a positive third group in order from an object side, the first group G1 including a negative cemented lens L12 formed by joining together, from the object side, a first lens L1 formed by a negative single lens and a second lens L2 formed by a positive single lens, the second group G2 including, from the object side, a cemented lens L34 formed by joining together a third lens L3 formed by a positive single lens and a fourth lens L4 formed by a negative single lens, and the third group including a fifth lens L5 formed by a positive single lens, and the zoom lens being formed so as to satisfy the following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

The three-group type zoom lens 1 (or 2 or 3) has the following advantages because the first group G1 includes only the single cemented lens L12 composed of the first lens L1 having negative power and the second lens L2 having positive power.

First, in the three-group type zoom lens 1 (or 2 or 3), because the first group G1 is of a single configuration of only the cemented lens L12 rather than a configuration of a plurality of lenses, performance degradation due to decentration between the lenses in the first group G1 does not occur. It is thus possible to eliminate a need for alignment between the lenses at a time of assembly, omit the manufacturing process of the alignment, and thereby shorten manufacturing time.

That is, because the first group G1 in the three-group type zoom lens 1 (or 2 or 3) is of a single configuration of only the cemented lens L12 rather than a configuration of a plurality of lenses, the three-group type zoom lens makes it possible to achieve an improvement in performance, cost reduction, and reduction in thickness as compared with the case where the first group G1 is formed by a plurality of lenses.

Second, in the three-group type zoom lens 1 (or 2 or 3), because the first group G1 is of a single configuration of only the cemented lens L12 rather than a configuration of a plurality of lenses, a lens interval error in the first group G1 is zero. Therefore an amount of shift in focal position is reduced as compared with the case where the first group G1 is formed by a plurality of lenses as in the existing case.

The three-group type zoom lens 1 (or 2 or 3) thereby makes it possible to reduce an amount of clearance of mechanical hardware configuration for focal position adjustment by the first to third groups G1 to G3. Therefore the whole of the three-group type zoom lens 1 (or 2 or 3) can be further miniaturized.

Third, in the three-group type zoom lens 1 (or 2 or 3), because the first group G1 is of a single configuration of only the cemented lens L12 rather than a configuration of a plurality of lenses, the second lens L2 located on an image surface side in the case where the first group G1 is formed by a plurality of lenses as in the existing case is prevented from interfering with the second group G2. Therefore the position of the second group G2 can be brought correspondingly closer to the principal point position of the first group G1.

The three-group type zoom lens 1 (or 2 or 3) can thereby weaken an effect of bringing the principal point position of the first group G1 closer to the image surface by the second group G2. That is, in the three-group type zoom lens 1 (or 2 or 3), the second group G2 can be formed only by the cemented lens L34 of the positive third lens L3 and the negative fourth lens L4. It is thus possible to suppress lens decentration sensitivity in the second group G2, and lower a degree of difficulty in manufacturing while achieving a reduction in thickness and an improvement in performance.

Fourth, in the three-group type zoom lens 1 (or 2 or 3), because not only the first group G1 but also the second group G2 can be formed by a cemented lens L34 alone, performance degradation due to decentration between the lenses in the second group G2 can be prevented.

At this time, in the three-group type zoom lens 1 (or 2 or 3), assembly variation in the direction of an optical axis between the lenses in the second group G2 is also eliminated, and thus an amount of focal position shift is reduced. The three-group type zoom lens 1 (or 2 or 3) thereby makes it possible to reduce an amount of clearance of mechanical hardware configuration for focal position adjustment by the first group G1 to third group G3. Therefore the whole of the three-group type zoom lens 1 (or 2 or 3) can be further miniaturized.

Here, the conditional expressions (1) to (3) in the three-group type zoom lens 1 (or 2 or 3) are defined to lower the degree of difficulty in manufacturing while achieving a reduction in thickness, miniaturization and an improvement in performance.

The conditional expression (1) defines the index of refraction of the negative first lens L1 forming the cemented lens L12 in the first group G1 with respect to the d-line. When the index of refraction of the negative first lens L1 is less than the lower limit value of the conditional expression (1), and when miniaturization is to be achieved by strengthening the negative power of the first group G1, the curvature of the negative first lens L1 is reduced, and thickness in the direction of an optical axis is increased, which is disadvantageous for thickness reduction, and it becomes difficult to correct spherical aberration, field curvature, and distortion aberration.

In addition, when the index of refraction of the negative first lens L1 is less than the lower limit value of the conditional expression (1), because the curvature of the negative first lens L1 is reduced, it becomes difficult to join the positive second lens L2 when forming the cemented lens L12, and therefore the degree of difficulty in manufacturing is raised. That is, in the three-group type zoom lens 1 (or 2 or 3), the conditional expression (1) lowers the degree of difficulty in manufacturing while achieving a reduction in thickness.

The conditional expression (2) defines the Abbe number of the positive second lens L2 forming the cemented lens L12 in the first group G1. The conditional expression (2) is to correct chromatic aberration of magnification in a wide-angle end state and longitudinal chromatic aberration in a telephoto end state while maintaining miniaturization.

When the Abbe number of the positive second lens L2 exceeds the upper limit value of the conditional expression (2), chromatic aberration of magnification in the wide-angle end state and longitudinal chromatic aberration in the telephoto end state when the negative power of the first lens L1 in the first group G1 is strengthened cannot be corrected, so that resolution performance in a peripheral part of the image pickup element in the wide-angle end state and a central part of the image pickup element in the telephoto end state is degraded. Incidentally, the effects are further enhanced when the upper limit value of the conditional expression (2) is set at 27.

The conditional expression (3) defines so as to prevent the radius of curvature of the second surface of the positive second lens L2 forming the cemented lens L12 of the first group G1 from becoming too small as compared with the radius of curvature of the first surface of the negative first lens L1.

When |G1R1/G2R2| exceeds the upper limit value of the conditional expression (3), the radius of curvature of the second surface of the second lens L2 in the first group G1 becomes too small as compared with the first surface of the first lens L1 in the first group G1. Thus, a degree of difficulty in manufacturing of the second lens L2 as a single part and the cemented lens L12 is increased, and manufacturing cost is raised. In addition, the negative power of the first lens L1 cannot be strengthened sufficiently, which is disadvantageous for miniaturization. Incidentally, the effects are further enhanced when the upper limit value of the conditional expression (3) is set at 1.7.

Next, the three-group type zoom lens 1 (or 2 or 3) is formed such that the curvature of the surface nearest to the object side and the curvature of the surface nearest to the image surface side in the cemented lens L12 of the first group G1 satisfy the following conditional expressions (4) and (5):

$$G1R1/fw < -2.2 \quad (4)$$

$$G2R2/fw > 3 \quad (5)$$

where fw is focal length in the wide-angle end state.

The conditional expression (4) defines the radius of curvature of the surface nearest to the object side of the first lens L1 in the cemented lens L12 of the first group G1. The conditional expression (5) defines the radius of curvature of the surface nearest to the image surface side of the second lens L2 in the cemented lens L12 of the first group G1.

When G1R1/fw exceeds the upper limit value of the conditional expression (4), the radius of curvature of the surface nearest to the object side of the first lens L1 in the cemented lens L12 of the first group G1 becomes too small, and the projection of a lens edge part of the first lens L1 in the direction of the optical axis with respect to a surface vertex nearest to the object side of the first lens becomes larger, which is disadvantageous for thickness reduction.

When G2R2/fw is less than the lower limit value of the conditional expression (5), the radius of curvature of the surface nearest to the image surface side of the second lens L2 in the cemented lens L12 of the first group G1 with respect to the focal length fw in the wide-angle end state becomes too small. Thus, a degree of difficulty in manufacturing of the second lens L2 as a single part and the cemented lens L12 is increased, and manufacturing cost is raised.

In addition, when the radius of curvature of the surface on the image surface side of the second lens L2 in the cemented lens L12 of the first group G1 becomes too small, the projection of a lens edge part of the second lens L2 in the direction of the optical axis with respect to a surface vertex on the image surface side of the second lens L2 becomes larger and interferes. It is thus difficult to make an interval between the first group G1 and the second group G2 sufficiently short.

As a result, in the three-group type zoom lens 1 (or 2 or 3), the principal point position of the first group G1 cannot be brought closer to the image surface IMG by the second group G2. It is thus difficult to correct spherical aberration and field curvature, in particular.

Next, in the three-group type zoom lens 1 (or 2 or 3), at least one surface nearest to the object side or nearest to the image surface side in the first group G1 is a spherical shape, and the zoom lens is formed so as to satisfy the following conditional expression (6):

$$|G1R1/G2R2|<1.4 \quad (6)$$

As with the above-described conditional expression (3), the conditional expression (6) defines so as to prevent the radius of curvature of the second surface of the positive second lens L2 from being too small as compared with the radius of curvature of the first surface of the negative first lens L1 forming the cemented lens L12 of the first group G1.

When |G1R1/G2R2| exceeds the upper limit value of the conditional expression (6), and sufficient negative power is to be provided by the first group G1, the radius of curvature of the first surface of the negative first lens L1 or the second surface of the positive second lens L2 forming the cemented lens L12 of the first group G1 becomes too small.

At this time, in the three-group type zoom lens 1 (or 2 or 3), it is difficult to correct distortion aberration, field curvature, coma aberration and the like in the wide-angle end state by only an aspheric shape formed as at least one surface nearest to the object side or nearest to the image surface side in the first group G1, and degradation in optical performance of a peripheral part in the wide-angle end state, in particular, becomes noticeable.

Incidentally, in the three-group type zoom lens 1 (or 2 or 3), when one of the negative first lens L1 and the positive second lens L2 forming the cemented lens L12 of the first group G1 is made into a spherical lens for cost reduction, the positive second lens L2 preferably has a spherical shape from a viewpoint of aberration correction.

This is because the passing position of rim rays in the wide-angle end state is closer to the optical axis in the positive second lens L2 situated on the image surface side than in the negative first lens L1 situated on the object side, and because the positive second lens L2 has weaker power and thus has a larger radius of curvature than the negative first lens L1.

As in Patent Document 1, when the first lens L1 has a low index of refraction, and the negative power of the first group G1 is to be strengthened, it is difficult to correct distortion aberration, field curvature, spherical aberration, coma aberration and the like in the wide-angle end state unless the first surface of the negative first lens L1 forming the cemented lens L12 of the first group G1 and the second surface of the positive second lens L2 are both in an aspheric shape.

Thus, in the three-group type zoom lens 1 (or 2 or 3), by making one of the first lens L1 and the second lens L2 forming the cemented lens L12 of the first group G1 have a spherical shape, it is possible not only to achieve the cost reduction, but also to reduce the cost of the cemented lens L12 because required cementing accuracy is lowered.

Further, the three-group type zoom lens 1 (or 2 or 3) is characterized in that the cemented lens L12 of the first group G1 is formed by a compound aspheric lens including the first lens L1 made of a negative glass lens and the second lens L2 made of a positive resin lens.

The three-group type zoom lens 1 (or 2 or 3) thus has the cemented lens L12 of the first group G1 formed by molding using resin. Therefore the thickness of a peripheral part of the second lens L2 formed by the resin can be greatly reduced as compared with a case where glass lenses are joined to each other.

Further, the three-group type zoom lens 1 (or 2 or 3) is formed such that a distance from the aperture stop S of the second group G2 to the lens surface vertex of the fourth lens L4 disposed nearest to the image surface side in the second group G2 satisfies the following conditional expression (7):

$$L/(fw*ft)^{1/2}<0.25 \quad (7)$$

where ft is focal length in the telephoto end state, and L is the distance from the aperture stop disposed in the second group to the lens surface vertex of the fourth lens disposed nearest to the image surface side in the second group.

This conditional expression (7) defines the distance from the aperture stop S to the lens surface vertex of the fourth lens L4 disposed nearest to the image surface side in the second group G2, and defines so as to prevent this distance from becoming too long.

When $L/(fw*ft)^{1/2}$ exceeds the upper limit value of the conditional expression (7), an angle of incidence of rim rays in the wide-angle end state in particular on the fourth lens L4 disposed nearest to the image surface side in the second group G2 is increased, and the occurrence of coma aberration degrades resolution performance.

[9-2. Configuration of Digital Still Camera]

Figure 32:
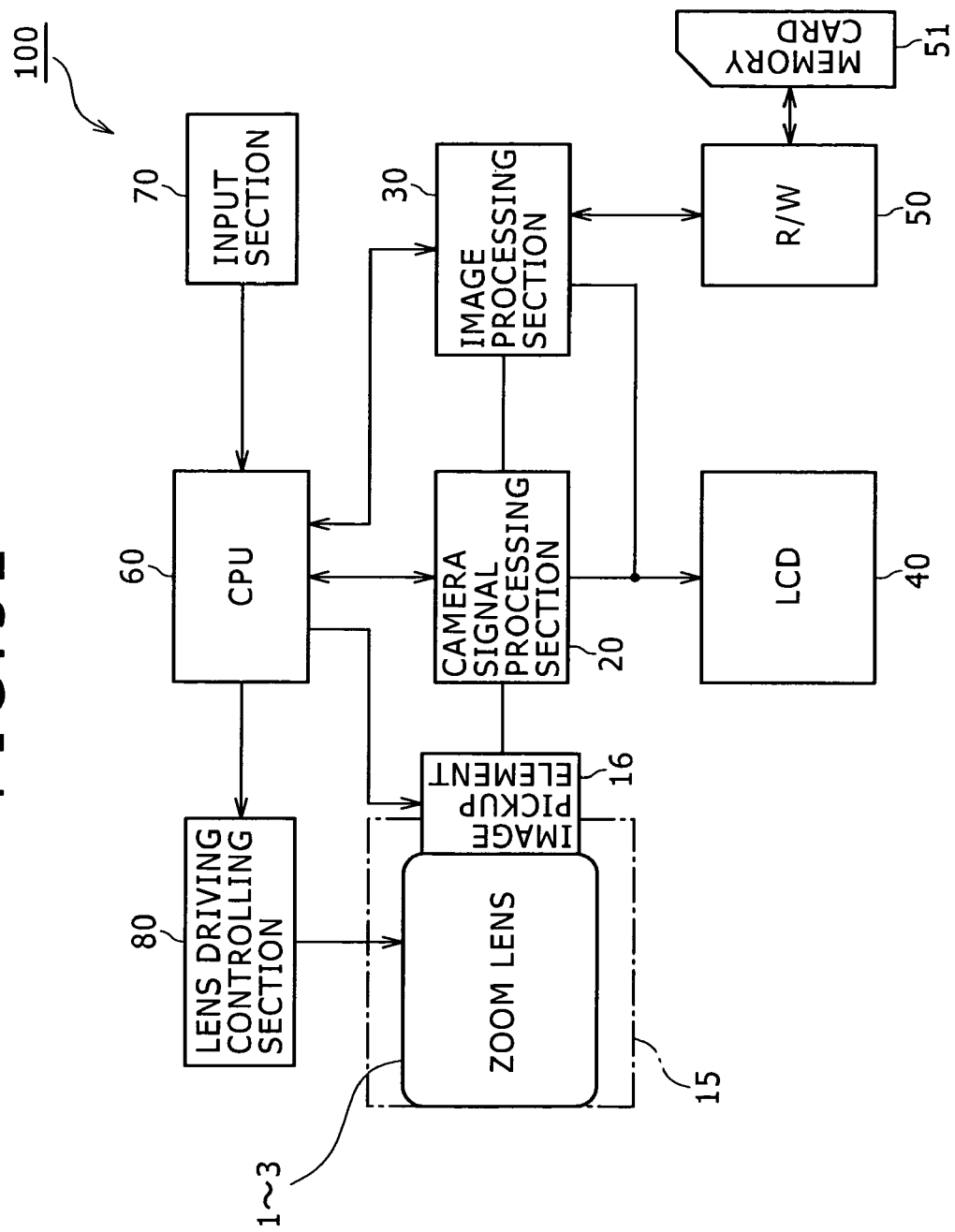
FIG. 32 is a schematic block diagram showing a configuration of a digital still camera including an image pickup device according to an embodiment of the present invention.

As shown in FIG. 32, a digital still camera 100 including an image pickup device as described above has a camera block 15 for performing an image pickup function as the image pickup device and a camera signal processing section 20 for subjecting an image signal obtained by image pickup by the camera block 15 to signal processing such as analog-to-digital conversion processing and the like.

The digital still camera 100 also has an image processing section 30 for performing image signal recording and reproducing processing and the like, an LCD (Liquid Crystal Display) 40 for displaying a taken image and the like, and a reader-writer 50 for performing writing/reading of a memory card 51.

In addition, the digital still camera 100 has a CPU (Central Processing Unit) 60 for controlling the whole of the camera, an input section 70 for operating input by a user, and a lens driving controlling section 80 for controlling the driving of a lens within the camera block 15.

The camera block 15 has a configuration combining an optical system including the zoom lens 1 (or 2 or 3) and an image pickup element 16 formed by for example a CCD (Charge Coupled Device) sensor or a CMOS (Complementary Metal Oxide Semiconductor) sensor.

The camera signal processing section 20 performs signal processing including the processing of conversion of an output signal from the image pickup element 16 into a digital signal, noise removal, image quality correction, the processing of conversion into a luminance signal and a color-difference signal, and the like.

The image processing section 30 performs the processing of compression coding and decompression decoding of an image signal on the basis of a predetermined image data format, the processing of conversion of data specifications including resolution, and the like.

The memory card 51 is composed of a detachable semiconductor memory. The reader-writer 50 writes image data coded by the image processing section 30 to the memory card 51, and reads image data recorded in the memory card 51.

The CPU 60 performs centralized control of each circuit block within the digital still camera 100. The CPU 60 controls each circuit block on the basis of an instruction input signal from the input section 70 and the like.

The input section 70 includes for example a shutter release button for performing shutter operation and a selecting switch for selecting an operation mode. The input section 70 outputs an instruction input signal corresponding to an operation by a user to the CPU 60.

The lens driving controlling section 80 controls a motor and the like not shown in FIG. 22 for driving lens groups within the zoom lens 1 (or 2 or 3) on the basis of a control signal from the CPU 60.

Operation of the digital still camera 100 will next be described in brief. In a standby state for picture taking, under control of the CPU 60, the digital still camera 100 outputs an image signal of an image picked up by the camera block 15 to the LCD 40 via the camera signal processing section 20, and displays the image signal as a camera-through image on the LCD 40.

When an instruction input signal for zooming is input from the input section 70, the CPU 60 outputs a control signal to the lens driving controlling section 80, and the digital still camera 100 moves a predetermined lens group within the zoom lens 1 (or 2 or 3) on the basis of control of the lens driving controlling section 80.

Then, when a shutter not shown in FIG. 22 within the camera block 15 is released by an instruction input signal from the input section 70, the digital still camera 100 outputs a picked-up image signal from the camera signal processing section 20 to the image processing section 30.

The image processing section 30 subjects the image signal supplied from the camera signal processing section 20 to predetermined compression coding, thereafter converts the image signal into digital data in a predetermined data format, and writes the digital data to the memory card 51 via the reader-writer 50.

Incidentally, focusing is for example performed by driving control of the zoom lens 1 (or 2 or 3) by the lens driving controlling section 80 on the basis of a control signal from the CPU 60 when the shutter release button is pressed halfway down or pressed all the way down for recording.

When image data recorded in the memory card 51 is reproduced, the CPU 60 reads the image data from the memory card 51 via the reader-writer 50 according to an operation of the input section 70, and the image data is subjected to decompression decoding processing by the image processing section 30 and then output to the LCD 40.

The LCD 40 displays a reproduced image on the basis of the image data resulting from the decompression decoding processing by the image processing section 30.

Incidentally, while in the present embodiment, description has been made of a case where the image pickup device according to the present invention is applied to a digital still camera, the image pickup device according to the present invention is also applicable to other image pickup devices such as digital video cameras, for example.

<10. Other Embodiments>

In addition, the concrete shapes, structures, and numerical values of respective parts shown in the third embodiment and the first to third numerical examples described above are each a mere example of embodiment in carrying out the present invention, and the technical scope of the present invention is not to be construed in a restricted manner by these shapes, structures, and numerical values.

Incidentally, in the foregoing third embodiment, a case where an image pickup device is incorporated into for example the digital still camera 100 has been illustrated as an example. However, objects into which to incorporate the image pickup device are not limited to this. The image pickup device is widely applicable to various other electronic devices such as digital video cameras, portable telephones, personal computers having a camera incorporated therein, PDAs having a camera incorporated therein, and the like.

<11. Fourth Embodiment>

A four-group type zoom lens according to a fourth embodiment of the present invention includes four groups that are a negative first group, a positive second group, a positive third group, and a negative or positive fourth group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, the third group including a fifth lens formed by a positive single lens, the fourth group including a sixth lens formed by a single lens at a fixed distance from an image pickup surface, at least one of surfaces in contact with air being formed in a spherical shape, and the zoom lens satisfying following conditional expressions (1) to (3):

$$N1d > 1.55 \quad (1)$$

$$\nu 2d < 30 \quad (2)$$

$$|G1R1/G2R2| < 3 \quad (3)$$

where N1d is an index of refraction of the negative first lens forming the cemented lens in the first group with respect to a d-line, $\nu 2d$ is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

The four-group type zoom lens has the following advantages because the first group includes only the single cemented lens composed of the first lens having negative power and the second lens having positive power.

First, in the four-group type zoom lens, because the first group is of a single configuration rather than a configuration of a plurality of lenses, performance degradation due to decentration between the lenses in the first group does not occur. It is thus possible to eliminate a need for alignment between the lenses at a time of assembly, omit the manufacturing process of the alignment, and thereby shorten manufacturing time.

That is, because the first group in the four-group type zoom lens is of a single configuration of only the cemented lens rather than a configuration of a plurality of lenses, the three-group type zoom lens makes it possible to achieve an improvement in performance, cost reduction, and reduction in thickness as compared with the case where the first group is formed by a plurality of lenses.

Second, in the four-group type zoom lens, because the first group is of a single configuration of only the cemented lens rather than a configuration of a plurality of lenses, a lens interval error in the first group is zero. Therefore an amount of shift in focal position is reduced as compared with the case where the first group is formed by a plurality of lenses as in the existing case.

The four-group type zoom lens thereby makes it possible to reduce an amount of clearance of mechanical hardware configuration for focal position adjustment by the first to third groups. Therefore the whole of the three-group type zoom lens can be further miniaturized.

Third, in the four-group type zoom lens, because the first group is of a single configuration of only the cemented lens rather than a configuration of a plurality of lenses, the second lens located on an image surface side in the case where the first group is formed by a plurality of lenses as in the existing case is prevented from interfering with the second group. Therefore the position of the second group can be brought correspondingly closer to the principal point position of the first group.

The four-group type zoom lens can thereby weaken an effect of bringing the principal point position of the first group closer to the image surface by the second group. That is, in the four-group type zoom lens, the second group can be formed only by the cemented lens of the positive third lens and the negative fourth lens. It is thus possible to suppress lens decentration sensitivity in the second group, and lower a degree of difficulty in manufacturing while achieving a reduction in thickness and an improvement in performance.

Fourth, in the four-group type zoom lens, because not only the first group but also the second group can be formed by a cemented lens alone, performance degradation due to decentration between the lenses in the second group can be prevented.

At this time, in the four-group type zoom lens, assembly variation in the direction of an optical axis between the lenses in the second group is also eliminated, and thus an amount of focal position shift is reduced. The three-group type zoom lens thereby makes it possible to reduce an amount of clearance of mechanical hardware configuration for focal position adjustment by the first to third groups. Therefore the whole of the four-group type zoom lens can be further miniaturized.

The conditional expressions (1) to (3) in the four-group type zoom lens are defined to lower the degree of difficulty in manufacturing while achieving a reduction in thickness, miniaturization and an improvement in performance.

The conditional expression (1) defines the index of refraction of the negative first lens forming the cemented lens in the first group with respect to the d-line. When the index of refraction of the negative first lens is less than the lower limit value of the conditional expression (1), and when miniaturization is to be achieved by strengthening the negative power of the first group, the curvature of the negative first lens is reduced, and thickness in the direction of an optical axis is increased, which is disadvantageous for thickness reduction, and it becomes difficult to correct spherical aberration, field curvature, and distortion aberration.

In addition, when N1d is less than the lower limit value of the conditional expression (1), the curvature of the negative first lens is decreased. Thus, it becomes difficult to join the positive second lens when the cemented lens is formed, and manufacturing becomes difficult. That is, in the four-group type zoom lens, the conditional expression (1) lowers the degree of difficulty in manufacturing while achieving a reduction in thickness.

The conditional expression (2) defines the Abbe number of the positive second lens forming the cemented lens in the first group. The conditional expression (2) is to correct chromatic aberration of magnification in a wide-angle end state and longitudinal chromatic aberration in a telephoto end state while maintaining miniaturization.

When the Abbe number of the positive second lens exceeds the upper limit value of the conditional expression (2), chromatic aberration of magnification in the wide-angle end state and longitudinal chromatic aberration in the telephoto end state when the negative power of the first lens in the first group is strengthened cannot be corrected, so that resolution performance in a peripheral part of the image pickup element in the wide-angle end state and a central part of the image pickup element in the telephoto end state is degraded. Incidentally, the effects are further enhanced when the upper limit value of the conditional expression (2) is set at 27.

The conditional expression (3) defines so as to prevent the radius of curvature of the second surface of the positive second lens forming the cemented lens of the first group from becoming too small as compared with the radius of curvature of the first surface of the negative first lens.

When |G1R1/G2R2| exceeds the upper limit value of the conditional expression (3), the radius of curvature of the second surface of the second lens in the first group becomes too small as compared with the first surface of the first lens in the first group. Thus, a degree of difficulty in manufacturing of the second lens as a single part and the cemented lens is increased, and manufacturing cost is raised. In addition, the negative power of the first lens cannot be strengthened sufficiently, which is disadvantageous for miniaturization. Incidentally, the effects are further enhanced when the upper limit value of the conditional expression (3) is set at 1.7.

Next, the four-group type zoom lens according to the fourth embodiment of the present invention is formed such that curvature of a surface nearest to the object side and curvature of a surface nearest to the image surface side in the cemented lens in the first group and focal lengths of the third group and the fourth group with respect to the first group satisfy following conditional expressions (4) to (7):

$$G1R1/fw > -4 \quad (4)$$

$$G2R2/fw > 2.3 \quad (5)$$

$$f3/f1 < -0.65 \quad (6)$$

$$f4/f1 > 1 \quad (7)$$

where fw is focal length in a wide-angle end state, f1 is focal length of the first group, f3 is focal length of the third group, and f4 is focal length of the fourth group.

The conditional expression (4) defines the radius of curvature of the surface nearest to the object side of the first lens in the cemented lens of the first group.

When G1R1/fw is less than the lower limit value of the conditional expression (4), the radius of curvature of the first surface of the negative first lens forming the cemented lens of the first group becomes too large with respect to the focal length in the wide-angle end state, and therefore the radius of curvature of the second surface of the first lens is decreased to maintain the negative power of the first lens.

As a result, in the four-group type zoom lens, the radius of curvature of the second surface of the positive second lens forming the cemented lens of the first group is also decreased. Thus, a degree of difficulty in manufacturing of the second lens as a single part and the cemented lens is raised, and manufacturing cost is increased.

The conditional expression (5) defines the radius of curvature of the surface nearest to the image surface side of the second lens in the cemented lens of the first group.

When G2R2/fw is less than the lower limit value of the conditional expression (5), the radius of curvature of the surface nearest to the image surface side of the second lens in the cemented lens of the first group becomes too small with respect to the focal length in the wide-angle end state. Thus, a degree of difficulty in manufacturing of the second lens as a single part and the cemented lens is increased, and manufacturing cost is raised.

In addition, when the radius of curvature of the surface on the image surface side of the second lens in the cemented lens of the first group becomes too small, the projection of a lens edge part of the second lens in the direction of the optical axis with respect to a surface vertex on the image surface side of the second lens becomes larger and interferes. It is thus difficult to make an interval between the first group and the second group sufficiently short.

As a result, in the four-group type zoom lens, the principal point position of the first group cannot be brought closer to the image surface by the second group. It is thus difficult to correct spherical aberration and field curvature, in particular.

The conditional expression (6) defines the focal length of the third group with respect to the focal length of the first group. When f3/f1 exceeds the upper limit value of the conditional expression (6), the thickness of a lens center in the fifth lens in the third group is increased to strengthen the power of the fifth lens while securing an edge thickness of a lens peripheral part in the fifth lens in the third group, thus inviting an increase in cost and size of the lens itself.

The conditional expression (7) defines the focal length of the fourth group with respect to the focal length of the first group. When f4/f1 is less than the lower limit value of the conditional expression (7), the positive power of the second group and the third group is strengthened with an increase in negative power of the sixth lens in the fourth group, and in particular the central thickness of the positive fifth lens in the third group is increased, which is disadvantageous for thickness reduction. Furthermore, in the four-group type zoom lens, as the power of the third group is strengthened, it is difficult to form the third group with only a single lens from a viewpoint of aberration correction.

Incidentally, in the four-group type zoom lens, the power of the third group and the fourth group can be prevented from becoming too strong by setting such a power ratio as satisfies the conditional expressions (6) and (7). Thus, performance degradation at times of temperature changes can be suppressed.

In addition, in the four-group type zoom lens, when the sixth lens having negative power is disposed in the fourth group, the field curvature of a close-range object in the telephoto end state, in particular, can be corrected due to an effect of aberration correction of the fourth group, as compared with a three-group type zoom lens of a negative group, a positive group, and a positive group.

Incidentally, in the four-group type zoom lens, when the sixth lens having negative power is disposed in the fourth group, the power of each group can be strengthened due to an effect of aberration correction of the fourth group, as compared with a three-group configuration of a negative group, a positive group, and a positive group. In particular, in the four-group type zoom lens, the power of the first group can be strengthened, and therefore an amount of travel of the second group is reduced, which is advantageous for shortening total length in the wide-angle end state.

Further, the four-group type zoom lens according to the fourth embodiment of the present invention is characterized in that the cemented lens of the first group is formed by a compound aspheric lens including the first lens made of a negative glass lens and the second lens made of a positive resin lens.

The four-group type zoom lens thus has the cemented lens of the first group formed by molding using resin. Therefore the thickness of a peripheral part of the second lens formed by the resin can be greatly reduced as compared with a case where glass lenses are joined to each other.

Further, the four-group type zoom lens can be reduced in thickness and cost because the fourth group is integral with an image pickup element for receiving the light of an image and doubles as a protective member. Incidentally, when the fourth group doubles as a protective member for the image pickup element, a degree of difficulty in manufacturing of the four-group type zoom lens can be further decreased by making a surface nearest to the image surface side in the fourth group a plane.

Next, in the four-group type zoom lens according to the third embodiment of the present invention, at least one surface nearest to the object side or nearest to the image surface side in the first group is a spherical shape, and the zoom lens is formed so as to satisfy the following conditional expression (8):

$$|G1R1/G2R2|<1.7 \qquad (8)$$

As with the above-described conditional expression (3), the conditional expression (8) defines so as to prevent the radius of curvature of the second surface of the positive second lens from being too small as compared with the radius of curvature of the first surface of the negative first lens forming the cemented lens of the first group.

When $|G1R1/G2R2|$ exceeds the upper limit value of the conditional expression (8), and sufficient negative power is to be provided by the first group, the radius of curvature of the first surface of the negative first lens or the second surface of the positive second lens forming the cemented lens of the first group becomes too small.

At this time, in the four-group type zoom lens, it is difficult to correct distortion aberration, field curvature, spherical aberration, coma aberration and the like in the wide-angle end state by only an aspheric shape formed as at least one surface nearest to the object side or nearest to the image surface side in the first group, and degradation in optical performance of a peripheral part in the wide-angle end state, in particular, becomes noticeable.

Incidentally, in the four-group type zoom lens, when one of the negative first lens and the positive second lens forming the cemented lens of the first group is made into a spherical lens for cost reduction, the positive second lens preferably has a spherical shape from a viewpoint of aberration correction.

This is because the passing position of rim rays in the wide-angle end state is closer to the optical axis in the positive second lens situated on the image surface side than in the negative first lens situated on the object side, and because the positive second lens has weaker power and thus has a larger radius of curvature than the negative first lens.

As in Patent Document 1, when the first lens has a low index of refraction, and the negative power of the first group is to be strengthened, it is difficult to correct distortion aberration, field curvature, spherical aberration, coma aberration and the like in the wide-angle end state unless the first surface of the negative first lens forming the cemented lens of the first group and the second surface of the positive second lens are both in an aspheric shape.

Thus, in the four-group type zoom lens, by making one of the first lens and the second lens forming the cemented lens of the first group have a spherical shape, it is possible not only to achieve the cost reduction, but also to reduce the cost of the cemented lens because required cementing accuracy is lowered.

Further, in the four-group type zoom lens according to the fourth embodiment of the present invention, the fifth lens in the third group is formed by a resin lens, and the sixth lens in the fourth group at a fixed distance from the image surface is formed by a resin lens. Thereby, focal position variations are cancelled and high performance can be maintained even at times of temperature changes.

Further, the four-group type zoom lens according to the third embodiment of the present invention is formed such that a distance from the aperture stop of the second group to the lens surface vertex of the fourth lens disposed nearest to the image surface side in the second group satisfies the following conditional expression (9):

$$L/(fw*ft)^{1/2} < 0.35 \quad (9)$$

where ft is focal length in the telephoto end state, and L is the distance from the aperture stop disposed in the second group to the lens surface vertex of the fourth lens disposed nearest to the image surface side in the second group.

This conditional expression (9) defines the distance from the aperture stop to the lens surface vertex of the fourth lens disposed nearest to the image surface side in the second group, and defines so as to prevent this distance from becoming too long.

When $L/(fw*ft)^{1/2}$ exceeds the upper limit value of the conditional expression (9), an angle of incidence of rim rays in the wide-angle end state in particular on the fourth lens disposed nearest to the image surface side in the second group is increased, and the occurrence of coma aberration degrades resolution performance. Incidentally, the effects are further enhanced when the upper limit value of the conditional expression (9) is set at 0.25.

<12. Numerical Examples Corresponding to Fourth>Embodiment

Numerical examples in which concrete numerical values are applied to the four-group type zoom lens according to the first embodiment of the present invention will next be described with reference to drawings and tables. In each numerical example, an aspheric surface is expressed by the following Equation 1:

$$x = cy^2/(1+(1-(1+k)c^2y^2)^{1/2}) + Ay^4 + By^6 + \quad (1)$$

where y is height from an optical axis, x is an amount of sag, c is curvature, k is a conic constant, and A, B, . . . are aspheric coefficients.

[12-1. First Numerical Example]

In FIG. 33, reference numeral 1 denotes a zoom lens as a whole in a first numerical example corresponding to the fourth embodiment, which zoom lens is formed by a four-group configuration of a negative first group G1, a positive second group G2, a positive third group G3, and a negative fourth group G4 in order from an object side.

Figure 34A:
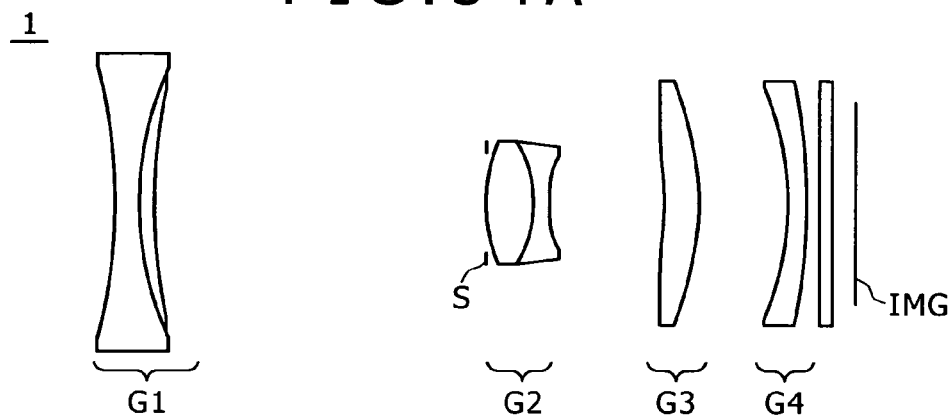
FIGS. 34A, 34B, and 34C are schematic sectional views of lens group arrangements in the first numerical example.
Figure 34B:
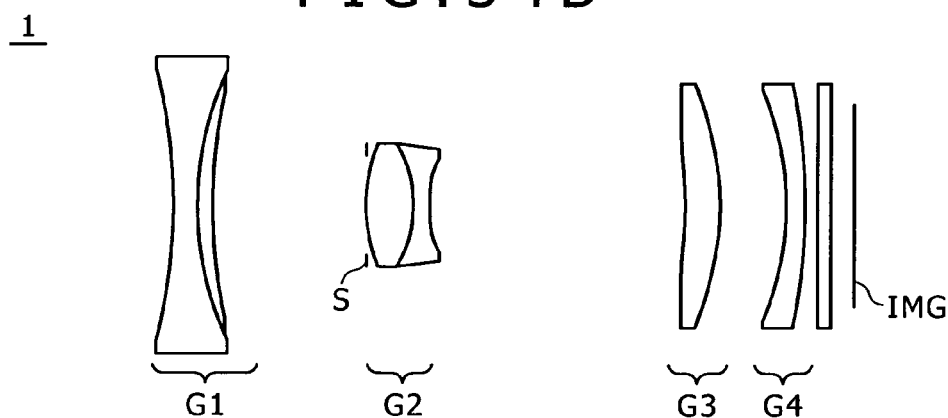
Figure 34C:
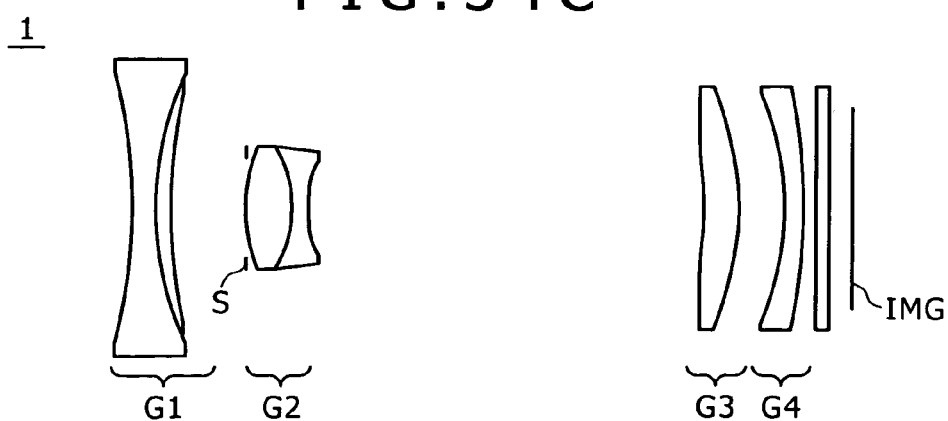

FIGS. 34A, 34B, and 34C show lens group arrangements when the zoom lens 1 in the first numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive aspheric glass lens. The first group G1 as a whole has negative power.

The second group G2 includes a cemented lens L34 formed by joining together a third lens L3 formed of an aspheric positive lens and a fourth lens L4 formed of a negative aspheric lens. An aperture stop S is disposed on the object side of the second group G2. This aperture stop S may be disposed on the image surface side of the second group G2.

The third group G3 includes a single fifth lens L5 formed by a positive resin lens. The fourth group G4 includes a single sixth lens L6 formed by a negative resin lens at a fixed distance from an image surface IMG.

Incidentally, an IR cutoff filter CF and a seal glass SG for protecting an image surface IMG are disposed between the fourth group G4 and the image surface IMG in the zoom lens 1.

The following Tables 51 to 55 show specification values of the first numerical example corresponding to the fourth embodiment. In the specification tables in the first numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 52 means a plane.

TABLE 51

|  | WIDE | MID | TELE |
|---|---|---|---|
| f | 6.00 | 11.02 | 16.95 |
| FNO | 3.17 | 4.32 | 5.65 |
| ω | 30.37 | 19.37 | 12.90 |

TABLE 52

|  | Radius of curvature | Surface interval | Index of refraction (d) | Abbe number (d) |
|---|---|---|---|---|
| 1(ASP) | −23.9159 | 0.800 | 1.61881 | 63.86 |
| 2 | 9.2419 | 0.706 | 1.75211 | 25.05 |
| 3(ASP) | 14.6182 | Variable |  |  |
| Aperture stop | ∞ | 0.000 |  |  |
| 5(ASP) | 4.5544 | 1.700 | 1.85135 | 40.10 |
| 6 | −3.5891 | 0.400 | 1.71736 | 29.50 |
| 7(ASP) | 5.1802 | Variable |  |  |
| 8(ASP) | −33.7631 | 1.589 | 1.52500 | 56.45 |
| 9(ASP) | −5.5357 | Variable |  |  |
| 10(ASP) | −9.0000 | 0.700 | 1.52500 | 56.45 |
| 11 | −22.2619 | 0.300 |  |  |
| 12 | ∞ | 0.300 | 1.56883 | 56.04 |
| 13 | ∞ | 1.100 |  |  |
| IMG | ∞ | 0.000 |  |  |

Incidentally, a first surface, a third surface, a fifth surface, a seventh surface, an eight surface, a ninth surface, and a tenth surface have an aspheric shape, and the aspheric coefficients of the surfaces are as shown in Table 3. Incidentally, for example, "0.26029E-05" denotes "0.26029×10$^{-5}$."

TABLE 53

| Surface number | κ | A | B | C | D |
|---|---|---|---|---|---|
| s2 | 0.00000E+00 | −4.55000E−04 | 1.60000E−05 | −7.23533E−08 | −4.05157E−09 |
| s4 | 0.00000E+00 | −5.68000E−04 | 2.00000E−05 | 1.34638E−07 | −1.63442E−08 |
| s10 | 0.00000E+00 | −1.20000E−05 | −1.80000E−05 | −2.60000E−05 | 1.00000E−06 |
| s12 | 0.00000E+00 | 4.59200E−03 | 2.15000E−05 | −3.50000E−05 | 4.00000E−06 |
| s15 | 0.00000E+00 | −3.18000E−04 | −8.00000E−06 | 7.00000E−06 | −2.46357E−07 |
| s16 | 0.00000E+00 | 1.17600E−03 | −4.70000E−05 | 1.20000E−05 | −3.77752E−07 |
| s17 | 0.00000E+00 | −1.15300E−03 | 1.28000E−04 | −1.00000E−06 | −1.83161E−07 |

Next, variable intervals when a lens position state changes in the zoom lens 1 according to the first numerical example are shown in the following Table 54. In the zoom lens 1, the first group G1, the second group G2, and the third group G3 are all movable, and the fourth group G4 is at a fixed distance from the image surface IMG.

In the zoom lens 1, variable power is achieved mainly by changing an interval between the first group G1 and the second group G2, and focal position variation at each angle of view is absorbed by moving the third group G3, whereby high performance can be ensured while maintaining miniaturization.

TABLE 54

|  | WIDE | MID | TELE |
|---|---|---|---|
| D3 | 10.916 | 4.008 | 1.000 |
| D7 | 3.966 | 8.801 | 13.646 |
| D9 | 2.702 | 2.198 | 1.700 |

Next, the focal lengths and group thicknesses of the first to fourth groups G1 to G4 in the zoom lens 1 are shown in Table 55.

TABLE 55

|  | First group | Second group | Third group | Fourth group |
|---|---|---|---|---|
| f | −15.7069 | 9.065 | 12.32 | −29.19 |
| L | 1.505984 | 2.1 | 1.589 | 1.3 |

The following Table 56 shows conditional expression correspondence values in the zoom lens 1 according to the first numerical example.

TABLE 56

|  |  | First example |
|---|---|---|
| Conditional expression (1) | nd(G1) | 1.61881 |
| Conditional expression (2) | vd(G2) | 25.05 |
| Conditional expression (3) | |G1R1/G2R2| | 1.6360359 |
| Conditional expression (4) | G1R1/fw | −3.98595 |
| Conditional expression (5) | G2R2/fw | 2.4363464 |
| Conditional expression (6) | f3/f1 | −0.784375 |
| Conditional expression (7) | f4/f1 | 1.8583107 |
| Conditional expression (8) | |G1R1/G2R2| | 1.6360359 |
| Conditional expression (9) | $L/(fw * ft)^{1/2}$ | 0.2082292 |

Figure 35A:
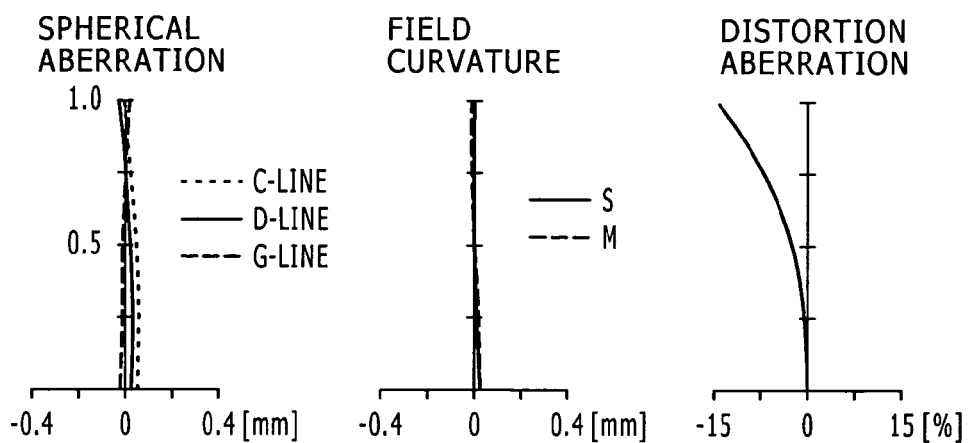
FIGS. 35A, 35B, and 35C are characteristic curve diagrams showing various aberrations in the first numerical example.
Figure 35B:
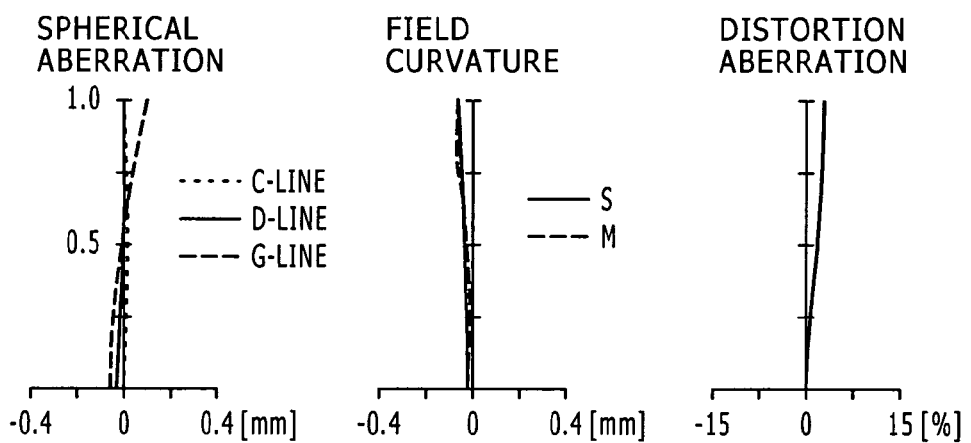
Figure 35C:
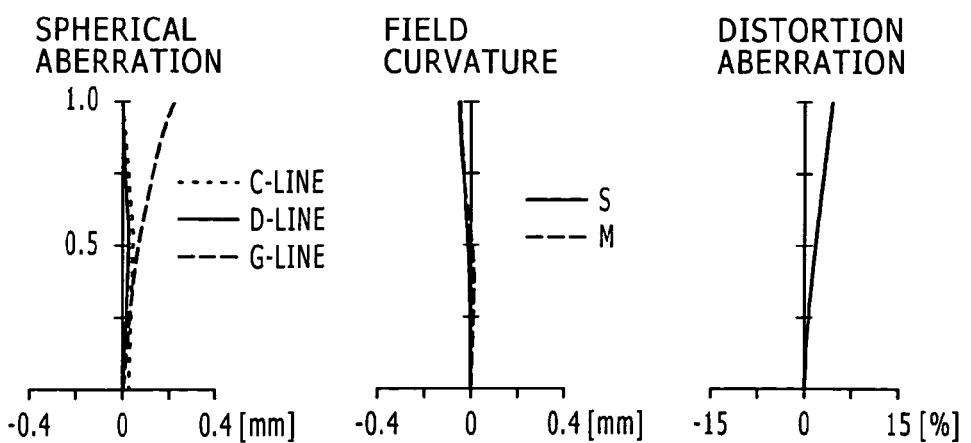

Next, FIGS. 35A, 35B, and 35C are diagrams of various aberrations in an infinity focused state of the first numerical example. FIG. 35A shows various aberrations in a wide-angle end state (ω=30.37 degrees). FIG. 35B shows various aberrations in an intermediate focal length state (ω=19.37 degrees). FIG. 35C shows various aberrations in a telephoto end state (ω=12.90 degrees).

In FIGS. 35A to 35C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 35A to 35C show that the zoom lens 1 according to the first numerical example excellently corrects various aberrations even though reduced in thickness and miniaturized, and has excellent image forming performance.

[12-2. Second Numerical Example]

Figure 36:
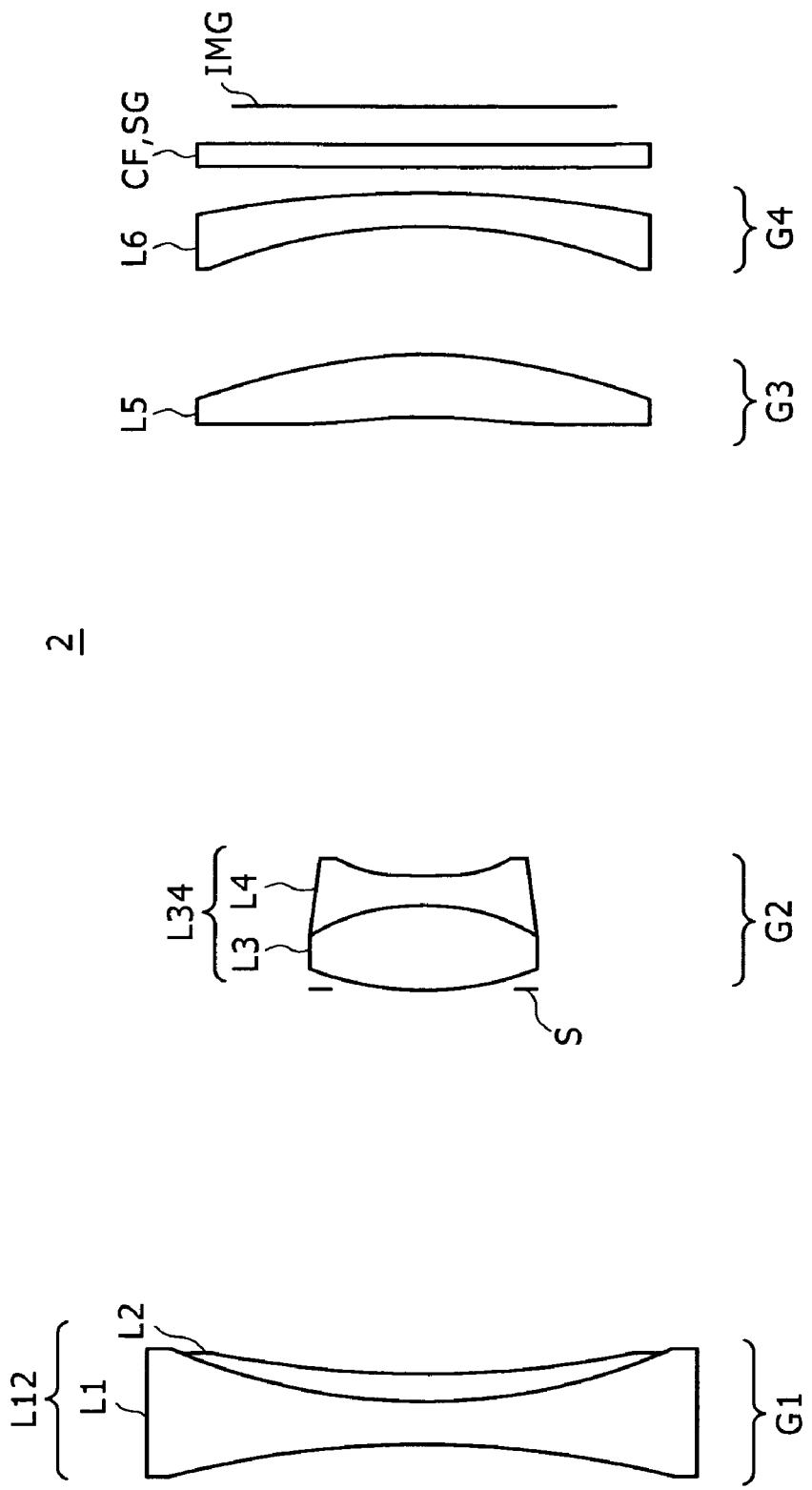
FIG. 36 is a schematic sectional view of a configuration of a zoom lens according to a second numerical example.

In FIG. 36, reference numeral 2 denotes a zoom lens as a whole in a second numerical example corresponding to the fourth embodiment, which zoom lens is formed by a four-group configuration of a negative first group G1, a positive second group G2, a positive third group G3, and a negative fourth group G4 in order from an object side.

Figure 37A:
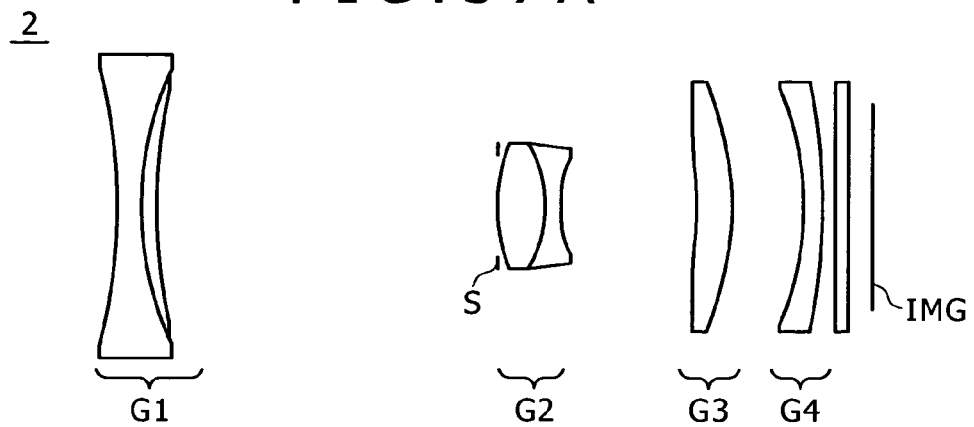
FIGS. 37A, 37B, and 37C are schematic sectional views of lens group arrangements in the second numerical example.
Figure 37B:
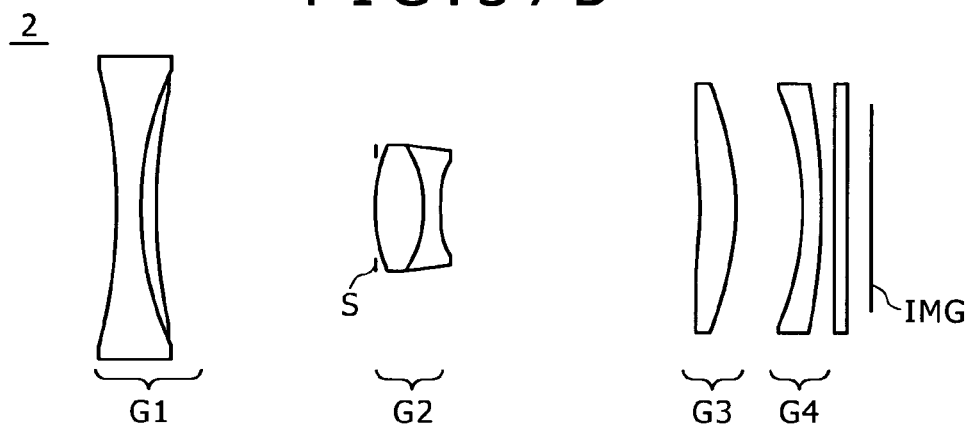
Figure 37C:

FIGS. 37A, 37B, and 37C show lens group arrangements when the zoom lens 2 in the second numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive aspheric glass lens. The first group G1 as a whole has negative power.

The second group G2 includes a cemented lens L34 formed by joining together a third lens L3 formed of an aspheric positive lens and a fourth lens L4 formed of a negative aspheric lens. An aperture stop S is disposed on the object side of the second group G2. This aperture stop. S may be disposed on the image surface side of the second group G2.

The third group G3 includes a single fifth lens L5 formed by a positive resin lens. The fourth group G4 includes a single sixth lens L6 formed by a negative resin lens at a fixed distance from an image surface IMG.

Incidentally, an IR cutoff filter CF and a seal glass SG for protecting an image surface IMG are disposed between the fourth group G4 and the image surface IMG in the zoom lens 2.

The following Tables 57 to 62 show specification values of the second numerical example corresponding to the fourth embodiment. In the specification tables in the second numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 58 means a plane.

TABLE 57

|     | WIDE  | MID   | TELE  |
|-----|-------|-------|-------|
| f   | 6.18  | 11.37 | 17.46 |
| FNO | 3.25  | 4.43  | 5.84  |
| ω   | 29.63 | 18.82 | 12.53 |

TABLE 58

|            | Radius of curvature | Surface interval | Index of refraction (d) | Abbe number (d) |
|------------|---------------------|------------------|-------------------------|-----------------|
| 1 (ASP)    | -13.8614            | 0.800            | 1.61881                 | 63.86           |
| 2          | 9.6227              | 0.708            | 1.75211                 | 25.05           |
| 3          | 20.9270             | Variable         |                         |                 |
| Aperture stop | ∞                | 0.000            |                         |                 |
| 5 (ASP)    | 4.8089              | 1.700            | 1.85135                 | 40.10           |
| 6          | -4.1162             | 0.543            | 1.72825                 | 28.32           |
| 7 (ASP)    | 6.1186              | Variable         |                         |                 |
| 8 (ASP)    | -33.8000            | 1.568            | 1.52500                 | 56.45           |
| 9 (ASP)    | -5.5474             | Variable         |                         |                 |
| 10 (ASP)   | -9.0000             | 0.700            | 1.52500                 | 56.45           |
| 11         | -29.7576            | 0.300            |                         |                 |
| 12         | ∞                   | 0.300            | 1.56883                 | 56.04           |
| 13         | ∞                   | 1.100            |                         |                 |
| IMG        | ∞                   | 0.000            |                         |                 |

Incidentally, a first surface, a fifth surface, a seventh surface, an eight surface, a ninth surface, and a tenth surface have an aspheric shape, and the aspheric coefficients of the surfaces are as shown in Table 59. Incidentally, for example, "0.26029E-05" denotes "0.26029×10$^{-5}$."

TABLE 59

| Surface number | κ          | A            | B            | C            | D            |
|----------------|------------|--------------|--------------|--------------|--------------|
| s2             | 0.00000E+00 | 2.11582E-04  | -8.00000E-06 | 2.47493E-07  | -3.46199E-09 |
| s10            | 0.00000E+00 | 3.03342E-04  | -3.00000E-05 | 5.05382E-08  | -1.00000E-06 |
| s12            | 0.00000E+00 | 4.33733E-03  | -2.80000E-05 | 1.02059E-04  | -1.60000E-05 |
| s15            | 0.00000E+00 | 4.66092E-04  | -1.08968E-04 | 1.20000E-05  | -3.46499E-07 |
| s16            | 0.00000E+00 | 2.66064E-03  | -2.33248E-04 | 2.10000E-05  | -1.00000E-06 |
| s17            | 0.00000E+00 | 1.61261E-03  | -3.02924E-04 | 2.60000E-05  | -1.00000E-06 |

Next, variable intervals when a lens position state changes in the zoom lens 2 according to the second numerical example are shown in Table 60 below. In the zoom lens 2, the first group G1, the second group G2, and the third group G3 are all movable, and the fourth group G4 is fixed relative to the image surface IMG.

In the zoom lens 2, variable power is achieved mainly by changing an interval between the first group G1 and the second group G2, and focal position variation at each angle of view is absorbed by moving the third group G3, whereby high performance can be ensured while maintaining miniaturization.

TABLE 60

|    | WIDE   | MID   | TELE   |
|----|--------|-------|--------|
| D3 | 10.513 | 3.874 | 1.136  |
| D7 | 4.553  | 9.489 | 14.686 |
| D9 | 2.622  | 2.250 | 1.731  |

Next, the focal lengths and group thicknesses of the first to fourth groups G1 to G4 in the zoom lens 2 are shown in Table 61.

TABLE 61

|   | First group | Second group | Third group | Fourth group |
|---|-------------|--------------|-------------|--------------|
| f | -14.78      | 9.08         | 12.35       | -24.76       |
| L | 1.508       | 2.243        | 1.568       | 1.300        |

The following Table 62 shows conditional expression correspondence values in the zoom lens 2 according to the second numerical example.

TABLE 62

|                          |                  | Second example |
|--------------------------|------------------|----------------|
| Conditional expression (1) | nd (G1)         | 1.6188         |
| Conditional expression (2) | vd (G2)         | 25.0461        |
| Conditional expression (3) | \|G1R1/G2R2\|   | 0.6624         |
| Conditional expression (4) | G1R1/fw         | -2.2429        |
| Conditional expression (5) | G2R2/fw         | 3.3862         |
| Conditional expression (6) | f3/f1           | -0.8358        |
| Conditional expression (7) | f4/f1           | 1.6754         |
| Conditional expression (8) | \|G1R1/G2R2\|   | 0.6624         |
| Conditional expression (9) | L/(fw * ft)$^{1/2}$ | 0.2160     |

Figure 38A:
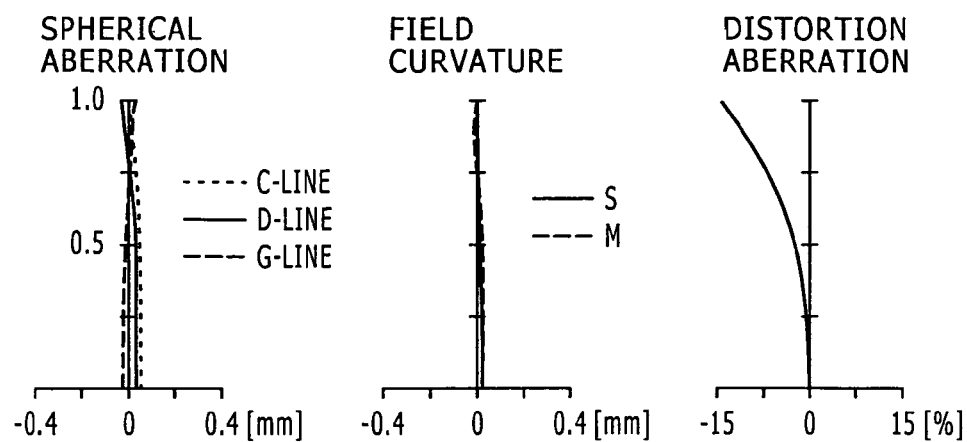
FIGS. 38A, 38B, and 38C are characteristic curve diagrams showing various aberrations in the second numerical example.
Figure 38B:
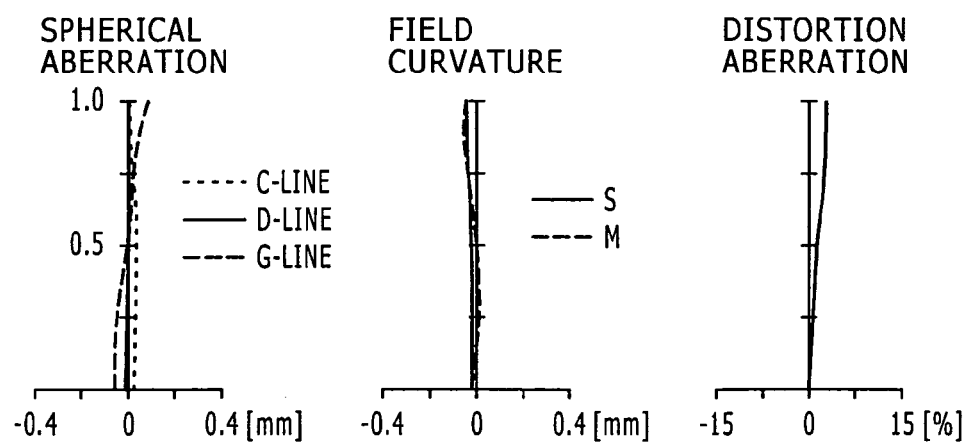
Figure 38C:
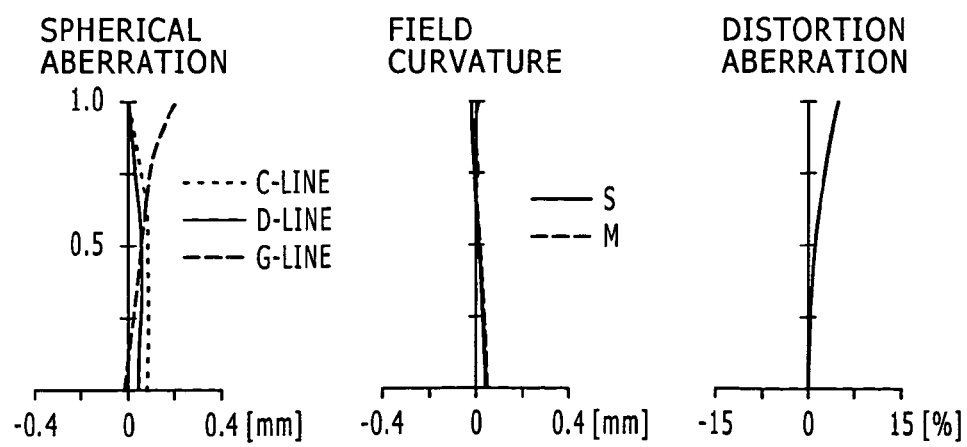

Next, FIGS. 38A, 38B, and 38C are diagrams of various aberrations in an infinity focused state of the second numerical example. FIG. 38A shows various aberrations in a wide-angle end state (ω=29.63 degrees). FIG. 38B shows various aberrations in an intermediate focal length state (ω=18.82 degrees). FIG. 38C shows various aberrations in a telephoto end state (ω=12.53 degrees).

In FIGS. 38A to 38C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 38A to 38C show that the zoom lens 2 according to the second numerical example excellently corrects various aberrations even though reduced in thickness and miniaturized, and has excellent image forming performance.

[12-3. Third Numerical Example]

In FIG. 39, reference numeral 3 denotes a zoom lens as a whole in a third numerical example corresponding to the fourth embodiment, which zoom lens is formed by a four-group configuration of a negative first group G1, a positive second group G2, a positive third group G3, and a negative fourth group G4 in order from an object side.

Figure 40A:
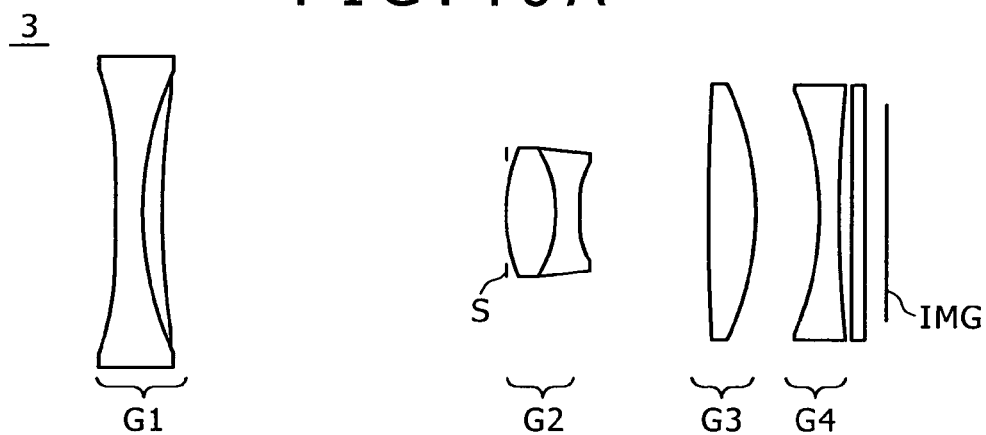
FIGS. 40A, 40B, and 40C are schematic sectional views of lens group arrangements in the third numerical example.
Figure 40B:
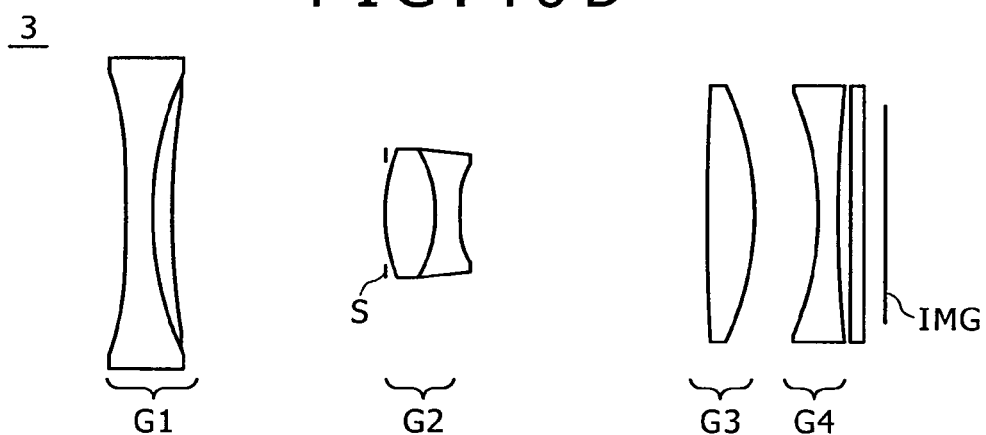
Figure 40C:

FIGS. 40A, 40B, and 40C show lens group arrangements when the zoom lens 3 in the third numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive resin lens. The first group G1 as a whole has negative power.

The second group G2 includes a cemented lens L34 formed by joining together a third lens L3 formed of an aspheric positive lens and a fourth lens L4 formed of a negative aspheric lens. An aperture stop S is disposed on the object side of the second group G2. This aperture stop S may be disposed on the image surface side of the second group G2.

The third group G3 includes a single fifth lens L5 formed by a positive resin lens. The fourth group G4 includes a single sixth lens L6 formed by a negative resin lens at a fixed distance from an image surface IMG.

Incidentally, an IR cutoff filter CF and a seal glass SG for protecting an image surface IMG are disposed between the fourth group G4 and the image surface IMG in the zoom lens 3.

The following Tables 63 to 68 show specification values of the third numerical example corresponding to the fourth embodiment. In the specification tables in the third numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 64 means a plane.

TABLE 63

|  | WIDE | MID | TELE |
|---|---|---|---|
| f | 6.12 | 11.24 | 17.30 |
| FNO | 3.18 | 4.35 | 5.74 |
| ω | 29.86 | 19.01 | 12.65 |

TABLE 64

|  | Radius of curvature | Surface interval | Index of refraction (d) | Abbe number (d) |
|---|---|---|---|---|
| 1 | −16.6543 | 0.700 | 1.61881 | 63.86 |
| 2 | 8.8000 | 0.922 | 1.60700 | 26.39 |
| 3 (ASP) | 23.6040 | Variable |  |  |
| Aperture stop | ∞ | 0.000 |  |  |
| 5 (ASP) | 5.0143 | 1.650 | 1.85135 | 40.10 |
| 6 | −4.3092 | 0.800 | 1.72825 | 28.32 |
| 7 (ASP) | 6.3487 | Variable |  |  |
| 8 | 140.8180 | 2.000 | 1.52500 | 56.45 |
| 9 (ASP) | −5.7760 | Variable |  |  |
| 10 (ASP) | −11.1321 | 0.650 | 1.52500 | 56.45 |
| 11 | 51.0477 | 0.300 |  |  |
| 12 | ∞ | 0.300 | 1.56883 | 56.04 |
| 13 | ∞ | 1.100 |  |  |
| IMG | ∞ | 0.000 |  |  |

Incidentally, a third surface, a fifth surface, a seventh surface, a ninth surface, and a tenth surface have an aspheric shape, and the aspheric coefficients of the surfaces are as shown in Table 65. Incidentally, for example, "0.26029E-05" denotes "$0.26029 \times 10^{-5}$."

TABLE 65

| Surface number | κ | A | B | C | D |
|---|---|---|---|---|---|
| s4 | 0.00000E+00 | −2.03000E−04 | 9.00000E−06 | −3.69221E−07 | 5.70660E−09 |
| s10 | 0.00000E+00 | −1.12000E−04 | −1.30000E−05 | −2.00000E−06 | −1.00000E−06 |
| s12 | 0.00000E+00 | 3.72100E−03 | 5.20000E−05 | 3.50000E−05 | −5.00000E−06 |
| s16 | 0.00000E+00 | 1.74400E−03 | −1.60000E−05 | 1.00000E−06 | −2.33298E−09 |
| s17 | 0.00000E+00 | −3.49000E−04 | 8.10000E−05 | −4.00000E−06 | 4.11833E−08 |

Next, variable intervals when a lens position state changes in the zoom lens 3 according to the third numerical example are shown in the following Table 66. In the zoom lens 3, the first group G1, the second group G2, and the third group G3 are all movable, and the fourth group G4 is fixed with respect to the image surface IMG.

In the zoom lens 3, variable power is achieved mainly by changing an interval between the first group G1 and the second group G2, and focal position variation at each angle of view is absorbed by moving the third group G3, whereby high performance can be ensured while maintaining miniaturization.

TABLE 66

|  | WIDE | MID | TELE |
|---|---|---|---|
| D3 | 10.603 | 3.814 | 1.000 |
| D7 | 4.479 | 9.469 | 14.763 |
| D9 | 2.275 | 1.996 | 1.600 |

Next, the focal lengths and group thicknesses of the first to fourth groups G1 to G4 in the zoom lens 3 are shown in Table 67.

TABLE 67

|   | First group | Second group | Third group | Fourth group |
|---|---|---|---|---|
| f | −15.34 | 9.34 | 10.57 | −17.27 |
| L | 1.622 | 2.450 | 2.000 | 1.250 |

The following Table 68 shows conditional expression correspondence values in the zoom lens 3 according to the third numerical example.

TABLE 68

|   |   | Third example |
|---|---|---|
| Conditional expression (1) | nd (G1) | 1.61881 |
| Conditional expression (2) | vd (G2) | 26.39016 |
| Conditional expression (3) | |G1R1/G2R2| | 0.705571 |
| Conditional expression (4) | G1R1/fw | −2.7203 |
| Conditional expression (5) | G2R2/fw | 3.855452 |
| Conditional expression (6) | f3/f1 | −0.68931 |
| Conditional expression (7) | f4/f1 | 1.125997 |
| Conditional expression (8) | |G1R1/G2R2| | 0.705571 |
| Conditional expression (9) | $L/(fw * ft)^{1/2}$ | 0.238083 |

Figure 41A:
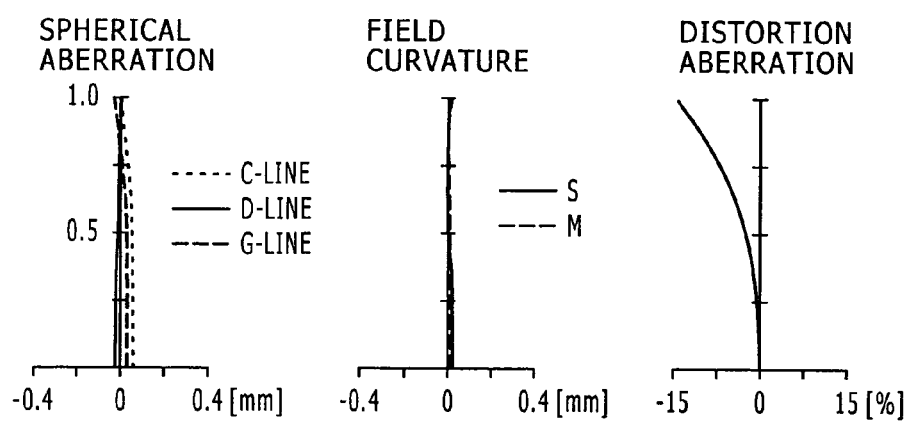
FIGS. 41A, 41B, and 41C are characteristic curve diagrams showing various aberrations in the third numerical example.
Figure 41B:
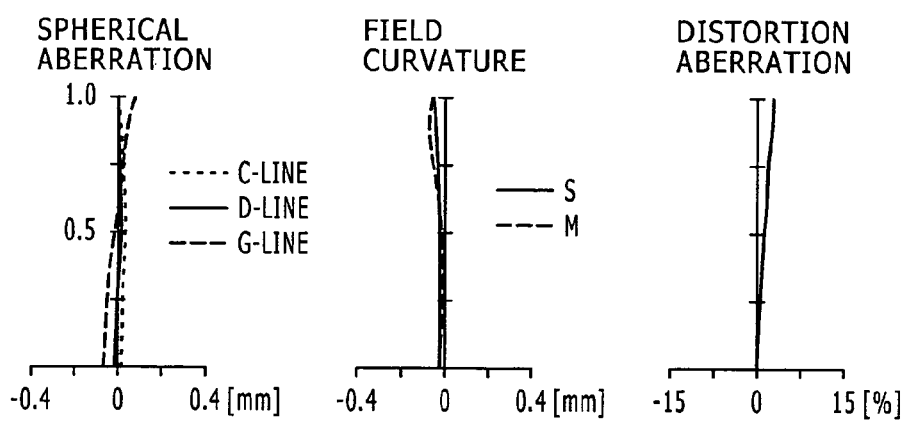
Figure 41C:
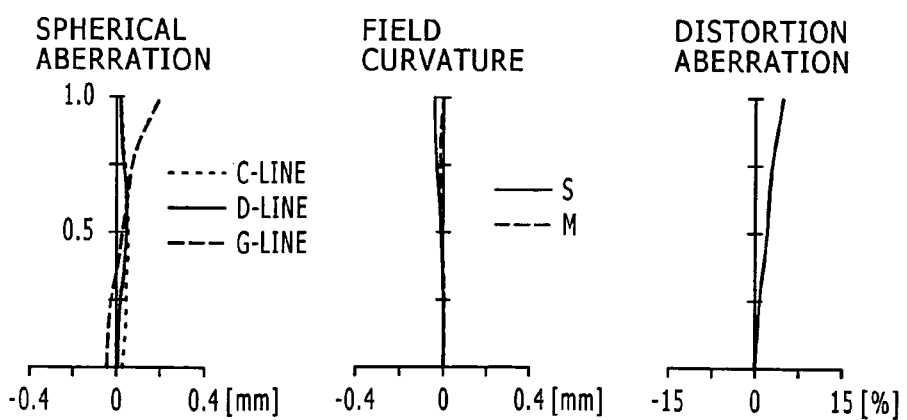

Next, FIGS. 41A, 41B, and 41C are diagrams of various aberrations in an infinity focused state of the third numerical example. FIG. 41A shows various aberrations in a wide-angle end state (ω=29.86 degrees). FIG. 41B shows various aberrations in an intermediate focal length state (ω=19.01 degrees). FIG. 41C shows various aberrations in a telephoto end state (ω=12.65 degrees).

In FIGS. 41A to 41C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 41A to 41C show that the zoom lens 3 according to the third numerical example excellently corrects various aberrations even though reduced in thickness and miniaturized, and has excellent image forming performance.

[12-4. Fourth Numerical Example]

In FIG. 42, reference numeral 4 denotes a zoom lens as a whole in a fourth numerical example corresponding to the fourth embodiment, which zoom lens is formed by a four-group configuration of a negative first group G1, a positive second group G2, a positive third group G3, and a negative fourth group G4 in order from an object side.

Figure 43A:
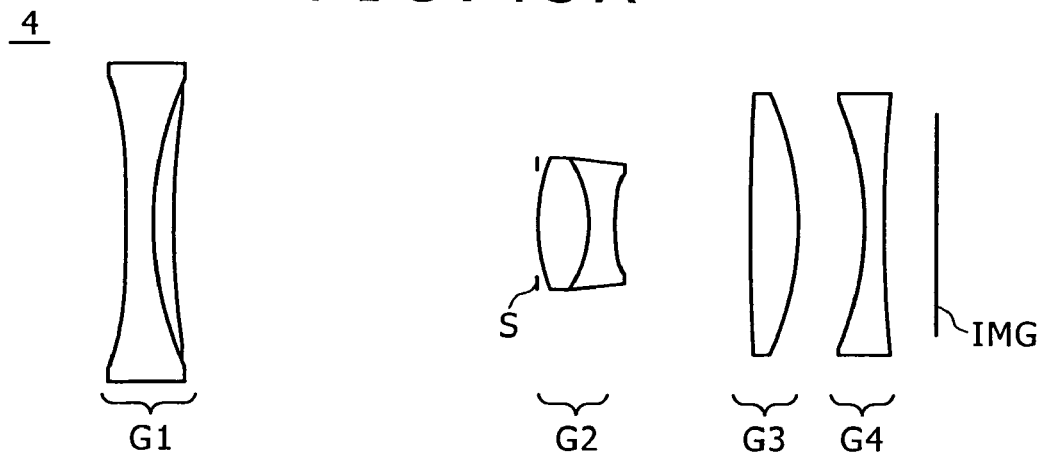
FIGS. 43A, 43B, and 43C are schematic sectional views of lens group arrangements in the fourth numerical example.
Figure 43B:
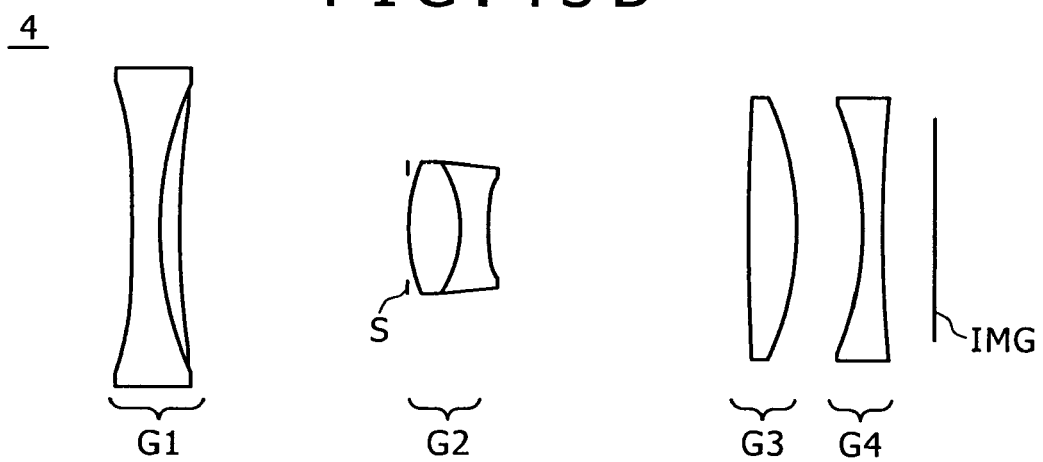
Figure 43C:
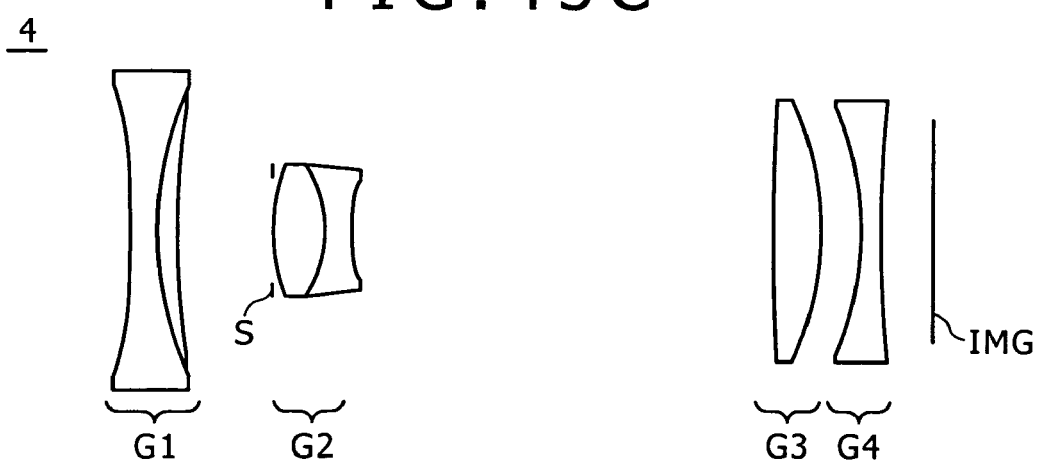

FIGS. 43A, 43B, and 43C show lens group arrangements when the zoom lens 4 in the fourth numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive resin lens. The first group G1 as a whole has negative power.

The second group G2 includes a cemented lens L34 formed by joining together a third lens L3 formed of an aspheric positive lens and a fourth lens L4 formed of a negative aspheric lens. An aperture stop S is disposed on the object side of the second group G2. This aperture stop S may be disposed on the image surface side of the second group G2.

The third group G3 includes a single fifth lens L5 formed by a positive resin lens. The fourth group G4 includes a single sixth lens L6 formed by a negative resin lens at a fixed distance from an image surface IMG.

In this case, the sixth lens L6 in the fourth group G4 doubles as a protective member such as a seal glass or the like for the image surface IMG, thereby achieving further reduction in thickness and size. Incidentally, the sixth lens L6 in the fourth group G4 may not only double as the protective member but also double as an IR cutoff filter CF.

The following Tables 69 to 74 show specification values of the fourth numerical example corresponding to the fourth embodiment. In the specification tables in the fourth numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 70 means a plane.

TABLE 69

|   | WIDE | MID | TELE |
|---|---|---|---|
| f | 6.13 | 11.25 | 17.31 |
| FNO | 3.19 | 4.35 | 5.75 |
| ω | 29.85 | 19.01 | 12.64 |

TABLE 70

|   | Radius of curvature | Surface interval | Index of refraction (d) | Abbe number (d) |
|---|---|---|---|---|
| 1 | −16.5839 | 0.700 | 1.61881 | 63.86 |
| 2 | 8.9116 | 0.919 | 1.60700 | 26.39 |
| 3 (ASP) | 24.0908 | Variable |   |   |
| Aperture stop | ∞ | 0.000 |   |   |
| 5 (ASP) | 5.0497 | 1.661 | 1.85135 | 40.10 |
| 6 | −4.2973 | 0.800 | 1.72825 | 28.32 |
| 7 (ASP) | 6.4115 | Variable |   |   |
| 8 | 113.3270 | 2.000 | 1.52500 | 56.45 |
| 9 (ASP) | −5.8280 | Variable |   |   |
| 10 (ASP) | −11.1600 | 0.650 | 1.52500 | 56.45 |
| 11 | 51.7044 | 1.500 |   |   |
| IMG | ∞ | 0.000 |   |   |

Incidentally, a third surface, a fifth surface, a seventh surface, a ninth surface, and a tenth surface have an aspheric shape, and the aspheric coefficients of the surfaces are as shown in Table 70. Incidentally, for example, "0.26029E-05" denotes "$0.26029 \times 10^{-5}$."

TABLE 71

| Surface number | κ | A | B | C | D |
|---|---|---|---|---|---|
| s4 | 0.00000E+00 | −1.99000E−04 | 9.00000E−06 | −3.54641E−07 | 5.27962E−09 |
| s10 | 0.00000E+00 | 1.18000E−04 | −2.10000E−05 | 1.76124E−07 | −1.00000E−06 |
| s12 | 0.00000E+00 | 3.66500E−03 | 3.60000E−05 | 4.00000E−05 | −6.00000E−06 |
| s16 | 0.00000E+00 | 1.67600E−03 | −1.10000E−05 | 3.74608E−07 | −1.04781E−09 |
| s17 | 0.00000E+00 | −6.58000E−04 | 1.12000E−04 | −5.00000E−06 | 5.03713E−08 |

Next, variable intervals when a lens position state changes in the zoom lens 4 according to the fourth numerical example are shown in the following Table 72. In the zoom lens 4, the first group G1, the second group G2, and the third group G3 are all movable, and the fourth group G4 is at a fixed with respect to the image surface IMG.

In the zoom lens 4, variable power is achieved mainly by changing an interval between the first group G1 and the second group G2, and focal position variation at each angle of view is absorbed by moving the third group G3, whereby high performance can be ensured while maintaining miniaturization.

TABLE 72

|  | WIDE | MID | TELE |
|---|---|---|---|
| D3 | 10.603 | 3.814 | 1.000 |
| D7 | 4.479 | 9.469 | 14.763 |
| D9 | 2.275 | 1.996 | 1.600 |

Next, the focal lengths and group thicknesses of the first to fourth groups G1 to G4 in the zoom lens 4 are shown in Table 73.

TABLE 73

|  | First group | Second group | Third group | Fourth group |
|---|---|---|---|---|
| f | −15.43 | 9.37 | 10.58 | −17.35 |
| L | 1.619 | 2.461 | 2.000 | 0.650 |

The following Table 74 shows conditional expression correspondence values in the zoom lens 4 according to the fourth numerical example.

TABLE 74

|  |  | Fourth example |
|---|---|---|
| Conditional expression (1) | nd(G1) | 1.61881 |
| Conditional expression (2) | vd(G2) | 26.39016 |
| Conditional expression (3) | |G1R1/G2R2| | 0.688391 |
| Conditional expression (4) | G1R1/fw | −2.70752 |
| Conditional expression (5) | G2R2/fw | 3.933108 |
| Conditional expression (6) | f3/f1 | −0.68519 |
| Conditional expression (7) | f4/f1 | 1.124044 |
| Conditional expression (8) | |G1R1/G2R2| | 0.688391 |
| Conditional expression (9) | $L/(fw * ft)^{1/2}$ | 0.239004 |

Figure 44A:
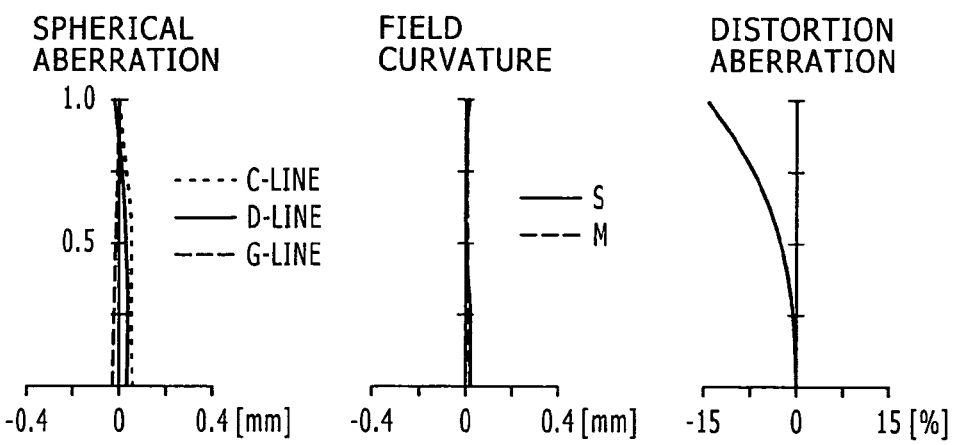
FIGS. 44A, 44B, and 44C are characteristic curve diagrams showing various aberrations in the fourth numerical example.
Figure 44B:
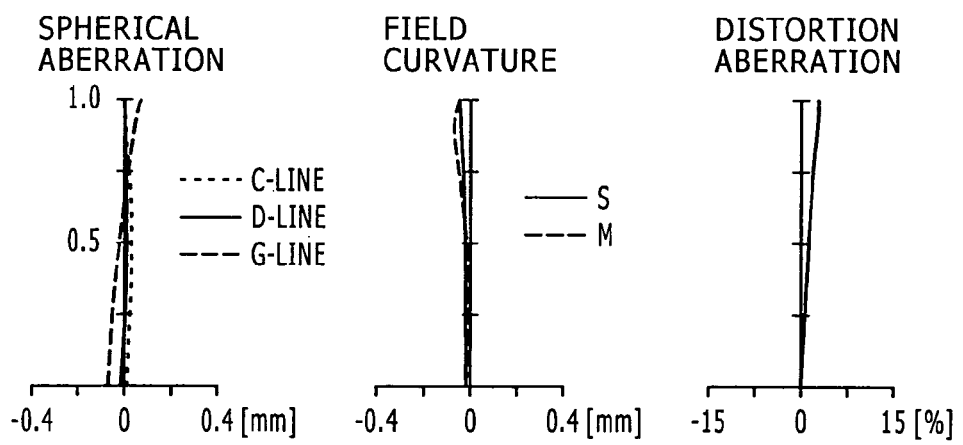
Figure 44C:
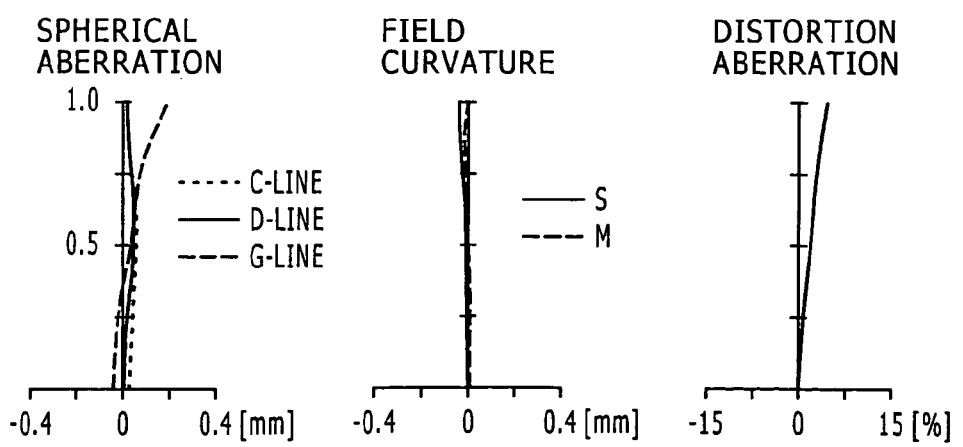

Next, FIGS. 44A, 44B, and 44C are diagrams of various aberrations in an infinity focused state of the first numerical example. FIG. 44A shows various aberrations in a wide-angle end state (ω=29.85 degrees). FIG. 44B shows various aberrations in an intermediate focal length state (ω=19.01 degrees). FIG. 44C shows various aberrations in a telephoto end state (ω=12.64 degrees).

In FIGS. 44A to 44C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 44A to 44C show that the zoom lens 4 according to the fourth numerical example excellently corrects various aberrations even though reduced in thickness and miniaturized, and has excellent image forming performance.

[12-5. Fifth Numerical Example]

In FIG. 45, reference numeral 5 denotes a zoom lens as a whole in a fifth numerical example corresponding to the fourth embodiment, which zoom lens is formed by a four-group configuration of a negative first group G1, a positive second group G2, a positive third group G3, and a negative fourth group G4 in order from an object side.

Figure 46A:
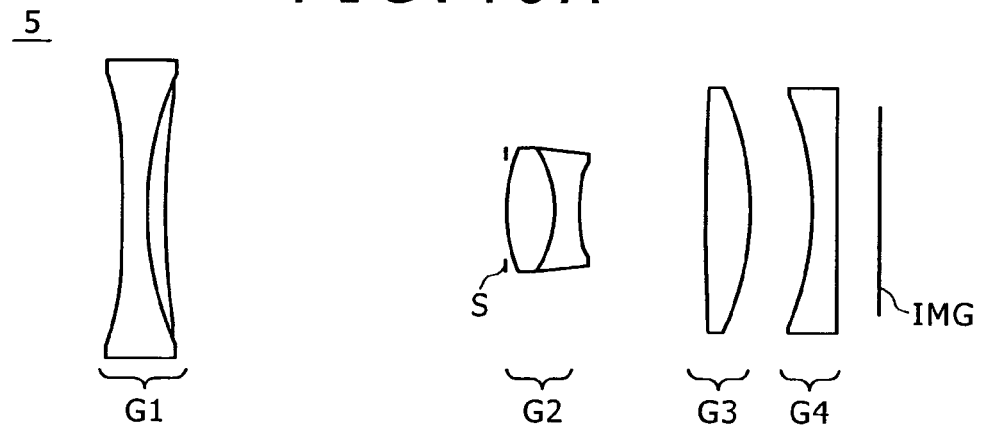
FIGS. 46A, 46B, and 46C are schematic sectional views of lens group arrangements in the fifth numerical example.
Figure 46B:
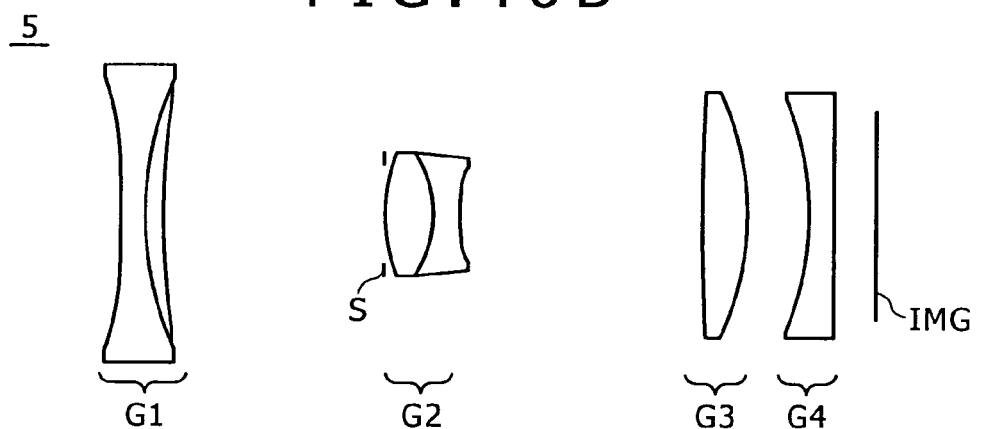
Figure 46C:

FIGS. 46A, 46B, and 46C show lens group arrangements when the zoom lens 5 in the fifth numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive resin lens. The first group G1 as a whole has negative power.

The second group G2 includes a cemented lens L34 formed by joining together a third lens L3 formed of an aspheric positive lens and a fourth lens L4 formed of a negative aspheric lens. An aperture stop S is disposed on the object side of the second group G2. This aperture stop S may be disposed on the image surface side of the second group G2.

The third group G3 includes a single fifth lens L5 formed by a positive resin lens. The fourth group G4 includes a single sixth lens L6 formed by a negative resin lens that is at a fixed distance from an image surface IMG and which has a plane as the second surface of the fourth group G4.

In this case, the sixth lens L6 in the fourth group G4 doubles as a protective member such as a seal glass or the like for the image surface IMG, thereby achieving further reduction in thickness and size. Incidentally, the sixth lens L6 in the fourth group G4 may not only double as the protective member but also double as an IR cutoff filter CF.

The following Tables 75 to 80 show specification values of the fifth numerical example corresponding to the fourth embodiment. In the specification tables in the fifth numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 76 means a plane.

TABLE 75

|  | WIDE | MID | TELE |
|---|---|---|---|
| f | 6.14 | 11.28 | 17.35 |
| FNO | 3.19 | 4.35 | 5.75 |
| ω | 29.78 | 18.96 | 12.61 |

TABLE 76

|  | Radius of curvature | Surface interval | Index of refraction (d) | Abbe number (d) |
|---|---|---|---|---|
| 1 | −16.4857 | 0.700 | 1.61881 | 63.86 |
| 2 | 8.9832 | 0.912 | 1.60700 | 26.39 |
| 3 (ASP) | 24.1963 | Variable |  |  |
| Aperture stop | ∞ | 0.000 |  |  |
| 5 (ASP) | 5.0262 | 1.650 | 1.85135 | 40.10 |
| 6 | −4.2860 | 0.800 | 1.72825 | 28.32 |
| 7 (ASP) | 6.3924 | Variable |  |  |
| 8 | 362.5150 | 1.997 | 1.52500 | 56.45 |
| 9 (ASP) | −5.7225 | Variable |  |  |
| 10 (ASP) | −9.2348 | 0.650 | 1.52500 | 56.45 |
| 11 | ∞ | 0.300 |  |  |
| IMG | ∞ | 0.000 |  |  |

Incidentally, a third surface, a fifth surface, a seventh surface, a ninth surface, and a tenth surface have an aspheric shape, and the aspheric coefficients of the surfaces are as shown in Table 77. Incidentally, for example, "0.26029E-05" denotes "$0.26029 \times 10^{-5}$."

TABLE 77

| Surface number | κ | A | B | C | D |
|---|---|---|---|---|---|
| s4 | 0.00000E+00 | −1.99689E−04 | 9.00000E−06 | −3.48763E−07 | 4.94396E−09 |
| s10 | 0.00000E+00 | 1.18758E−04 | −1.80000E−05 | −1.00000E−06 | −1.00000E−06 |
| s12 | 0.00000E+00 | 3.67546E−03 | 8.70000E−05 | 1.90000E−05 | −2.00000E−06 |
| s16 | 0.00000E+00 | 1.72369E−03 | −1.20000E−05 | 4.49576E−07 | −1.42012E−09 |
| s17 | 0.00000E+00 | −3.11446E−04 | 1.01694E−04 | −5.00000E−06 | 5.52401E−08 |

Next, variable intervals when a lens position state changes in the zoom lens 5 according to the fifth numerical example are shown in the following Table 78. In the zoom lens 5, the first group G1, the second group G2, and the third group G3 are all movable, and the fourth group G4 is fixed with respect to the image surface IMG.

In the zoom lens 5, variable power is achieved mainly by changing an interval between the first group G1 and the second group G2, and focal position variation at each angle of view is absorbed by moving the third group G3, whereby high performance can be ensured while maintaining miniaturization.

TABLE 78

|  | WIDE | MID | TELE |
|---|---|---|---|
| D3 | 10.697 | 3.816 | 1.000 |
| D7 | 4.540 | 9.447 | 14.669 |
| D9 | 2.334 | 2.047 | 1.600 |

Next, the focal lengths and group thicknesses of the first to fourth groups G1 to G4 in the zoom lens 5 are shown in Table 79.

TABLE 79

|  | First group | Second group | Third group | Fourth group |
|---|---|---|---|---|
| f | −15.41 | 9.31 | 10.71 | −17.52 |
| L | 1.612 | 2.450 | 1.997 | 0.650 |

The following Table 80 shows conditional expression correspondence values in the zoom lens 5 according to the fifth numerical example.

TABLE 80

|  |  | Fifth example |
|---|---|---|
| Conditional expression (1) | nd(G1) | 1.61881 |
| Conditional expression (2) | vd(G2) | 26.39016 |
| Conditional expression (3) | |G1R1/G2R2| | 0.681331 |
| Conditional expression (4) | G1R1/fw | −2.684 |
| Conditional expression (5) | G2R2/fw | 3.939341 |
| Conditional expression (6) | f3/f1 | −0.69475 |
| Conditional expression (7) | f4/f1 | 1.136725 |
| Conditional expression (8) | |G1R1/G2R2| | 0.681331 |
| Conditional expression (9) | $L/(fw * ft)^{1/2}$ | 0.237308 |

Next, FIGS. 47A, 47B, and 47C are diagrams of various aberrations in an infinity focused state of the fifth numerical example. FIG. 47A shows various aberrations in a wide-angle end state (ω=29.78 degrees). FIG. 47B shows various aberrations in an intermediate focal length state (ω=18.96 degrees). FIG. 47C shows various aberrations in a telephoto end state (ω=12.61 degrees).

In FIGS. 47A to 47C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 47A to 47C show that the zoom lens 5 according to the fifth numerical example excellently corrects various aberrations even though reduced in thickness and miniaturized, and has excellent image forming performance.

[12-6. Six Numerical Example]

In FIG. 48, reference numeral 6 denotes a zoom lens as a whole in a sixth numerical example corresponding to the fourth embodiment, which zoom lens is formed by a four-group configuration of a negative first group G1, a positive second group G2, a positive third group G3, and a negative fourth group G4 in order from an object side.

Figure 49A:
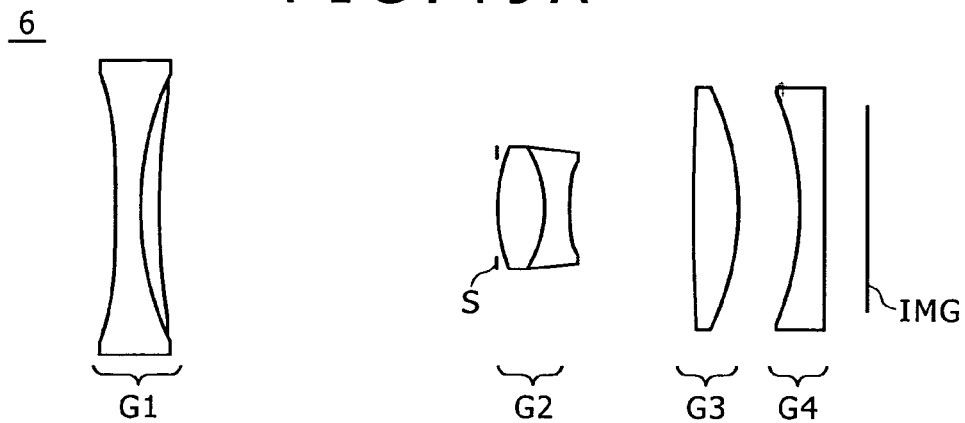
FIGS. 49A, 49B, and 49C are schematic sectional views of lens group arrangements in the sixth numerical example.
Figure 49B:
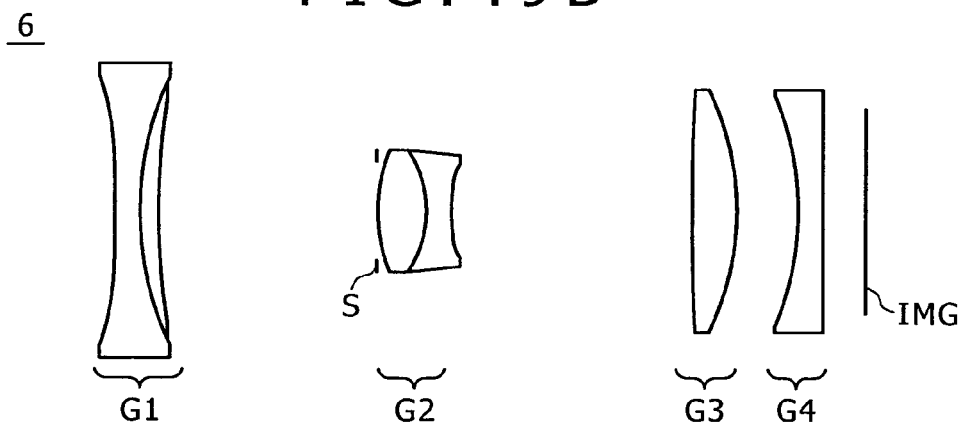
Figure 49C:

FIGS. 49A, 49B, and 49C show lens group arrangements when the zoom lens 6 in the sixth numerical example is in a wide-angle end state (WIDE), an intermediate focal length state (MID), and a telephoto end state (TELE).

The first group G1 is a cemented lens L12 including a first lens L1 formed of a negative spherical glass lens and a second lens L2 formed of a positive resin lens. The first group G1 as a whole has negative power.

The second group G2 includes a cemented lens L34 formed by joining together a third lens L3 formed of an aspheric positive lens and a fourth lens L4 formed of a negative aspheric lens. An aperture stop S is disposed on the object side of the second group G2. This aperture stop S may be disposed on the image surface side of the second group G2.

The third group G3 includes a single fifth lens L5 formed by a positive resin lens. The fourth group G4 includes a single sixth lens L6 formed by a negative glass spherical lens that is at a fixed distance from an image surface IMG and which has a plane as the second surface of the fourth group G4.

In this case, the sixth lens L6 in the fourth group G4 doubles as a protective member such as a seal glass or the like for the image surface IMG, thereby achieving further reduction in thickness and size. Incidentally, the sixth lens L6 in the fourth group G4 may not only double as the protective member but also double as an IR cutoff filter CF.

The following Tables 81 to 86 show specification values of the sixth numerical example corresponding to the fourth embodiment. In the specification tables in the sixth numerical example, f denotes focal length, FNO denotes an F-number, and ω denotes a half angle of view, and an index of refraction is a value corresponding to the d-line (wavelength of 587.6 nm). Incidentally, a radius of curvature of ∞ in Table 82 means a plane.

TABLE 81

|  | WIDE | MID | TELE |
|---|---|---|---|
| f | 6.12 | 11.24 | 17.29 |
| FNO | 3.18 | 4.34 | 5.73 |
| ω | 29.88 | 19.03 | 12.65 |

TABLE 82

|  | Radius of curvature | Surface interval | Index of refraction (d) | Abbe number (d) |
|---|---|---|---|---|
| 1 | −16.6396 | 0.700 | 1.61881 | 63.86 |
| 2 | 9.1697 | 0.889 | 1.60700 | 26.39 |
| 3 (ASP) | 23.9112 | Variable |  |  |
| Aperture stop | ∞ | 0.000 |  |  |
| 5 (ASP) | 4.9842 | 1.650 | 1.85135 | 40.10 |
| 6 | −4.3372 | 0.800 | 1.72825 | 28.32 |
| 7 (ASP) | 6.3116 | Variable |  |  |
| 8 | 317.2730 | 2.000 | 1.52500 | 56.45 |
| 9 (ASP) | −5.6725 | Variable |  |  |
| 10 (ASP) | −9.1510 | 0.650 | 1.53172 | 48.84 |
| 11 | ∞ | 0.300 |  |  |
| IMG | ∞ | 0.000 |  |  |

Incidentally, a third surface, a fifth surface, a seventh surface, a ninth surface, and a tenth surface have an aspheric shape, and the aspheric coefficients of the surfaces are as shown in Table 83. Incidentally, for example, "0.26029E-05" denotes "$0.26029 \times 10^{-5}$."

TABLE 83

| Surface number | κ | A | B | C | D |
|---|---|---|---|---|---|
| s4 | 0.00000E+00 | −2.00325E−04 | 8.00000E−06 | −3.12385E−07 | 3.90487E−09 |
| s10 | 0.00000E+00 | 1.36899E−04 | −2.60000E−05 | 3.00000E−06 | −2.00000E−06 |
| s12 | 0.00000E+00 | 3.75354E−03 | 8.40000E−05 | 2.60000E−05 | −3.00000E−06 |
| s16 | 0.00000E+00 | 1.80968E−03 | −1.70000E−05 | 1.00000E−06 | −2.57205E−09 |
| s17 | 0.00000E+00 | −7.40000E−05 | 7.80000E−05 | −4.00000E−06 | 3.80675E−08 |

Next, variable intervals when a lens position state changes in the zoom lens 6 according to the sixth numerical example are shown in the following Table 84. In the zoom lens 6, the first group G1, the second group G2, and the third group G3 are all movable, and the fourth group G4 is fixed with respect to the image surface IMG.

In the zoom lens 6, variable power is achieved mainly by changing an interval between the first group G1 and the second group G2, and focal position variation at each angle of view is absorbed by moving the third group G3, whereby high performance can be ensured while maintaining miniaturization.

TABLE 84

|  | WIDE | MID | TELE |
|---|---|---|---|
| D3 | 10.694 | 3.826 | 1.000 |
| D7 | 4.468 | 9.366 | 14.554 |
| D9 | 2.327 | 2.036 | 1.600 |

Next, the focal lengths and group thicknesses of the first to fourth groups G1 to G4 in the zoom lens 6 are shown in Table 85.

TABLE 85

|  | First group | Second group | Third group | Fourth group |
|---|---|---|---|---|
| f | −15.41 | 9.31 | 10.71 | −17.52 |
| L | 1.612 | 2.450 | 1.997 | 0.650 |

The following Table 86 shows conditional expression correspondence values in the zoom lens 6 according to the sixth numerical example.

TABLE 86

|  | | Sixth example |
| --- | --- | --- |
| Conditional expression (1) | nd(G1) | 1.61881 |
| Conditional expression (2) | vd(G2) | 26.39016 |
| Conditional expression (3) | \|G1R1/G2R2\| | 0.695891 |
| Conditional expression (4) | G1R1/fw | −2.71971 |
| Conditional expression (5) | G2R2/fw | 3.90824 |
| Conditional expression (6) | f3/f1 | −0.68663 |
| Conditional expression (7) | f4/f1 | 1.110118 |
| Conditional expression (8) | \|G1R1/G2R2\| | 0.695891 |
| Conditional expression (9) | $L/(fw*ft)^{1/2}$ | 0.238242 |

Figure 50A:
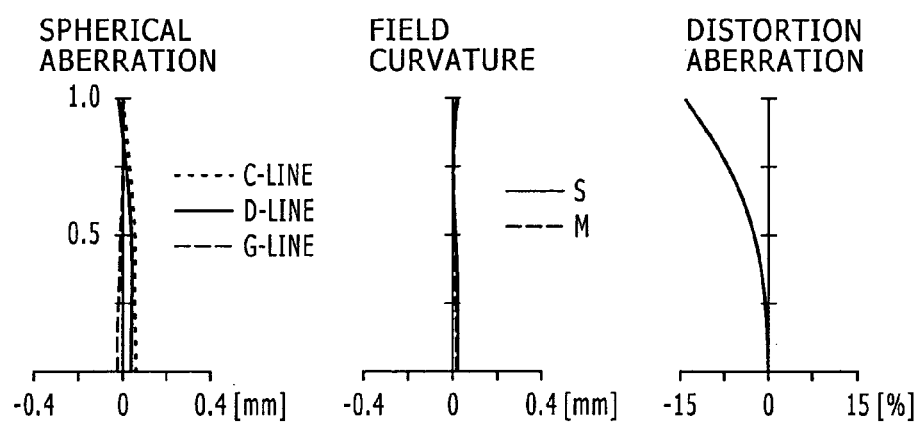
FIGS. 50A, 50B, and 50C are characteristic curve diagrams showing various aberrations in the sixth numerical example.
Figure 50B:
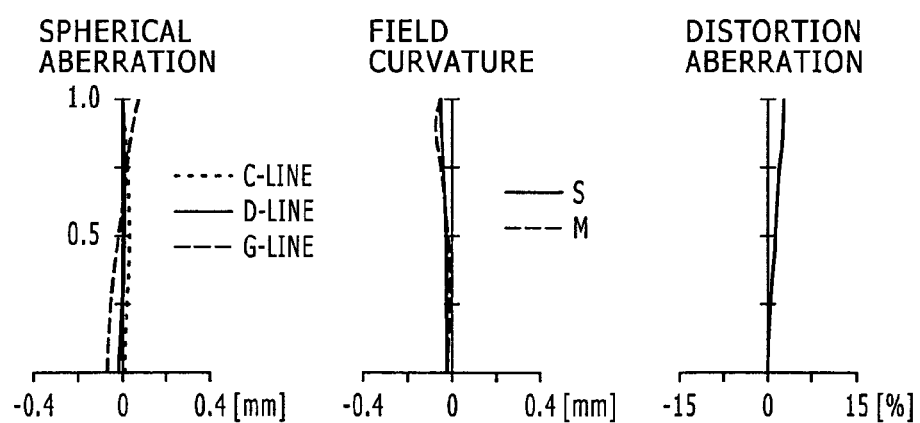
Figure 50C:
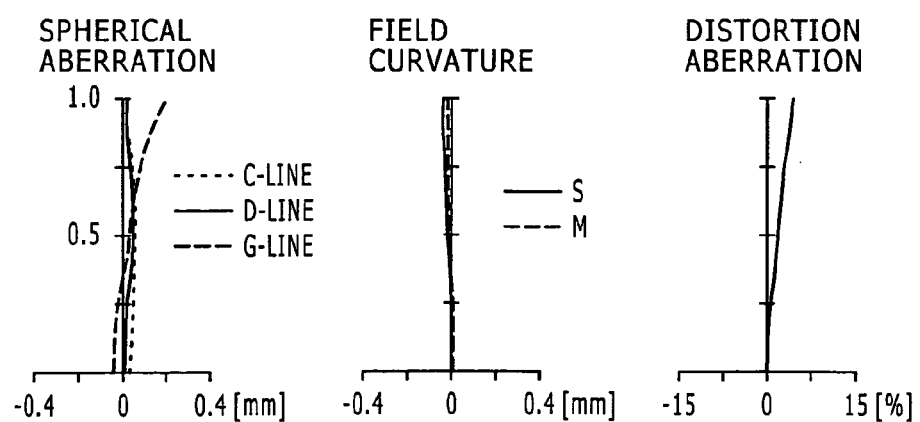

Next, FIGS. 50A, 50B, and 50C are diagrams of various aberrations in an infinity focused state of the sixth numerical example. FIG. 50A shows various aberrations in a wide-angle end state (ω=29.88 degrees). FIG. 50B shows various aberrations in an intermediate focal length state (ω=19.03 degrees). FIG. 50C shows various aberrations in a telephoto end state (ω=12.65 degrees).

In FIGS. 50A to 50C, spherical aberrations correspond to a C-line with a wavelength of 656.3 nm, a D-line with a wavelength of 587.6 nm, and a G-line with a wavelength of 435.8 nm, a solid line in the diagrams of field curvature represents a sagittal image surface and a broken line in the diagrams of field curvature represents a meridional image surface, and distortion aberration corresponds to the D-line with the wavelength of 587.6 nm.

The diagrams of various aberrations in FIGS. 50A to 50C show that the zoom lens 6 according to the sixth numerical example excellently corrects various aberrations even though reduced in thickness and miniaturized, and has excellent image forming performance.

Thus, according to the first to sixth numerical examples corresponding to the fourth embodiment, an image pickup system miniaturized and improved in performance at low cost with a focal length Wf of 28 mm to 38 mm (equivalent to a 35-mm film), a variable power ratio of two to four times, an FNO of about 2.5 to 3.5 in the wide-angle end state, and an FNO of about 5 to 6.5 in the telephoto end state can be realized in the zoom lenses 1 to 6. ps <13. Image Pickup Device and Digital Still Camera>

[13-1. Configuration of Image Pickup Device]

An image pickup device according to an embodiment of the present invention will next be described. This image pickup device has an image pickup element formed by a CCD (Charge Coupled Device) sensor or a CMOS (Complementary Metal Oxide Semiconductor) sensor, for example, for converting an optical image formed by the four-group type zoom lens 1 (or 2, 3, 4, 5 or 6) illustrated in the numerical examples in accordance with the fourth embodiment into an electric signal.

The four-group type zoom lens 1 (or 2, 3, 4, 5, or 6) includes four groups that are a negative first group, a positive second group, a positive third group, and a negative fourth group in order from an object side, the first group G1 including a negative cemented lens L12 formed by joining together a first lens L1 formed by a negative single lens and a second lens L2 formed by a positive single lens from the object side, the second group G2 including a cemented lens L34 formed by joining together a third lens L3 formed by a positive single lens and a fourth lens L4 formed by a negative single lens from the object side, the third group G3 including a fifth lens L5 formed by a positive single lens, the fourth group G4 including a sixth lens L6 formed by a single lens at a fixed distance from an image pickup surface, at least one of surfaces in contact with air being formed in a spherical shape, and the zoom lens satisfying following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

The four-group type zoom lens 1 (or 2, 3, 4, 5 or 6) has the following advantages because the first group G1 includes only the single cemented lens L12 composed of the first lens L1 having negative power and the second lens L2 having positive power.

First, in the four-group type zoom lens 1 (or 2, 3, 4, 5 or 6), because the first group G1 is of a single configuration of only the cemented lens L12 rather than a configuration of a plurality of lenses, performance degradation due to decentration between the lenses in the first group G1 does not occur. It is thus possible to eliminate a need for alignment between the lenses at a time of assembly, omit the manufacturing process of the alignment, and thereby shorten manufacturing time.

That is, because the first group G1 in the four-group type zoom lens 1 (or 2, 3, 4, 5 or 6) is of a single configuration of only the cemented lens L12 rather than a configuration of a plurality of lenses, the three-group type zoom lens makes it possible to achieve an improvement in performance, cost reduction, and reduction in thickness as compared with the case where the first group G1 is formed by a plurality of lenses.

Second, in the four-group type zoom lens 1 (or 2, 3, 4, 5 or 6), because the first group G1 is of a single configuration of only the cemented lens L12 rather than a configuration of a plurality of lenses, a lens interval error in the first group G1 is zero. Therefore an amount of shift in focal position is reduced as compared with the case where the first group G1 is formed by a plurality of lenses as in the existing case.

The four-group type zoom lens 1 (or 2, 3, 4, 5 or 6) thereby makes it possible to reduce an amount of clearance of mechanical hardware configuration for focal position adjustment by the first to third groups G1 to G3. Therefore the whole of the four-group type zoom lens 1 (or 2, 3, 4, 5 or 6) can be further miniaturized.

Third, in the four-group type zoom lens, because the first group G1 is of a single configuration of only the cemented lens L12 rather than a configuration of a plurality of lenses, the second lens L2 located on an image surface IMG side in the case where the first group G1 is formed by a plurality of lenses as in the existing case is prevented from interfering with the second group G2. Therefore the position of the second group G2 can be brought correspondingly closer to the principal point position of the first group G1.

The four-group type zoom lens 1 (or 2, 3, 4, 5 or 6) can thereby weaken an effect of bringing the principal point position of the first group G1 closer to the image surface IMG by the second group G2. That is, in the four-group type zoom lens 1 (or 2, 3, 4, 5 or 6), the second group G2 can be formed only by the cemented lens L34 of the positive third lens L3 and the negative fourth lens L4. It is thus possible to suppress lens decentration sensitivity in the second group G2, and lower a degree of difficulty in manufacturing while achieving a reduction in thickness and an improvement in performance.

Fourth, in the four-group type zoom lens 1 (or 2, 3, 4, 5 or 6), because not only the first group G1 but also the second group G2 can be formed by a cemented lens L34 alone, performance degradation due to decentration between the lenses in the second group G2 can be prevented.

At this time, in the four-group type zoom lens 1 (or 2, 3, 4, 5 or 6), assembly variation in the direction of an optical axis between the lenses in the second group G2 is also eliminated, and thus an amount of focal position shift is reduced. The four-group type zoom lens 1 (or 2, 3, 4, 5 or 6) thereby makes it possible to reduce an amount of clearance of mechanical hardware configuration for focal position adjustment by the first group G1 to third group G3. Therefore the whole of the three-group type zoom lens 1 (or 2 or 3) can be further miniaturized.

Here, the conditional expressions (1) to (3) in the four-group type zoom lens 1 (or 2, 3, 4, 5 or 6) are defined to lower the degree of difficulty in manufacturing while achieving a reduction in thickness, miniaturization and an improvement in performance.

The conditional expression (1) defines the index of refraction of the negative first lens L1 forming the cemented lens L12 in the first group G1 with respect to the d-line. When the index of refraction of the negative first lens L1 is less than the lower limit value of the conditional expression (1), and when miniaturization is to be achieved by strengthening the negative power of the first group G1, the curvature of the negative first lens L1 is reduced, and thickness in the direction of an optical axis is increased, which is disadvantageous for thickness reduction, and it becomes difficult to correct spherical aberration, field curvature, and distortion aberration.

In addition, when the index of refraction of the negative first lens L1 is less than the lower limit value of the conditional expression (1), because the curvature of the negative first lens L1 is reduced, it becomes difficult to join the positive second lens L2 when forming the cemented lens L12, and therefore the degree of difficulty in manufacturing is raised. That is, in the four-group type zoom lens 1 (or 2, 3, 4, 5 or 6), the conditional expression (1) lowers the degree of difficulty in manufacturing while achieving a reduction in thickness.

The conditional expression (2) defines the Abbe number of the positive second lens L2 forming the cemented lens L12 in the first group G1. The conditional expression (2) is to correct chromatic aberration of magnification in a wide-angle end state and longitudinal chromatic aberration in a telephoto end state while maintaining miniaturization.

When the Abbe number of the positive second lens L2 exceeds the upper limit value of the conditional expression (2), chromatic aberration of magnification in the wide-angle end state and longitudinal chromatic aberration in the telephoto end state when the negative power of the first lens L1 in the first group G1 is strengthened cannot be corrected, so that resolution performance in a peripheral part of the image pickup element in the wide-angle end state and a central part of the image pickup element in the telephoto end state is degraded. Incidentally, the effects are further enhanced when the upper limit value of the conditional expression (2) is set at 27.

The conditional expression (3) defines so as to prevent the radius of curvature of the second surface of the positive second lens L2 forming the cemented lens L12 of the first group G1 from becoming too small as compared with the radius of curvature of the first surface of the negative first lens L1.

When |G1R1/G2R2| exceeds the upper limit value of the conditional expression (3), the radius of curvature of the second surface of the second lens L2 in the first group G1 becomes too small as compared with the first surface of the first lens L1 in the first group G1. Thus, a degree of difficulty in manufacturing of the second lens L2 as a single part and the cemented lens L12 is increased, and manufacturing cost is raised. In addition, the negative power of the first lens L1 cannot be strengthened sufficiently, which is disadvantageous for miniaturization. Incidentally, the effects are further enhanced when the upper limit value of the conditional expression (3) is set at 1.7.

Next, the four-group type zoom lens 1 (or 2, 3, 4, 5 or 6) is formed such that curvature of a surface nearest to the object side and curvature of a surface nearest to the image surface side in the cemented lens L12 in the first group G1 and focal lengths f3 and f4 of the third group G3 and the fourth group G4 with respect to the first group G1 satisfy following conditional expressions (4) to (7):

$$G1R1/fw > -4 \quad (4)$$

$$G2R2/fw > 2.3 \quad (5)$$

$$f3/f1 < -0.65 \quad (6)$$

$$f4/f1 > 1 \quad (7)$$

where fw is focal length in a wide-angle end state, f1 is focal length of the first group, f3 is focal length of the third group, and f4 is focal length of the fourth group.

The conditional expression (4) defines the radius of curvature of the surface nearest to the object side of the first lens L1 in the cemented lens L12 of the first group G1.

When G1R1/fw is less than the lower limit value of the conditional expression (4), the radius of curvature of the first surface of the negative first lens L1 forming the cemented lens L12 of the first group G1 becomes too large with respect to the focal length fw in the wide-angle end state, and therefore the radius of curvature of the second surface of the first lens L1 is decreased to maintain the negative power of the first lens L1.

As a result, in the four-group type zoom lens 1 (or 2, 3, 4, 5 or 6), the radius of curvature of the second surface of the positive second lens L2 forming the cemented lens L12 of the first group G1 is also decreased. Thus, a degree of difficulty in manufacturing of the second lens L2 as a single part and the cemented lens L12 is raised, and manufacturing cost is increased.

The conditional expression (5) defines the radius of curvature of the surface nearest to the image surface side of the second lens L2 in the cemented lens L12 of the first group G1.

When G2R2/fw is less than the lower limit value of the conditional expression (5), the radius of curvature of the surface nearest to the image surface side of the second lens L2 in the cemented lens L12 of the first group G1 becomes too small with respect to the focal length fw in the wide-angle end state. Thus, a degree of difficulty in manufacturing of the second lens L2 as a single part and the cemented lens L12 is increased, and manufacturing cost is raised.

In addition, when the radius of curvature of the surface on the image surface IMG side of the second lens L2 in the cemented lens L12 of the first group G1 becomes too small, the projection of a lens edge part of the second lens L2 in the direction of the optical axis with respect to a surface vertex on the image surface IMG side of the second lens L2 becomes larger and interferes. It is thus difficult to make an interval between the first group G1 and the second group G2 sufficiently short.

As a result, in the four-group type zoom lens 1 (or 2, 3, 4, 5 or 6), the principal point position of the first group G1 cannot be brought closer to the image surface IMG by the second group G2. It is thus difficult to correct spherical aberration and field curvature, in particular.

The conditional expression (6) defines the focal length f3 of the third group G3 with respect to the focal length f1 of the first group G1. When f3/f1 exceeds the upper limit value of the conditional expression (6), the thickness of a lens center in the fifth lens L5 in the third group G3 is increased to strengthen the power of the fifth lens L5 while securing an edge thickness of a lens peripheral part in the fifth lens in the third group, thus inviting an increase in cost and size of the lens itself.

The conditional expression (7) defines the focal length f4 of the fourth group G4 with respect to the focal length f1 of the first group G1. When f4/f1 is less than the lower limit value of the conditional expression (7), the positive power of the second group G2 and the third group G3 is strengthened with an increase in negative power of the sixth lens L6 in the fourth group G4, and in particular the central thickness of the positive fifth lens L5 in the third group G3 is increased, which is disadvantageous for thickness reduction. Furthermore, in the four-group type zoom lens 1 (or 2, 3, 4, 5 or 6), as the power of the third group is strengthened, it is difficult to form the third group G3 with only a single lens from a viewpoint of aberration correction.

Incidentally, in the four-group type zoom lens 1 (or 2, 3, 4, 5 or 6), the power of the third group G3 and the fourth group G4 can be prevented from becoming too strong by setting such a power ratio as satisfies the conditional expressions (6) and (7). Thus, performance degradation at times of temperature changes can be suppressed.

In addition, in the four-group type zoom lens 1 (or 2, 3, 4, 5 or 6), when the sixth lens L6 having negative power is disposed in the fourth group G4, the field curvature of a close-range object in the telephoto end state, in particular, can be corrected due to an effect of aberration correction of the fourth group G4, as compared with a three-group type zoom lens of a negative group, a positive group, and a positive group.

Incidentally, in the four-group type zoom lens 1 (or 2, 3, 4, 5 or 6), when the sixth lens L6 having negative power is disposed in the fourth group G4, the power of each group can be strengthened due to an effect of aberration correction of the fourth group G4, as compared with a three-group configuration of a negative group, a positive group, and a positive group. In particular, in the four-group type zoom lens 1 (or 2, 3, 4, 5 or 6), the power of the first group G1 can be strengthened, and therefore an amount of travel of the second group G2 is reduced, which is advantageous for shortening total length in the wide-angle end state.

Further, the four-group type zoom lens 1 (or 2, 3, 4, 5 or 6) according to the fourth embodiment of the present invention is characterized in that the cemented lens L12 of the first group G1 is formed by a compound aspheric lens including the first lens L1 made of a negative glass lens and the second lens L2 made of a positive resin lens.

The four-group type zoom lens 1 (or 2, 3, 4, 5 or 6) thus has the cemented lens L12 of the first group G1 formed by molding using resin. Therefore the thickness of a peripheral part of the second lens L2 formed by the resin can be greatly reduced as compared with a case where glass lenses are joined to each other.

Further, the four-group type zoom lens 1 (or 2, 3, 4, 5 or 6) can be reduced in thickness and cost because the fourth group G4 is integral with an image pickup element for receiving the light of an image and doubles as a protective member. Incidentally, when the fourth group doubles as a protective member for the image pickup element, a degree of difficulty in manufacturing of the four-group type zoom lens 1 (or 2, 3, 4, 5 or 6) can be further decreased by making a surface nearest to the image surface IMG side in the fourth group G4 a plane.

Next, in the four-group type zoom lens 1 (or 2, 3, 4, 5 or 6), at least one surface nearest to the object side or nearest to the image surface side in the first group G1 is a spherical shape, and the zoom lens is formed so as to satisfy the following conditional expression (8):

$$|G1R1/G2R2| < 1.7 \tag{8}$$

As with the above-described conditional expression (3), the conditional expression (8) defines so as to prevent the radius of curvature of the second surface of the positive second lens L2 from being too small as compared with the radius of curvature of the first surface of the negative first lens L1 forming the cemented lens L12 of the first group G1.

When $|G1R1/G2R2|$ exceeds the upper limit value of the conditional expression (8), and sufficient negative power is to be provided by the first group G1, the radius of curvature of the first surface of the negative first lens L1 or the second surface of the positive second lens L2 forming the cemented lens L12 of the first group G1 becomes too small.

At this time, in the four-group type zoom lens 1 (or 2, 3, 4, 5 or 6), it is difficult to correct distortion aberration, field curvature, spherical aberration, coma aberration and the like in the wide-angle end state by only an aspheric shape formed as at least one surface nearest to the object side or nearest to the image surface side in the first group G1, and degradation in optical performance of a peripheral part in the wide-angle end state, in particular, becomes noticeable.

Incidentally, in the four-group type zoom lens 1 (or 2, 3, 4, 5 or 6), when one of the negative first lens L1 and the positive second lens L2 forming the cemented lens L12 of the first group G1 is made into a spherical lens for cost reduction, the positive second lens L2 preferably has a spherical shape from a viewpoint of aberration correction.

This is because the passing position of rim rays in the wide-angle end state is closer to the optical axis in the positive second lens L2 situated on the image surface side than in the negative first lens L1 situated on the object side, and because the positive second lens L2 has weaker power and thus has a larger radius of curvature than the negative first lens L1.

As in Patent Document 1, when the first lens L1 has a low index of refraction, and the negative power of the first group G1 is to be strengthened, it is difficult to correct distortion aberration, field curvature, spherical aberration, coma aberration and the like in the wide-angle end state unless the first surface of the negative first lens L1 forming the cemented lens L12 of the first group G1 and the second surface of the positive second lens L2 are both in an aspheric shape.

Thus, in the four-group type zoom lens 1 (or 2, 3, 4, 5 or 6), by making one of the first lens L1 and the second lens L2 forming the cemented lens L12 of the first group G1 have a spherical shape, it is possible not only to achieve the cost reduction, but also to reduce the cost of the cemented lens because required cementing accuracy is lowered.

Further, in the four-group type zoom lens 1 (or 2, 3, 4, 5 or 6), the fifth lens L5 in the third group G3 is formed by a resin lens, and the sixth lens L6 in the fourth group G4 at a fixed distance from the image surface IMG is formed by a resin lens. Thereby, focal position variations are cancelled and high performance can be maintained even at times of temperature changes.

Further, the four-group type zoom lens 1 (or 2, 3, 4, 5 or 6) is formed such that a distance from the aperture stop S of the second group G2 to the lens surface vertex of the fourth lens L4 disposed nearest to the image surface IMG side in the second group G2 satisfies the following conditional expression (9):

$$L/(fw*ft)^{1/2}<0.35 \qquad (9)$$

where ft is focal length in the telephoto end state, and L is the distance from the aperture stop disposed in the second group to the lens surface vertex of the fourth lens disposed nearest to the image surface side in the second group.

This conditional expression (9) defines the distance from the aperture stop S to the lens surface vertex of the fourth lens L4 disposed nearest to the image surface IMG side in the second group G2, and defines so as to prevent this distance from becoming too long.

When $L/(fw*ft)^{1/2}$ exceeds the upper limit value of the conditional expression (9), an angle of incidence of rim rays in the wide-angle end state in particular on the fourth lens L4 disposed nearest to the image surface IMG side in the second group G2 is increased, and the occurrence of coma aberration degrades resolution performance. Incidentally, the effects are further enhanced when the upper limit value of the conditional expression (9) is set at 0.25.

[13-2. Configuration of Digital Still Camera]

As shown in FIG. 51, a digital still camera 100 including an image pickup device as described above has a camera block 15 for performing an image pickup function as the image pickup device and a camera signal processing section 20 for subjecting an image signal obtained by image pickup by the camera block 15 to signal processing such as analog-to-digital conversion processing and the like.

The digital still camera 100 also has an image processing section 30 for performing image signal recording and reproducing processing and the like, an LCD (Liquid Crystal Display) 40 for displaying a taken image and the like, and a reader-writer 50 for performing writing/reading of a memory card 51.

In addition, the digital still camera 100 has a CPU (Central Processing Unit) 60 for controlling the whole of the camera, an input section 70 for operating input by a user, and a lens driving controlling section 80 for controlling the driving of a lens within the camera block 15.

The camera block 15 has a configuration combining an optical system including the zoom lens 1 (or 2, 3, 4, 5 or 6) and an image pickup element 16 formed by for example a CCD (Charge Coupled Device) sensor or a CMOS (Complementary Metal Oxide Semiconductor) sensor.

The camera signal processing section 20 performs signal processing including the processing of conversion of an output signal from the image pickup element 16 into a digital signal, noise removal, image quality correction, the processing of conversion into a luminance signal and a color-difference signal, and the like.

The image processing section 30 performs the processing of compression coding and decompression decoding of an image signal on the basis of a predetermined image data format, the processing of conversion of data specifications including resolution, and the like.

The memory card 51 is composed of a detachable semiconductor memory. The reader-writer 50 writes image data coded by the image processing section 30 to the memory card 51, and reads image data recorded in the memory card 51.

The CPU 60 performs centralized control of each circuit block within the digital still camera 100. The CPU 60 controls each circuit block on the basis of an instruction input signal from the input section 70 and the like.

The input section 70 includes for example a shutter release button for performing shutter operation and a selecting switch for selecting an operation mode. The input section 70 outputs an instruction input signal corresponding to an operation by a user to the CPU 60.

The lens driving controlling section 80 controls a motor and the like not shown in FIG. 22 for driving lens groups within the zoom lens 1 (or 2, 3, 4, 5 or 6) on the basis of a control signal from the CPU 60.

Operation of the digital still camera 100 will next be described in brief. In a standby state for picture taking, under control of the CPU 60, the digital still camera 100 outputs an image signal of an image picked up by the camera block 15 to the LCD 40 via the camera signal processing section 20, and displays the image signal as a camera-through image on the LCD 40.

When an instruction input signal for zooming is input from the input section 70, the CPU 60 outputs a control signal to the lens driving controlling section 80, and the digital still camera 100 moves a predetermined lens group within the zoom lens 1 (or 2, 3, 4, 5 or 6) on the basis of control of the lens driving controlling section 80.

Then, when a shutter not shown in FIG. 51 within the camera block 15 is released by an instruction input signal from the input section 70, the digital still camera 100 outputs a picked-up image signal from the camera signal processing section 20 to the image processing section 30.

The image processing section 30 subjects the image signal supplied from the camera signal processing section 20 to predetermined compression coding, thereafter converts the image signal into digital data in a predetermined data format, and writes the digital data to the memory card 51 via the reader-writer 50.

Incidentally, focusing is for example performed by driving control of the zoom lens 1 (or 2, 3, 4, 5 or 6) by the lens driving controlling section 80 on the basis of a control signal from the CPU 60 when the shutter release button is pressed halfway down or pressed all the way down for recording.

When image data recorded in the memory card 51 is reproduced, the CPU 60 reads the image data from the memory card 51 via the reader-writer 50 according to an operation of the input section 70, and the image data is subjected to decompression decoding processing by the image processing section 30 and then output to the LCD 40.

The LCD 40 displays a reproduced image on the basis of the image data resulting from the decompression decoding processing by the image processing section 30.

Incidentally, while in the present embodiment, description has been made of a case where the image pickup device according to the present invention is applied to a digital still camera, the image pickup device according to the present invention is also applicable to other image pickup devices such as digital video cameras, for example.

<14. Other Embodiments>

In addition, the concrete shapes, structures, and numerical values of respective parts shown in the fourth embodiment and the first to sixth numerical examples described above are each a mere example of embodiment in carrying out the present invention, and the technical scope of the present invention is not to be construed in a restricted manner by these shapes, structures, and numerical values.

Incidentally, in the foregoing fourth embodiment, description has been made of a case where a fourth group G4 having negative power is used. However, the present invention is not limited to this. A fourth group G4 having positive power may be used.

Further, in the foregoing fourth embodiment, a case where an image pickup device is incorporated into for example the digital still camera 100 has been illustrated as an example. However, objects into which to incorporate the image pickup device are not limited to this. The image pickup device is widely applicable to various other electronic devices such as digital video cameras, portable telephones, personal computers having a camera incorporated therein, PDAs having a camera incorporated therein, and the like.

The present application contains subject matter related to that disclosed in Japanese Priority Patent Applications JP 2009-246700, JP 2009-246701, and JP 2009-246702 each filed in the Japan Patent Office on Oct. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
three groups that are a negative first group, a positive second group, and a positive third group in order from an object side,
the first group including a negative cemented lens formed by joining together, from the object side, a first lens formed by a negative single lens and a second lens formed by a positive single lens,
the second group including, from the object side, a third lens formed by a positive single lens and a cemented lens formed by joining together a fourth lens formed by a positive single lens and a fifth lens formed by a negative single lens,
the third group including a sixth lens formed by a positive single lens;
the zoom lens satisfying following conditional expressions (1) to (3):

$$N1d > 1.55 \quad (1)$$

$$v2d < 30 \quad (2)$$

$$f21/fw > 1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

2. The zoom lens according to claim 1,
wherein at least one surface nearest to the object side or nearest to an image surface side in the cemented lens in said first group and at least one surface of the positive said third lens located nearest to the object side in said second group have an aspheric shape, and said zoom lens satisfies a following conditional expression (4):

$$f21/f2 > 1 \quad (4)$$

where f2 is focal length of the second group.

3. The zoom lens according to claim 1,
wherein at least one surface nearest to the object side or nearest to an image surface side in the cemented lens in said first group has an aspheric shape, both surfaces of the positive said third lens nearest to the object side in said second group have a spherical shape, and at least one surface nearest to the object side or nearest to the image surface side in the cemented lens in said second group has an aspheric shape.

4. The zoom lens according to claim 1,
wherein curvature of a surface nearest to the object side in the cemented lens in said first group satisfies a following conditional expression (5):

$$-1 > G1R1/fw > -3.3 \quad (5)$$

where G1R1 is a radius of curvature of the surface nearest to the object side in the cemented lens in the first group.

5. The zoom lens according to claim 1,
wherein the cemented lens in said first group is formed by a compound aspheric lens including said first lens formed by a negative glass lens and said second lens formed by a positive resin lens.

6. An image pickup device comprising:
a zoom lens; and
an image pickup element for converting an optical image formed by said zoom lens into an electric signal;
said zoom lens including
three groups that are a negative first group, a positive second group, and a positive third group in order from an object side, the first group including a negative cemented lens formed by joining together, from the object side, a first lens formed by a negative single lens and a second lens formed by a positive single lens, the second group including, from the object side, a third lens formed by a positive single lens and a cemented lens formed by joining together a fourth lens formed by a positive single lens and a fifth lens formed by a negative single lens, the third group including a sixth lens formed by a positive single lens;
said zoom lens satisfying following conditional expressions (1) to (3):

$$N1d > 1.55 \quad (1)$$

$$v2d < 30 \quad (2)$$

$$f21/fw > 1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

7. A zoom lens comprising:
four groups that are a negative first group, a positive second group, a positive third group, and a negative or positive fourth group in order from an object side,
the first group including a negative cemented lens formed by joining together, from the object side, a first lens formed by a negative single lens and a second lens formed by a positive single lens,
the second group including, from the object side, a third lens formed by a positive single lens and a cemented lens formed by joining together a fourth lens formed by a positive single lens and a fifth lens formed by a negative single lens, the third group including a sixth lens formed by a positive single lens, the fourth group including a seventh lens formed by a single lens at a fixed distance from an image pickup surface;

the zoom lens satisfying following conditional expressions (1) to (3):

$$N1d>1.55 \quad (1)$$

$$v2d<30 \quad (2)$$

$$f21/fw>1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

8. The zoom lens according to claim 7,
wherein at least one surface nearest to the object side or nearest to an image surface side in the cemented lens in said first group and at least one surface of the positive said third lens located nearest to the object side in said second group have an aspheric shape, and said zoom lens satisfies a following conditional expression (4):

$$f21/f2>1 \quad (4)$$

where f2 is focal length of the second group.

9. The zoom lens according to claim 7,
wherein at least one surface nearest to the object side or nearest to an image surface side in the cemented lens in said first group has an aspheric shape, both surfaces of the positive said third lens nearest to the object side in said second group have a spherical shape, and at least one surface nearest to the object side or nearest to the image surface side in the cemented lens in said second group has an aspheric shape.

10. The zoom lens according to claim 7,
wherein curvature of a surface nearest to the object side in the cemented lens in said first group satisfies a following conditional expression (5):

$$-1>G1R1/fw>-3.3 \quad (5)$$

where G1R1 is a radius of curvature of the surface nearest to the object side in the cemented lens in the first group.

11. The zoom lens according to claim 7,
wherein said fourth group has negative power, and satisfies a following conditional expression (6):

$$f1/f4<0.9 \quad (6)$$

where f1 is focal length of the first group, and f4 is focal length of the fourth group.

12. The zoom lens according to claim 7,
wherein the sixth lens forming said third group and the seventh lens forming said fourth group are made of resin.

13. The zoom lens according to claim 7,
wherein the cemented lens in said first group is formed by a compound aspheric lens including said first lens formed by a negative glass lens and said second lens formed by a positive resin lens.

14. An image pickup device comprising:
a zoom lens; and
an image pickup element for converting an optical image formed by said zoom lens into an electric signal;

said zoom lens including
four groups that are a negative first group, a positive second group, a positive third group, and a negative or positive fourth group in order from an object side, the first group including a negative cemented lens formed by joining together, from the object side, a first lens formed by a negative single lens and a second lens formed by a positive single lens, the second group including, from the object side, a third lens formed by a positive single lens and a cemented lens formed by joining together a fourth lens formed by a positive single lens and a fifth lens formed by a negative single lens, the third group including a sixth lens formed by a positive single lens, the fourth group including a seventh lens formed by a single lens at a fixed distance from an image pickup surface;

the zoom lens satisfying following conditional expressions (1) to (3):

$$N1d>1.55 \quad (1)$$

$$v2d<30 \quad (2)$$

$$f21/fw>1 \quad (3)$$

where N1d is an index of refraction of the negative first lens forming the cemented lens in the first group with respect to a d-line, v2d is an Abbe number of the positive second lens forming the cemented lens in the first group, fw is focal length in a wide-angle end state, and f21 is focal length of the positive third lens located nearest to the object side within the second group.

15. A zoom lens comprising:
three groups that are a negative first group, a positive second group, and a positive third group in order from an object side,
the first group including a negative cemented lens formed by joining together, from the object side, a first lens formed by a negative single lens and a second lens formed by a positive single lens,
the second group including, from the object side, a third lens formed by a positive single lens and a cemented lens formed by joining together a fourth lens formed by a positive single lens and a fifth lens formed by a negative single lens,
the third group including a sixth lens formed by a positive single lens;
the zoom lens satisfying following conditional expressions (1) to (3):

$$N1d>1.55 \quad (1)$$

$$v2d<-30 \quad (2)$$

$$|G1R1/G2R2|<3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

16. The zoom lens according to claim 15,
wherein said zoom lens satisfies following conditional expressions (4) and (5):

$$G1R1/fw<-2.2 \quad (4)$$

$$G2R2/fw>3 \quad (5)$$

where fw is focal length in a wide-angle end state.

17. The zoom lens according to claim 15,
wherein in said zoom lens, at least one surface nearest to the object side or nearest to an image surface side in said first group is a spherical shape, and said zoom lens satisfies a following conditional expression (6):

$$|G1R1/G2R2|<1.4 \quad (6)$$

18. The zoom lens according to claim 15,
wherein in said zoom lens, the cemented lens of said first group is formed by a compound aspheric lens including said first lens made of a negative glass lens and said second lens made of a positive resin lens.

19. The zoom lens according to claim 15,
wherein in said zoom lens, a distance from an aperture stop of said second group to a lens surface vertex of said fourth lens disposed nearest to an image surface side in said second group satisfies a following conditional expression (7):

$$L/(fw*ft)^{1/2}<0.25 \quad (7)$$

where ft is focal length in a telephoto end state, and L is the distance from the aperture stop disposed in the second group to the lens surface vertex of said fourth lens disposed nearest to the image surface side in the second group.

20. An image pickup device comprising:
a zoom lens; and
an image pickup element for converting an optical image formed by said zoom lens into an electric signal;
said zoom lens including three groups that are a negative first group, a positive second group, and a positive third group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, and the third group including a fifth lens formed by a positive single lens, and the zoom lens satisfying following conditional expressions (1) to (3):

$$N1d>1.55 \quad (1)$$

$$v2d<30 \quad (2)$$

$$|G1R1/G2R2|<3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

21. A zoom lens comprising:
four groups that are a negative first group, a positive second group, a positive third group, and a negative or positive fourth group in order from an object side,
the first group including a negative cemented lens formed by joining together a first lens formed by a negative single lens and a second lens formed by a positive single lens from the object side,
the second group including a cemented lens formed by joining together a third lens formed by a positive single lens and a fourth lens formed by a negative single lens from the object side,
the third group including a fifth lens formed by a positive single lens, the fourth group including a sixth lens formed by a single lens at a fixed distance from an image pickup surface, at least one of surfaces in contact with air being formed in a spherical shape, and the zoom lens satisfying following conditional expressions (1) to (3):

$$N1d>1.55 \quad (1)$$

$$v2d<30 \quad (2)$$

$$|G1R1/G2R2|<3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

22. The zoom lens according to claim 21,
wherein said zoom lens satisfies following conditional expressions (4) to (7):

$$G1R1/fw>-4 \quad (4)$$

$$G2R2/fw>2.3 \quad (5)$$

$$f3/f1<-0.65 \quad (6)$$

$$f4/f1>1 \quad (7)$$

where fw is focal length in a wide-angle end state, f1 is focal length of the first group, f3 is focal length of the third group, and f4 is focal length of the fourth group.

23. The zoom lens according to claim 21,
wherein in said zoom lens, at least one surface nearest to the object side or nearest to an image surface side in said first group is a spherical shape, and said zoom lens satisfies a following conditional expression (8):

$$|G1R1/G2R2|<1.4 \quad (8)$$

24. The zoom lens according to claim 21,
wherein in said zoom lens, the fifth lens in said third group and the sixth lens in said fourth group are each formed by a resin lens.

25. The zoom lens according to claim 21,
wherein in said zoom lens, the cemented lens of said first group is formed by a compound aspheric lens including said first lens made of a negative glass lens and said second lens made of a positive resin lens.

26. The zoom lens according to claim 21,
wherein in said zoom lens, said fourth group is integral with an image pickup element for receiving light of an image and doubles as a protective member.

27. The zoom lens according to claim 21,
wherein in said zoom lens, a distance from an aperture stop of said second group to a lens surface vertex of said fourth lens disposed nearest to an image surface side in said second group satisfies a following conditional expression (9):

$$L/(fw*ft)^{1/2}<0.35 \quad (9)$$

where ft is focal length in a telephoto end state, and L is the distance from the aperture stop disposed in the second group to the lens surface vertex of said fourth lens disposed nearest to the image surface side in the second group.

28. An image pickup device comprising:
a zoom lens; and
an image pickup element for converting an optical image formed by said zoom lens into an electric signal;
said zoom lens including four groups that are a negative first group, a positive second group, a positive third group, and a negative or positive fourth group in order from an object side, the first group including a negative cemented lens formed by joining together a first lens formed by a negative single lens and a second lens formed by a positive single lens from the object side, the second group including a cemented lens formed by joining together a third lens formed by a positive single lens and a fourth lens formed by a negative single lens from the object side, the third group including a fifth lens formed by a positive single lens, the fourth group including a sixth lens formed by a single lens at a fixed distance from an image pickup surface, at least one of surfaces in contact with air being formed in a spherical shape, and the zoom lens satisfying following conditional expressions (1) to (3):

$$N1d > 1.55 \quad (1)$$

$$v2d < 30 \quad (2)$$

$$|G1R1/G2R2| < 3 \quad (3)$$

where N1d is an index of refraction of the negative first lens forming the cemented lens in the first group with respect to a d-line, v2d is an Abbe number of the positive second lens forming the cemented lens in the first group, G1R1 is a radius of curvature of a first surface of the negative first lens forming the cemented lens in the first group, and G2R2 is a radius of curvature of a second surface of the positive second lens forming the cemented lens in the first group.

* * * * *